US012454714B2

(12) United States Patent
Bohlmann et al.

(10) Patent No.: US 12,454,714 B2
(45) Date of Patent: Oct. 28, 2025

(54) MONBRETIN A (MBA) SYNTHESIS USING A HETEROLOGOUS NUCLEIC ACID(S) ENCODING A MBA PATHWAY ENZYME

(71) Applicant: The University of British Columbia, Vancouver (CA)

(72) Inventors: Carl Joerg Bohlmann, Vancouver (CA); Sandra Irmisch, Vancouver (CA); Seohyun Jo, Vancouver (CA)

(73) Assignee: The University of British Columbia, Vancouver (CA)

( * ) Notice: Subject to any disclaimer, the term of this patent is extended or adjusted under 35 U.S.C. 154(b) by 883 days.

(21) Appl. No.: 17/254,461

(22) PCT Filed: Jun. 21, 2019

(86) PCT No.: PCT/CA2019/050872
§ 371 (c)(1),
(2) Date: Dec. 21, 2020

(87) PCT Pub. No.: WO2019/241895
PCT Pub. Date: Dec. 26, 2019

(65) Prior Publication Data

US 2021/0317497 A1 Oct. 14, 2021

Related U.S. Application Data

(60) Provisional application No. 62/688,918, filed on Jun. 22, 2018, provisional application No. 62/826,826, filed on Mar. 29, 2019.

(51) Int. Cl.

| | |
|---|---|
| ***C12N 9/00*** | (2006.01) |
| ***C12N 9/02*** | (2006.01) |
| ***C12N 9/10*** | (2006.01) |
| ***C12N 15/82*** | (2006.01) |
| ***C12P 19/60*** | (2006.01) |

(52) U.S. Cl.
CPC ............ *C12P 19/60* (2013.01); *C12N 9/0071* (2013.01); *C12N 9/1029* (2013.01); *C12N 9/1048* (2013.01); *C12N 9/1051* (2013.01); *C12N 15/825* (2013.01); *C12Y 114/11* (2013.01); *C12Y 114/11009* (2013.01); *C12Y 114/11023* (2013.01)

(58) Field of Classification Search
CPC ......................... C12N 15/8243; C12N 15/825; C12N 9/1048; C12N 9/24; C12P 17/06; C12Y 114/11009; C12Y 114/11023
USPC ........................................................... 435/75
See application file for complete search history.

(56) References Cited

PUBLICATIONS

Baba et al ( JBC 2017, 292, pp. 4700-4713).*
Nakatsuka et al (Molecular Breeding 2006, 17, pp. 91-99.*
Kisselev L., (Structure, 2002, vol. 10: 8-9).*
Witkowski et al., (Biochemistry 38:11643-11650, 1999.*
Whisstock et al., (Quarterly Reviews of Biophysics 2003, vol. 36 (3): 307-340.*
Devos et al., (Proteins: Structure, Function and Genetics, 2000, vol. 41: 98-107.*
O. Ahrazem, "UGT709: A saffron glycosyltransferase involved in picrocrocin glucosylation," Ciencia y Tecnologia Agroforestal y Genetica, Botanical Institute, UCLM, Campus Universitario, Albacete 02071, Spain, Jun. 13, 2016, GenBank accession No. APU54677.1, 1 page.
Limin Fu, et al., "CD-HIT: accelerated for clustering the next-generation sequencing data," Bioinformatics Applications Note, (2012), vol. 28, No. 23, pp. 3150-3152.
S. Irmisch, et al., "Crocosmia x crocosmiiflora flavonoid 3'-hydroxylase (CYP1) mRNA, complete cds," Apr. 30, 2019, GenBank accession No. MK562520, 2 pages.
S. Irmisch, et al., "Crocosmia x crocosmiiflora flavonoid 3'5'-hydroxylase (CYP2) mRNA, complete cds," Apr. 30, 2019, GenBank accession No. MK562521, 2 pages.
S. Irmisch, et al., "Crocosmia x crocosmiiflora flavanone 3'-hydroxylase (F3H-1) mRNA, complete cds," Apr. 30, 2019, GenBank accession No. MK562522, 2 pages.
S. Irmisch, et al., "Crocosmia x crocosmiiflora flavanone 3'-hydroxylase (F3H-2) mRNA, complete cds," Apr. 30, 2019, GenBank accession No. MK562523, 2 pages.
S. Irmisch, et al., "Crocosmia x crocosmiiflora flavonol synthase (FLS) mRNA, complete cds," Apr. 30, 2019, GenBank accession No. MK562524, 2 pages.
S. Irmisch, et al., "Crocosmia x crocosmiiflora transcription factor (MYB1) mRNA, complete cds," Apr. 30, 2019, GenBank accession No. MK562525, 2 pages.
S. Irmisch, et al., "Crocosmia x crocosmiiflora transcription factor (MYB2) mRNA, complete cds," Apr. 30, 2019, GenBank accession No. MK562526, 2 pages.
S. Irmisch, et al., "Crocosmia x crocosmiiflora transcription factor (MYB3) mRNA, complete cds," Apr. 30, 2019, GenBank accession No. MK562527, 2 pages.
S. Irmisch, et al., "Crocosmia x crocosmiiflora transcription factor (MYB4) mRNA, complete cds," Apr. 30, 2019, GenBank accession No. MK562528, 2 pages.

(Continued)

*Primary Examiner* — Tekchand Saidha
*Assistant Examiner* — Mohammad Y Meah
(74) *Attorney, Agent, or Firm* — Christsensen O'Connor Johnson Kindness PLLC

(57) ABSTRACT

Provided are transgenic organisms, such as plants and plant parts, cells, and related compositions and methods for producing and monitoring the genotype for enhanced production of montbretin A and/or its precursors. For example, provided is a transgenic organism comprising at least one heterologous nucleic acid operatively linked to a promoter, wherein the heterologous nucleic acid encodes at least one enzyme in a montbretin A (MbA) metabolic pathway. The organisms can be a plant, plant part, or plant cell, or a microorganism such as a yeast. Also provided is a method for producing at least one montbretin A (MbA) precursor and/or MbA, comprising permitting the expression of the at least one heterologous nucleic acid in the transgenic organism. The disclosure also provides isolated nucleic acid molecules that comprise sequence encoding at least one enzyme in a montbretin A (MbA) metabolic pathway and vectors comprising the nucleic acids.

13 Claims, 18 Drawing Sheets

Specification includes a Sequence Listing.

(56) References Cited

PUBLICATIONS

S. Irmisch, et al., "Crocosmia x crocosmiiflora cytochrome P450 reductase (CPR) mRNA, complete cds," Apr. 30, 2019, GenBank accession No. MK562529, 2 pages.
S. Irmisch, et al., "Discovery of UDP-Glycosyltransferases and BAHD-Acyltransferases Involved in the Biosynthesis of the Antidiabetic Plant Metabolite Montbretin A," The Plant Cell, Aug. 2018, vol. 30, pp. 1864-1886.
S. Irmisch, et al., "Flavonol Biosynthesis Genes and Their Use in Engineering the Plant Antidiabetic Metabolite Montbretin A1," Plant Physiology, Jul. 2019, vol. 180, pp. 1277-1290.
C. Lillo, et al., "Nutrient depletion as a key factor for manipulating gene expression and product formation in different branches of the flavonoid pathway," Plant, Cell and Environment, 2008, vol. 31, pp. 587-601.
Susanna Pollastri, et al., "Flavonols: old compounds for old roles," Annals of Botany, 2011, vol. 108, pp. 1225-1233.
Carsten Rautengarten, et al., "The Golgi localized bifunctional UDP-rhamnose/UDP-galactose transporter family of Arabidopsis," Proc. Natl. Acad. Sci., Aug. 5, 2014, vol. 111, No. 31, pp. 11563-11568.
Seohyun Jo, "Investigating Montbretin A Biosynthesis and Elucidating Acyltransferase in Crocosmia x crocosmiiflora," A Thesis in Partial Fulfillment of the Requirements for the Degree of Master of Science, University of British Columbia, 2016, 91 pages.
Chris A. Tarling, et al., "The Search for Novel Human Pancreatic α-Amylase Inhibitors: High-Throughput Screening of Terrestrial and Marine Natural Product Extracts," ChemBioChem, 2008, vol. 9, pp. 433-438.
Y. Yang, et al., "*Allium cepa* var. aggregatum flavanone 3-hydroxylase (F3H) mRNA, complete cds," Jul. 30, 2018, GenBank accession No. MF805715, 2 pages.
N. Yoshihara, et al., Iris x hollandica IhF3H1 mRNA for Flavanone 3-hydroxylase, complete cds, Jul. 12, 2006, GenBank accession No. AB183826, 2 pages.
International Search Report mailed Aug. 29, 2019, issued in corresponding International Patent Application No. PCT/CA2019/050872, filed Jun. 21, 2019, 7 pages.
International Preliminary Report on Patentability mailed Dec. 22, 2020, issued in corresponding International Patent Application No. PCT/CA2019/050872, filed Jun. 21, 2019, 8 pages.
Product Nos. W530098, 92204, 60010, 74565, T4512, 1592409, 05390590 and 91255. Safety Data Sheets [online]. sigmaaldrich.com. [retrieved on Aug. 19, 2019]. Retrieved from <http://sigmaaldrich.com/safety-center.html>. See pp. 1 and 2 of respective safety data sheets (includes relevant date of publication).
Yoshihara, N., et al., Iris x hollandica IhF3HI mRNA for Flavanone 3-hydroxylase, complete eds. GenBank: Accession No. AB183826. Jul. 12, 2006. [retrieved on Aug. 19, 2019]. Retrieved from https://ncbi.nlm.nih.gov/protein/APU54677.
Williams, L. K., et al., "The Amylase Inhibitor Montbretin A Reveals A New Glycosidasc Inhibition Motif," Nature Chemical Biology 11(9):691-696. Sep. 2015.
Written Opinion mailed Aug. 29, 2019, issued in corresponding International Patent Application No. PCT/CA2019/050872, filed Jun. 21, 2019, 8 pages.

* cited by examiner myricetin

MR

MRG

Mini-MbA

MbA

Tetrahydroxy chalcone

Naringenin

Eriodictyol

PHF

DHK

DHQ

DHM

MONBRETIN A (MBA) SYNTHESIS USING A HETEROLOGOUS NUCLEIC ACID(S) ENCODING A MBA PATHWAY ENZYME

CROSS-REFERENCES TO RELATED APPLICATIONS

This application is a National Stage of International Patent Application No. PCT/CA2019/050872, filed Jun. 21, 2019, which claims the benefit of U.S. Provisional Application No. 62/826,826 filed Mar. 29, 2019, and U.S. Provisional Application No. 62/688,918, filed Jun. 22, 2018, the entire contents of which are incorporated herein by reference in their entireties.

STATEMENT REGARDING SEQUENCE LISTING

The sequence listing associated with this application is provided in text format in lieu of a paper copy and is hereby incorporated by reference into the specification. The name of the text file containing the sequence listing is UOBC169641_ST25.txt. The text file is 92 KB; was created on Jun. 20, 2019; and is being submitted via EFS-Web with the filing of the specification.

BACKGROUND

Diabetes and obesity are diseases that are approaching globally epidemic proportions with tremendous human health and economic consequences. The increasing occurrence of type-2 diabetes mellitus, a chronic disease that affects over 320 million people worldwide, is fast becoming one of the major health challenges of the 21st century. Type-2 diabetes is characterized by the body's inefficient use of insulin and hyperglycemia that may cause long-term damage to different organs of the human body.

A major goal in treating diabetes and obesity is to reduce high levels of blood glucose, which is a particular problem in patients with diets that are rich in starch and other sugars. The regulation of blood glucose levels in patients diagnosed with type-2 diabetes can be achieved, amongst other treatments, by inhibition of the human enzymes involved in starch degradation, such as the pancreatic α-amylase (HPA), which cleaves starch into oligosaccharides, and the gut α-glucosidases, which degrade those oligosaccharides, as well as dietary oligosaccharides such as sucrose, to glucose. Drugs currently on the market under the trade names Acarbose, Miglitol and Voglibose inhibit the gut α-glucosidases and have the positive effect of reducing sugar uptake. However, they also result in the movement of oligo- and disaccharides to the lower bowel where they result in osmotic imbalance and can be rapidly fermented by the gut microbiome. This can cause undesirable side effects such as abdominal pain, flatulence or diarrhea that may lead to patient non-compliance.

Use of a specific inhibitor of the amylase but not the α-glucosidases should bypass these problems, thereby minimizing the described side effects of existing drugs in the treatment of type-2 diabetes. Relatively recently, a large-scale screen of a library of 30,000 extracts from terrestrial and marine sources for inhibitors of HPA identified montbretin A (MbA), isolated from montbretia (*Crocosmia* x *crocosmiiflora*) corms, as a highly specific and potent HPA inhibitor. MbA selectively inhibits HPA with a $K_i$ of 8.1 nM, but does not affect the gut α-glucosidases. Animal studies with "Zucker diabetic fatty" rats demonstrated the biological activity of MbA as an effective blood-glucose-lowering molecule.

MbA is a complex acylated flavonol glycoside (FIG. 1A) described as myricetin 3-O-(glucosyl-6'-O-caffeoyl)-1,2-β-D-glucosyl 1,2-α-L-rhamnoside 4'-O-α-L-rhamnosyl 1,4-β-D-xyloside. It contains a myricetin core, which is decorated with two carbohydrate chains, a trisaccharide chain (β-D-glucosyl 1,2-β-D-glucosyl 1,2-α-L-rhamnoside) at O3 of the benzopyrone and a disaccharide chain (α-L-rhamnosyl 1,4-β-D-xyloside) at C4 of the phenyl moiety. The second glucose of the trisaccharide chain is linked at C6 to a caffeoyl moiety. In a series of structure-activity assays the core active structure of MbA was identified as myricetin 3-O-(6'-O-caffeoyl)-β-D-glucosyl 1,2-α-L-rhamnoside (MRG-Caff). This structure, dubbed mini-MbA, has a $K_i$ of 93 nM with HPA, and is a much less complex molecule yet still a highly potent HPA inhibitor.

The ornamental plant montbretia (*Crocosmia* x *crocosmiiflora*), a perennial of the Iridaceae family native to southern and eastern Africa, is the only known source of MbA. Montbretia propagates by seed and through bulb-like below ground storage/reproductive organs, called corms, from which MbA was isolated. Research on montbretia has almost entirely focused on its improvement as an ornamental plant, and there has been no prior molecular or biochemical research on this plant and its MbA biosynthesis.

Development of MbA as a drug for treatment of type-2 diabetes would require reliable large-volume production. Isolation of variable amounts of ~0.3-3 mg MbA per gram corm, dependent on montbretia cultivars, has been reported. While these amounts are sufficient for in vitro tests and initial animal and clinical trials, this is insufficient for realistic therapeutic drug production.

Accordingly, a need exists for efficient and cost-effective production of MbA and its metabolites to provide an improved source of therapeutically relevant compositions. The present disclosure addresses this and related needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosure provides transgenic organisms, or subcomponents thereof, and related compositions and methods for producing montbretin A and/or its precursors, and methods of detecting and/or monitoring the capacity for enhanced production of montbretin A and/or its precursors.

In one aspect the disclosure provides a transgenic organism comprising at least one heterologous nucleic acid operatively linked to a promoter, wherein the heterologous nucleic acid encodes at least one enzyme in a montbretin A (MbA) metabolic pathway.

In some embodiments, the transgenic organism can be a plant, plant part, or plant cell. In some embodiments, the transgenic organism can be a microorganism, such as a yeast. In some embodiments, the transgenic organism produces at least one precursor montbretin A (MbA), such as one or more of naringenin, dihydrokaempferol (DHK), kaempferol, eriodictyol, dihydroquercetin (DHQ), quercetin, pentahydroxyflavanon (PHF), dihydromyricetin (DHM), myricetin, myricetin 3-O-rhamnoside (MR), myricetin 3-O-glycosyl rhamnoside (MRG), myricetin 3-O-(6'-O- caffeoyl)-glucosyl rhamnoside (mini-MbA), myricetin 3-O-(glucosyl-6'-O-caffeoyl)-glucosyl rhamnoside (MbA-$XR^2$), and myricetin 3-O-(glucosyl-6'-O-caffeoyl)-glucosyl rhamnoside 4'-O-xyloside (MbA-$R^2$). In some embodiments, the transgenic organism produces MbA.

In some embodiments, the at least one enzyme in the MbA metabolic pathway is selected from a flavanone hydroxylase (F3H), flavonol synthase (FLS), a flavonoid 3'-hydroxylase (F3'H), a flavonoid 3'5'-hydroxylase (F3'5'H), a UDP-sugar dependent glycosyltransferase (UGT), and a BAHD-acyltransferase (BAHD-AT).

In another aspect, the disclosure provides a method for producing at least one montbretin A (MbA) precursor. The method comprises permitting the expression of the at least one heterologous nucleic acid in the transgenic organism. In some embodiments, the method also comprises producing MbA in the transgenic organism. The method can also comprise extracting the MbA precursor or product from the transgenic organism.

In another aspect, the method provides an isolated MbA precursor or product produced by the method.

In another aspect, the method provides a vector comprising a nucleic acid encoding at least one enzyme in a montbretin A (MbA) metabolic pathway operatively linked to a promoter.

In yet another aspect, the method provides isolated nucleic acid comprising at least 10 consecutive nucleotides of a gene (or a complement thereof), wherein the gene encodes an enzyme in a montbretin A (MbA) biosynthetic pathway. The isolated nucleic acid can be detectably labeled.

In yet another aspect, the disclosure also provides a method of detecting the presence or expression of at least one enzyme in a montbretin A (MbA) metabolic pathway in a montbretia (*Crocosmia* x *crocosmiiflora*) plant. The method comprises contacting genetic material extracted from the montbretia plant with the isolated nucleic acid disclosed herein under stringent binding conditions, and detecting binding of the isolated nucleic acid to the genetic material.

In yet another aspect, the disclosure provides a genotyping method for monitoring the breeding of a montbretia (*Crocosmia* x *crocosmiiflora*) plant for favorable characteristics for production of montbretin A (MbA) or at least one precursor thereof. The method comprises contacting genetic material extracted from an offspring montbretia plant or plant part produced from one or more parent montbretia plants with the isolated nucleic acid disclosed herein under stringent binding conditions, and detecting binding of the isolated nucleic acid to the genetic material.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

(FIG. 2A) Schematic of vegetative growth and corm development. Plant organs are labeled as old corm (oC), roots (r), stolon (st), young corm (yc), and shoot (s). (FIG. 2B) Representative images of yC and oC at the June 10th and September 12th sampling time points. (FIG. 2C) Corms were collected at 14 time points over a one-year growing period (February 2016-February 2017). Levels of MbA in corm extracts are shown as the average with standard errors for four to six biological replicates for each time point. Different letters above the data points indicate significant differences between time points. Asterisks (*) indicate the statistical significance between yC and oC for that time point.

FIGS. 11A-111F graphically illustrate transcript abundance of myricetin biosynthesis pathway genes in yC (open circles) and oC (closed circles). RNA was isolated from yC and oC harvested at six different time points of corm development. Transcript abundance was determined by qRT-PCR for CcF3H1 (FIG. 11A), CcF3H2 (FIG. 11B), CcFLS (FIG. 11C), CcCYP1 (FIG. 11D) and CcCYP2 (FIG. 11E). Fold change of myricetin biosynthesis pathway genes for yC relative to oC at the June 10th sampling time point (FIG. 11F). Means and standard errors are shown (n=3). Different letters above the data points indicate significant differences between sampling time points and n.s. indicates no statistical significance. Asterisks (*) indicate the statistical significance between yC and oC for time points.

DETAILED DESCRIPTION

As indicated above, montbretin A (MbA) has been shown to be a highly specific and potent HPA inhibitor, but which does not affect gut α-glucosidases. Furthermore, the MbA precursor mini-MbA also has HPA inhibitory characteristics. While MbA represents a potent therapeutic for addressing type 2 diabetes and related conditions, the only known source of MbA are the corms of montbretia (*Crocosmia* x *crocosmiiflora*) and the inventors have shown that MbA is only produced in small amounts during a narrow window of time during seasonal corm development (see EXAMPLE 1). Due to the rare occurance and low abundance of MbA in nature and due to its complex chemical structure, extraction of MbA from montbretia corms and chemical synthesis, respectively, are insufficient to produce the metabolite for full-scale drug development and application.

MbA production using a synthetic biology approach through metabolic engineering of a heterologous plant or microbial system is an attractive alternative, but this approach requires knowledge of the genes and enzymes of MbA biosynthesis. As described in more detail below, the inventors embarked on a detailed study to isolate and characterize the enzymes that participate in the biosynthesis of MbA in montbretia plants. As proof of concept, the inventors genetically engineered a model plant (*Nicotiana benthamiana*) to heterologously express the characterized enzymes leading to successful production of MbA.

As described in more detail in the Examples below, MbA biosynthesis occurs almost exclusively in young developing corms and involves the formation and step-wise assembly of seven individual building blocks: the flavonol core myricetin, two units of UDP-rhamnose (UDP-Rha), two units of UDP-glucose (UDP-Glc), UDP-xylose (UDP-Xyl) and caffeoyl-CoA. EXAMPLE 1 describes the characterization of the first three steps of MbA assembly, starting with myricetin, proceed via myricetin 3-O-α-L-rhamnoside (MR) and myricetin 3-O-β-D-glucosyl 1,2-α-L-rhamnoside (MRG) to myricetin 3-O-(6'-O-caffeoyl)-β-D-glucosyl 1,2-α-L-rhamnoside (mini-MbA) (see FIG. 1B, steps 1-3). These steps were found to require two different UDP-sugar dependent glycosyltransferases (UGTs), CcUGT1 (UGT77B2) and CcUGT2 (UGT709G2), and a BAHD-acyltransferase (AT) reaction catalyzed by CcAT1 or CcAT2.

EXAMPLE 2 describes characterization and heterologous expression of additional genes that affect biosynthesis of the precursor myricetin. Using CcUGT1, CcUGT2, CcAT1 or CcAT2, together with montbretia genes of myricetin biosynthesis, specifically a MYB-transcription factor (CcMYB4), flavanone hydroxylase (CcF3H), flavonol synthase (CcFLS), a flavonoid 3'-hydroxylase (CcCYP1), and flavonol 3'5'-hydroxylase (CcCYP2), the inventors successfully reconstructed the biosynthesis of mini-MbA in *N. benthamiana.*

Figure 1A:
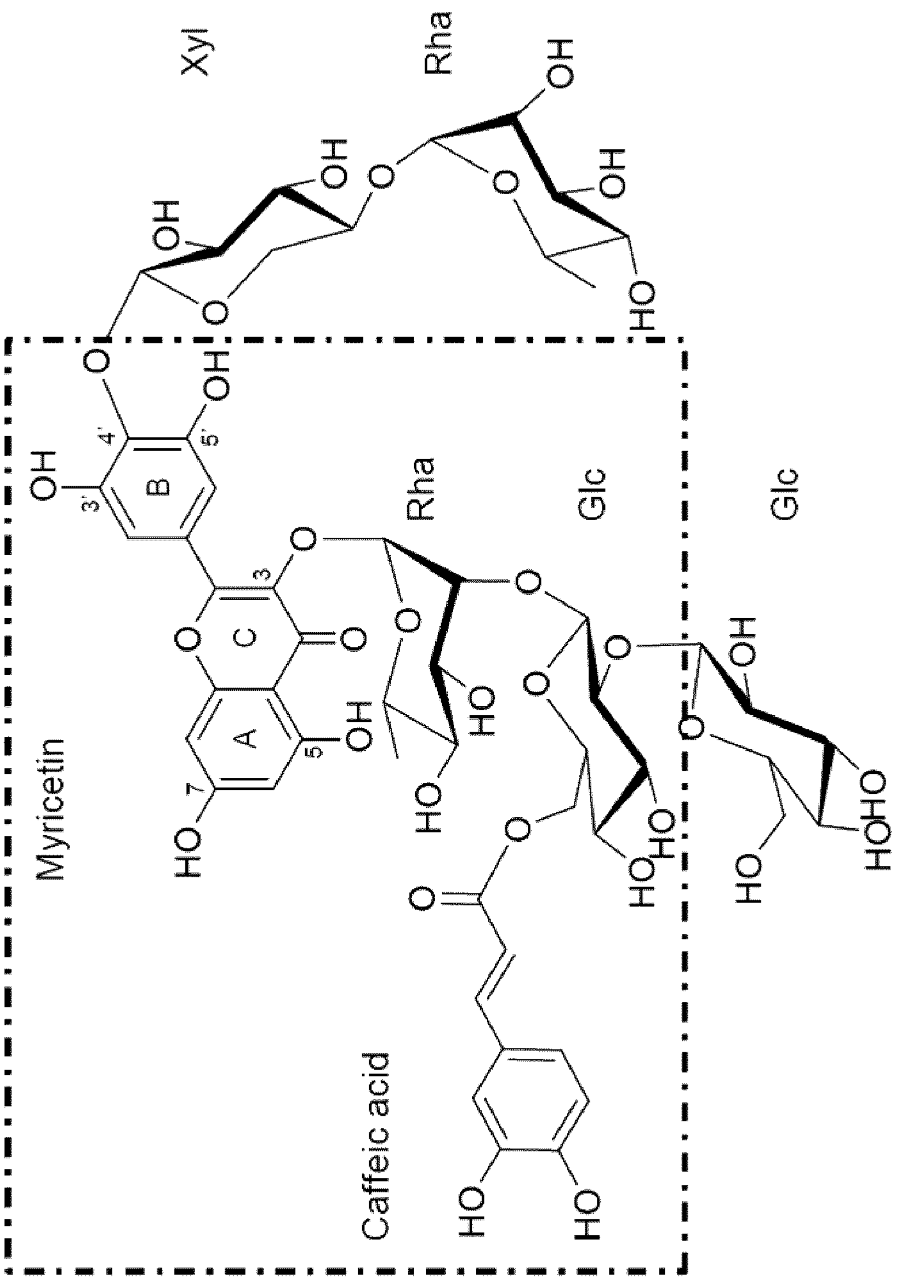
FIG. 1A is a structural representation of montbretin A (MbA). The building blocks of MbA are labeled: myricetin, rhamnose (Rha), glucose (Glc), xylose (Xyl) and caffeic acid. Position of hydroxy groups of the myricetin core and A,B,C-designation of aromatic rings are shown. Dotted line marks the mini-MbA structure. The full chemical name of montbretin A (MbA) is myricetin 3-O-(glucosyl-6'-O-caffeoyl)-1,2-β-D-glucosyl 1,2-α-L-rhamnoside 4'-O-α-L-rhamnosyl 1,4-β-D-xyloside.
Figure 1B:
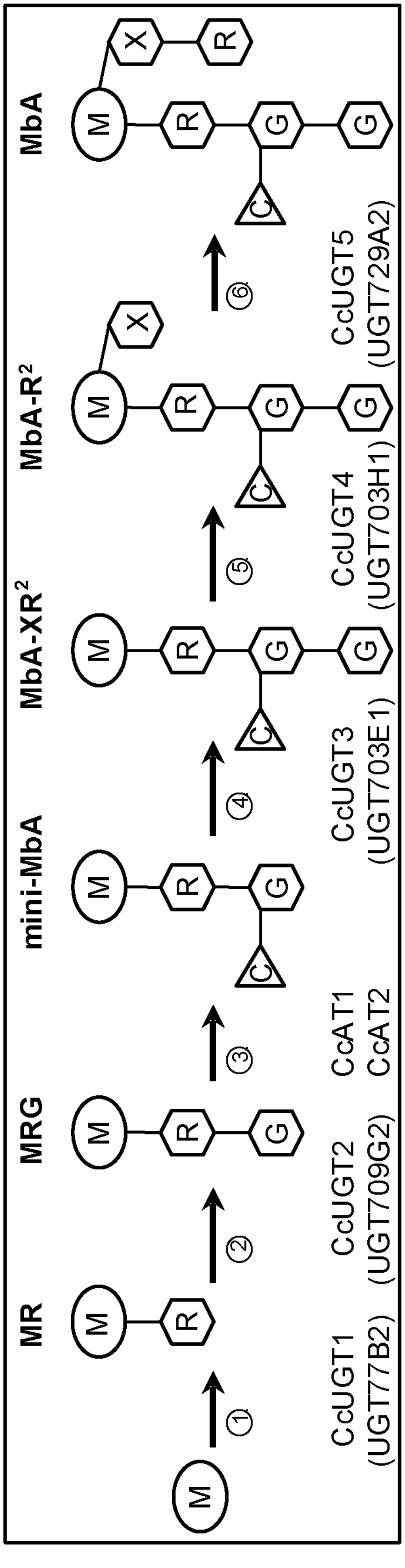
FIG. 1B is a schematic representation of the metabolic steps of biosynthesis of MbA from the flavonol myricetin. The six steps of MbA assembly from a myricetin precursor are indicated with numbers below the arrows. Steps 1 to 3 were elucidated as described in Example 1 and the enzymes catalyzing these reactions are shown as CcUGT1, CcUGT2 and CcAT1 or CcAT2, respectively. The sequence of glycosylation in step 4 is described in Example 3. The sequence of glycosylation in steps 5 and 6 are described in Example 4. M=myricetin; R=rhamnose; G=glucose; X=xylose; C=caffeic acid.

EXAMPLES 3 and 4 described characterization and implementation of the final three steps of MbA biosynthesis beyond mini-MbA. These steps were found to involve three additional glycosylations with UDP-Glc, UDP-Xyl and UDP-Rha (FIG. 1B, steps 4-6). EXAMPLE 3 describes a combined approach of transcriptome-based gene discovery, cDNA cloning, enzyme characterization, and gene expression in *N. benthamiana*, to functionally characterize CcUGT3 (UGT703E1) as a myricetin 3-O-(6'-O-caffeoyl)-β-D-glucosyl 1,2-α-L-rhamnoside 1,2-β-D-glucosyltransferase catalyzing the glycosylation of mini-MbA to myricetin 3-O-(glucosyl-6'-O-caffeoyl)-1,2-β-D-glucosyl 1,2-α-L-rhamnoside (MbA-$XR^2$) as the fourth step in MbA biosynthesis. EXAMPLE 4 describes a similar approach to identify CcUGT4 (UGT703H1), which catalyzes the glycosylation of MbA-$XR^2$ to produce the final MbA product 3-O-(glucosyl-6'-O-caffeoyl)-glucosyl rhamnoside 4'-O-xyloside (MbA-$R^2$), and CcUGT5 (UGT729A2), which catalyzes the glycosylation of MbA-$R^2$ to produce the final MbA product.

In accordance with the foregoing, the disclosure provides transgenic organisms, or subcomponents thereof, and related compositions and methods for producing montbretin A and/or its precursors, and methods of detecting and/or monitoring the capacity for enhanced production of montbretin A and/or its precursors.

Transgenic Organisms

In one aspect the disclosure provides a transgenic organism comprising at least one heterologous nucleic acid operatively linked to a promoter, wherein the heterologous nucleic acid encodes at least one enzyme in a montbretin A (MbA) metabolic pathway.

A transgenic organism is an organism that contains heterologous DNA, i.e., DNA from a source different than the host or parental organism. In this sense, the transgenic organism is engineered or modified in a manner where genetic material has been introduced into the host or parental organism. The heterologous genetic material can be integrated into the chromosomes of the host or parental organism. Alternatively, the introduced heterologous genetic material can exist in the organism (e.g., within a cell) but apart from the organism's endogenous chromosomes. For example, the heterologous genetic material can exist in a plasmid that resides within the cell. The heterologous genetic material functions to modify or alter the cellular physiology or biochemistry of the organism by encoding functional proteins (e.g., enzymes or transcription factors) that participate in a montbretin A (MbA) metabolic pathway. Through the introduction of genetic material, the parental organism, or subcomponent thereof, acquires new properties, e.g. the ability to produce a new, or greater quantities of, one or more metabolites, namely MbA or a precursor thereof.

The disclosed transgenic organism comprises a least one heterologous nucleic acid operatively linked to a promoter. The term "promoter" refers to a regulatory nucleotide sequence that can activate transcription (expression) of a gene and/or splice variant isoforms thereof. A promoter is typically located upstream of a gene, but can be located at other regions proximal to the gene, or even within the gene. The promoter typically contains binding sites for RNA polymerase and one or more transcription factors, which participate in the assembly of the transcriptional complex. As used herein, the term "operatively linked" indicates that the promoter and the encoding nucleic acid are configured and positioned relative to each other in a manner such that the promoter can activate transcription of the encoding nucleic acid by the transcriptional machinery of the cell. The promoter can be constitutive or inducible. Constitutive promoters can be determined based on the character of the host organism, or cells thereof, and the particular transcription factors available in the cytosol. A person of ordinary skill in the art can select an appropriate promoter based on the intended person, as various promoters are known and commonly used in the art.

The transgenic organism can be any organism useful for production of MbA or a precursor thereof via heterologous expression of enzymes in an MbA pathway. An exemplary organism is a plant. The disclosure encompasses transgenic plants where not necessarily all parts of the plant necessarily comprise the heterologous nucleic acid. In some embodiments, subcomponents of the entire plant, such as leaves, stems, seeds, roots, etc., comprise the heterologous nucleic acid and, thus, are capable of producing MbA or a precursor thereof. In other embodiments, the heterologous nucleic acid is integrated in the entire plant, including the germline. Thus, the transgenic organism can be a plant or the plant can be transgenic at least in a cell or part of the plant. The transgenic plant can be any species that is useful for production of MbA or precursors thereof. In some embodiments, the plant is capable of large scale agricultural production, thereby permitting large scale production and harvesting of transgenically synthesized MbA or precursors thereof. Exemplary plants include plants in the genus *Nicotiana*, such as *N. benthamiana*, which the inventors used as a proof of concept for heterologous production of MbA and precursors thereof. However, other plants can be readily selected depending on growing conditions and other desired characteristics of the plant, such as amenability for large scale production. Illustrative, non-limiting examples of plants amenable to large scale cultivation and production include plants in the genus *Solanum*, such as *S. tuberosum* or *S. lycopersicum*. Genetic engineering of host plants can be implemented by persons of ordinary skill in the art, including selection of appropriate plant-specific or appropriate promoters to facilitate heterologous expression of at least one enzyme. The heterologous nucleic acid can be integrated into the host plant using plant-appropriate vectors known in the art that can, for example, facilitate efficient integration of the heterologous nucleic acid (and linked promoter) into the chromosome of the host plant. See, e.g., Dunwell, J. M. and Wetten A. C. (eds.), *Transgenic Plants: Methods and Protocols, Second Edition*, Humana Press, 2012, incorporated herein by reference in its entirety.

In other embodiments, the organism is a single live cell. For example, the organism can be a cell from a eukaryotic cell line that is maintained in culture. In some embodiments, the eukaryotic cell is a plant cell. In other embodiments, the organism is a microorganism. For example, the microorganism can be a yeast (e.g., *Saccharomyces*), which is amenable to heterologous expression of biosynthetic pathway enzymes from other eukaryotes. Considering that the heterologous MbA metabolic pathway components are derived from a plant source (e.g., montbretia (*Crocosmia* x *crocosmiiflora*)), target yeast host may require additional manipulation or specialized cultivation to provide sufficient flavonol precursors to the MbA metabolic pathway (described below) as compared to a target plant host, which can have higher levels of endogenous production of such flavonol precursors that can feed into the MbA metabolic pathway. For example, in some embodiments, the transgenic yeast culture can be supplemented with myricetin and caffeoyl-CoA precursor metabolites. Alternatively, genes of the canonical phenylpropanoid and flavonol pathways leading to caffeoyl-CoA and myricetin production can be heterologously expressed in yeast either from plasmids or from genes integrated into yeast chromosomes. The genes for these pathways are known from a variety of plant species. The canonical pathway of flavonol biosynthesis in plants consists of phenylalanine ammonia lyase (PAL), 4-coumaroyl-CoA ligase (4CL), chalcone synthase (CHS), chalcone isomerase (CHI), flavanone 3β-hydroxylase (F3H) and flavonolsynthase (FLS). In addition, P450s such as flavonoid 3'-hydroxylases or flavonoid 3',5'-hydroxylases catalyze the addition of hydroxyl groups to the B-ring of flavonoids, which are necessary for multihydroxylated flavonols (myricetin), can be heterologously expressed in the target yeast host to promote elevated production of myricetin and, thus, promote the flux towards subsequent production of the MbA metabolic pathway.

With the heterologous expression of the at least one enzyme in an MbA pathway, the transgenic organism is capable of producing MbA and/or at least one precursor thereof. In this sense, the transgenic organism is engineered to express one or more the heterologous nucleic acid encodes at least one enzyme in a montbretin A (MbA) metabolic pathway. The term "metabolic pathway", also referred to as "biosynthetic pathway", refers to a set of anabolic or catabolic biochemical reactions for converting (transmuting) one chemical species (a substrate) into another (a product). Gene products belong to the same "metabolic pathway" if they, in parallel or in series, act on the same substrate, produce the same product, or act on or produce a metabolic intermediate (i.e., metabolite) between the same substrate and metabolite end product. A metabolite intermediate can also be referred to as a precursor to the metabolite end product.

Figure 10:
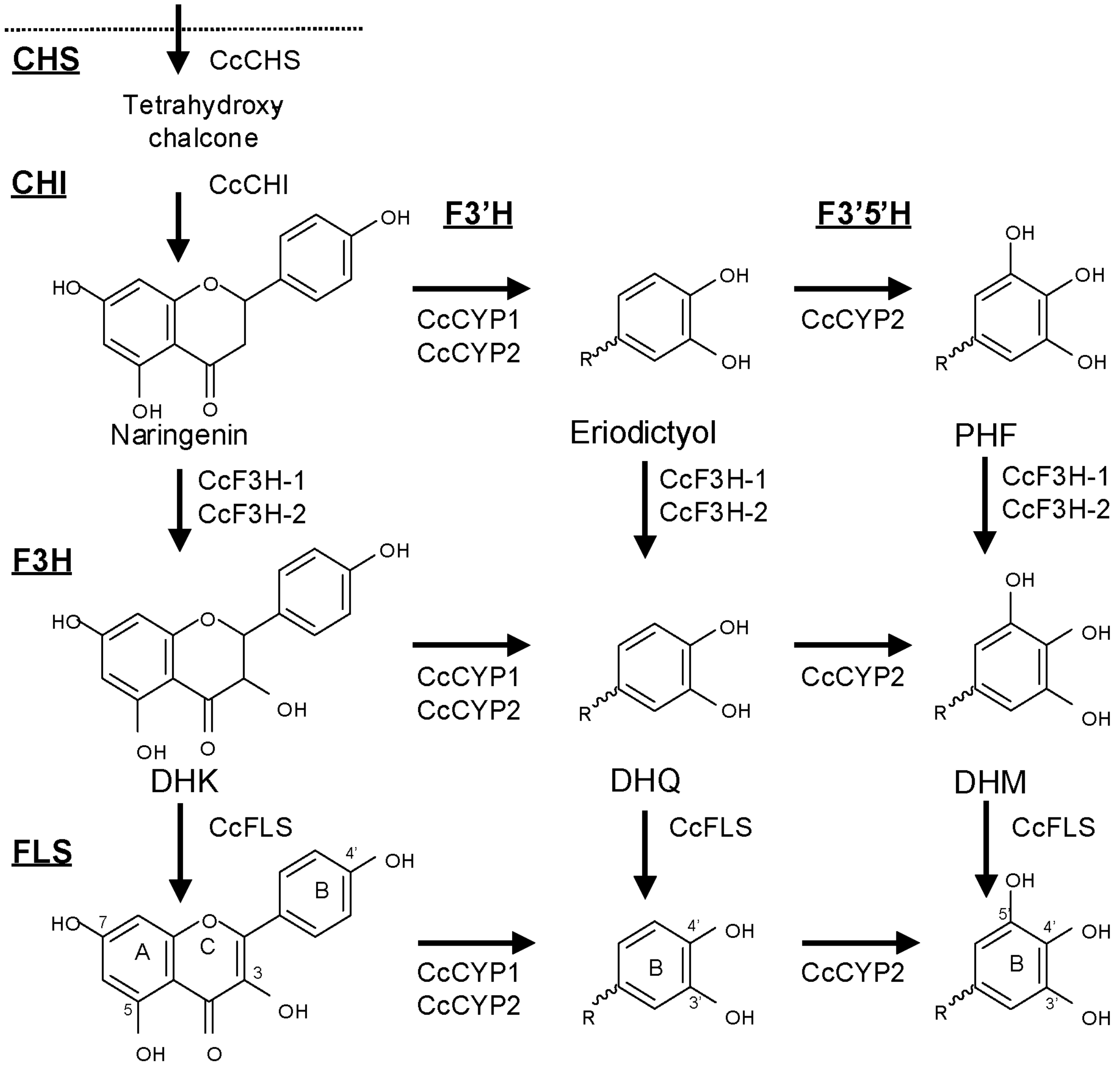
FIG. 10 illustrates a general schematic of myricetin biosynthesis indicating the enzymes and metabolites of flavonol biosynthesis leading to the formation of the 3'4'5'-hydroxylated flavonol myricetin. R indicates the A,C-component in the abbreviated flavonoid structures.

In some embodiments, the transgenic organism produces elevated levels of at least one of dihydrokaempferol (DHK), kaempferol, eriodictyol, dihydroquercetin (DHQ), quercetin, pentahydroxyflavanon (PHF), dihydromyricetin (DHM), myricetin, myricetin 3-O-rhamnoside (MR), myricetin 3-O-glycosyl rhamnoside (MRG), myricetin 3-O-(6'-O-caffeoyl)-glucosyl rhamnoside (mini-MbA), myricetin 3-O-(glucosyl-6'-O-caffeoyl)-glucosyl rhamnoside (MbA-$XR^2$), and myricetin 3-O-(glucosyl-6'-O-caffeoyl)-glucosyl rhamnoside 4'-O-xyloside (MbA-$R^2$), all of which are precursor metabolites for the production of MbA. For example, individual steps of an illustrative metabolic pathway from a myricetin precursor starting point to the production of MbA are illustrated in FIG. 1B and the characterization of these individual steps and their implementation in a transgenic plant are described in EXAMPLES 1, 3, and 4. Furthermore, the upstream precursor metabolites and the steps that lead to their conversion to the myricetin intermediate metabolite are illustrated in FIG. 10 and the characterization of these individual steps and their implementation in a transgenic plant are described on EXAMPLE 2. The disclosure encompasses transgenic organisms that produce any one of these precursors. In other embodiments, the transgenic organism produces 2, 3, 4, 5, 6, 7, 8, 9, 10, 11, or 12 of DHK, kaempferol, eriodictyol, DHQ, quercetin, PHF, DHM, myricetin, MR, MRG, mini-MbA, MbA-$XR^2$, and MbA-$R^2$, in any combination. In some embodiments, the transgenic organism produces all of these MbA precursors. In some embodiments, the transgenic organism also produces MbA. In some embodiments, the transgenic organism (e.g., a plant, plant part, or plant cell) produces an elevated level of the at least one precursor and/or MbA compared to an organism (e.g., plant, a plant part, or plant cell) of the same species under equivalent conditions but that does not comprise the heterologous nucleic acid (e.g., is not transgenic with the same heterologous nucleic acid).

In an exemplary embodiment, the transgenic organism produces myricetin. In another exemplary embodiment, the transgenic organism produces myricetin MR, MRG, and/or mini-MbA. In another embodiment, the transgenic organism produces MR, MRG, mini-MbA. MbA-$XR^2$, and MbA-$R^2$. In some further embodiment, the transgenic organism also produces MbA.

The at least one enzyme in a montbretin A (MbA) metabolic pathway encoded by the heterologous nucleic acid can be one or more of a flavanone hydroxylase (F3H), flavonol synthase (FLS), a flavonoid 3'-hydroxylase (F3'H), a flavonoid 3'5'-hydroxylase (F3'5'H), a UDP-sugar dependent glycosyltransferase (UGT), and a BAHD-acyltransferase (BAHD-AT), in any combination. In some embodiments, the transgenic organism comprises a plurality of heterologous nucleic acids operatively linked to one or more promoters, wherein each of the plurality of nucleic acids encodes a different enzyme in the MbA metabolic pathway selected from a F3H, FLS, F3'H, F3'5'H, UGT, and BAHD-AT, in any combination. These enzymes are described in more detail below. In some further embodiments, the encoding nucleic acid sequence is derived from the montbretia plant (*Crocosmia* x *crocosmiiflora*) and the function of the encoded enzyme has the same functionality as an enzyme in the source montbretin plant.

In some embodiments, the at least one enzyme is or comprises a F3H. In some embodiments, the F3H is operative to hydroxylate naringenin to form DHK (see, e.g., FIG. 10). In some embodiments, the F3H is selected from CcF3H1 derived from a montbretia (*Crocosmia* x *crocosmiiflora*) plant, CcF3H2 derived from a montbretia (*Crocosmia* x *crocosmiiflora*) plant, or a homolog thereof. In some embodiments, the F3H has an amino acid sequence with at least 80% identity (e.g., about 80, about 85%, about 90%, about 95%, about 96%, about 97%, about 98%, about 99%, or 100% identity) to the amino acid sequence set forth in SEQ ID NO:2 or SEQ ID NO:4, which reflects an exemplary F3H sequence.

In some embodiments, the at least one enzyme is or comprises a FLS. In some embodiments, the FLS is operative to catalyze desaturation of a dihydroflavonol to a flavonol. For example, the FLS can catalyze conversion of DHK to kaempferol, DHQ to quercetin and/or DHM to myricetin, as illustrated in FIG. 10. In some embodiments, the FLS is CcFLS derived from a montbretia (*Crocosmia* x *crocosmiiflora*) plant, or a homolog thereof. In some embodiments, the F3H has an amino acid sequence with at least 80% identity (e.g., about 80, about 85%, about 90%, about 95%, about 96%, about 97%, about 98%, about 99%, or 100% identity) to the amino acid sequence set forth SEQ ID NO:6, which reflects an exemplary FLS sequence.

In some embodiments, the at least one enzyme is or comprises a F3'H. In some embodiments, the F3'H is operative to catalyze hydroxylation of the B-ring of a flavonol or dihydroflavonol (see FIG. 10). In some embodiments, the F3'H is CcYP1 derived from a montbretia (*Crocosmia* x *crocosmiiflora*) plant, or a homolog thereof. In some embodiments, the F3'H has an amino acid sequence with at least 80% identity (e.g., about 80, about 85%, about 90%, about 95%, about 96%, about 97%, about 98%, about 99%, or 100% identity) to the amino acid sequence set forth in SEQ ID NO:8, which reflects an exemplary F3'H sequence.

In some embodiments, the at least one enzyme is or comprises a F3'5'H. In some embodiments, the F3'5'H is operative to catalyze hydroxylation of the B-ring of a flavonol or dihydroflavonol (see FIG. 10). In some embodiments, the F3'5'H is CcYP2 derived from a montbretia (*Crocosmia* x *crocosmiiflora*) plant, or a homolog thereof. In some embodiments, the F3'5'H has an amino acid sequence with at least 80% identity (e.g., about 80, about 85%, about 90%, about 95%, about 96%, about 97%, about 98%, about 99%, or 100% identity) to the amino acid sequence set forth in SEQ ID NO:10, which reflects an exemplary F3'5'H sequence.

Figure 5:
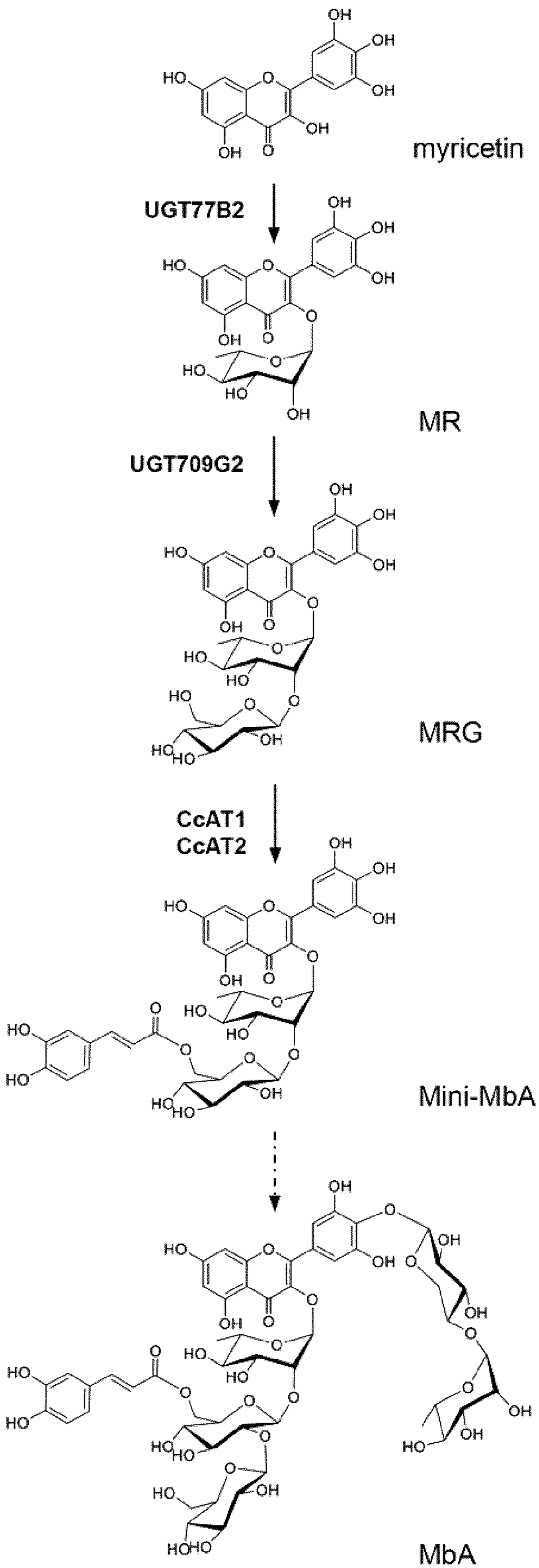
FIG. 5 illustrates the structures of the intermediates in the metabolic pathway from myricetin to MbA, and the roles of UGT1 (UGT77B2), UGT2 (UGT709G2), CcAT1 and CcAT2 in biosynthesis of the mini-MbA precursor. UGT1 (UGT77B2) converts myricetin and UDP-Rha into myricetin 3-O-α-L-rhamnoside (MR), which is then converted by UGT2 (UGT709G2) with UDP-Glc into myricetin 3-O-β-D-glucosyl 1,2-α-L-rhamnoside (MRG). CcAT1 and CcAT2 catalyze the acylation on the C6 position of the Glc of MRG to yield myricetin 3-O-(6'-O-caffeoyl)-β-D-glucosyl 1,2-α-L-rhamnoside (mini-MbA). Solid black arrows indicate pathway steps described in this work; dotted arrows indicate the proposed downstream biosynthesis.

In some embodiments, the at least one enzyme is or comprises a UGT, wherein the UGT is operative to catalyze glycosylation of myricetin to produce MR (see FIGS. 1B and 5). In some embodiments, the UGT is CcUGT1 (also referred to as UGT77B2) derived from a montbretia (*Crocosmia* x *crocosmiiflora*) plant, or a homolog thereof. In some embodiments, the UGT has an amino acid sequence with at least 80% identity (e.g., about 80, about 85%, about 90%, about 95%, about 96%, about 97%, about 98%, about 99%, or 100% identity) to the amino acid sequence set forth in SEQ ID NO:12, which reflects an exemplary CcUGT1 (UGT77B2) sequence.

In some embodiments, the at least one enzyme is or comprises a UGT, wherein the UGT is operative to catalyze glycosylation of MR to produce MRG (see FIGS. 1B and 5). In some embodiments, the UGT is CcUGT2 (also referred to as UGT709G2) derived from a montbretia (*Crocosmia* x *crocosmiiflora*) plant, or a homolog thereof. In some embodiments, the UGT has an amino acid sequence with at least 80% identity (e.g., about 80, about 85%, about 90%, about 95%, about 96%, about 97%, about 98%, about 99%, or 100% identity) to the amino acid sequence set forth in SEQ ID NO:14, which reflects an exemplary CcAT1 sequence.

In some embodiments, the at least one enzyme is or comprises a BAHD-AT. In some embodiments, the BAHD-AT is operative to catalyze acylation of MRG to produce mini-MbA (see FIGS. 1B and 5). In some embodiments, the BAHD-AT is selected from CcAT1 derived from a montbretia (*Crocosmia* x *crocosmiiflora*) plant, CcAT2 derived from a montbretia (*Crocosmia* x *crocosmiiflora*) plant, or a homolog thereof. In some embodiments, the BAHD-AT has an amino acid sequence with at least 80% identity (e.g., about 80, about 85%, about 90%, about 95%, about 96%, about 97%, about 98%, about 99%, or 100% identity) to the amino acid sequence set forth in SEQ ID NO:16 or SEQ ID NO:18, which reflects an exemplary CcAT2 sequence.

Figure 14:
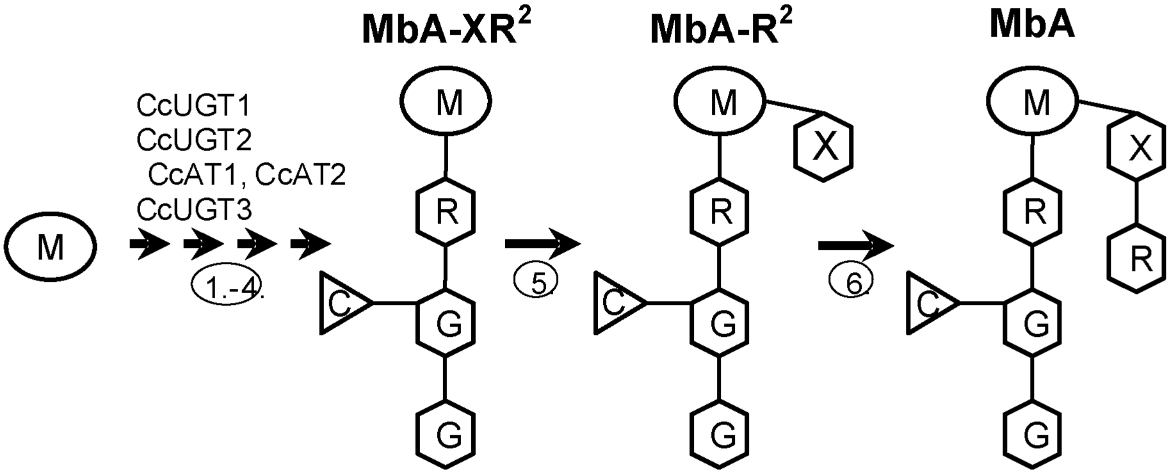
FIG. 14 schematically illustrates the metabolic pathway converting the mini-MbA precursor to MbA. The six steps of the MbA pathway from myricetin are indicated by numbers below the arrows. Genes and enzymes for steps 1 to 4 have are indicated in FIG. 1B. The two final steps from MbA-$XR^2$ to MbA-$R^2$ and MbA are illustrated. Schematic of MbA-$XR^2$ (myricetin 3-O-(glucosyl-6'-O-caffeoyl)-glucosyl rhamnoside), MbA-R2 (myricetin 3-O-(glucosyl-6'-O-caffeoyl)-glucosyl rhamnoside 4'-O-xyloside) and MbA, myricetin 3-O-(glucosyl-6'-O-caffeoyl)-1,2-β-D-glucosyl 1,2-α-L-rhamnoside 4'-O-α-L-rhamnosyl 1,4-β-D-xyloside. M=myricetin; R=rhamnose; G=glucose; X=xylose; C=caffeic acid.

In some embodiments, the at least one enzyme is or comprises a UGT, wherein the UGT is operative to catalyze 1,2-glucosylation of mini-MbA to produce MbA-X$R^2$ (see FIGS. 1B and 14). In some embodiments, the UGT is CcUGT3 (also referred to as UGT703E1) derived from a montbretia (*Crocosmia* x *crocosmiiflora*) plant, or a homolog thereof. In some embodiments, the UGT has an amino acid sequence with at least 80% identity (e.g., about 80, about 85%, about 90%, about 95%, about 96%, about 97%, about 98%, about 99%, or 100% identity) to the amino acid sequence set forth in SEQ ID NO:20, which reflects an exemplary CcUGT3 (UGT703E1) sequence.

In some embodiments, the at least one enzyme is or comprises a UGT, wherein the UGT is operative to catalyze glycosylation of MbA-X$R^2$ to produce MbA-$R^2$ (see FIGS. 1B and 14). In some embodiments, the UGT is CcUGT4 (also referred to as UGT703H1) derived from a montbretia (*Crocosmia* x *crocosmiiflora*) plant, or a homolog thereof. In some embodiments, the UGT has an amino acid sequence with at least 80% identity (e.g., about 80, about 85%, about 90%, about 95%, about 96%, about 97%, about 98%, about 99%, or 100% identity) to the amino acid sequence set forth in SEQ ID NO:22, which reflects an exemplary CcUGT4 (UGT703H1) sequence.

In some embodiments, the at least one enzyme is or comprises a UGT, wherein the UGT is operative to catalyze glycosylation of MbA-$R^2$ to produce MbA (see FIGS. 1B and 14). In some embodiments, the UGT is CcUGT5 (also referred to as UGT729A2) derived from a montbretia (*Crocosmia* x *crocosmiiflora*) plant, or a homolog thereof. In some embodiments, the UGT has an amino acid sequence with at least 80% identity (e.g., about 80, about 85%, about 90%, about 95%, about 96%, about 97%, about 98%, about 99%, or 100% identity) to the amino acid sequence set forth in SEQ ID NO:24, which reflects an exemplary CcUGT5 (UGT829A2) sequence.

Any combination of the above-indicated enzymes can be encoded within the same or multiple heterologous nucleic acids in the transgenic organism. Illustrative, non-limiting examples of heterologously encoded enzyme combinations in the transgenic organism include any enzyme in the myricetin to mini-MbA subpathway, such as: at least CcUGT1, and CcUGT2; at least CcUGT1 and CcAT1 and/or CcAT2 (CcAT1/2); at least CcUGT2 and CcAT1/2; and at least CcUGT1, CcUGT2, CcAT1/2. Additional illustrative examples of heterologously encoded enzyme combinations in the transgenic organism include any enzyme in the mini-MbA to MbA subpathway, such as: at least CcUTG3 and CcUTG4; at least CcUTG3 and CcUTG5; at least CcUTG4 and CcUTG5; and at least CcUTG3, CcUTG4 and CcUTG5. Yet additional illustrative examples heterologously encoded enzyme combinations in the transgenic organism include: at least CcUGT1, CcUGT2, CcAT1/2, and ATG3; at least CcUGT1, CcUGT2, CcAT1/2, CcUTG3, and CcUTG4; at least CcUGT1, CcUGT2, CcAT1/2, CcUTG3, CcUTG4 and CcUTG5. Additional illustrative examples of heterologously encoded enzyme combinations in the transgenic organism include any two or more enzymes involved in myricetin production, including, for example: at least CcF3H and CcFLS; at least CcF3H, CcFLS, and CcF3'H; at least CcF3H, CcFLS, CcF3'H, and CcF3'5'H; at least CcF3H and CcF3'H; at least CcF3H and CcF3'5'H; at least CcF3H, CcF3'H, and CcF3'5'H; at least CcFLS, CcF3'H, and CcF3'5'H; at least CcFLS and CcF3'H; at least CcFLS and CcF3'5'H; at least CcFLS, CcF3'H, and CcF3'5'H; and at least CcF3'H and CcF3'5'H. In some embodiments, the transgenic organism comprises one or more heterologous nucleic acids that encode a combination of enzymes in a montbretin A (MbA) metabolic pathway that includes at least two, three, or four different enzymes involved in the production of myricetin and further includes at least two, three, four, five, or six different enzymes involved in conversion of myricetin to MbA. For example, the transgenic organism can comprise heterologous nucleic acid(s) encoding CcF3H, CcFLS, CcF3'H, and CcF3'5'H, or a subcombination thereof, and also comprise CcUGT1, CcUGT2, CcAT1/2, CcUTG3, CcUTG4 and CcUTG5, or a subcombination thereof. In one embodiment, the transgenic organisms comprise one or more heterologous nucleic acids operatively linked to one or more promoters, wherein the heterologous nucleic acids encode (in aggregate) CcF3H, CcFLS, CcF3'H, CcF3'5'H, CcUGT1, CcUGT2, CcAT1/2, CcUTG3, CcUTG4 and CcUTG5. It will be understood that the designation of each of these enzymes encompasses the individual embodiments contemplated herein, such as the embodiments described above.

The inventors also demonstrated in EXAMPLE 2 that additional expression of MYB transcription factors (e.g., CcMYB1, CcMYB2, CcMYB3, and/or CcMYB4) can further promote successful production of myricetin by enhancing the availability of flavonol precursors for MbA or precursors thereof. Thus, in additional embodiments, the transgenic organism can further comprise a heterologous nucleic acid that encodes an MYB transcription factor in addition to the at least one heterologous nucleic acid encoding an enzyme in the MbA biosynthetic pathway (or combination of enzymes) as described above. In some embodiments, the MYB encoded transcription factor is selected from CcMYB1, CcMYB2, CcMYB3, and/or CcMYB4, described from *Crocosmia* x *crocosmiiflora*. In some embodiments, the encoded CcMYB1 has an amino acid sequence with at least 80% identity (e.g., about 80, about 85%, about 90%, about 95%, about 96%, about 97%, about 98%, about 99%, or 100% identity) to the amino acid sequence set forth SEQ ID NO:26. In some embodiments, the additional nucleic acid encoding CcMYB1 comprises the sequence set forth in SEQ ID NO:25. In some embodiments, the encoded CcMYB2 has an amino acid sequence with at least 80% identity (e.g., about 80, about 85%, about 90%, about 95%, about 96%, about 97%, about 98%, about 99%, or 100% identity) to the amino acid sequence set forth SEQ ID NO:28. In some embodiments, the additional nucleic acid encoding CcMYB2 comprises the sequence set forth in SEQ ID NO:27. In some embodiments, the encoded CcMYB3 has an amino acid sequence with at least 80% identity (e.g., about 80, about 85%, about 90%, about 95%, about 96%, about 97%, about 98%, about 99%, or 100% identity) to the amino acid sequence set forth SEQ ID NO:30. In some embodiments, the additional nucleic acid encoding CcMYB3 comprises the sequence set forth in SEQ ID NO:29. In some embodiments, the encoded CcMYB4 has an amino acid sequence with at least 80% identity (e.g., about 80, about 85%, about 90%, about 95%, about 96%, about 97%, about 98%, about 99%, or 100% identity) to the amino acid sequence set forth SEQ ID NO:32. In some embodiments, the additional nucleic acid encoding CcMYB4 comprises the sequence set forth in SEQ ID NO:31.

When a plurality of heterologous nucleic acids is present, each of the plurality of heterologous nucleic acids can be operatively linked to its own promoter sequence. In such instances, the individual promoter sequences on the different heterologous nucleic acids can be the same or different, although all promoter sequences are preferably operable to induce expression of the encoding heterologous nucleic acid in the organism. Alternatively, two or more of the plurality of heterologous nucleic acids can be operatively linked to the same promoter, as in an expression cassette leading capable of expressing multiple transcripts from a single promoter sequence. In embodiments where the heterologous nucleic acid is not integrated into the organism's chromosomes, the different heterologous nucleic acids (and the operatively linked promoter(s)) can reside on the same nucleic acid construct (e.g., a plasmid vector within the transgenic organism) or each can reside on different nucleic acid constructs within the same cell of the transgenic organism.

Production of MbA or Precursors Thereof

In another aspect, the disclosure provides a method for producing at least one montbretin A (MbA) precursor. The method comprises permitting the expression of at least one heterologous nucleic acid in a transgenic organism, as described above. The expression of the at least one heterologous nucleic acid is facilitated by the operatively linked promoter that is selected for inducible expression or constitutive expression in the host organism.

As described in more detail above, the transgenic organism can comprise one or more heterologous nucleic acids that encode enzymes selected from a flavanone hydroxylase (F3H), flavonol synthase (FLS), a flavonoid 3'-hydroxylase (F3'H), a flavonoid 3'5'-hydroxylase (F3'5'H), and a UDP-sugar dependent glycosyltransferase (UGT), and a BAHD-acyltransferase (BAHD-AT) in any combination. Exemplary enzymes and combinations are described in more detail above and are encompassed by this aspect of the disclosure.

In some embodiments, the method comprises providing the transgenic organism with a sufficient supply of myricetin. This can be applicable in cases where the transgenic organism does not produce a sufficient flux of the flavonol precursors to supply the engineered metabolic pathway that produces mini-MbA (or even MbA) from myricetin.

The organism can be grown en masse, such as in an incubator (e.g., for transgenic yeast) or in a greenhouse or other agricultural setting (e.g., for transgenic plants) to permit the accumulation of MbA or precursor thereof during the growth phase of the organism. The method can also comprise a step of extracting the MbA or precursor thereof from the organism to obtain isolated MbA or precursor thereof.

In another aspect, the disclosure encompasses the isolated MbA precursor or MbA product extracted from the transgenic organism. In some embodiments, the precursor is selected from myricetin, myricetin 3-O-rhamnoside (MR), myricetin 3-O-glycosyl rhamnoside (MRG), myricetin 3-O-(6'-O-caffeoyl)-glucosyl rhamnoside (mini-MbA), myricetin 3-O-(glucosyl-6'-O-caffeoyl)-glucosyl rhamnoside (MbA-$XR^2$), and myricetin 3-O-(glucosyl-6'-O-caffeoyl)-glucosyl rhamnoside 4'-O-xyloside (MbA-$R^2$). In one embodiment, the precursor is myricetin. In one embodiment, the precursor is mini-MbA. In one embodiment, the product is MbA.

The disclosure also comprises methods of generating a transgenic organism, whereby the host organism is transformed to receive at least one heterologous nucleic acid operatively linked to a promoter, wherein the heterologous nucleic acid encodes at least one enzyme in a montbretin A (MbA) metabolic pathway heterologous nucleic acid. Embodiments of the organisms, nucleic acids, enzymes and enzyme combinations are described in more detail above. The method can comprise contacting the host organism with the heterologous nucleic acid and continue to culture or cultivate the transformed organism. Appropriate vectors can be selected for the organism of choice according to the knowledge and skill in the art. For example, for target plant organisms, the practitioner can refer to, e.g., Dunwell, J. M. and Wetten A. C. (eds.), *Transgenic Plants: Methods and Protocols, Second Edition*, Humana Press, 2012, incorporated herein by reference in its entirety.

Compositions

In another aspect the disclosure provides a vector comprising a nucleic acid encoding at least one enzyme in a montbretin A (MbA) metabolic pathway operatively linked to a promoter. In one embodiment, the vector is a viral vector, a circularized nucleic acid, or a nanoparticle. In one embodiment, the vector is a viral vector selected from an adeno associated virus (AAV) vector, an adenovirus vector, a retrovirus vector, and a lentivirus vector.

The at least one enzyme can comprise a flavanone hydroxylase (F3H), flavonol synthase (FLS), a flavonoid 3'-hydroxylase (F3'H), a flavonoid 3'5'-hydroxylase (F3'5'H), a UDP-sugar dependent glycosyltransferase (UGT), and a BAHD-acyltransferase (BAHD-AT), which are described above in more detail and are encompassed by this aspect. For example, the at least one enzyme encoded by the nucleic acid is selected from the following:

- a F3H, wherein the F3H is operative to hydroxylate naringenin to form DHK;
- a FLS, wherein the FLS is operative to catalyze desaturation of a dihydroflavonol to a flavonol;
- a F3'H, wherein the F3'H is operative to catalyze hydroxylation of the B-ring of a flavonol or dihydroflavonol;
- a F3'5'H, wherein the F3'5'H is operative to catalyze hydroxylation of the B-ring of a flavonol or dihydroflavonol;
- a UGT, wherein the UGT is operative to catalyze glycosylation of myricetin to produce MR;
- a UGT, wherein the UGT is operative to catalyze glycosylation of MR to produce MRG;
- a BAHD-AT, wherein the BAHD-AT is operative to catalyze acylation of MRG to produce mini-MbA;
- a UGT, wherein the UGT is operative to catalyze 1,2-glucosylation of mini-MbA to produce MbA-$XR^2$;
- a UGT, wherein the UGT is operative to catalyze glycosylation of MbA-$XR^2$ to produce MbA-$R^2$;
- a UGT, wherein the UGT is operative to catalyze glycosylation of MbA-$R^2$ to produce MbA, and any combination thereof.

The at least one enzyme encoded by the nucleic acid can be selected from CcF3H1, CcF3H2, CcFLS, CcYP1, CcYP2, CcUGT1, CcUGT2, CcAT1, CcAT2, CcUGT3, CcUGT4, and CcUGT5, and any combination thereof, wherein the foregoing are derived from a montbretia (*Crocosmia* x *crocosmiiflora*) plant, or a homolog thereof.

In some embodiments, the at least one enzyme encoded by the nucleic acid can have an amino acid sequence with at least 80% identity (e.g., about 80, about 85%, about 90%, about 95%, about 96%, about 97%, about 98%, about 99%, or 100% identity) to an amino acid sequence selected from SEQ ID NO:2, 4, 6, 8, 10, 12, 14, 16, 18, 20, 22, and 24. For example, in some embodiments the nucleic acid can have a sequence as set forth in SEQ ID NO:1, 3, 5, 7, 9, 11, 13, 15, 17, 19, 21, 23 or a variant thereof that imposes conservative mutations to a threshold encoding a protein with up to 20% sequence variation to the amino acid sequences set forth in SEQ ID NO:2, 4, 6, 8, 10, 12, 14, 16, 18, 20, 22, or 24, respectively.

Operatively linked promoters can encompass any promoter that facilitates expression in a target cell of interest, which can be appropriately selected by persons of ordinary skill in the art.

The vectors can comprise additional elements providing, e.g., resistance or other selection markers, origin of replication, and the like, which facilitate delivery and expression of the nucleic acid to a target cell of interest. Non-limiting examples of vectors encompassed by the present disclosure are described in more detail in the Examples.

In another aspect, the disclosure provides an isolated nucleic acid molecule at least 10 consecutive nucleotides of a gene or a complement thereof, wherein the gene encodes one of the following:

- a F3H, wherein the F3H is operative to hydroxylate naringenin to form DHK;
- a FLS, wherein the FLS is operative to catalyze desaturation of a dihydroflavonol to a flavonol;
- a F3'H, wherein the F3'H is operative to catalyze hydroxylation of the B-ring of a flavonol or dihydroflavonol;
- a F3'5'H, wherein the F3'5'H is operative to catalyze hydroxylation of the B-ring of a flavonol or dihydroflavonol;
- a UGT, wherein the UGT is operative to catalyze glycosylation of myricetin to produce MR;
- a UGT, wherein the UGT is operative to catalyze glycosylation of MR to produce MRG;
- a BAHD-AT, wherein the BAHD-AT is operative to catalyze acylation of MRG to produce mini-MbA;
- a UGT, wherein the UGT is operative to catalyze 1,2-glucosylation of mini-MbA to produce MbA-$XR^2$;
- a UGT, wherein the UGT is operative to catalyze glycosylation of MbA-$XR^2$ to produce MbA-$R^2$; and
- a UGT, wherein the UGT is operative to catalyze glycosylation of MbA-$R^2$ to produce MbA.

These encoded enzymes are participants in the MbA metabolic pathway. The embodiments described above are encompassed in this aspect. In some embodiments, the gene encodes an enzyme selected from CcF3H1, CcF3H2, CcFLS, CcYP1, CcYP2, CcUGT1, CcUGT2, CcAT1, CcAT2, CcUGT3, CcUGT4, or CcUGT5, wherein the foregoing are derived from a montbretia (*Crocosmia* x *crocosmiiflora*) plant, or a homolog thereof. In some embodiments, the gene encodes an enzyme comprising an amino acid sequence with at least 80% identity (e.g., about 80, about 85%, about 90%, about 95%, about 96%, about 97%, about 98%, about 99%, or 100% identity) to the amino acid set forth in SEQ ID NO:2, 4, 6, 8, 10, 12, 14, 16, 18, 20, 22, or 24. In some embodiments, the gene can have a sequence as set forth in SEQ ID NO:1, 3, 5, 7, 9, 11, 13, 15, 17, 19, 21, 23 or a variant thereof that imposes conservative mutations to a threshold encoding a protein with up to 20% sequence variation to the amino acid sequences set forth in SEQ ID NO:2, 4, 6, 8, 10, 12, 14, 16, 18, 20, 22, or 24, respectively.

The isolated nucleic acid can further comprise a promotor sequence operatively linked to the encoding sequence. Promoters are described elsewhere herein in more detail. In some embodiments, the encoding sequence and promoter sequence do not naturally occur together. In some embodiments, encoding sequence and promoter sequence are configured in a manner not reflected in nature (e.g., the isolate nucleic acid has been engineered and does not consist of a naturally occurring sequence).

In some embodiments, the nucleic acid molecule can further comprise a detectable label. There is a wide variety of available detectable moieties used to label oligonucleotides, including fluorescent labels, radiolabels, and the like, all of which are encompassed by this disclosure. The labels can be linked to the isolated nucleic acid molecule accordingly to routine techniques known in the art.

The isolated nucleic acid molecule can be a single stranded oligo (e.g., DNA or RNA). The isolated nucleic acid molecule can be between about 10 and 50 nucleotides in length, such as about 10, about 12, about 15, about 17, about 20, about 25, about 30, about 35, about 40, about 45, and about 50 nucleotides or more. In some embodiments, the sequence of the isolated nucleotide is selected to avoid formation of hairpin constructs through self-hybridization under standard hybridization conditions.

Detection

In another aspect, the disclosure provides a method of detecting the presence of a nucleic acid encoding at least one enzyme in a montbretin A (MbA) metabolic pathway in a plant. The plant can be a montbretia (*Crocosmia* x *crocosmiiflora*) plant or a plant that has been transformed with montbretia nucleic acid encoding at least one enzyme in the MbA metabolic pathway. The method comprises contacting genetic material extracted from the plant with an isolated nucleic acid as described above under stringent binding conditions, and detecting hybridization of the isolated nucleic acid to the genetic material. The detection of binding can be accomplished by detecting a detectable label attached to the isolated nucleic acid.

Embodiments of the at least one enzyme in an MbA metabolic pathway are described in more detail above and are encompassed by this aspect.

In some embodiments, the method is operative to detect expression of the at least one enzyme. In these embodiments, the genetic material extracted from the plant is RNA and specifically comprises mRNA. If hybridization of the isolated nucleic acid is detected, then the presence of mRNA is confirmed, indicating the expression of the at least one enzyme. In some embodiments, the method allows quantifying the amounts of mRNA and, thus, allows inference of the degree of expression of the at least one enzyme.

In some embodiments, the method is operative for genotyping, i.e., to detect whether the plant comprises a gene (endogenous or heterologous) encoding the at least one enzyme. In such embodiments, the genetic material extracted from the plant comprises DNA (e.g., plant chromosomes), and detection of hybridization of the isolated nucleic acid to the genetic material indicates that the plant genome includes a gene encoding the at least one enzyme in the MbA biosynthesis pathway. Such genotyping measures are useful, for example, in monitoring breeding programs of montbretia (*Crocosmia* x *crocosmiiflora*) plant or transgenic plants for favorable characteristics for production of montbretin A (MbA) or at least one precursor thereof. The genotyping can be conducted to successive generations of plants and the plants that are positive for the at least one enzyme of the montbretin A (MbA) metabolic pathway are selected for further breeding. In some embodiments, the plants are monitored for more than one gene encoding a plurality of enzymes in the MbA biosynthesis pathway. Exemplary combinations of enzymes applicable to this aspect are disclosed in more detail above in the context of transgenic organisms.

General Definitions

Unless specifically defined herein, all terms used herein have the same meaning as they would to one skilled in the art of the present disclosure. Practitioners are particularly directed to Dunwell, J. M. and Wetten A. C. (eds.), *Transgenic Plants: Methods and Protocols, Second Edition*, Humana Press, 2012; Ausubel, F. M., et al. (eds.), *Current Protocols in Molecular Biology*, John Wiley & Sons, New York (2010); Coligan, J. E., et al. (eds.), Modern Proteomics—Sample Preparation, Analysis and Practical Applications in *Advances in Experimental Medicine and Biology*, Springer International Publishing, 2016, and Comai, L, et al., (eds.); and Proteomic: Methods and Protocols in *Methods in Molecular Biology*, Springer International Publishing, 2017, for definitions and terms of art.

For convenience, certain terms employed herein, in the specification, examples and appended claims are provided here. The definitions are provided to aid in describing particular embodiments and are not intended to limit the claimed invention, because the scope of the invention is limited only by the claims.

The use of the term "or" in the claims is used to mean "and/or" unless explicitly indicated to refer to alternatives only or the alternatives are mutually exclusive, although the disclosure supports a definition that refers to only alternatives and "and/or."

The words "a" and "an," when used in conjunction with the word "comprising" in the claims or specification, denotes one or more, unless specifically noted.

Unless the context clearly requires otherwise, throughout the description and the claims, the words "comprise," "comprising," and the like, are to be construed in an inclusive sense as opposed to an exclusive or exhaustive sense, which is to indicate, in the sense of "including, but not limited to." Words using the singular or plural number also include the plural and singular number, respectively. The word "about" indicates a number within range of minor variation above or below the stated reference number. For example, in some embodiments, the term "about" refers to a number within a range of 10%, 9%, 8%, 7%, 6%, 5%, 4%, 3%, 2%, or 1% above and/or below the indicated reference number.

As used herein, the term "polypeptide" or "protein" refers to a polymer in which the monomers are amino acid residues that are joined together through amide bonds. When the amino acids are alpha-amino acids, either the L-optical isomer or the D-optical isomer can be used, the L-isomers being preferred. The term polypeptide or protein as used herein encompasses any amino acid sequence and includes modified sequences such as glycoproteins. The term polypeptide is specifically intended to cover naturally occurring proteins, as well as those that are recombinantly or synthetically produced.

One of skill will recognize that individual substitutions, deletions or additions to a peptide, polypeptide, or protein sequence which alters, adds or deletes a single amino acid or a percentage of amino acids in the sequence is a "conservatively modified variant" where the alteration results in the substitution of an amino acid with a chemically similar amino acid. Conservative amino acid substitution tables providing functionally similar amino acids are well known to one of ordinary skill in the art. The following six groups are examples of amino acids that are considered to be conservative substitutions for one another:

(1) Alanine (A), Serine (S), Threonine (T),
(2) Aspartic acid (D), Glutamic acid (E),
(3) Asparagine (N), Glutamine (Q),
(4) Arginine (R), Lysine (K),
(5) Isoleucine (I), Leucine (L), Methionine (M), Valine (V), and
(6) Phenylalanine (F), Tyrosine (Y), Tryptophan (W).

Reference to sequence identity addresses the degree of similarity of two polymeric sequences, such as protein sequences. Determination of sequence identity can be readily accomplished by persons of ordinary skill in the art using accepted algorithms and/or techniques. Sequence identity is typically determined by comparing two optimally aligned sequences over a comparison window, where the portion of the peptide or polynucleotide sequence in the comparison window may comprise additions or deletions (i.e., gaps) as compared to the reference sequence (which does not comprise additions or deletions) for optimal alignment of the two sequences. The percentage is calculated by determining the number of positions at which the identical amino-acid residue or nucleic acid base occurs in both sequences to yield the number of matched positions, dividing the number of matched positions by the total number of positions in the window of comparison and multiplying the result by 100 to yield the percentage of sequence identity. Various software driven algorithms are readily available, such as BLAST N or BLAST P to perform such comparisons.

Disclosed are materials, compositions, and components that can be used for, can be used in conjunction with, can be used in preparation for, or are products of the disclosed methods and compositions. It is understood that, when combinations, subsets, interactions, groups, etc., of these materials are disclosed, each of various individual and collective combinations is specifically contemplated, even though specific reference to each and every single combination and permutation of these compounds may not be explicitly disclosed. This concept applies to all aspects of this disclosure including, but not limited to, steps in the described methods. Thus, specific elements of any foregoing embodiments can be combined or substituted for elements in other embodiments. For example, if there are a variety of additional steps that can be performed, it is understood that each of these additional steps can be performed with any specific method steps or combination of method steps of the disclosed methods, and that each such combination or subset of combinations is specifically contemplated and should be considered disclosed. Additionally, it is understood that the embodiments described herein can be implemented using any suitable material such as those described elsewhere herein or as known in the art.

Publications cited herein and the subject matter for which they are cited are hereby specifically incorporated by reference in their entireties.

EXAMPLES

The following examples are provided for the purpose of illustrating, not limiting, the disclosure.

Example 1

The following is a description of a study conducted by the inventors entitled "Discovery of UDP-Glycosyltransferases and BAHD-Acyltransferases in the Biosynthesis of the Anti-Diabetic Plant Metabolite Montbretin A", which was also published as Irmisch S, et al, (2018) Plant Cell 30: 1864-1886, incorporated herein by reference in its entirety.

Introduction

The inventors investigated a biosynthetic pathway for MbA and discovered that a functional pathway involves the formation of a set of five different building blocks, specifically the flavonol myricetin, the activated sugars UDP-rhamnose (UDP-Rha), UDP-glucose (UDP-Glc), UDP-xylose (UDP-Xyl), and the activated phenylpropanoid caffeoyl-CoA, followed by their stepwise assembly towards MbA. Transcriptome sequencing revealed the majority of the genes that constitute the three basic pathways that produce these five building blocks in montbretia, namely the flavonol pathway, the nucleotide sugar pathway, and the phenylpropanoid pathway (SRP108844). The goal of this investigation was to discover the genes and enzymes that generate the unique glycosylation and acylation patterns in the biosynthesis of MbA, starting from the flavonol core myricetin. Enzymes that catalyze specific glycosylation and acylation reactions in plant specialized metabolism cannot be easily identified purely by predictive homology searches of sequence databases. Thus, discovery of genes and enzymes with specific roles in specialized metabolism typically required steps of functional characterization, described herein.

Glycosylation is a common modification of flavonoids, contributing to their stability and solubility as well as generating complexity and diversity of flavonoids in nature. Acylation also increases solubility and affects stability and transport. Glycosylation of plan-specialized metabolites is typically catalyzed by UDP-sugar dependent glycosyltransferases (UGTs) belonging to family GT-1 of the CAZy-based glycosyltransferase classification. Plant UGTs utilize UDP-activated sugar donors, their sequences contain a highly conserved Plant Secondary Product Glycosylation (PSPG) motif, and they are encoded by members of some of the largest plant gene families. For example *Arabidopsis thaliana, Sorghum bicolor* and *Populus trichocarpa* contain 120, 180, and 223 sequences, respectively, annotated as UGTs. Based on sequence phylogeny, plant UGTs fall into 16 clades (A-P). Several of these clades have been described to contain UGTs catalyzing the glycosylation of hydroxy groups of flavonoids at one or more of the 3-O-, 5-O-, 7-O-, 3'-O-, 4'-O-, or 5'-O-positions. Flavonoid glycosylation often starts with the 3-hydroxy group on the C-ring, and UGTs involved in flavonoid 3-O-glycosylation have been characterized in several plant species. In addition to UGTs catalyzing the direct glycosylation of the core flavonoid structure, side chain-elongating UGTs have also been described. Enzyme of two classes can catalyze flavonoid acylation, BAHD-acyltransferases (BAHD-ATs) and serine carboxypeptidase-like acyltransferases (SCPL-ATs). While BAHD-ATs are cytosolic and use acyl-CoA donors, SCLP-ATs are vacuolar and use 1-O-β-glucose esters as acyl donors. Over 60 BAHD-ATs have been characterized, while few SCPL-ATs have known functions. BAHD-ATs group into five major phylogenetic clades. Clade I members function with flavonoids as acyl acceptors, but acyl donor specificity cannot be predicted.

Described here are the inventors' insights into MbA biosynthesis based on metabolite and enzyme activity profiling, as well as the transcriptome-based discovery, cDNA cloning and functional characterization of four enzymes that catalyze the three initial steps in MbA biosynthesis and the complete biosynthesis of mini-MbA. Specifically, the inventors describe two UGTs and two BAHD-ATs, a myricetin 3-O-rhamnosyltransferase, a myricetin 3-O-rhamnoside 1,2-glucosyltransferase and two myricetin 3-O-glucosyl 1,2-rhamnoside 6'-O-caffeoyl transferases involved in the formation of myricetin 3-O-α-L-rhamnoside (MR), myricetin 3-O-β-D-glucosyl 1,2-α-L-rhamnoside (MRG) and myricetin 3-O-(6'-O-caffeoyl)-β-D-glucosyl 1,2-α-L-rhamnoside (mini-MbA or MRG-Caff) (FIG. 1B), respectively. This work enables the superior montbretia breeding techniques to promote MbA production, as well as metabolic engineering of mini-MbA towards production of an anti-diabetic drug candidate.

Results

MbA Accumulates in Developing Young Corms

Figure 2A:
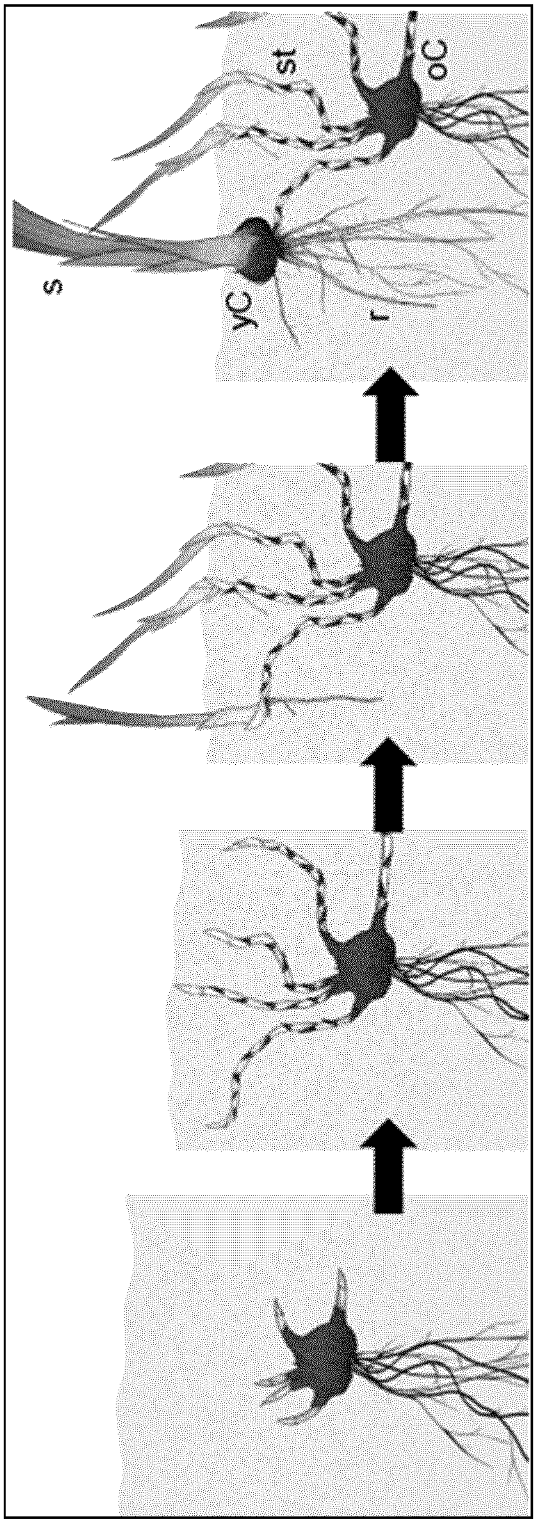
FIGS. 2A-2C illustrate the time course of MbA accumulation in old corms (oC) and developing young corms (yC).
Figure 2B:
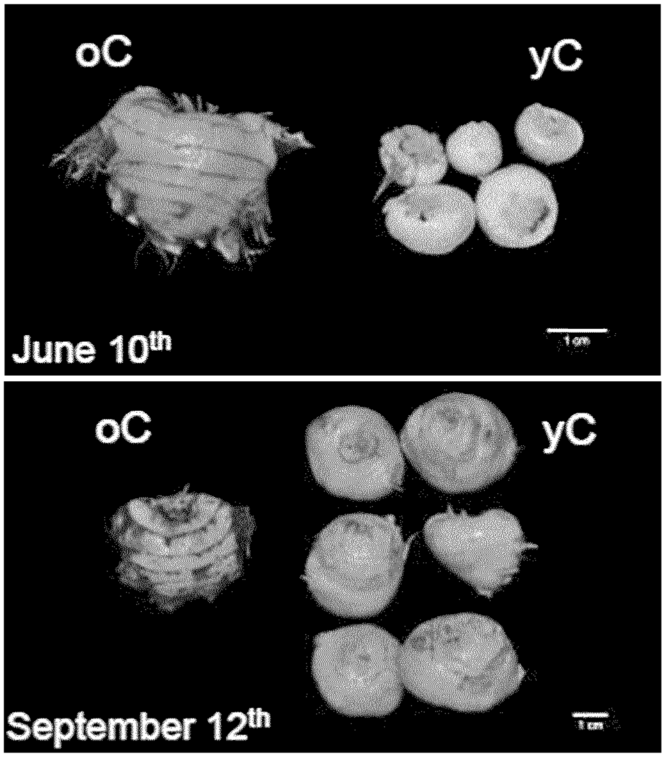
Figure 2C:
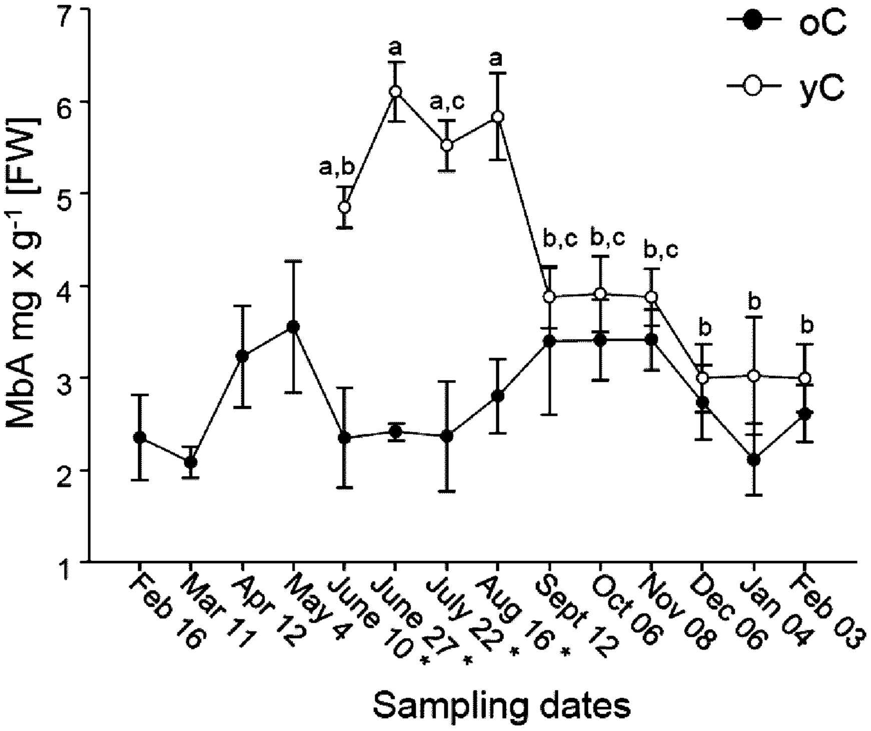
Figure 3A:
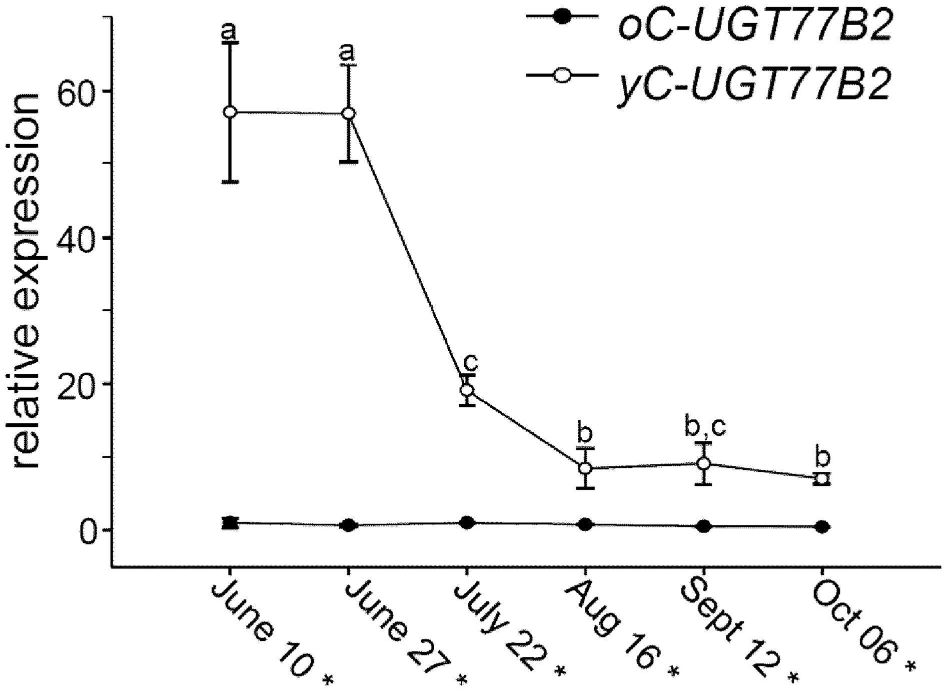
FIGS. 3A-3D illustrate transcript abundance of CcUGT1 (UGT77B2), CcUGT2 (UGT709G2), CcAT1, and CcAT2 in yC and oC. RNA was isolated from yC and oC harvested at different time points of corm development. Transcript abundance was determined by qRT-PCR for CcUGT1 (UGT77B2) (FIG. 3A), CcUGT2 (UGT709G2) (FIG. 3B), CcAT1 (FIG. 3C) and CcAT2 (FIG. 3D). Means and standard errors are shown (n=3). Different letters above the data points indicate significant differences between harvest points. Asterisks (*) indicate the statistical significance between yC and oC for all time points.
Figure 3B:
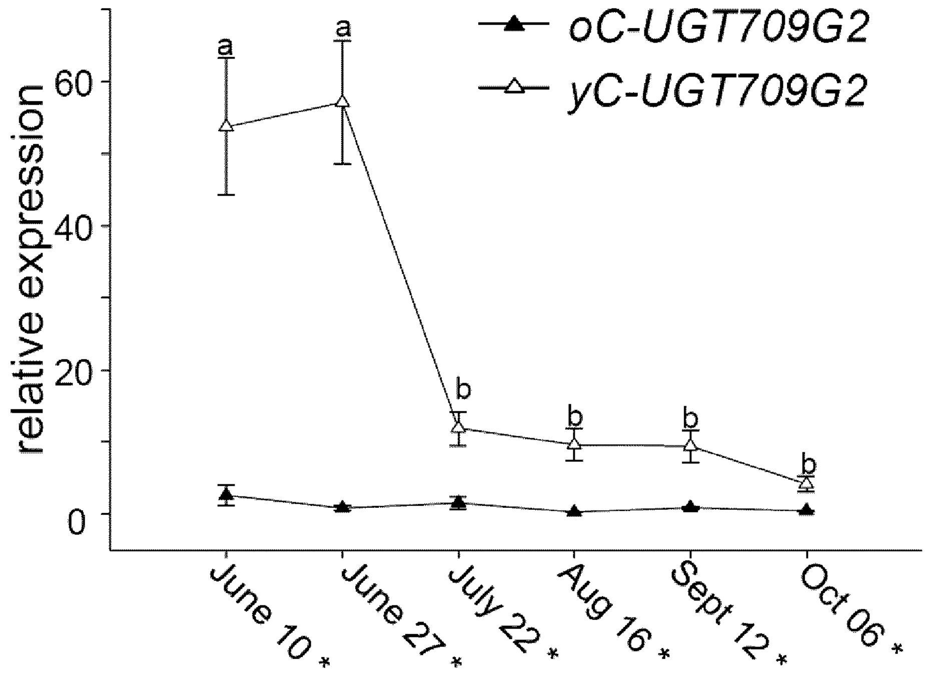
Figure 3C:
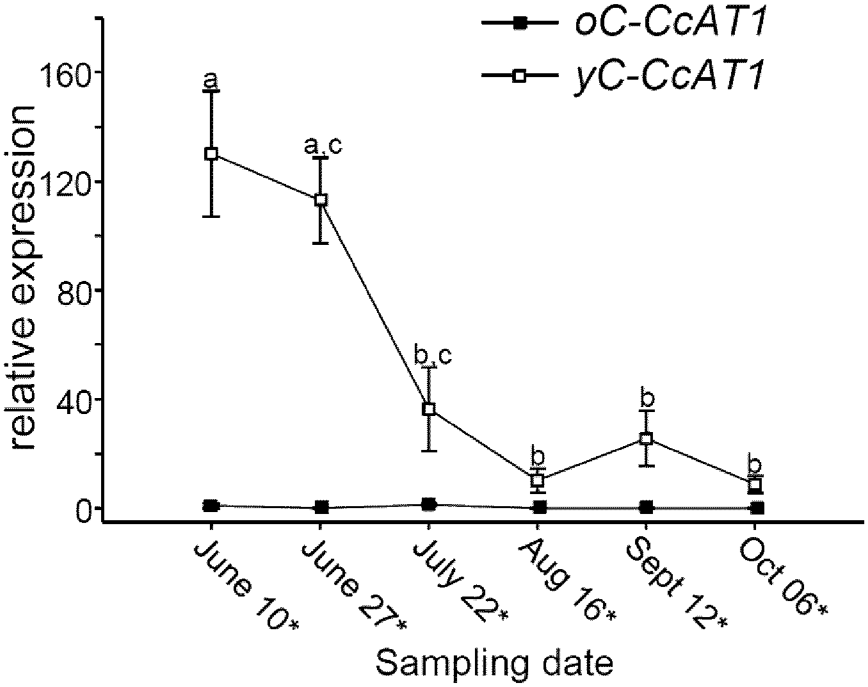
Figure 3D:
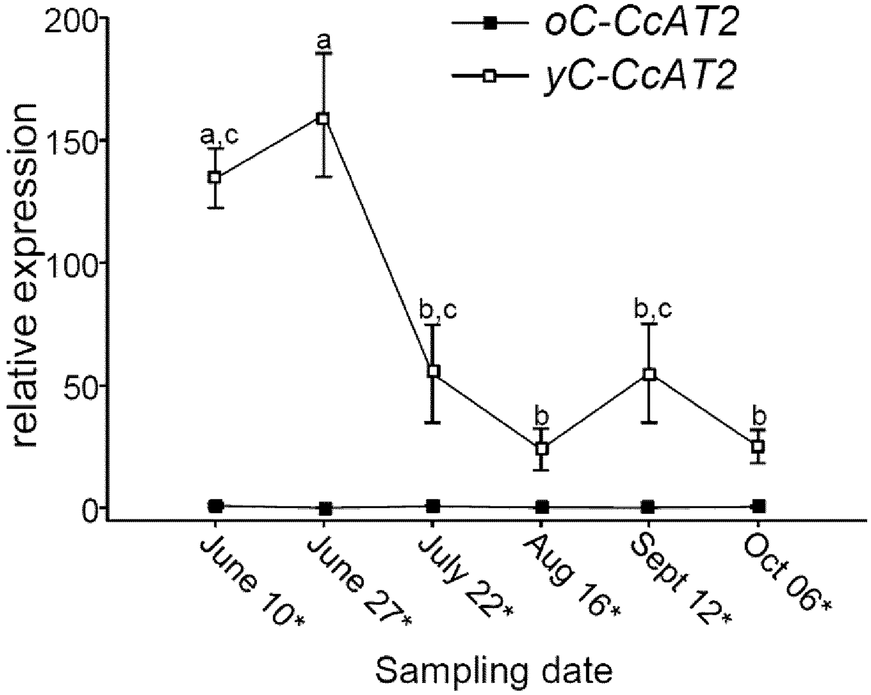
Figure 4A:
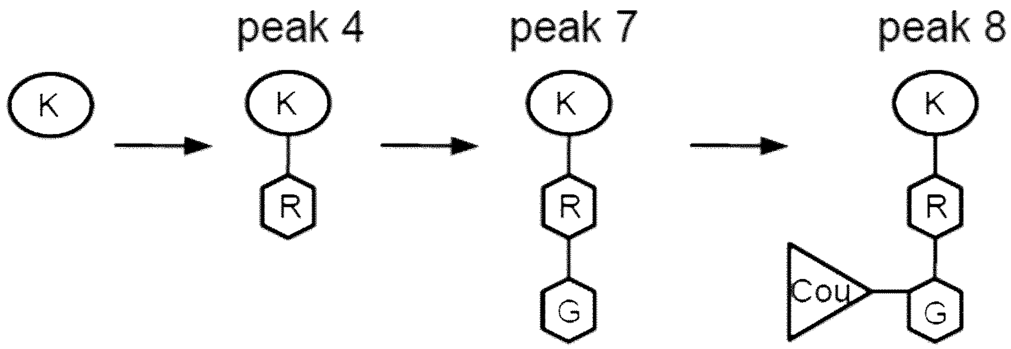
FIG. 4A represents the proposed pathway for production kaempferol derived surrogate mini-MbA in transiently transformed *N. benthamiana*. Peak 4, kaempferol 3-O-rhamnoside (KR); peak 5, kaempferol disaccharide; peak 6, unknown; peak 7, kaempferol 3-O-glucosyl rhamnoside (KRG); peak 8, kaempferol 3-O-(6'-O-coumaryl)-glucosyl rhamnoside (surrogate mini-MbA or KRG-Cou). K, kaempferol; R, rhamnose; G, glucose; Cou, coumaric acid.
Figure 4B:
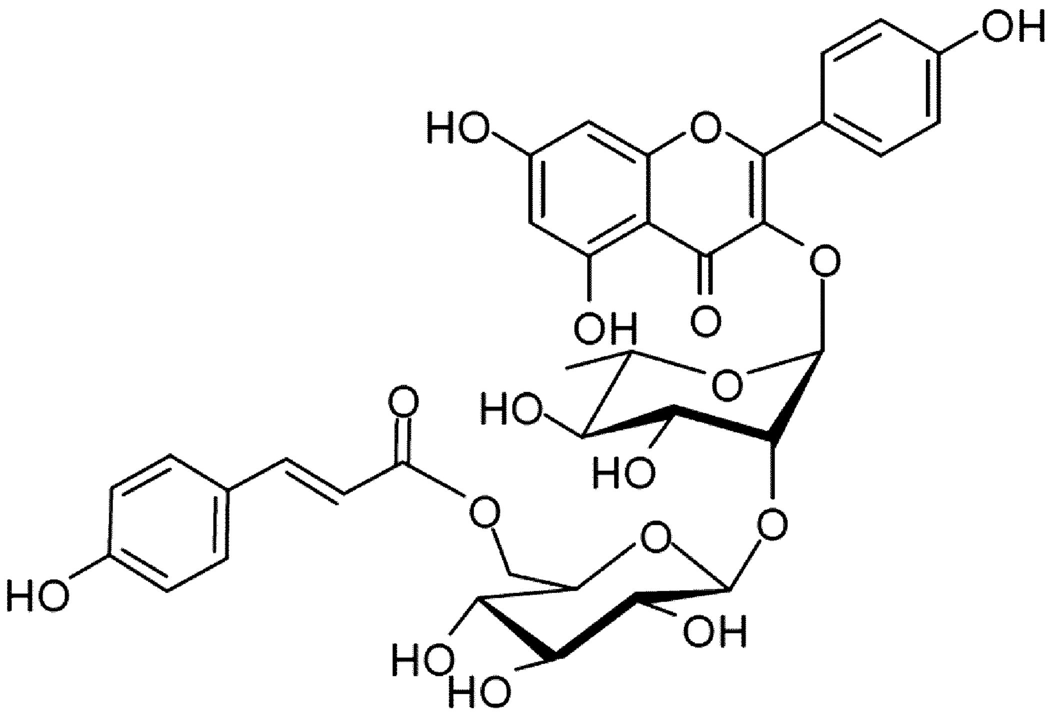
FIG. 4B represents the surrogate mini-MbA structure.
Figure 6:
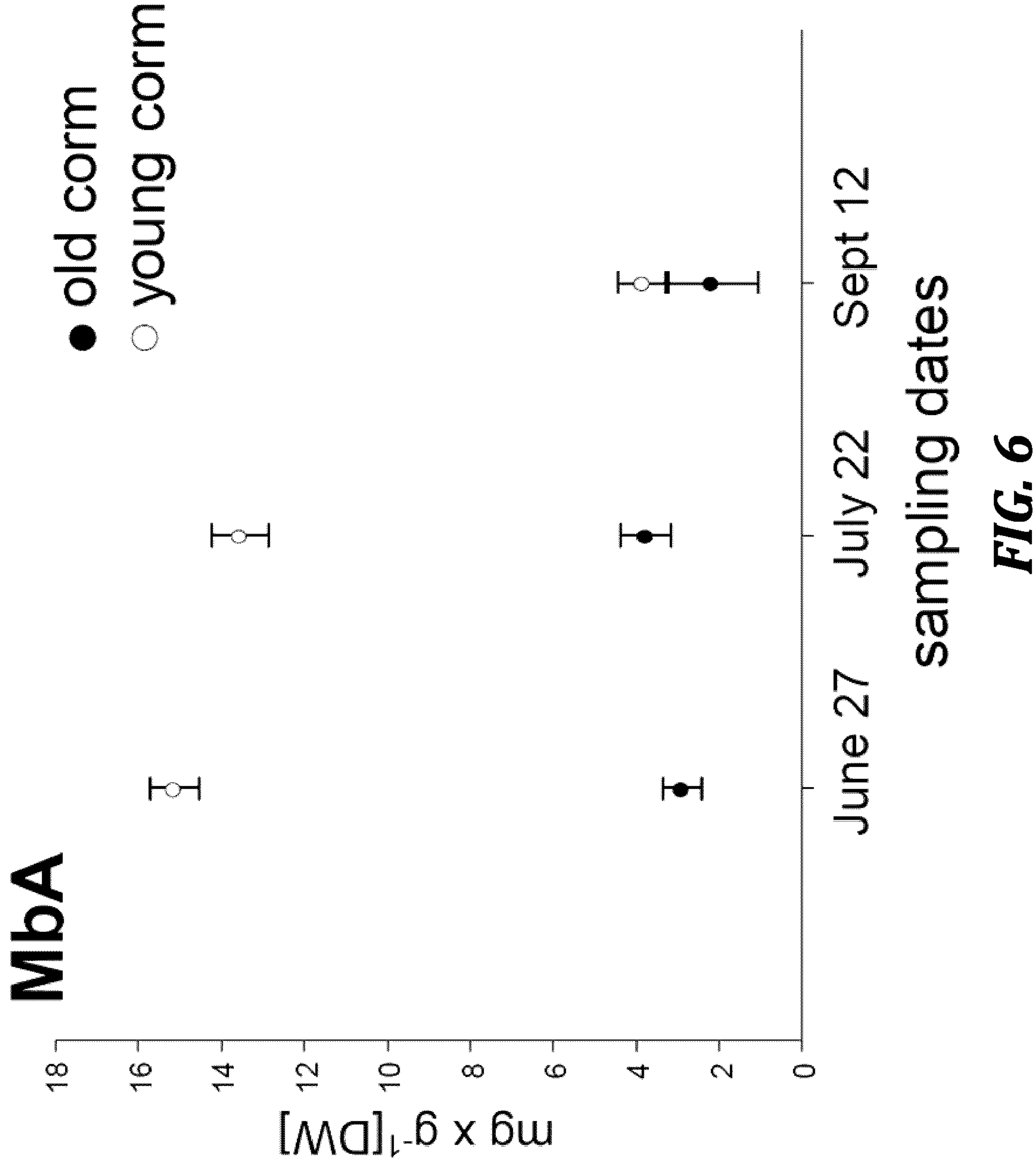
FIG. 6 graphically illustrates MbA levels in dried young and old corms.

As a foundation for investigating MbA biosynthesis, the inventors first monitored temporal patterns of MbA accumulation in corms over a one-year growing season (FIGS. 2A-2C). Montbretia propagates vegetatively via corms (FIGS. 2A and 2B). In early spring the original overwintering corm (old corm, oC) produces multiple below ground shoots, called stolons. The stolon tip grows towards the surface, where it gives rise to the above ground parts of the plant including leaves, stems and flowers. Over the growing season, the base of the newly grown, above ground shoot expands into a developing new corm (young corm, yC). Over the one-year growing season, yC were observed first at the June $10^{th}$ time point and continued to grow in diameter while the above ground foliage, stem and flowers developed. A single oC gave rise to between one and ten yC. The inventors collected corms at 14 time points over the year. MbA was extracted from yC and oC and identified by LC-UV/MS (liquid chromatography-UV/mass spectrometry) based on retention time and fragmentation pattern in comparison to an authentic standard (UV chromatograms, extracted ion chromatograms (EIC), mass spectra and MS/MS fragmentation patterns were generated and compared). Throughout the year, levels of MbA were relatively constant in oC with an average of 2.8±0.1 mg×$g^{-1}$ FW (FIG. 2C). By comparison, yC had significantly higher levels of MbA from June to August relative to oC and showed a pattern of maximum accumulation during the summer. MbA levels in yC increased from 4.9±0.2 mg×$g^{-1}$ FW in early June to 6.1±0.3 mg×$g^{-1}$ FW in late June, remained steady in July and August, and decreased to 3.9±0.3 mg×$g^{-1}$ FW in September, more closely resembling the concentration of MbA in oC (FIG. 2C). To validate that the observed differences in MbA levels between yC and oC and between the summer and fall time points for yC were not due to differences in water content, corms from a subset of time points were dried and MbA content and water loss were determined. Profiles of MbA accumulation showed the same pattern as observed for fresh material, and water loss did not differ between young and old corms (FIG. 6).

Once the above ground parts of the plants were developed, the inventors also analyzed roots, stolons, leaves, stems, flowers and seed pods for levels of MbA from late June until mid-August. MbA was not detectable in leaves or roots, and only low levels of MbA were found in stolons, stems, flowers and seed pods (not shown). Across these samples, flowers at the late June time point had the highest levels of MbA at 0.2±0.3 mg×$g^{-1}$ FW, which was less than 4% of the MbA levels in yC at the same time point. The identity of MbA was verified for each sample using an authentic standard and LC-UV/MS (described above).

MR and MRG are Likely Intermediates in MbA Biosynthesis

Figure 7B:
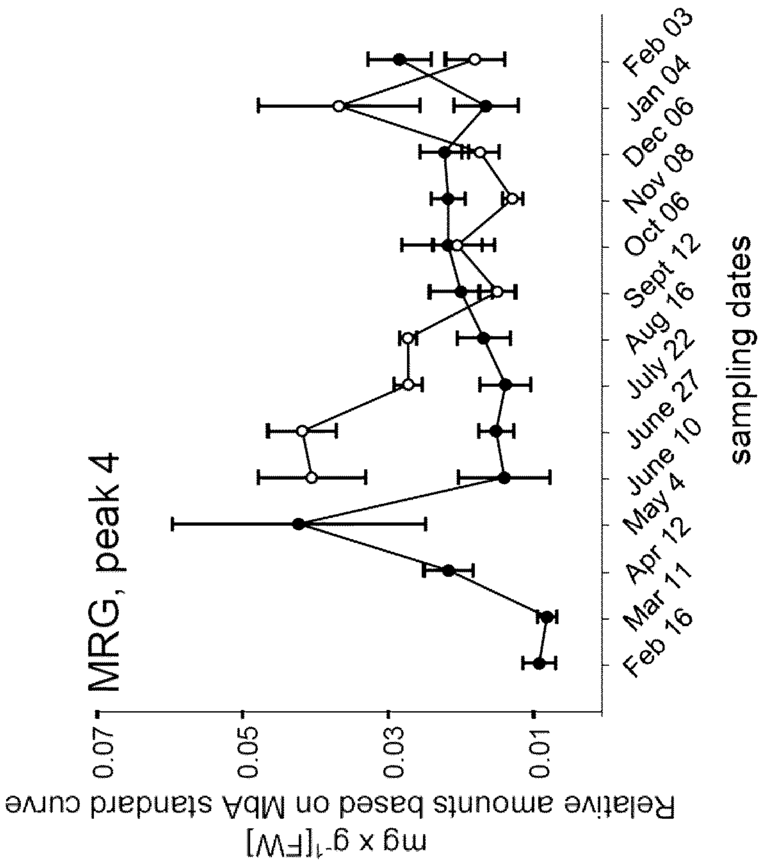
FIGS. 7A-7D graphically illustrate accumulation of intermediates MR (FIG. 7A), MRG (FIG. 7B), MGR (FIG. 7C), and MbA-C (FIG. 7D) in MbA biosynthesis in old corms (solid circles) and young corms (open circles) over a one-year time course.
Figure 7A:
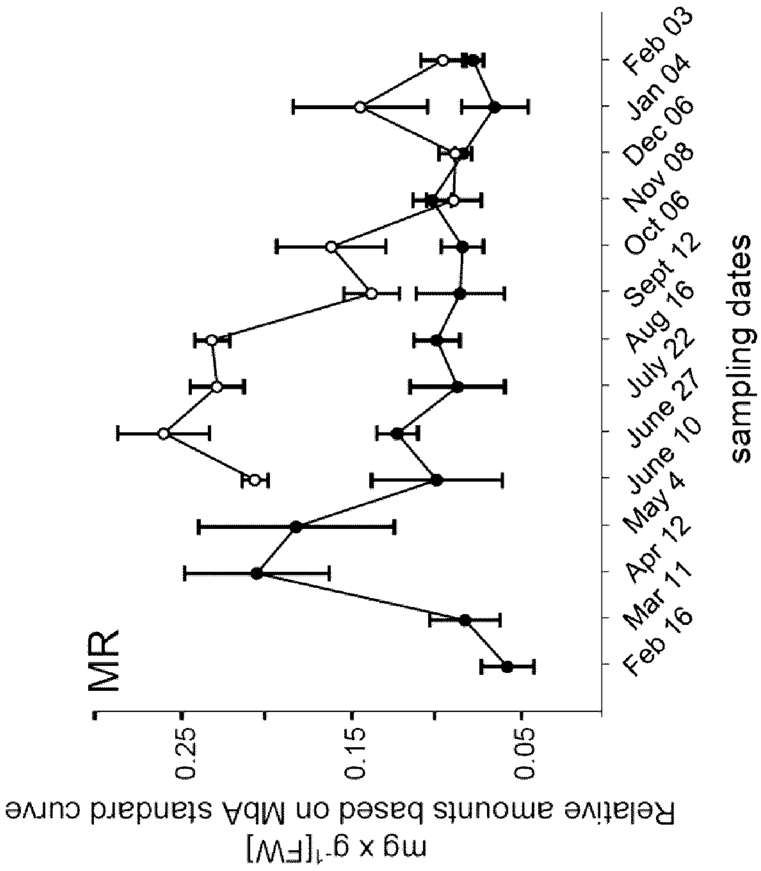

Given the multiple glycosylations of MbA (FIG. 1A), the sequence of the assembly of this molecule from its building blocks is not obvious. To develop predictions of a potential biosynthetic route, the inventors performed metabolite screens for theoretical intermediates in the modification of myricetin towards MbA in yC and oC. While myricetin could not be detected, LC-MS analysis revealed the presence of its 3-hydroxy rhamnosylated form, myricetin 3-O-α-L-rhamnoside (MR, m/z 463) in young corms (yC) extracts and its formation in enzyme activity assays with yC total protein extracts. MR was identified by comparison of retention time and fragmentation pattern to an authentic standard. The MS/MS fragmentation of the mother ion (m/z 463) of the MR identified in corm extracts showed the expected difference in the relative abundance of the aglycone ion $[Y]^-$ compared to the radical aglycon ion $[Y—H]^{-\bullet}$, with the latter (m/z 316) being more dominant and indicative of glycosylation at the 3-hydroxy group. Over the year-long time course analysis, MR displayed a similar pattern of accumulation in yC as MbA, with highest levels in late June to August (FIG. 7A).

Figure 7C:
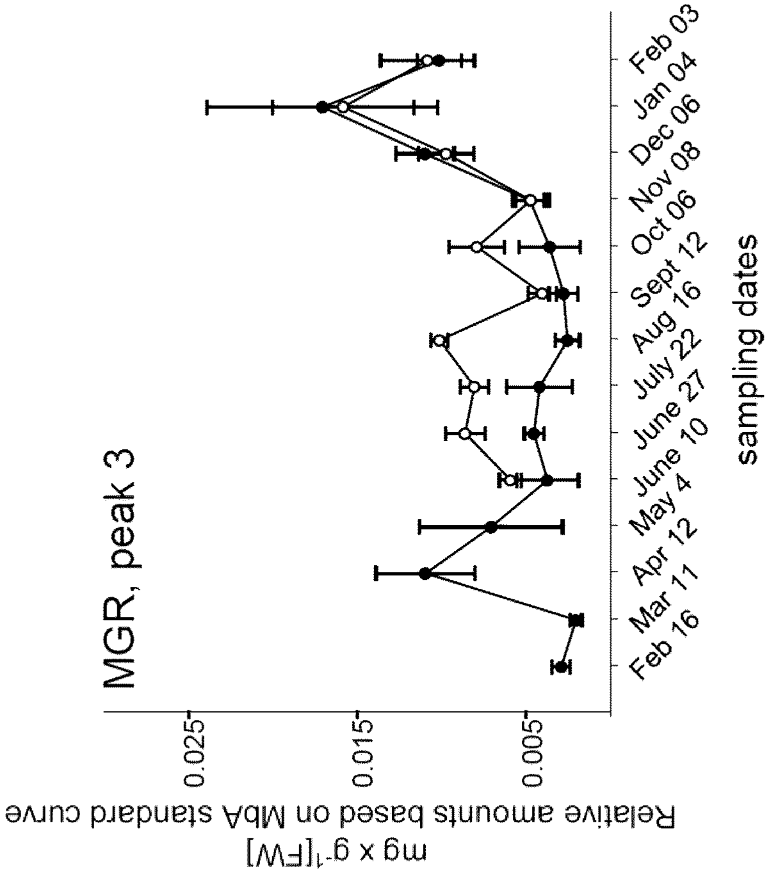

In addition the inventors detected two metabolite peaks (peak 3 and peak 4) in yC extracts with m/z 625 in the LC-MS analysis. The MS/MS spectra for peak 3 and peak 4 were nearly identical and showed a prominent m/z 316 for myricetin, but not ions indicative of monoglycosylated myricetin (m/z 479, m/z 463) (MS/MS fragmentation of m/z 625 was used for disaccharide identification), suggesting a disaccharide. The LC-MS spectra for peaks 3 and 4 resembled the mass and expected MS/MS fragmentation pattern of myricetin 3-O-glucosyl rhamnoside (MRG) or myricetin 3-O-rhamnosyl glucoside (MGR). Peak 4 was subsequently identified by NMR as myricetin 3-O-β-D-glucosyl 1,2-α-L-rhamnoside (MRG) (see below), which led to the tentative annotation of peak 3 as MGR. Over the year-long time course analysis, peak 4 resembled the accumulation pattern of MbA and MR in corms (FIG. 7B), while peak 3 did not show the similar high abundance in the early summer (FIG. 7C).

Figure 7D:
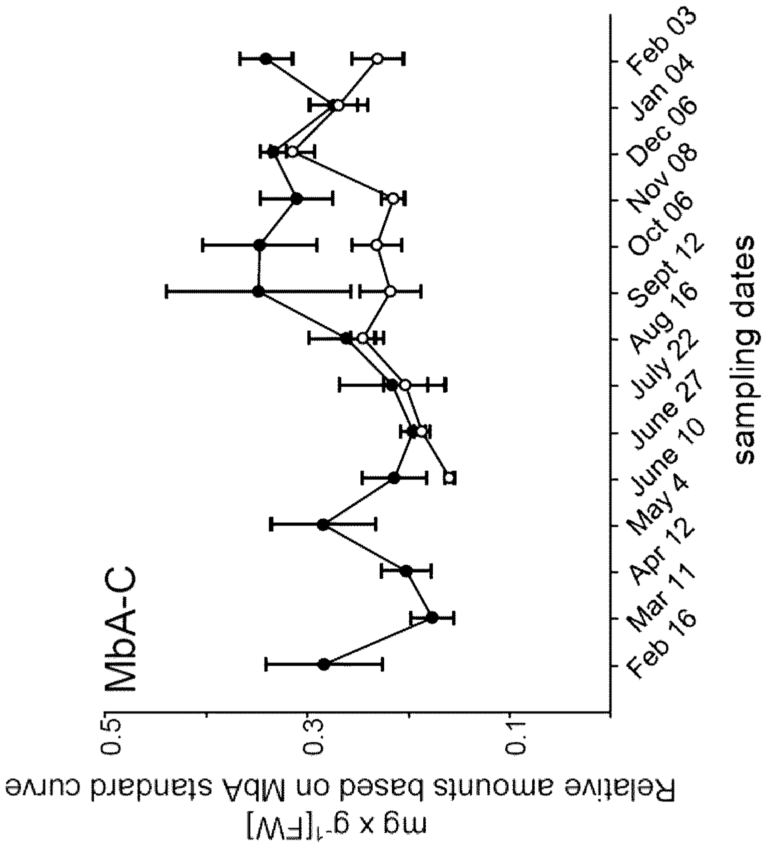

Another metabolite with m/z 1065 was detected in the LC-MS analysis of corm extracts. This compound matched the retention time and fragmentation pattern of an authentic standard for myricetin 3-O-glucosyl glucosyl rhamnoside 4'-O-rhamnosyl xyloside (MbA-C), which corresponds to MbA without the caffeoyl moiety. Over the year-long time course analysis, the accumulation pattern of m/z 1065 did not reflect that of MbA or MR, and there was no difference in the abundance of m/z 1065 between yC and oC (FIG. 7D). No additional peaks for potential intermediates in MbA biosynthesis could be detected.

UGT Activities in Corm Protein Extracts Catalyze the Formation of MR and MRG

To verify the conversion of myricetin to MR and MRG as the first two steps in MbA biosynthesis and the involvement of UGTs in MR and MRG formation, the inventors tested for enzyme activities in total protein extracts from yC and oC collected at the June $10^{th}$ time point. As substrates the inventors used myricetin and a UDP-rhamnose preparation (UDP-$Rha^P$) produced with *A. thaliana* UDP-Rha synthase, or MR and UDP-Glc. Samples were analyzed using LC-MS.

Protein extracts from yC converted myricetin and UDP-$Rha^P$ into MR (peak 1, m/z 463) (described above). Assays with protein extracts from yC produced almost 20-fold more MR (peak 1) than protein extracts derived from the same amount of oC. Briefly, total protein extracts from yC catalyzed the conversion of myricetin and UDP-RhaP into MR (peak 1, m/z 463). Formation of peak 1 was over 20-fold lower with protein extracts from the same amount of oC. The same assays of yC with myricetin and UDP-$Rha^P$ gave two additional products (m/z 625), which matched the retention times, masses and fragmentations of peak 3 (MGR) and peak 4 (MRG) detected in yC metabolite extracts (described above). These additional products may be due to remaining UDP-glucose (UDP-Glc) in the UDP-$Rha^P$ preparation. This is inferred by experiments where *A. thaliana* UDP-L-rhamnose synthase domains RHM-D and RHM-ER were expressed in *E. coli*, and protein extracts were used to catalyze the two-step conversion of UDP-D-Glc (peak 1, m/z 565), through the intermediate UDP-4-keto-6-deoxy-D-glucose (peak 2, m/z 547), into UDP-L-Rha (peak 3, 549), as assessed by LC-MS.

Figure 8:
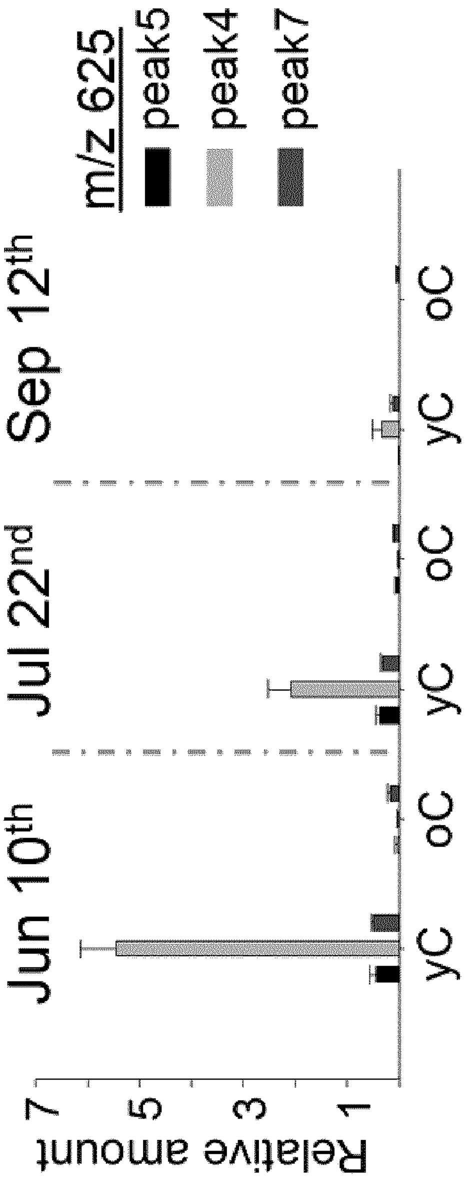
FIG. 8 graphically illustrates UGT and BAHD-AT activity in protein extracts of yC and oC. The indicated peak 4 is MRG (myricetin 3-O-glucosyl rhamnoside). Peak 5 and peak 7 are compounds tentatively identified as myricetin 3-O-rhamnoside 0-glucoside. These peaks are produced by glycosyltransferases in total protein extracts from corms.

Protein extracts from yC incubated with MR and UDP-Glc resulted in a dominant m/z 625 product (peak 4) in the LC-MS analysis, matching the retention time, mass and fragmentation pattern of MRG. In addition, three smaller m/z 625 di-glycoside products, peak 5, peak 6 and peak 7, were formed. Their MS/MS fragmentation showed daughter ions m/z 479 and m/z 463, which suggest that the glucose was linked directly to hydroxy groups of the flavonol core of MR, but not to the rhamnosyl side chain. Assays with protein extracts from yC produced 250 times more MRG (peak 4) at the June $10^{th}$ time point than protein extracts derived from the same amount of oC of the same time point (FIG. 8). At the later sampling time points, protein extracts from yC showed a decrease in product formation (especially of m/z 625 peak 4), but product formation remained higher compared to oC protein extracts (FIG. 8).

To assess the identity of m/z 625 peak 3 and peak 4, the inventors performed a set of comparative assays with yC protein extracts. They included assays with myricetin, UDP-$Rha^P$ and UDP-Glc, and assays with myricetin 3-O-glucoside (MG) and UDP-$Rha^P$. Briefly, total protein extracts of young corms were incubated with myricetin+UDP-Rha+UDP-Glc or myricetin 3-O-glucoside+UDP-Rha. Samples were analyzed using LC-MS and extracted ion chromatograms (EIC) were generated. Peak 1 was tentatively identified as myricetin 3-O-rhamnosyl glucoside (MGR); Peak 2 was myricetin 3-O-glucosyl rhamnoside (MRG). Only assays with myricetin, UDP-$Rha^P$ and UDP-Glc produced peak 4 in addition to a lower abundance of peak 3. In contrast, assays with MG and UDP-$Rha^P$ produced m/z 625 peak 3, but not peak 4. These results support the identification of peak 4 as MRG, the predicted intermediate in MbA biosynthesis. Peak 3 is likely myricetin 3-O-rhamnosyl glucoside (MGR), which would not be an intermediate in MbA biosynthesis.

As MbA possesses a xylose at the 4'-hydroxy group, the inventors also tested for alternative UGT activities in the conversion of myricetin or MR with UDP-xylose (UDP-Xyl) as a sugar donor. When yC protein extracts were incubated with myricetin and UDP-Xyl, the inventors detected the formation of three low-abundance m/z 449 peaks, representing putative myricetin xylosides (samples were analyzed using LC-MS and extracted ion chromatograms (EIC) were generated). The peak area of MR formed when UDP-Rha was used as sugar donor was over 200-fold higher compared to the peak area of any of the m/z 449 products. Incubation of yC protein extracts with MR and UDP-Xyl led to the formation of m/z 595 peak. The peak area of MRG formed when UDP-Glc was used as sugar donor was over 10-fold greater compared to that of the m/z 595 product. The fragmentation of the mother ion (m/z 595) into the daughter ion m/z 316 indicated the attachment of Xyl to the Rha of MR; however, myricetin xylosyl rhamnoside is not a potential intermediate in MbA biosynthesis. Conversion of myricetin or MR with UDP-Xyl in yC protein extracts thus appeared to be a background UGT activity that is likely not specific for MbA biosynthesis.

BAHD-AT Activity in Corm Protein Extracts Catalyzes the Formation of Mini-MbA

Next, the inventors assessed the formation of myricetin 3-O-(6'-O-caffeoyl)-β-D-glucosyl 1,2-α-L-rhamnoside (mini-MbA) as the third step in MbA biosynthesis and its possible formation from MRG by acyl-CoA dependent BAHD-acyltransferase activity. Protein extracts from yC were incubated with MRG and the acyl donor caffeoyl-CoA (Caff-CoA), which resulted in the detection of an m/z 787 product peak that matched the retention time and fragmentation pattern of mini-MbA as detected by LC-MS (all samples were analyzed using LC-MS in negative-ionization mode). The mother ion m/z 787 fragmented into m/z 625 (MRG; loss of the caffeoyl group with its weaker ester linkage) and m/z 316 (myricetin; additional loss of the disaccharide group). The acylation activity that converted MRG to mini-MbA was over 15-fold greater in yC extracts compared to oC extracts. The inventors also tested for alternative reactions that could conceivably represent the third step in MbA biosynthesis. To this end, corm protein extracts were incubated with MRG and the sugar donors UDP-Glc or UDP-Xyl. Glucosylation of MRG (m/z 625) was observed when UDP-Glc was incubated with yC or oC extracts, showing the formation of an m/z 787 peak. The MS/MS fragmentation pattern of m/z 787 showed the prominent daughter ion m/z 315 for myricetin as well as ions for mono- and diglycosylated myricetin (m/z 478 corresponding to MG; m/z 625 corresponding to MRG). These patterns indicated the attachment of the additional glucose moiety to the flavonol core in contrast to its attachment to the terminal glucose moiety of MRG, as would be required for MbA biosynthesis. No glycosylation activity was observed when yC or oC protein extracts were incubated with UDP-Xyl and MRG. These results support the formation of mini-MbA from MRG as the third step in MbA biosynthesis catalyzed by a caffeoyl-CoA dependent BAHD-acyltransferase.

Differential Transcriptome Expression Across the Large UGT Gene Family in yC and oC To discover UGT genes involved in MbA biosynthesis, the inventors established a montbretia corm reference transcriptome. Based on the temporal profiles of MbA accumulation and UGT activities over the time course of corm development (FIG. 2C), the inventors selected corms of the June $10^{th}$ time point for RNA isolation and transcriptome sequencing of yC and oC. Sequencing on the Illumina HiSeq platform generated approximately 400 M paired-end (PE) reads, which were assembled using Trinity into 171,070 non-redundant (NR) contigs with an average length of 691 bp, encoding 54,266 predicted NR peptides with an average length of 308 amino acids. Using reciprocal BLASTP searches against *A. thaliana* and *Zea mays* UGTs, which represent all of the known UGT-families A-P, the inventors identified 159 different putative UGTs in the montbretia combined yC and oC transcriptome.

The predicted montbretia UGT protein sequences clustered with 14 of the 16 different known UGT families. Briefly, MUSCLE alignment was used to construct a neighbor joining tree with MEGA6 of the 159 montbretia UGT sequences identified in the corm transcriptome together with selected UGTs from other plant species. Alignments and phylogeny were used to cluster montbretia UGTs with known UGT clades. Only two UGT families, H and N, were not represented in the montbretia corm transcriptome. The largest number of montbretia UGTs were identified as members of family D comprising 35% of corm-expressed UGTs (56 members). Of the 159 montbretia UGTs, 147 were differentially expressed (DE) in yC versus oC, and 70 had at least two-fold higher transcript abundance in yC compared to oC. These 70 UGTs clustered into 11 of the 16 UGT families. Briefly, predicted amino acid sequences of montbretia UGTs with at least two-fold higher transcript abundance in the young corm (yC) transcriptome compared to the old corm (oC) transcriptome were aligned with selected UGTs from other plant species using MUSCLE. A neighbor joining tree was constructed using MEGA6. Alignments and phylogeny were used to cluster montbretia UGTs with known UGT clades.

Since metabolite profiling and enzyme activity assays with yC and oC showed that UGTs of MR and MRG formation are most active in yC, the inventors focused on the 70 UGTs with preferential expression in yC for further characterization. Based on the results from enzyme assays with whole protein extracts from corms and metabolite profiling, the inventors hypothesized the formation of myricetin 3-O-rhamnoside (MR) as the first step in the conversion of myricetin in the MbA biosynthesis. UGTs that glycosylate the 3-hydroxy position of flavonoids have been described for other plant species to cluster in clade F of family 1 UGTs. The phylogeny of the DE 70 UGTs with higher expression in yC, identified three montbretia UGTs, UGT77B2 (contig DN63814_c1_g1_i), UGT77C1 (contig DN63602_c0_g1_i1) and UGT77C2 (contig DN63602_c0_g1_i2) in the F-clade. Transcripts of UGT77B2, UGT77C1, and UGT77C2 were respectively 35-fold, 10-fold, and 8-fold more abundant in yC compared to oC at the June $10^{th}$ time point.

UGT77B2 Catalyzes the Formation of Myricetin 3-O-Rhamnoside (MR)

The full-length open reading frame (ORF) for UGT77B2, which encodes a protein of 456 amino acids (aa), was amplified from cDNA from yC and oC of the June $10^{th}$ time point. The ORF sequence matched transcriptome contig DN63814_c1_g1_i1 with 99.8% identity. Contigs DN63602_c0_g1_i1 and DN63602_c0_g1_i2 appeared to be truncated. DN63602_c0_g1_i1 contained an early stop codon and encoded a protein of 390 aa missing the C-terminal region including the sugar binding motif DN63602_c0_g1_i2 encoded a protein of 254 aa missing the N-terminal part. Full-length cDNAs for these contigs could not be identified, and thus they were not further investigated.

To test UGT77B2 (also referred to as UGT1) for rhamnosyltransferase activity, the cDNA was expressed in *E. coli*, protein expression was verified using western blot analysis, and recombinant protein assayed using myricetin and UDP-$Rha^{P}$ followed by LC-UV/MS analysis of products. In the initial screen with non-purified, heterologously expressed protein, UGT77B2 showed the formation of a single product peak with m/z 463 identified as MR based on matching retention time and fragmentation pattern with an authentic standard (UGTs were heterologously expressed in *E. coli* and protein extracts were assayed for activity with myricetin and UDP-Rha for UGT77B2). Ni-affinity purified UGT77B2 protein catalyzed the same reaction (UGT77B2 was heterologously expressed in *E. coli*, extracted, purified and tested for enzyme activity in assays with myricetin (M) and UDP-Rha. Products were analyzed using LC-MS/UV; extracted ion chromatograms (EIC, m/z 463) were generated for products of enzyme assays with UGT77B2; control enzyme assays with protein from *E. coli* transformed with empty vector, and the authentic MR standard).

In addition, purified UGT77B2 was also active with myricetin and UDP-Glc or UDP-xylose (UDP-Xyl) leading to the formation of, respectively, m/z 479 identified as myricetin 3-O-glucoside (MG) based on comparison with an authentic standard, and m/z 449 tentatively identified as myricetin 3-O-xyloside (MX) based on fragmentation pattern. Briefly, UGT77B2 was heterologously expressed in *E. coli*, extracted, purified and tested for enzyme activity in separate assays with myricetin (M) and one of the sugar donors UDP-Glc, UDP-Xyl or UDP-Rha. Products were analyzed using LC-MS and extracted ion chromatograms (EIC) were generated for m/z 479, m/z 449 and m/z 463, as well as m/z 317. Relative turnover rates in the formation of MG, MX and MR were generated. UGT77B2 was about 45-fold and 50-fold more efficient with UDP-Rha compared to UDP-Glc and UDP-Xyl, respectively, as sugar donors. The inventors also tested specificity of UGT77B2 towards different flavonoid and phenolic substrates, specifically myricetin, quercetin, naringenin, dihydrokaempferol, dihydroquercetin, dihydromyricetin, epicatechin, MR, quercetin 4'-O-glucoside, caffeic acid, salicin and trichlorophenol. Briefly, UGT77B2 was heterologously expressed in *E. coli*, extracted, purified and tested for enzyme activity in the separate assays with UDP-Rha and kaempferol, myricetin or quercetin. Products were analyzed using LC-MS and the UVspectrum (350-370 nm). Relative turnover rates in the formation of different flavonol rhamnosides were assessed. Of these substrates, UGT77B2 only converted the flavonols myricetin, kaempferol and quercetin into the corresponding rhamnosides MR, quercetin O-rhamnoside and kaempferol O-rhamnoside. UGT77B2 did not appear to be active with flavan(onol)s, 4'-hydroxy or 3-hydroxy glycosylated flavonols, or simpler phenolics. To determine the relative activity of UGT77B2 with the three different flavonols, relative turnover rates were determined using purified UDP-Rha and myricetin, quercetin or kaempferol. The turnover rates for these three substrates were similar with 2.4-fold and 3.6-fold higher turnover rate for kaempferol compared to quercetin and myricetin.

UGT709G2 Catalyzes the Formation of Myricetin 3-O-Glucosyl Rhamnoside (MRG)

Enzymes catalyzing sequential reactions in the biosynthesis of plant specialized metabolites may be co-expressed, and such co-expression can be explored for gene discovery in a biosynthetic pathway. The inventors used Haystack co-expression analysis with UGT77B2 as a bait across the transcriptomes of montbretia flowers, stems, leaves, stolons and corms to screen for candidate UGTs that may catalyze the second glycosylation step in MbA biosynthesis, specifically the glycosylation of MR to form MRG. Two different transcripts, DN65518_c1_g1_i2 and DN71115_c1_g1_i4 encoded apparent full-length UGTs and showed strong correlation (R≥0.9) with UGT77B2 expression, as well as a ≥10× higher transcript abundance in yC compared to oC.

Figure 9:
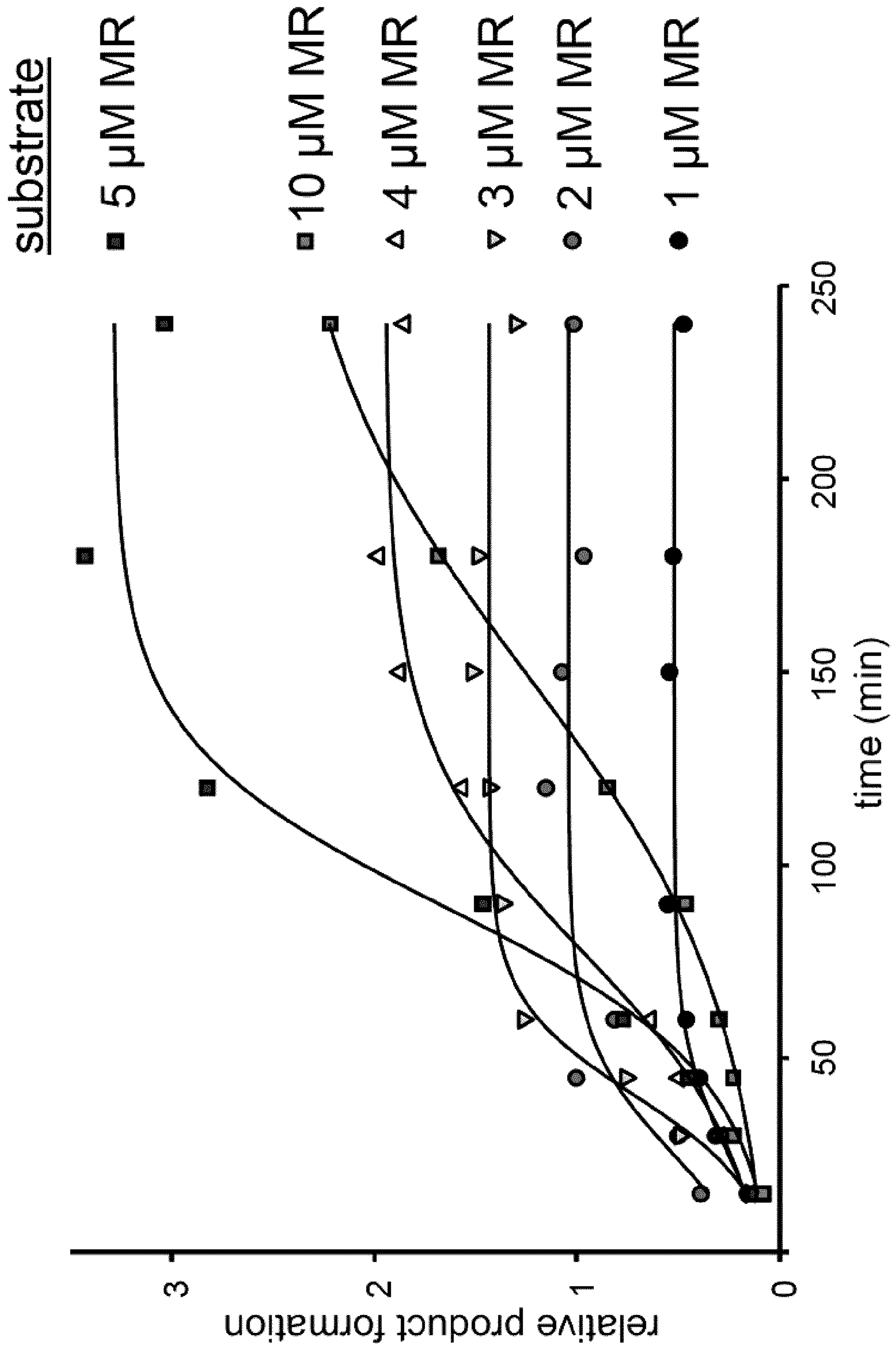
FIG. 9 illustrates the relative product formation catalyzed by UGT2 (UGT709G2) over time.

The inventors cloned the full-length cDNAs UGT709G2 and UGT91P2 corresponding to contigs DN65518_c1_g1_i2 (100% identity at the translated aa level) and DN71115_c1_g1_i4 (97.9% aa identity), respectively, from cDNA from yC and oC of the June $10^{th}$ time point. UGT709G2 clustered into the P-clade, and DN71115 into the A-clade of family 1 UGTs (described above). Both UGTs were heterologously expressed in *E. coli* and protein expression was verified using western blot analysis. Total protein extracts were assayed for enzyme activity with MR and UDP-Glc as substrates, followed by LC-UV/MS analysis of products. Only UGT709G2 showed glycosyltransferase activity in these assays with the formation of a single m/z 625 product peak. LC-MS/MS of m/z 625 showed the direct fragmentation into myricetin (m/z 316) suggesting the sugars rhamnose and glucose are attached in the m/z 625 product as a disaccharide. The fragmentation pattern and the retention time of the m/z 625 product of UGT709G2 matched the fragmentation pattern and retention time of peak 2 m/z 625 detected in corm extracts, and it was tentatively identified as MRG. Briefly, corms were extracted with 50% MeOH. UGT709G2 was heterologously expressed in *E. coli*, and protein extract assayed for UGT activity using MR and UDP-Glc. Corm extracts and assay product were analyzed using LC-MS and the extracted ion chromatogram m/z 625 (EIC) was generated. Purification of the UGT709G2 product m/z 625 and structural elucidation via NMR spectroscopy confirmed the identity as myricetin 3-O-β-D-glucosyl 1,2-α-L-rhamnoside (MRG). Briefly, NMR spectra were acquired of HPLC-purified MRG produced using UGT709G2. The NMR data indicated a myricetin aglycon with two sugar moieties. The identities and connectivities of the sugars were determined based on COSY and HMBC correlations, as well as chemical shifts and observable coupling constants. The 1" anomeric proton resonating at $\delta_H$ 5.59 s ($\delta_C$ 102.3) produced an HMBC correlation to the C-3 position ($\delta_C$ 135.6), and a COSY correlation to the 2"-proton ($\delta_H$ 4.27 broad s/$\delta_C$ 82.9). Additional COSY correlations were observed from the 2"-proton to the 3"-proton ($\delta_H$ 3.96 dd; 10, 3 Hz), from the 3"-proton to the 4"-proton ($\delta_H$ 3.31), from the 4"-proton to the 5"-proton ($\delta_H$ 3.85), and from the 5"-proton to the 6"-methyl group ($\delta_H$ 1.00 d; 6 Hz). The chemical shifts and coupling constants for this 1" sugar are consistent with rhamnose. The 1"' anomeric proton resonating at $\delta_H$ 4.33 (d, 8 Hz) ($\delta_C$ 107.0) produced an HMBC correlation to the 2"-position ($\delta_C$ 82.9) of the rhamnose confirming the 1→2 linkage of the two sugar moieties. As with the previous sugar, COSY correlations were used for the remainder of the assignment. The 1"' anomeric proton correlated to the 2"'-proton ($\delta_H$ 3.20 dd; 9, 8 Hz), which in turn correlated to the 3"'-proton ($\delta_H$ 3.35). The 6"'-proton ($\delta_H$ 3.59/3.66) correlated to the 5"'-proton ($\delta_H$ 3.09 m), and the 5"'-proton correlated to the 4"'-proton ($\delta_H$ 3.32). Due to overlap, it was not possible to observe correlations between the 3"' and 4'-protons. The chemicals shifts and coupling constants for this 1"' sugar are consistent with glucose. Ni-affinity purified UGT709G2 showed a sigmoidal profile of product formation over time and appeared to be affected by substrate inhibition at low substrate concentration (FIG. 9).

The inventors tested purified UGT709G2 for substrate specificity with UDP-Glc as a sugar donor and different flavonoids and phenolics as sugar acceptors, specifically myricetin, quercetin, MR, quercetin 3-O-glucoside, myricetin 3-O-glucoside, epicatechin, quercetin sophoroside, quercetin 4'-O-glucoside, arbutin, salicin, caffeic acid, trichlorophenol. In addition to producing MRG with MR and UDP-Glc, UGT709G2 also glucosylated myricetin 3-O-glucoside and quercetin 3-O-glucoside (UGT709G2 was heterologously expressed in *E. coli*, extracted, purified and tested for enzyme activity with UDP-Glc and quercetin 3-O-glucoside, MR, or myricetin 3-O-glucoside). UGT709G2 was not active with any of the other acceptor substrates tested. In addition to UDP-Glc, purified UGT709G2 also accepted UDP-Xyl producing myricetin 3-O-xylosyl rhamnoside (MRX) from MR. The approximate 50-fold higher turnover rate of UGT709G2 with MR and UDP-Glc compared to MR and UDP-Xyl suggested a substrate preference of UGT709G2 for UDP-Glc. UDP-Rha was not accepted as a sugar donor. The product peak m/z 609, which was formed with UDP-Rha and MR as substrates, fragmented into m/z 301 likely representing quercetin O-glucosyl rhamnoside (QRG).

Identification of CcAT Candidates by Transcriptome Expression Analysis and Co-Expression with UGT77B2 and UGT709G2

Using reciprocal BLASTP searches with BAHD-ATs from other plant species the inventors identified 59 different putative BAHD-ATs in the combined yC and oC transcriptome. Briefly, MUSCLE alignment was used to construct a neighbor joining tree with MEGA6 of the 59 montbretia BAHD-AT sequences identified in the corm transcriptome together with selected BAHD-ATs from other plant species. Alignments and phylogeny were used to cluster montbretia BAHDATs with known BAHD-AT clades. Of these, 50 were DE in yC versus oC, and 27 had at least two-fold higher transcript abundance in yC. These 27 sequences clustered into four of the five known BAHD-AT clades, with their majority falling into clade V. Briefly, predicted amino acid sequences of montbretia ATs with at least twofold higher transcript abundance in the young corm (yC) transcriptome compared to the old corm (oC) transcriptome were aligned with selected BAHD-ATs from other plant species using MUSCLE. A neighbor joining tree was constructed using MEGA6. Alignments and phylogeny were used to cluster montbretia ATs with known AT clades. To reduce the list of target BAHD-ATs for functional characterization, the inventors performed Haystack co-expression analysis across the flower, stem, leave, stolon and corm transcriptomes using UGT77B2 and UGT709G2 as baits. Seven different BAHD-AT transcripts, DN66658_c0_g1_i2 (CcAT1), DN66658_c0_g1_i1 (CcAT2), DN69556_c0_g2_i1 (CcAT3), DN63150_c0_g1_i1 (CcAT4), DN29265_c0_g1_i1 (CcAT5), DN37908_c0_g1_i1 (CcAT6) and DN61381_c0_g1_i1 (CcAT7), showed strong correlation (R≥0.9) of expression with UGT77B2 and UGT709G2 as well as a ≥10-fold higher transcript abundance in yC compared to oC.

CcAT 1 and CcAT2 Catalyze the Formation of Mini-MbA

The inventors cloned the full-length cDNAs of CcAT1-CcAT7 from yC and oC of the June $10^{th}$ time point. Predicted proteins CcAT1, CcAT2 and CcAT5 clustered into clade V; CcAT3, CcAT4 and CcAT7 clustered into clade I, and CcAT6 clustered into clade IV (method of establishing the phylogeny are described above). CcAT1 and CcAT2 shared 96.3% amino acid sequence identity. The inventors expressed all seven ATs in *E. coli* and verified protein expression with western blots. Total protein extracts were assayed for enzyme activity with MRG and Caff-CoA as substrates, followed by LC-MS analysis of products. Only CcAT1 and CcAT2 showed acyltransferase activity in these assays (as controls, assays were performed with protein, extracts of *E. coli* transformed with empty vector and products were analyzed using LC-MS), resulting in a single product peak with m/z 787, which was identified as mini-MbA by comparison of retention time and fragmentation pattern with an authentic standard. No activity with MRG and Caff-CoA was detected for CcAT3-CcAT7 or the empty vector control.

CcAT1 and CcAT2 activity was verified using Ni-purified proteins. Briefly, ATs were heterologously expressed in *E. coli* and purified proteins were assayed for activity with MRG and Caff-CoA. As controls, assays were performed with purified protein of *E. coli* transformed with empty vector. Products were analyzed using LC-MS. Extracted ion chromatogram and MS/MS fragmentation patterns of the reaction products were generated. The inventors also tested the acyl acceptor specificity of CcAT1 and CcAT2 towards myricetin, MG, MR, quercetin 3-O-sophoroside (QGG), rutin (QRG), salicin and arbutin with Caff-CoA as the acyl donor. Briefly, CcAT1 and CcAT2 were heterologously expressed in *E. coli*, extracted, purified and tested for enzyme activity with Caff-CoA and QGG. Products were analyzed using LC-MS. CcAT1 and CcAT2 produced an m/z 787 peak when QGG and Caff-CoA were used as substrates. The m/z 787 peak fragmented into m/z 625 (QGG) and m/z 300 (Q) and the product was tentatively identified as quercetin 3-O-(6'-O-caffeoyl)-glucosyl glucoside. No activity was observed for any of the other substrates tested. Acyl donor specificity of CcAT1 and CcAT2 was tested using MRG as the acyl acceptor and coumaroyl-CoA (Cou-CoA), feruloyl-CoA (Fe-CoA), acetyl-CoA (Ac-CoA) or malonyl-CoA (Ma-CoA) as acyl donor. Briefly, CcAT1 and CcAT2 were heterologously expressed in *E. coli*, extracted, purified and tested for enzyme activity with myricetin 3-O-glucosyl rhamnoside (MRG) and caffeoyl-CoA (Caff-CoA), coumaroyl-CoA, feruloyl-CoA (Fe-CoA), acetyl-CoA (Ac-CoA) or malonyl-CoA (Ma-CoA). Products were analyzed using LC-MS. Both enzymes accepted Cou-CoA, Fe-CoA and Ac-CoA and produced m/z 771, m/z 801 and m/z 667, respectively with MRG as the acyl acceptor. All three product peaks fragmented into expected daughter ions m/z 625 (MRG) and m/z 316 (M). CcAT1 and CcAT2 had the highest turn-over with Caff-CoA and Cou-CoA. The turn over with Fe-CoA was over four times less compared to Caff-CoA for both enzymes. Ac-CoA turn-over was about nine-fold and three-fold less for CcAT1 and CcAT2, respectively, compared to Caff-CoA. No activity was observed with Ma-CoA as the acyl donor.

Transcript Profiles of UGT77B2, UGT709G2, CcAT1 and CcAT2 Match MbA Accumulation Profiles in vC and oC The inventors measured profiles of transcript abundance of UGT77B2, UGT709G2, CcAT1 and CcAT2 during corm development in yC and oC from June $10^{th}$ to October $6^{th}$ using quantitative real time PCR (qRT-PCR) (FIGS. 3A-3D). Putative serin-incorporator (MEP) and a putative zinc-finger protein (ZF) were established as references for quantitative transcript analysis. UGT77B2, UGT709G2, CcAT1 and CcAT2 showed similar transcript expression patterns (FIGS. 3A-3D). In general, transcript abundance of all genes was low and did not significantly change across all time points in oC, and was significantly higher in yC at all time points. Transcript abundance was highest in June, with over 60-fold higher transcript levels for UGT77B2, UGT709G2, CcAT1 and CcAT2 at the June $27^{th}$ time point compared to oC of the same time point. Transcript abundance of all genes significantly dropped from June towards August in yC. The temporal patterns of UGT77B2, UGT709G2, CcAT1 and CcAT2 transcript abundance (FIGS. 3A-3D) matched the MbA accumulation profiles in yC and oC (FIG. 2C).

Reconstitution of Surrogate Mini-MbA Biosynthesis in *N. benthamiana*

To validate functions of UGT77B2, UGT709G2, CcAT1 and CcAT2, the inventors expressed the cDNAs in *N. benthamiana*. In a first set of experiments, the inventors tested the functions of UGT77B2 and UGT709G2, and then extended the experiments by additional co-expression of CcAT1 or CcAT2. In the first set of experiments the inventors used *Agrobacterium tumefaciens* transformed with plasmids carrying the promoter-UGT constructs 35S::UGT77B2, 35S::UGT709G2 or the gene for the enhanced green fluorescent protein (eGFP) to infiltrate *N. benthamiana* leaves. Samples of leaves that expressed 35S::eGFP, 35S::UGT77B2, or 35S::UGT77B2+35S::UGT709G2 were collected four days after infiltration, and MeOH/$H_2O$ extracts analyzed by LC-MS. Myricetin glycosides were not detected in any of the samples expressing the montbretia UGTs. This may be due to lack of access to myricetin as a substrate. The inventors therefore performed experiments in which the inventors supplied myricetin to leaves expressing 35S::eGFP or 35S::UGT77B2 or 35S::UGT77B2+35S::UGT709G2. For this purpose, transformed leaf discs were placed in a myricetin solution followed by MeOH/$H_2O$ extraction and LC-MS analysis. When myricetin was added as a substrate, MR (m/z 463 peak 2) was produced in *N. benthamiana* leaves expressing UGT77B2. Briefly, tobacco leaves were infiltrated with *A. tumefaciens* transformed with plasmids carrying the promoter-UGT constructs 35S::UGT77B2, 35S::UGT709G2 or the gene for the enhanced green fluorescent protein (eGFP). After four days leaves were collected and leaf disks placed into myricetin solution overnight. Metabolites were extracted with MeOH/$H_2O$, analyzed by LC-MS/UV and identified based on their fragmentation patterns and authentic standards for MR and MRG. In addition, the inventors detected peak 4 with m/z 625 and a MS/MS daughter ion m/z 463 indicative of a monoglycosylated myricetin, which suggested peak 4 represents MR with an additional glucose group on the flavonol ring. When UGT709G2 and UGT77B2 were co-expressed in tobacco leaves, and myricetin was provided, myricetin was converted into MRG (m/z 625, peak 5). The lack of detection of an MR peak in the UGT709G2 and UGT77B2 co-expression assays demonstrated efficient conversion of MR into MRG. None of the above-mentioned product peaks were observed in the controls expressing eGFP. The inventors detected two additional m/z 463 peaks, peak 1 and peak 3, which fragmented into m/z 301, indicative of quercetin O-glucosides. These peaks were also present in the eGFP control and were not affected by montbretia UGTs. No other myricetin disaccharides could be detected in these assays. The inventors also screened for other myricetin glycosides; no myricetin xyloside was detected and only small amounts of myricetin 3-O-glucoside (m/z 479) were detected in all samples. Briefly, tobacco leaves were infiltrated with *A. tumefaciens* transformed with plasmids carrying the promoter-UGT constructs 35S::UGT77B2, 35S::UGT709G2 or the gene for the enhanced green fluorescent protein (eGFP). After four days leaves were collected and leaf disks placed into myricetin solution overnight. Metabolites were extracted with MeOH/H2O, analyzed by LC-MS. MG was identified using an authentic standard.

Tobacco leaves have been reported to contain various kaempferol glycosides, suggesting that kaempferol may be available as a flavonol substrate. The inventors tested leaves that expressed 35S::eGFP, 35S::UGT77B2, or 35S::UGT77B2+35S::UGT709G2 for kaempferol glycosides. Briefly, tobacco leaves were infiltrated with *A. tumefaciens* transformed with plasmids carrying the promoter-UGT constructs 35S::UGT77B2, 35S::UGT709G2, 35S::CcAT1, 35S::CcAT2 or the gene for the enhanced green fluorescent protein (eGFP). Leaves were collected at day four after infiltration. Metabolites were extracted with MeOH/H2O, analyzed by LC-MS and tentatively identified based on their fragmentation patterns. Leaves expressing UGT77B2 produced a unique m/z 431 peak 4 with the fragmentation pattern expected for kaempferol 3-O-rhamnoside. This peak was absent in leaves expressing eGFP and only traces were found in leaves expressing both UGT77B2 and UGT709G2. Leaves expressing UGT77B2 and UGT709G2 together produced two peaks with the mass and fragmentation patterns expected for kaempferol 3-O-glucosyl rhamnoside (KRG). The fragmentation of the mother ion m/z 593 into m/z 285 indicated kaempferol as the core flavonol and the absence of monoglycosylated daughter ions suggested a disaccharide side chain. The first m/z 593 peak (peak 5) was also present in eGFP expressing leaves and likely represents kaempferol 3-O-rhamnosyl glucoside (KGR) known to be produced in tobacco. The other m/z 593 peak (peak 7) was specific to samples co-expressing the two montbretia UGTs. The identity of this peak is likely KRG, which is also supported by the depletion in KR (m/z 431) in these samples.

In a second set of experiments, the inventors transiently co-expressed UGT77B2 and UGT709G2 in combination with CcAT1 or CcAT2 in *N. benthamiana* (35S::UGT77B2+35S::UGT709G2+35::CcAT1 or 35S::UGT77B2+35S::UGT709G2+35::CcAT1). Small peaks for KR (m/z 431, peak 4) and KRG (m/z 593, peak 7) were detected in leaves co-expressing both UGTs and CcAT1 or CcAT2 suggesting depletion of the kaempferol glycosides in the presence of the CcATs. The inventors screened for products with m/z 755, corresponding to the addition of a caffeoyl-group to KRG and detected two peaks. One of these peaks (peak 1) was also present in controls co-expressing eGFP with UGT77B2+UGT709G2, independent of CcAT expression. A second, much smaller m/z 755 peak (peak 2) was only present in leaves co-expressing the two UGTs with CcAT1 or CcAT2, but was not detected in controls with eGFP or UGTs alone. This second m/z 755 peak showed daughter ions of m/z 609 (indicative of QRG) and m/z 300 (Q) as well as m/z 593 (KRG) and m/z 285 (K), suggesting that peak 2 represents the co-elution of two compounds tentatively identified as quercetin 3-O-(6'-O-coumaroyl)-glucosyl rhamnoside (QRG-Cou) and kaempferol 3-O-(6'-O-caffeoyl)-glucosyl rhamnoside (KRG-Caff). Given the central role of coumaroyl-CoA in plant phenylpropanoid metabolism, the inventors also screened samples for metabolites of m/z 739, which would correspond to the addition of a coumaroyl-group to KRG. Only samples expressing UGT77B2, UGT709G2 and CcAT1 or CcAT2 produced an m/z 739 peak. This peak fragmented into the daughter ions m/z 593 (KRG) and m/z 285 (K) and was tentatively identified as kaempferol 3-O-(6'-O-coumaroyl)-glucosyl rhamnoside (KRG-Cou). KRG-Cou appeared to be about 10-times more abundant than KRG-Caff or QGG-Cou.

By transiently co-expressing UGT77B2, UGT709G2 and CcAT1 or UGT77B2, UGT709G2 and CcAT2 in *N. benthamiana* the inventors achieved the formation of, respectively, 50.1±11.4 $\mu g \times g^{-1}$ (FW) or 57.2±3.8 $\mu g \times g^{-1}$ (FW) KRG-Cou. KRG-Cou is effectively a surrogate for mini-MbA (MRG-Caff) produced by the first three enzymes of the MbA biosynthetic pathways in transiently transformed *N. benthamiana* where kaempferol may be more accessible to UGT77B2 than myricetin, and where Cou-CoA may be more accessible to CcAT1 and CcAT2 than Caff-CoA. The inventors did not observe other glycosides of the flavonols kaempferol, quercetin or myricetin that were specific to conditions of transient expression of UGT and AT. However the inventors cannot exclude further conversion of such compounds by endogenous *N. benthamiana* enzymes.

Discussion

Type-2 diabetes is a major global health problem affecting over 320 M people. The specialized plant metabolite MbA, found in corms of the ornamental plant montbretia, is a promising novel drug candidate for the treatment of type-2 diabetes. MbA selectively inhibits HPA with a very high potency (Ki=8 nM) (Tarling, C. A., et al. (2008). ChemBioChem 9, 433-438; Yuen, V., et al. (2015). Nat. Chem. Biol. 11, 691-696; each of which is incorporated herein by reference in its entirety). While MbA is a complex acylated flavonol glycoside (FIG. 1A), the simpler precursor mini-MbA, which is also a strong HPA inhibitor (Ki=93 nM) (Williams, L. K., et al. (2015). Nat. Chem. Biol. 11, 691-696, incorporated herein by reference in its entirety). The inventors have established that mini-MbA can be biosynthesized from the flavonol myricetin by a set of two UGT-catalyzed reactions and an additional acyltransferase reaction. The inventors report here the transcriptome and metabolome based discovery of two UGTs, a myricetin 3-O-rhamnosyltransferase and a myricetin 3-O-rhamnoside 1,2-glucosyltransferase, and two BAHD-ATs, myricetin 3-O-glucosyl rhamnoside 6'-O-caffeoyltransferases from montbretia. These enzymes produce mini-MbA en route to MbA and provide a foundation for improved production of MbA or mini-MbA through plant or microbial metabolic engineering or improved breeding.

Assembly of MbA Involves the Formation of MR, MRG and Mini-MbA

The sequence of reactions by which MbA is assembled cannot be predicted from its structure alone. Using metabolite profiling, enzyme assays, and characterization of cloned UGTs and ATs the inventors resolved the first three steps in the assembly of MbA: the rhamnosylation of myricetin to yield MR, followed by the glucosylation of MR to form the disaccharide MRG, and next the acylation of MRG to form mini-MbA. A similar pattern of glycosylation occurs in the biosynthesis of lobelinin in *Lobelia erinus*, where stepwise assembly of a disaccharide at the 3-hydroxy group of the anthocyanin core precedes the glycosylation on other positions of the flavonoid ring. Glycosylation of the 3-O-position is a common primary modification of flavonoids, which increases the stability and solubility of the molecule. In the biosynthesis of lobelinin in *L. erinus*, acylation of the disaccharide occurs prior to further glycosylations. In contrast, in the anthocyanin biosynthesis in *Iris ensata* acylation occurs after 5-O-glycosylation. The third step in MbA biosynthesis is the formation of the mini-MbA molecule. The biological activity of both mini-MbA and MbA as potent HPA inhibitors has been attributed to internal π-stacking interactions between the myricetin and caffeic acid building blocks pre-organizing the phenolic hydroxy groups for multiple hydrogen bonds with conserved HPA active site residues. With the identification of UGT77B2, UGT709G2, CcAT1 and CcAT2 the full set of enzymes required to produce mini-MbA from myricetin is now available.

MbA and Mini-MbA Biosynthesis is Affected by Substrate Availability, Enzyme Expression and Enzyme Specificity of UGTs and ATs The montbretia corm transcriptome revealed a large number of different UGTs and BAHD-ATs, consistent with the large number of UGT and BAHD-AT genes in the genomes of other plant species. Using information about spatial and temporal patterns of MbA accumulation, enzyme activities, as well as identification of intermediates in MbA biosynthesis, the inventors discovered two UGTs, UGT77B2 and UGT709G2, and two BAHD-ATs, CcAT1 and CcAT2, catalyzing the biosynthesis of mini-MbA and the first three steps in the assembly of MbA. For the discovery of UGT77B2, a myricetin 3-O-rhamnosyltransferase that clusters in clade F of family 1 UGTs, the inventors relied on the assumption that regio-specificity of UGTs in flavonoid biosynthesis is a conserved feature that occurred early in the evolution of family 1 UGTs. As a consequence, UGTs cluster across the gene family by regio-specificity rather than by species and sugar donor specificity. Other known UGT members of the F-clade mediate the transfer of UDP-sugars, mostly UDP-Glc onto the 3-hydroxy group of different flavonoids. Notably, UGTs of the F-clade appear to be missing in the genomes of the monocotyledonous reference plant system maize and rice, and only one other flavonol 3-O-rhamnosyltransferase, UGT78D1 from *A. thaliana*, has been characterized previously. Like AtUGT78D1, montbretia UGT77B2 can use different flavonols as sugar acceptors and showed high specificity towards UDP-Rha as sugar donor. The sugar donor specificity is thought to be determined by the last amino acid residue (position number 376 of SEQ ID NO:12) of the PSPG-motif (represented by amino acids 336 to 376 of SEQ ID NO:12). A glutamine or histidine in this position is important for glucosyl or galactosyl transfer activity, respectively. AtUGT78D1 contains an asparagine at this position, while montbretia UGT77B2 has a glutamine in this position despite its characterized preference for UDP-Rha.

The inventors characterized UGT2 (UGT709G2) as myricetin 3-O-rhamnoside 1,2-glucosyltransferase, which mediates the first chain-elongating glycosylation in MbA biosynthesis. Other flavonoid or polyphenol chain-elongating UGTs have been characterized to catalyze 1,6-glycosylations or 1,2-glycosylations. For example, UGT79B6 from *A. thaliana* catalyzes the 1,2-glucosylation of flavonol 3-O-glucosides and is important for the production of kaempferol and quercetin 3-O-glucosyl 1,2-glucosides in pollen. Like UGT79B6 and other branch-elongating UGTs, montbretia UGT2 (UGT709G2) is specific towards its sugar donor and accepts different 3-O-glycosylated flavonols. All previously characterized chain-elongating UGTs of plant origin are from eudicots and form a separate branch within clade A of family 1 UGTs. In contrast, montbretia UGT2 (UGT709G2) falls into the clade P. UGTs of the P-clade appear to be absent in *A. thaliana*, while the P-clade has expanded in montbretia compared to other plants. The montbretia UGT709G2 appears to be the first functionally characterized member of the P-clade and it is not known if other members of this clade may also function as branch elongating UGTs. Expression of UGT1 (UGT77B2) and UGT2 (UGT709G2) in *N. benthamiana* supported the conclusion that sugar donor specificity is an inherent feature of these UGTs, while acceptor specificity is more promiscuous and the biosynthetic product of these enzymes may be determined by flavonol availability in planta.

The inventors characterized CcAT1 and CcAT2 as myricetin 3-O-glucosyl 1,2-rhamnoside 6'-O-caffeoyl transferases. CcAT1 and CcAT2 cluster into BAHD-AT family clade V, which contains ATs that act on a range of substrates including terpenoids, medium-chain alcohols and quinic acid. For example, the hexenol acetyltransferase, CHAT from *A. thaliana* is involved in the production of volatile esters and the hydroxycinnamoyl-transferases from *Trifolium pratense*, TpHCT1A is involved in the production of p-coumaroyl-shikimate/quinate esters. Interestingly all BAHD-ATs characterized to acylate flavonoids (mainly anthocyanins) are members of clade I, except for the malonyltransferase SsMAT2 from *Salvia splendens* in clade III. CcAT1 and CcAT2 appear to be the first known members of clade V that use flavonoids as the acyl acceptor. Flavonoid BAHD-ATs have been described to be specific towards the position of the glucose and the hydroxy group on the glucose but not towards the hydroxylation pattern on the B-ring of flavonoids. For example *Arabidopsis* At3AT1 and At3AT2 acylate the C6 hydroxy of the glucose in position 3 of anthocyanins. These results suggest that CcAT1 and CcAT2 are specific towards the C6'-hydroxy of the second glucose of the flavonoid 3-hydroxy disaccharide chain. Characterized flavonoid BAHD-ATs have been shown to be aliphatic ATs, transferring the malonyl moiety or aromatic ATs transferring hydroxycinnamoyl moieties. For example, At3AT1 and At3AT2 exhibit affinity for p-coumaroyl-, feruloyl- and caffeoyl-, but not sinapoyl-CoA. CcAT1 and CcAT2 were most active with p-coumaroyl and caffeoyl-CoA but also accept acetyl-CoA and to a lesser extent feruloyl-CoA.

In addition to the most abundant montbretin, MbA, montbretia produces smaller amounts of montbretin B (MbB) and montbretin C (MbC). MbB has a coumaroyl moiety, and MbC has a feruloyl moiety, instead of the caffeoyl moiety in MbA. Compared to MbA, the potency of MbB and MbC to inhibit HPA is 1000-fold lower, which highlighted the importance of the meta-hydroxy group of the caffeoyl moiety. The lack of absolute acyl donor specificity suggests that CcAT1 and CcAT2, together with UGT1 (UGT77B2) and UGT2 (UGT709G2), may also be involved in the formation of MbB and MbC. As with UGT1 (UGT77B2) and UGT2 (UGT709G2), the in planta products of CcAT1 and CcAT2 may be controlled by the substrate availability, whereby availability of caffeoyl-CoA, coumaroyl-CoA and feruloyl-CoA may be a key factor in determining the preferential formation of MbA, MbB or MbC, respectively. This would be similar to the features of cocaine synthase from *Erythroxylum coca*, which can form cocaine or cinnamoylcocaine based on the availability of benzoyl-CoA or cinnamoyl-CoA, respectively.

Overall, the high regio-specificity of UGT77B2 and UGT709G2 as well as CcAT1 and CcAT2 support their function in MbA biosynthesis. This conclusion is also supported by correlation of gene expression, metabolite accumulation and protein activity over the time course of corm development. Substrate availability and expression of the UGT and BAHD-ATs are likely critical factors for the control of MbA biosynthesis.

Montbretia Corms and Alternative Systems for the Production of MbA

Montbretia is the only known source of MbA, which is produced in a mostly organ-specific fashion in montbretia corms. However, MbA accounts for only 0.06 to 0.69% of the corm fresh weight (or 0.07 to 1.67% of corm dry weight). The small size of montbretia corms and the low abundance of MbA limit production of MbA using its natural source. In addition, harvesting of corms, which serve as the plant's below-ground storage and vegetative reproductive organs, is destructive and would require the development of specialized farm operations for planting, harvesting and propagation at large scale. Animal studies suggest that treatment of type-2 diabetes with MbA requires a daily dose of 7.5 mg per kg body weight for rats. As an alternative to MbA production in montbretia, it may be possible to produce MbA, and more easily mini-MbA, in an engineered biological system such as microorganisms or plants.

Progress has been made in engineering flavonoid glycoside production in microbial systems such as *E. coli* and yeast (*Saccharomyces cerevisiae*). However, as these hosts do not possess endogenous flavonoid biosynthesis, the introduction of a large suite of genes and engineering of metabolite flux will be necessary for MbA production, in addition to the expression of the genes that assemble MbA from its building blocks. Indeed, few projects have achieved flavonoid glycoside production in microbial hosts without supplementation of precursors. For example, production has been reported of 58 mg$\times$L$^{-1}$ of kaempferol 3-O-rhamnoside, which is a considerably less complex molecule than MbA, from glucose by engineering of 12 different genes in *E. coli*. Utilizing the endogenous phenylpropanoid and flavonoid metabolism of a plant host for metabolic engineering may accomplish MbA production by metabolic engineering of fewer genes. A plant host may also be advantageous for proper subcellular localization of engineered MbA biosynthesis. Transient expression in *N. benthamiana* is particularly suitable for the expression of multiple genes. For example, others have achieved the production of an etoposide aglycone, the precursor for the chemotherapeutic etoposide, by transiently expressing ten genes in *N. benthamiana*. Another example is the production of glucoraphanin, a cancer preventive glucosinolate by transient expression of 13 genes. In this system, reduction of undesired side products and improved yield was accomplished with the expression of two additional genes. This study highlighted a possible problem of using heterologous plant systems for metabolic engineering of a complex plant metabolite, which is the potential formation of non-target products that may result from promiscuous activities of the introduced enzymes reacting with non-target substrates, or the conversion of engineered pathway intermediates and products by endogenous enzymes. In the present work, transient expression of UGT1 (UGT77B2UGT2), (UGT709G2), and CcAT1 or CcAT2 in *N. benthamiana* with only endogenous substrates resulted in the production of KRG-Cou instead of MRG-Caff (mini-MbA). On an experimental scale, this problem can be overcome by feeding of substrates myricetin and caffeoyl-CoA, which are expensive. For larger scale production, conversion of kaempferol into myricetin and redirection of coumaroyl-CoA formation towards caffeoyl-CoA could be implemented. In addition, overall levels of phenylpropanoid and flavonoid biosynthesis may have to be increased, which may be achieved by overexpression of transcription factors that control these pathways.

Other approaches to facilitate MbA or mini-MbA production may include cell cultures, as shown for the production of Taxol™, or increasing MbA levels in montbretia through breeding, as demonstrated for the enhanced production of artemisinin in *Artimisia annua*. All of these approaches will be informed by the detailed understanding of the complex MbA biosynthetic system, which the inventors have disclosed here, including knowledge of the genes, enzymes and spatial and temporal patterns of biosynthesis and accumulation.

Spatial and Temporal Patterns of MbA Biosynthesis May Suggest a Role in Plant Defense MbA biosynthesis occurs during yC development in the early summer as demonstrated by i) higher levels of MbA and MbA-intermediate levels in yC compared to oC, ii) greater total biosynthetic enzyme activity in yC compared to oC at the same time points in early summer and iii) the transcript profiles of UGT77B2, UGT709G2, CcAT1 and CcAT22 that match the profiles of metabolite and enzyme activities. The window of time for MbA biosynthesis appears tightly correlated to yC development. Corms are also the site of starch accumulation. It is conceivable that the spatially restricted pattern of MbA accumulation in corms, and the temporally restricted pattern of MbA biosynthesis in developing yC followed by retention of MbA in oC provides protection of the storage and reproductive organ against feeding mammals by interfering with a digestive enzyme of starch degradation.

Material & Methods

Plant Material

Montbretia (*Crocosmia* x *crocosmiiflora*) plants of the variety Emily McKenzie were obtained from a collection curated by Dr. Gary Brayer (Richmond, British Columbia, Canada) in July 2010. Plants were vegetatively propagated from corms and maintained in 4 L pots containing perennial potting mix under natural outdoor conditions on the University of British Columbia campus in a semi shaded area. Plant maintenance included the annual removal of dead above ground leaves and stems after the active growing season in November, coverage of pots for overwintering, and annual re-potting in February whereby clusters of corms were separated and a single corm per pot was replanted. *Nicotiana benthamiana* plants were grown from seed in potting soil in a controlled environment chamber (day, 26° C.; night, 22° C.; 16 h/8 h light/dark cycle).

Plant Sampling

Between February 2016 and February 2017 corms of four to six biological replicates were collected at least once a month. Corms that were newly developing during this growing season appeared in June and were defined as young corms (yC), and collected separately from the original corm, which was defined as the old corm (oC). During the summer months (late June, July, August), additional parts of the plants (stems, leaves, flowers, seed pods, stolons and roots) were collected. Plants were dissected with a razor blade, samples flash frozen in liquid nitrogen and stored at −80° C. until further use. In addition, corms, stem, leaves, flowers, stolon and roots were sampled on Jul. 29, 2013 from three to four biological replicates for RNA-Seq.

Metabolite Extraction

Frozen plant material was ground in liquid nitrogen to a fine powder, of which 100 mg per sample was extracted with 1 mL 50% MeOH/$H_2O$ (v/v) (2 h shaking at 21° C.). After removing the supernatant one re-extraction step was performed and both supernatants were combined. After two extraction steps less than 10% MbA remained in the material. Undiluted and 1:10 diluted samples were used for metabolite analyses which were performed with four to six separate biological replicates for each time point and sample type. To assess the potential that differences in MbA levels may be caused by differences in water content of corms, 100 mg powdered tissue of a subset of samples was dried for three days at 50° C., DW was determined, and the sample was extracted as described above for non-dried samples. The yC and oC did not differ in water content, and extraction from dried or non-dried samples did not affect the results of temporal metabolite profiling in yC and oC (FIG. 6). Extracts were analyzed using LC-MS (described below).

Protein Extraction and UGT and BAHD-AT Activity Assays

Total protein extracts were prepared as described in Nagel, R., et al. (2012). Anal. Biochem. 422, 33-38, and Martin, D., et al. (2002). Plant Physiol. 129, 1003-1018, each incorporated herein by reference in its entirety, with minor modifications. In brief, 500 mg of powdered corm sample was extracted with 2.5 mL of buffer (100 mM NaPi, pH 7.4, 5 mM ascorbic acid, 5 mM sodium bisulfite, 5 mM dithiothreitol, 1 mM EDTA, 10% (v/v) glycerol, 1% (w/v) PVP, 4% (w/v) PVPP, 4% (w/v) Amberlite XAD-4, 0.1% (v/v) Tween) for 1 h at 4° C. Following centrifugation at 4300×g for 30 min (4° C.), the supernatant was desalted three times into assay buffer (10 mM Tris-HCl, pH 7.5, 1 mM dithiothreitol, 10% (v/v) glycerol) using NAP-5 columns (GE-Healthcare). Desalted protein extract (75 μL) was used in 150 μL total assay volume with 100 μM myricetin or 100 μM MR (Sigma-Aldrich) as flavonoid substrates and one of the following UDP sugars, 1 mM UDP-Glc (Sigma-Aldrich), 1 mM UDP-Xyl (CarboSource Services), or 50 μL UDP-$Rha^P$ (see below for UDP-Rha preparation). Additional assays were performed using 50 μM MRG and 120 μM caffeoyl-CoA (TransMIT GmbH) or 1 mM UDP-Glc or 1 mM UDP-Xyl. Assays were incubated at 21° C. for 6 h in a Teflon-sealed, screw-capped 1-mL GC glass vial and stopped by placing vials on ice after the addition of 100 μL MeOH. After centrifugation at 4300×g for 20 min (4° C.) supernatant was transferred into a fresh vial and assays were analyzed for product formation by LC-MS.

LC-MS Analysis

LC was performed on an Agilent 1100 HPLC (Agilent Technologies GmbH, Waldbronn, Germany) with Agilent ZORBAX SB-C18 column (50×4.6 mm, 1.8 μm particle size) (Merck, Darmstadt, 370 Germany) using aqueous formic acid (0.2% v/v) (mobile phase A) and acetonitrile plus formic acid (0.2% v/v) (mobile phases B). The elution profile was: 0-0.5 min, 95% A; 0.5-5 min, 5-20% B in A; 5-7 min 90% B in A and 7.1-10 min 95% A. The flow rate was 0.8 mL×$min^{-1}$ at a column temperature of 50° C. LC was coupled to an Agilent MSD Trap XCT-Plus mass spectrometer equipped with an electro-spray operated in negative ionization mode (capillary voltage, 4000 eV; temp, 350° C.; nebulizing gas, 60 psi; dry gas 12 L/min) and an Agilent 1100 Diode Array Detector (DAD, detection 200-700 nm, J&M Analytik AG, Aalen, Germany). MS/MS was used to monitor daughter ion formation. The LC/MSD Trap Software 5.2 (Bruker Daltonik, GmbH) was used for data acquisition and processing. Metabolites were quantified using an MbA standard curve. Enzyme products were quantified, in addition, using the UV spectrum (350-370 nm) and external standard curves of myricetin, quercetin or kaempferol (Sigma Aldrich). Compounds were tentatively identified using their molecular masses and specific fragmentation patterns. Authentic standards were available for MR (Sigma Aldrich), myricetin 3-O-glucoside (Extrasynthese, France), MbA, MbA-C, mini-MbA (Williams, L. K., et al. (2015). Nat. Chem. Biol. 11, 691-696, incorporated herein by reference in its entirety).

UDP-L-Rhamnose Preparation and Purification

As UDP-L-rhamnose was not commercially available when this research was performed, a preparation of this activated sugar (UDP-$Rha^P$) was generated from UDP-glucose using the two active domains (RHM-D, RHM-ER) of the *A. thaliana* UDP-L-rhamnose synthase (Rautengarten, C., et al. (2014). Proc. Natl. Acad. Sci. U.S.A. 111, 11563-11568, incorporated herein by reference in its entirety). RHM-D, RHM-ER were individually expressed in *E. coli* BL21(DE) (Invitrogen) following the protocol for expression and crude protein preparation as described below for UGTs, except that 1 mM IPTG was used to induce gene expression. Crude protein extract containing RHM-D (450 µL) was incubated with 2 mM UDP-Glc and 1 mM $NAD^+$ in a total volume of 500 µL in assay buffer (see UGT expression below) for 24 h at 21° C. The enzyme was then inactivated and precipitated by incubation at 70° C. for 10 min. After centrifugation, 450 µL RHM-ER crude protein extract and 1 mM of NADPH was added to the supernatant to yield a total volume of 1 mL. The reaction was incubated for another 24 h at 21° C., followed by heat inactivation at 70° C. for 10 min. After centrifugation the supernatant (UDP-$Rha^P$) was stored at −20° C. until further use. All UDP-$Rha^P$ were analyzed by LC-MS to ensure the conversion of UDP-glucose (m/z 565) into UDP-Rha (m/z 549). Some of the UDP-$Rha^P$ was purified by HPLC using an Agilent Zorbax SB-Aq column (150×4.6 mm, 5 µm) with water (phase A) and acetonitrile (phase B). The elution profile was: 0-5 min, 95% A; 5-10 min, 5-95% B in A; hold 2 min at 95% B, 12.1-15 min 95% A. The column temperature was 25° C. Purified UDP-Rha fractions were freeze dried.

Purification and NMR Analysis of MRG

MRG was purified from enzyme assays by HPLC using an Agilent Zorbax SB-C18 column (150×4.6 mm, 5 µm) with water (phase A) and acetonitrile (phase B). The elution profile was changed to: 0-0.5 min, 95% A; 0.5-8 min, 25% B in A; 8-12 min 95% B in A and 12.1-15 min 95% A. The column temperature was 35° C. Purified MRG was freeze dried and used for structure determination by NMR. All NMR spectra were acquired on a Bruker Avance 600 spectrometer with a 1H operating frequency of 600 MHz and equipped with a Bruker BioSpin TCI 1.7 mm MicroCryoProbe. The sample was dissolved in 13 uL of CD3OD and syringed into a 1 mm NMR tube. 1H chemical shifts were recorded with respect to the residual non-deuterated solvent signal from the NMR solvent, CD3OD. 13C chemical shifts were obtained from the HSQC and HMBC spectra. 1H, gradient COSY, ROESY, gradient HSQC and gradient HMBC spectra were acquired for structure elucidation.

RNA Extraction

Plant material was ground into a fine powder under liquid nitrogen and total RNA extracted as described previously with minor modifications (Kolosova, N., et al. (2004). BioTechniques 36, 821-824, incorporated herein by reference in its entirety). In brief, 1 mL extraction buffer (200 mM Tris-HCl, pH 8.5, 1.5% (w/v) lithium dodecylsulfate, 300 mM LiCl, 10 mM disodium salt EDTA, 1% (w/v) sodium deoxycholate, 1% (w/v) Tergitol Nonidet® P-40 (NP40), 5 mM thiourea, 1 mM aurintricarboxylic acid, 10 mM dithiothreitol, and 2% (w/v) polyvinylpolypyrrolidone (PVPP)) was added to 100 mg plant material, the sample was flash frozen in liquid nitrogen and thawed at RT, centrifuged at 20,000×g for 10 min at 4° C., and one-thirtieth volume of 3.3 M sodium acetate (pH 6.1) and 0.1 volume 100% ethanol were added to the supernatant. After incubation on ice for 10 min, the centrifugation step was repeated and one-tenth volume of 3.3 M sodium acetate (pH 6.1) and 0.6 volume of ice-cold isopropanol were added to the supernatant, and then left at −80° C. for at least 30 min. Samples were thawed at RT, centrifuged (20,000×g, 20 min, 4° C.), the pellet was resuspended in 400 µL TE-buffer (10 mM Tris-HCl, pH 8.0, 1 mM EDTA) and 400 µL 5 M NaCl for at least 30 min on ice. Samples were mixed with 200 µL of 10% cetyltrimethylammonium bromide (CTAB) and then incubated for 5 min at 65° C. following a two times extraction with 1 mL chloroform/isoamylalcohol each (24:1; v/v). A quarter volume of 10 M LiCl was added to the chloroform/isoamylalcohol extract and samples were incubated overnight at −20° C. RNA precipitates were collected by centrifugation (20,000×g, 30 min, 4° C.), dissolved in 100 µL TE buffer for up to 1 h on ice and 100 µL chilled isopropanol and 11 µL of 3.3 M sodium acetate were added, and RNA was precipitated for 30 min at −80° C. RNA precipitates were collected by centrifugation (20,000×g, 30 min, 4° C.) and washed with 100 µL 70% (v/v) ethanol. Centrifugation was repeated for 10 min to remove remaining liquid. The RNA pellet was dried for 3 min at RT and re-suspended in 25 µL DEPC-treated $H_2O$ on ice for 30 min. Total RNA concentration was determined using a NanoDrop 1000 (ThermoFisher Scientific, http://www.thermoscientific.com/) and assessed for quality on an Agilent 2100 Bioanalyzer and Agilent RNA 6000 Nano Kit LabChips (Agilent Technologies Inc.; http://www.agilent.com/). RNA was stored at −80° C. until further use.

Transcriptome Sequencing, De Novo Assembly

RNA samples (RNA Integrity Number ≥9) prepared separately from yC and oC of the Jun. 10, 2016 time point, each with two biological replicates were sequenced at the McGill University & Génome Québec Innovation Centre. RNA-Seq was performed on the Illumina HiSeq platform using 100-bp PE strand-specific libraries multiplexed on a single lane, generating approximately 400 million PE reads. Sequence quality was assessed with FastQC (http://www.bioinformatics.babraham.ac.uk/projects/fastqc/). Adapter sequences were trimmed with BBDuk of the BBTools software suite (v 36.62, sourceforge.net/projects/bbmap/). To improve assembly contiguity, overlapping PE reads were joined by BBMerge to generate longer single end reads. A second round of trimming, using BBDuk, was carried out to remove low quality base pairs in both merged and unmerged reads. A total of 274 million merged reads and 112 million unmerged PE reads were pooled and assembled de novo using Trinity (v 2.3.2) (Grabherr, M. G., et al. (2011). Nat. Biotech. 29, 644-652, incorporated herein by reference in its entirety), resulting in 171,070 NR contigs with an average length of 691 bp. From the assembly, TransDecoder (version 3.0.0, https://transdecoder.github.io/) predicted 54,266 NR peptides with an average length of 308 amino acids. Additional RNA-seq data were produced from sixteen RNA samples (three biological replicates for flowers, leafs, stems, and stolons and four replicates of corms; RNA Integrity Numbers ≥8) from plant material collected on Jul. 29, 2013 to generate approximately 75 gigabases (Gbp) of sequencing data using the Illumina HiSeq2000 platform with 150 bp PE sequencing at the McGill University & Génome Québec Innovation Centre.

Identification of UGT and BAHD-AT Transcripts

Putative montbretia UGT sequences were identified in the transcriptome assembly by BLASTP search of the montbretia translated protein database using *A. thaliana* and *Z. mays* UGTs from all currently known UGT-families (A-P). Results were filtered using a reciprocal BLASTP search against the non-redundant protein database of NCBI. Montbretia UGT sequences and the *A. thaliana* and *Z. mays* UGTs were used to construct a phylogenetic tree to select representative montbretia UGTs from each family for a reciprocal BLASTP analysis. All putative montbretia UGTs were clustered at 98% amino acid identity, using CD-HIT (v 4.6.1) to collapse possible allelic variants (Fu, L., et al. (2012). Bioinformatics 28, 3150-3152, incorporated herein by reference in its entirety). In addition, short sequences (≥250 amino acids) were removed and UGTs were manually assessed using alignments to join shorter sequences and remove likely chimeric or misassembled genes, which resulted in the refined list of 159 montbretia UGT. Montbretia BAHD-ATs were identified using the same pipeline as described for UGTs. A refined list of 59 montbretia-ATs was generated.

UGT and BAHD-AT Sequence Analysis and Reconstruction of Sequence Phylogeny

An amino acid alignment of montbretia UGTs and published UGTs from other plant species was constructed using the MUSCLE algorithm (gap open, −2.9; gap extend, 0; hydrophobicity multiplier, 1.5; clustering method, upgmb) implemented in MEGA6 (Tamura, K., et al. (2011). Mol. Biol. Evol. 28, 2731-2739, incorporated herein by reference in its entirety). Based on this alignment, a phylogenetic tree was produced using the neighbor-joining algorithm (Poisson model) in MEGA6. A bootstrap resampling analysis with 1000 replicates was performed to evaluate the topology of the phylogeny. An additional phylogeny was constructed using only UGTs that were at least two-fold up-regulated in yC compared to oC together with UGTs from other species. To associate montbretia UGTs with previously described UGT clades, the inventors selected *Arabidopsis* and maize UGTs that represent clades A-P. In addition, the inventors selected characterized UGTs that catalyze O-glycosylations and chain elongations. To visualize the PSPG-motif an alignment was generated using BioEdit (http://www.mbio.ncsu.edu/bioedit/bioedit.html) and the ClustalW algorithm. A phylogenetic tree comprising the 59 montbretia BAHD-ATs and BAHD-ATs from other species, and a phylogeny of BAHD-ATs that were at least two-fold up-regulated in yC compared to oC together with BAHD-ATs from other species, was constructed as described for UGTs.

Analysis of Differentially Expressed UGTs and Identification of Target UGTs

The refined UGT list was used to carry out a DE analysis between yC and oC on all predicted coding sequences using the voom/limma package in R with quantification results from Salmon (v 0.8) with numBootStrap=100 (Law, C. W., et al. (2014). Genome Biol. 15, R29; Patro, R., et al. (2017). Nat. Methods 14, 417-419, incorporated herein by reference in its entirety). Contigs with less than 100 counts per million (CPM) were discarded. Expression of UGTs in other plant organs was assessed with RNA-Seq data using Salmon with the same parameters as described above and using the refined UGT list from the yC and oC transcriptome assembly. Haystack (http://haystack.mocklerlab.org/) was used to test for correlations in expression patterns between UGT77B2 and other UGTs across yC, oC, and other plant organs. A correlation cut off, of R≥0.9 was used; in addition results were filtered to meet criteria of at least 10-fold greater expression in yC compared to oC.

UGT cDNA Cloning and Heterologous Expression in *E. coli*

Target UGTs were amplified from cDNA prepared from yC of the Jun. 10, 2016 time point and cloned into the pJET1.2/blunt vector (ThermoFisher Scientific) for sequencing (primer sequences are set forth in TABLE 1). Complete open reading frames of the target UGTs were cloned as BsaI or BspMI fragments into the pASK-IBA37 vector (IBA-GmbH, Gottingen, Germany). The *E. coli* TOP10 strain (Invitrogen) was used for heterologous UGT expression. Cultures were grown at 21° C., induced at an OD600=0.5 with 200 μg/L anhydrotetracycline (Sigma-Aldrich, Germany) and then placed at 18° C. and grown for another 20 h. Cells were collected by centrifugation and disrupted by five freeze and thaw cycles in chilled extraction buffer [50 mM Tris-HCl, pH 7.5, 10 mM $MgCl_2$, 5 mM dithiothreitol, 10% (v/v) glycerol, 1× Pierce™ protease inhibitor (EDTA-free, ThermoFisher Scientific), 25 U Benzonase Nuclease (Merck, Germany), 0.2 mg×$mL^{-1}$ lysozyme]. Cell fragments were removed by centrifugation at 14,000×g and the supernatant was desalted into assay buffer (10 mM Tris-HCl, pH=7.5, 1 mM dithiothreitol, 10% (v/v) glycerol) using Econopac 10DG columns (BioRad, Hercules, CA, USA). For protein purification using Ni-NTA, a modified extraction buffer was used [50 mM Tris-HCl, pH 7.5, 10 mM $MgCl_2$, 5 mM dithiothreitol, 2% (v/v) glycerol, 150 mM $NaCl_2$, 20 mM imidazole, 1× Pierce™ protease inhibitor (EDTA-free, ThermoFisher Scientific), 25 U Benzonase Nuclease (Merck, Germany), and 0.2 mg×$mL^{-1}$ lysozyme] and the lysate was directly loaded onto a Ni-NTA agarose column (Qiagen, Hilden, Germany). Protein was eluted with elution buffer (10 mM Tris-HCl, pH=7.5, 500 mM imidazole, 1 mM dithiothreitol, 10% (v/v) glycerol) and desalted into assay buffer using Illustra NAP-5 Columns (GE Healthcare). Enzyme concentrations were determined using UV absorption at 280 nm. For all experiments the His•Tag® Antibody HRP Conjugate Kit (Novagene) was used to ensure successful heterologous enzyme expression.

TABLE 1

Oligonucleotides used herein.

| Primer name | Sequence | SEQ ID NO: |
|---|---|---|
| UGT77B2-fwd | ATGGATTCAGCCAGCAGGCAGC | 33 |
| UGT77B2-rev | TTAATTAGCAGTCCCACGTACCATC | 34 |
| UGT709G2-fwd | ATGGCAGAGAAAGAAGCAAAACATC | 35 |
| UGT709G2-rev | CTAAAAACCCGAAGTACTTGAACAGGC | 36 |
| UGT91P2-fwd | ATGGAAGCTCATGGAGATAGCC | 37 |
| UGT91P2-rev | TCAGCCATGTGAGGTTCTGTGAG | 38 |

TABLE 1-continued

| Oligonucleotides used herein. | | |
|---|---|---|
| Primer name | Sequence | SEQ ID NO: |
| AT1-fwd | ATGAGCTTCACAGTGACCAAG | 39 |
| AT1-rev | CTAGGTAAAATCATTCATCTCGG | 40 |
| AT2-fwd | ATGAGCTTCACAGTGACCAAG | 41 |
| AT2-rev | CTAGGTAAAATCATTCATCTCGG | 42 |
| AT3-fwd | ATGGTGAAGGGAGAAGTGACA | 43 |
| AT3-rev | TCAATTAGCAACTGCTTCCATGAA | 44 |
| AT4-fwd | ATGGCAGTAGAGGTAGAGGC | 45 |
| AT4-rev | TCAAGCACCCACATTGAGAAAC | 46 |
| AT5-fwd | ATGACACCTTCCCTATCCTTC | 47 |
| AT5-rev | TCAAAGTGTAGAAAGAGTAAATGGG | 48 |
| AT6-fwd | ATGAGCTTCACAGTGACCAAG | 49 |
| AT6-rev | TTAAGCTACAGCCTCGTAGAAC | 50 |
| AT7-fwd | ATGGGTAAGGGAGAAGTCATAATT | 51 |
| AT7-rev | TTAACCAACTGCCTCCATGAAC | 52 |
| qRTf-UGT77B2 | GTGAAGGTCAGCTGTGTGGTCAG | 53 |
| qRTr-UGT77B2 | GCTTCTCAACTCCGAACCTCTCC | 54 |
| qRTf-UGT709G2 | GTGGTCTATGTCAGTTTCGGTAG | 55 |
| qRTr-UGT709G2 | CGGTCAGCTCACACTCTTCTAG | 56 |
| qrtf-AT1 | CGGATCTGTCACCAGTGTCTGATAT | 57 |
| qrtr-AT1 | GGATTGCCATAGCTTCGCTGT | 58 |
| qrtf-AT2 | CGGATCTGTCATCAATTCCTGATT | 59 |
| qrtr-AT2 | AGATTGCCATAGCTTGGCTGC | 60 |
| MEP1-f | GTCGTCGGCTTCTTCGAGATG | 61 |
| MEP1-r | CACATAGCAAACTAGGGACACAAC | 62 |
| ZF1-f | GTCCGTCTCGAATCTGGTGAG | 63 |
| ZF1-r | GAGCAACACAATTCTTAGGCGTG | 64 |

Enzyme Assays with Recombinant UGTs

To test for UGT activity, initial enzyme assays were performed with 100 μL of the bacterial extract, 50 μM myricetin or 50 μM MR, and 1 mM UDP-Glc or UDP-Xyl or 50 μL of UDP-Rha$^P$ in a Teflon-sealed, screw-capped 1 ml GC glass vial. Unless stated otherwise, assays were performed in assay buffer in a final volume of 150 μL and incubated at 25° C. Assays were incubated for 6 h, and stopped by placing on ice after the addition of an equal volume of MeOH. To characterize UGTs and determine enzyme parameters, Ni-purified UGT1 (UGT77B2) or UGT2 (UGT709G2) were assayed with variations in incubation times and substrate concentrations. UGT77B2 was tested for substrate specificity using 2 μg of protein, 50 μL of UDP-Rha$^P$ and 50 μM of the different substrates, listed in Supplemental Table S5, and incubated for 1 h. For relative turnover rates for myricetin and different UDP-sugars, 5 μg purified UGT1 (UGT77B2) was assayed with 50 μM myricetin and 1 mM UDP-Glc or UDP-Xyl or HPLC-purified UDP-Rha for 15, 30, 45, 60, 120, 180 or 210 min. To determine relative turnover rates for different flavonol acceptors, 1.25 μg purified UGT1 (UGT77B2) enzyme was incubated with 50 μM flavonol (myricetin, kaempferol or quercetin) and 1 mM UDP-Rha (HPLC-purified) for 15, 30, 45, 60, 120 and 210 min. UGT2 (UGT709G2) substrate specificity was tested by incubating 0.36 μg of purified protein with 1 mM UDP-Glc and 5 μM of different substrates (substrates are listed in Supplemental Table S5) for 2 h or 45 min for the different flavonol 3-O-glycoside substrates (MR, quercetin 3-O-glucoside, myricetin 3-O-glucoside). Sugar specificity was tested using 0.26 μg purified UGT709G2 protein, 5 μM MR and 1 mM UDP-Glc or UDP-Xyl or UDP-Rha (HPLC purified) and 15, 30, 45, 60, 120 and 210 min incubation time. MRG formation was characterized using 0.18 μg purified UGT2 (UGT709G2) protein, 1 mM UDP-Glc and different MR concentrations (1, 2, 3, 4, 5, 10 μM) and incubation times (15, 30, 45, 60, 90, 120, 150, 180, 240 min). Product quantification was done based on the UV (350-370 nm) signal of external standard curves of myricetin, quercetin or kaempferol. Enzyme concentrations and incubation times were chosen so that the reaction velocity was constant during the incubation time period.

Analysis, Identification and Characterization of BAHD-ATs

The refined BAHD-AT list was used to carry out a DE analysis between yC and oC and between other plant organs as described for UGTs. Haystack (http://haystack.mockler-lab.org/) was used to test for correlations in expression patterns between UGT1 (UGT77B2), UGT2 (UGT709G2) and BAHD-ATs across yC, oC, and other plant organs. A correlation cut-off, of R≥0.9 was used; in addition results were filtered to meet criteria of at least 10-fold greater expression in yC compared to oC.

Target BAHD-ATs were amplified, cloned, heterologously expressed and purified as described for UGTs. To test for BAHD-AT activity, initial enzyme assays were performed with 98 μL of the bacterial extract, 120 μM MRG and 60 μM caffeoyl-CoA in a Teflon-sealed, screw-capped 1-mL GC glass vial. Unless stated otherwise, assays were performed in assay buffer in a final volume of 100 μL and incubated at 25° C. Assays were incubated for 6 h, and stopped by placing on ice after the addition of an equal volume of MeOH. To characterize BAHD-ATs and determine enzyme parameters, Ni-purified CcAT1 or CcAT2 were used. CcAT1 and CcAT2 were tested for acyl acceptor specificity using 1 μg of protein, 150 μM of caffeoyl-CoA and 100 μM of the different substrates, listed in Supplemental Table S5, and incubated for 1 h. Acyl donor specificity for both enzymes was tested using 1 μg of protein, 100 μM MRG and 150 μM of the different acyl donors: caffeoyl-CoA, coumaroyl-CoA (TransMIT GmbH), feruloyl-CoA (TransMIT GmbH), acetyl-CoA (Sigma-Aldrich) and malonyl-CoA (Sigma-Aldrich) and incubated for 1 h. For relative turnover rates for MRG and different acyl donors, 0.8 μg purified CcAT1 or CcAT2 was assayed with 25 μM MRG and 37.5 μM acyl donor for 10 min. Product quantification was done using an external standard curves for MbA.

Transient Expression of UGT77B2, UGT709G2, CcAT1 and CcAT2 in *N. benthamiana*

For expression in *N. benthamiana*, the coding regions of UGT77B2, UGT709G2, CcAT1 and CcAT2 were cloned into the pCAMBiA2300U vector. After sequence verification, pCAMBiA vectors carrying UGT77B2, UGT709G2, CcAT1, CcAT2, the enhanced green fluorescence protein (eGFP) and the pBIN::p19 (Voinnet et al., 2003) were separately transferred into *Agrobacterium tumefaciens* strain C58pMP90. One mL of overnight cultures (220 rpm, 28° C.) were used to inoculate 10 mL LB-media containing 50 $\mu g \times mL^{-1}$ kanamycin, 25 $\mu g \times mL^{-1}$ rifampicin and 25 $\mu g \times mL^{-1}$ gentamicin for overnight growth. The following day the cultures were centrifuged (4000×g, 5 min) and cells were re-suspended in infiltration buffer (10 mM MES, pH 5.6, 10 mM $MgCl_2$, 100 μM acetosyringone) to a final OD600 of 0.5. After shaking for 3 h at RT, the following combinations of transformed *A. tumefaciens* were prepared for leaf infiltration using: (i) *A. tumefaciens* 35S::UGT77B2+*A. tumefaciens* pBIN:p19; (ii) *A. tumefaciens* 35S::UGT77B2+*A. tumefaciens* 35S::UGT709G2+*A. tumefaciens* pBIN:p19; (iii) *A. tumefaciens* 35S::UGT77B2+*A. tumefaciens* 35S::UGT709G2+*A. tumefaciens* 35S::CcAT1+*A. tumefaciens* pBIN:p19, (iv) *A. tumefaciens* 35S::UGT77B2+*A. tumefaciens* 35S::UGT709G2+*A. tumefaciens* 35S::CcAT2+*A. tumefaciens* pBIN:p19, (v) *A. tumefaciens* 35S::eGFP+*A. tumefaciens* pBIN:p19. Equal volumes of each line of transformed *A. tumefaciens* were used to prepare the mixtures. The leaves of four-week old *N. benthamiana* plants were infiltrated with *A. tumefaciens* solution using a 1-mL needle-free syringe to gently push the bacterial mixture into the abaxial surface. Infiltrated leaves were labeled with tape and harvested four days after infiltration. For substrate infiltration, leaf discs of 1 cm diameter were prepared from *A. tumefaciens*-infiltrated *N. benthamiana* leaves using a corkborer and placed in a 24 well cell culture plate containing 800 μL of tap water with 500 μM myricetin (added as 4 μL of a 100 mM myricetin solution in DMSO). Remaining leaf material was directly frozen in liquid nitrogen and stored at −80° C. until further analysis. After incubating leaf discs in a climate chamber (day, 26° C.; night, 22° C.; 16 h/8 h light/dark cycle) overnight, leaf discs were briefly flushed with water, dried and flash frozen in liquid nitrogen. Plant material was ground in liquid nitrogen into a fine powder, and 100 mg were extracted with 400 μL 50% (v/v) MeOH for 2 h at RT. The extract was analyzed using LC-MS.

Reverse Transcription and qRT-PCR cDNA syntheses were done with 650 ng total RNA using the dsDNase and Maxima First Strand cDNA Synthesis Kit (ThermoFisher Scientific) according to the manufacturer's instructions. For qRT-PCR the cDNA was diluted 1:5 with water. For the amplification of UGT and AT gene fragments of approximately 150 bp length, primer pairs were designed with a Tm≥60° C., a GC content of 45-60%, and a primer length of 20-25 nt (TABLE 1). Primer specificity was confirmed by agarose gel electrophoresis, melting curve analysis, standard curve analysis and by sequence verification of cloned PCR products. qRT-PCR reactions were performed in duplicate on a Bio-Rad CFX96™ instrument (Bio-Rad Laboratory, Hercules, CA, USA) in optical 96-well plates using SsoFast™ EvaGreen® Supermix (Bio-Rad) with the following PCR conditions: Initial incubation at 95° C. for 30 sec followed by 40 cycles of amplification (95° C. for 5 sec, 60° C. for 10 sec). Fluorescence measurement was performed during the annealing and the extension steps of each cycle. Data for the melting curves were recorded at the end of cycling from 55° C. to 95° C. qRT-PCR analyses were performed with three biological replicates for each of the 6 different time points of yC and oC collections (June $10^{th}$, June $27^{th}$, July $22^{nd}$, August $16^{th}$, September $12^{th}$, October $6^{th}$). Serin-incorperator (MEP) and zinc-finger protein (ZF) were used as reference genes (TABLE 1).

Statistical Analysis

To test for significant differences in MbA accumulation patterns (June 2016-February 2017) and UGT and AT gene expression in young and old corms at different time points a two-way analysis of variance (ANOVA) was performed followed by a Tukey-Test using SigmaPlot 11.0 for Windows (Systat Software Inc. 2008). Data for UGT1 (UGT77B2) and UGT2 (CcAT1/2) gene expression was transformed ^0.35 or ^0.25, respectively in order to meet statistical requirements. MbA levels in old corms from February 2016-February 2017 were additionally analyzed using a one-way ANOVA.

Accession Numbers

Transcriptome libraries from old and young corms are available in the NCBI/GenBank Sequence Read Archive (SRA) (SRP108844). UGT and BAHD-AT nucleotide sequences were deposited in GenBank with the accession numbers MG938542 (UGT77B2), MG938543 (UGT709G2), MH365462 (CcAT1) and MH365463 (CcAT2), and are incorporated herein by reference in their entireties.

Example 2

The plant metabolite montbretin A (MbA) and its simpler precursor mini-MbA are being developed as new drugs against Type-2 diabetes. The only known source for these complex acylated flavonol glycosides is the ornamental plant montbretia (*Crocosmia* x *crocosmiiflora*). MbA occurs in small amounts in below-ground storage organs, called corms. The long-term goal is to metabolically engineer *Nicothiana benthamiana* as a heterologous production system for mini-MbA and MbA. As described in EXAMPLE 1, above, montbretia UDP-dependent glycosyltransferases (UGTs), CcUGT1 and CcUGT2, catalyze the formation of myricetin 3-O-rhamnoside and myricetin 3-O-glucosyl rhamnoside, the first two pathway-specific intermediates in MbA biosynthesis. Expression of these UGTs in *N. benthamiana* resulted in small amounts of kaempferol glycosides, but not myricetin glycosides, suggesting myricetin is limiting. The inventors investigated montbretia genes and enzymes of flavonol biosynthesis to enhance myricetin formation in *N. benthamiana*. In this Example, the inventors' work to characterize two flavanone hydroxylases (F3H), a flavonol synthase (FLS), a flavonoid 3'-hydroxylase (F3'H) and a flavonoid 3'5'-hydroxylase (F3'5'H) is described herein and has also been published online as Irmisch, S. et al. (April 2019) Plant Physiology, DOI: 10.1104/pp. 19.00254, incorporated herein by reference in its entirety. Montbretia FLS converted dihydromyricetin into myricetin. Unexpectedly, montbretia F3'5'H clustered with F3'Hs in the CYP75B subfamily of cytochromes P450. Transient expression of combinations of montbretia flavonol biosynthesis genes and a montbretia MYB transcription factor in *N. benthamiana* resulted in availability of myricetin for MbA biosynthesis. Transient co-expression of montbretia flavonol biosynthesis genes combined with CcUGT1 and CcUGT2 in *N. benthamiana* resulted in 2 $mg \times g^{-1}$ fresh weight of the MbA pathway-specific compound myricetin 3-O-glucosyl rhamnoside. Additional expression of the montbretia acyltransferase CcAT1 led to detectable levels of mini-MbA in *N. benthamiana*.

Results

Transcripts for Flavonol Biosynthesis Genes are Abundant in Montbretia Young Corms The inventors searched for montbretia transcripts of myricetin biosynthesis in the published corm transcriptome, which covers young corms (yC) and old corms (oC) (EXAMPLE 1 and Irmisch S, et al, (2018) Plant Cell 30: 1864-1886, incorporated herein by reference in its entirety). A BLASTP analysis revealed three putative chalcone synthases, CcCHS1, CcCHS2 and CcCHS3, and four putative chalcone isomerases, CcCHI1, CcCHI2, CcCHI3, and CcCHI4. The inventors also identified two candidate flavanone 3-hydroxylases, CcF3H-1 and CcF3H-2, and a putative flavonol synthase, CcFLS. The inventors found two candidate F3'H-like transcripts, CcCYP1 and CcCYP2, but no transcripts that were immediately obvious to encode a candidate F3'5'H. Since MbA biosynthesis occurs predominantly during the development of yC, while biosynthesis is lacking or minmal in oC (EXAMPLE 1), the inventors compared transcript abundance of candidate myricetin biosynthesis genes between yC and oC using previously established differential expression analysis (EXAMPLE 1). CcCHI1 showed overall low expression and was excluded from further analysis. All other candidate genes showed higher transcript abundance in yC compared to oC.

CcF3H-1, CcF3H-2 and CcFLS Encode 20 GDs of Flavonol Biosynthesis

The full-length open reading frames (ORFs) of CcF3H-1, CcF3H-2 and CcFLS encode proteins of 372, 372 and 331 amino acids (aa), respectively. CcF3H-1 and CcF3H-2 shared 93% identity on the aa level. CcF3H-1, CcF3H-2 and CcFLS belong to the class of 2 OGDs and cluster with F3H or FLS, respectively, from other plants. Briefly, predicted amino acid sequences of montbretia enzymes were aligned with selected F3H and FLS from other plant species and a neighbor joining tree was constructed using MEGA6. To test for F3H and FLS activity, CcF3H-1, CcF3H-2 and CcFLS were heterologously expressed from cDNAs in *E. coli*. The three different Ni-purified proteins were tested with the two flavanone substrates naringenin and eriodictyol and the three dihydroflavonol substrates DHK, DHQ and DHM.). As controls, assays were performed with purified protein of *E. coli* transformed with empty vector. Products were detected using liquid chromatography-mass spectrometry (LC-MS) and identified based on mass and retention time compared to authentic standards. CcF3H-1 and CcF3H-2 showed the expected F3H activity, converting naringenin (m/z 271) into DHK (m/z 287) and eriodyctiol (m/z 287) into DHQ (m/z 301). CcFLS also showed some activity with naringenin and eriodyctiol, however, the abundance of DHK and DHQ formed by FLS was less than 3% of product formed by CcF3H-1 or CcF3H-2. In addition to DHQ, CcFLS produced two unidentified peaks with m/z 303 when assayed with eriodyctiol. In assays with the three dihydroflavonols, CcFLS, but not CcF3H-1 and CcF3H-2, showed flavonol synthase activity and converted DHK (m/z 287), DHQ (m/z 303) and DHM (m/z 319) into the respective flavonols kaempferol (m/z 285), quercetin (m/z 301) and myricetin (m/z 317). No activity was observed with any of the empty vector controls.

CcCYP1 Encodes a F3'H and CcCYP2 Encodes a F3'5'H

The ORFs of CcCYP1 and CcCYP2 encode proteins of 508 and 527 aa length, respectively, which share 60.5% aa identity. These two P450s fall into the CYP75B subfamily of the plant P450 family, which includes known F3'H of other species. Briefly, as above, predicted amino acid sequences of montbretia enzymes were aligned with selected F3'H and F3'5'H from other plant species and neighbor joining tree was constructed using MEGA6. To test CcCYP1 and CcCYP2 for functions in flavonoid 3'- or 5'-hydroxylations, the proteins were individually co-expressed with montbretia cytochrome P450 reductase (CcCPR1) in *Saccharomyces cerevisiae*, and microsomes were used for enzyme assays. Both CcCYP1 and CcCYP2 catalyzed 3-hydroxylations with naringenin (m/z 271), DHK (m/z 287) and kaempferol (m/z 285), leading to the formation of eriodyctiol (m/z 287, peak 1), DHQ (m/z 303, peak 3) and quercetin (m/z 301, peak 5), respectively.

In addition to the F3'H activity, CcCYP2 also showed 5'-hydroxylation activity, which identified this P450 as a F3'5'H. In assays with naringenin, CcCYP2 produced eriodyctiol (m/z 287, peak 1) and a second product with m/z 303 (peak 2), tentatively identified as PHF. CcCYP2 converted DHK (m/z 287) into DHQ (m/z 303, peak 3) and DHM (m/z 319, peak 4). Kaempferol (m/z 285) was converted into quercetin (m/z 301, peak 5), but in this case no further 5'-hydroxylation to myricetin (m/z 317) was observed. The inventors confirmed the 5'-hydroxylation activity of CcCYP2 in separate assays with the 3'4'-hydroxylated flavonoid substrates eriodyctiol (m/z 287), DHQ (m/z 203) and quercetin (m/z 301), which resulted in PHF (m/z 303, peak 2), DHM (m/z 319, peak 4) and myricetin (m/z 317, peak 9), respectively; although myricetin formation was only observed with high substrate concentration.

No 5'-hydroxylation activity was observed in any of the assays with CcCYP1, and no product formation was observed when microsomes prepared from yeast expressing the CcCPR1 together with the empty vector were used.

Figures 11A, 11B, 11C:
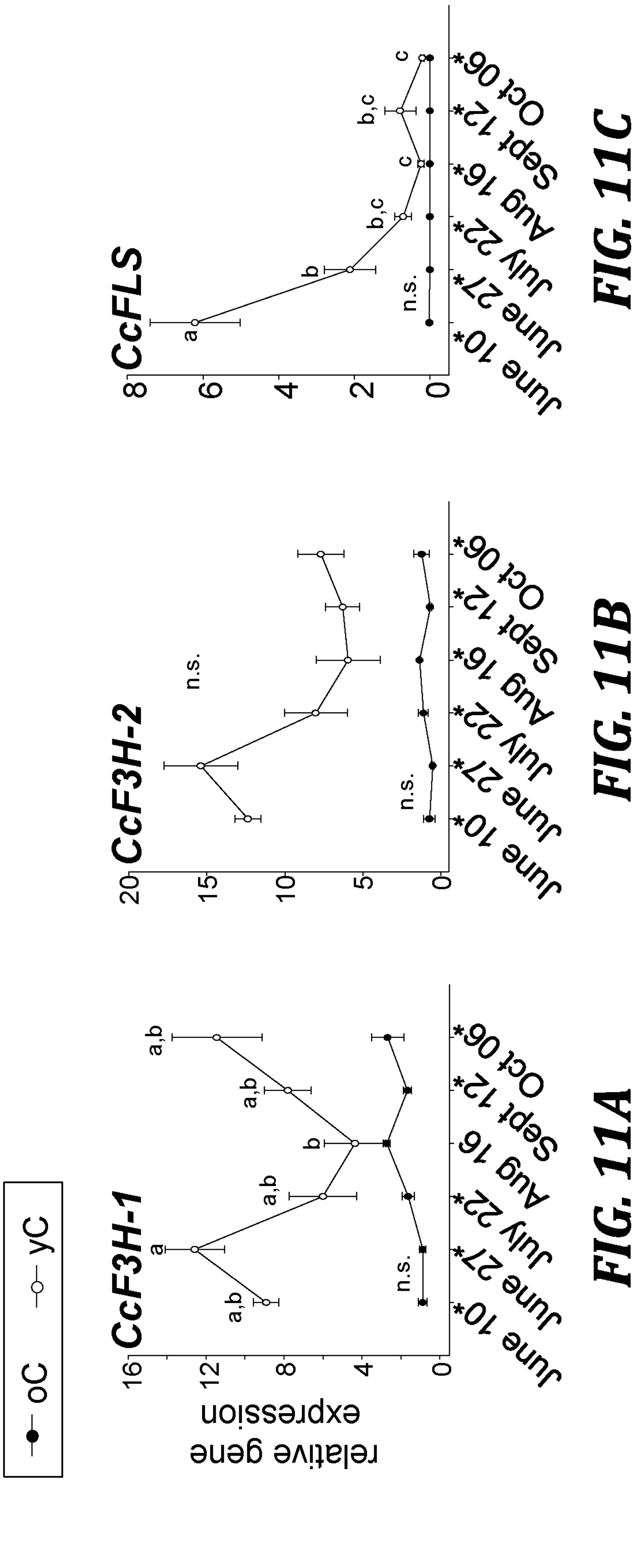
Figure 11D:
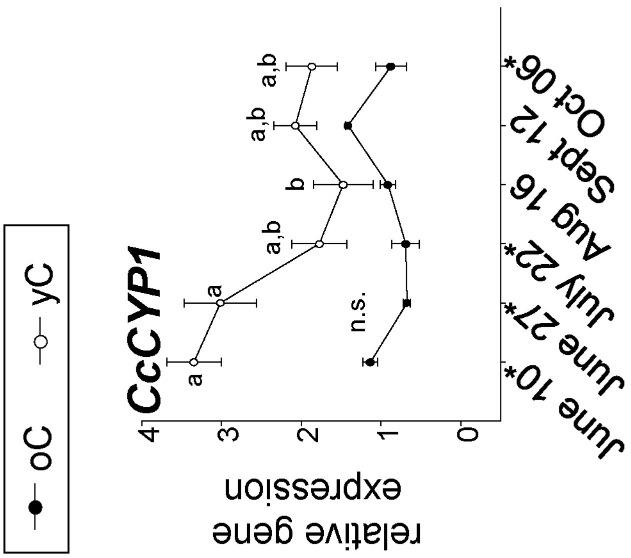
Figure 11E:
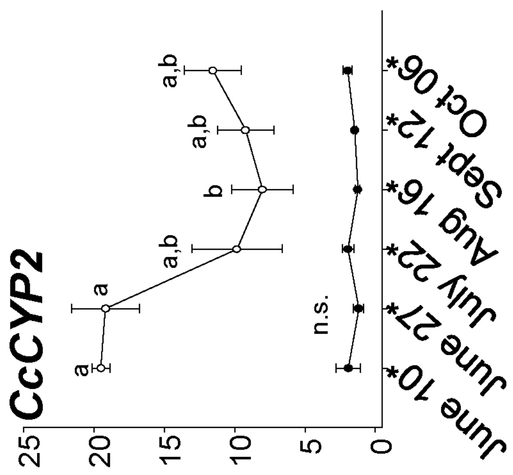
Figure 11F:
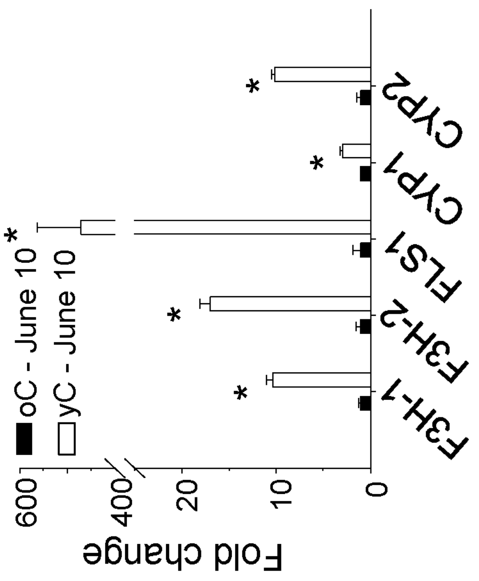

Transcript Expression Patterns of CcF3H-1, CcF3H-2, CcCYP1, CcCYP2, and CcFLS Support a Role in MbA Biosynthesis Following their functional characterization with in vitro assays, the inventors measured transcript abundance of CcF3H-1, CcF3H-2, CcCYP1, CcCYP2, and CcFLS over a time course of corm development in yC and oC from early summer (June $10^{th}$) to fall (October $6^{th}$) using quantitative real time PCR (qRT-PCR). All genes showed significantly higher transcript abundance in yC compared to oC for the majority of sampling time points (FIGS. 11A-11F). In general, transcript abundance was approximately 3- to 17-fold higher in yC compared to oC. CcFLS showed up to 470-fold higher transcript levels in yC compared to oC (FIG. 11F). Transcript abundance in yC was generally higher in June and dropped towards August. This pattern was particularly pronounced with CcFLS (FIGS. 11C and 11F). Transcript abundance did not change significantly over time in oC. The patterns of differential transcript expression of CcF3H-1, CcF3H-2, CcCYP1, CcCYP2, and CcFLS in yC and oC over the time course of the growing season matched the previously reported patterns of MbA accumulation and CcUGT and CcAT transcript expression (EXAMPLE 1), supporting a role of these genes in myricetin and MbA biosynthesis.

*N. benthamiana* Transiently Co-Expressing Montbretia Myricetin Biosynthetic Pathway Genes and CcUGT1 Produce Myricetin 3-O-Rhamnoside As described in EXAMPLE 1, the inventors that *N. benthamiana* leaves transiently expressing montbretia CcUGT1 produced small amounts of kaempferol 3-O-rhamnoside (KR) but not MR, suggesting that myricetin was limiting. Using transient co-expression of various combinations of montbretia myricetin biosynthetic pathway genes and CcUGT1, the inventors tested if the flavonol pathway could be engineered to provide myricetin for heterologous MR production in *N. benthamiana*. MR is the first pathway specific intermediate in MbA biosynthesis. The inventors produced a set of *Agrobacterium tumefaciens* strains that were transformed with individual plasmids carrying the promoter-gene constructs $35S_{pro}$:CcCHS2, $35S_{pro}$:CcCHI2, $35S_{pro}$:CcF3H-2, $35S_{pro}$:CcCYP2, $35S_{pro}$:CcFLS, or $35S_{pro}$:CcUGT1. For use as a negative control, *A. tumefaciens* was transformed with the enhanced green fluorescent protein (eGFP) construct $35S_{pro}$:eGFP. *A. tumefaciens* strains were used separately or in various different combinations to infiltrate *N. benthamiana* leaves (TABLE 2). Leaves that expressed eGFP, CcUGT1 or the four different gene combinations A-D were collected five days after infiltration, and MeOH/$H_2O$ extracts were analyzed by LC-MS/MS. The co-expression of CcUGT1 allowed us to perform targeted metabolite profiling for the flavonol rhamnosides KR (m/z 431), quercetin 3-O-rhamnoside (QR, m/z 447) and MR (m/z 463), which are not present in non-transformed *N. benthamiana* (EXAMPLE 1).

TABLE 2

Combinations of genes used for transient expression in *N. benthamiana*. Each combination is identified with a letter A-T. Each $35S_{pro}$:gene construct was separately transformed into *A. tumefaciens*. Different combinations were achieved by mixing different *A. tumefaciens* strains each carrying a different gene construct. The infiltration solution contained equal amounts of *A. tumefaciens* containing the listed and *A. tumefaciens* pBIN:p19 for enhancement of gene expression.

| Combination | Constructs |
|---|---|
| A | CcCHS-2 + CcCHI2 + CcUGT1 |
| B | CcFLS + CcF3H-2 + CcCYP2 + CcUGT1 |
| C | CcCHS2 + CcCHI2 + CcFLS + CcF3H-2 + CcCYP2 + CcUGT1 |
| D | CcCHS2 + CcCHI2 + CcFLS + CcF3H-2 + CcCYP2 |
| E | CcUGT1 + CcMYB1 |
| F | CcUGT1 + CcMYB2 |
| G | CcUGT1 + CcMYB3 |
| H | CcUGT1 + CcMYB4 |
| J | CcMYB4 + CcUGT1 + CcFLS |
| K | CcMYB4 + CcUGT1 + CcCYP2 |
| L | CcMYB4 + CcUGT1 + CcF3H-2 |
| M | CcMYB4 + CcUGT1 + CcFLS + CcCYP2 |
| N | CcMYB4 + CcUGT1 + CcFLS + CcF3H-2 |
| O | CcMYB4 + CcUGT1 + CcF3H-2 + CcCYP2 |
| P | CcMYB4 + CcUGT1 + CcFLS + CcF3H-2 + CcCYP2 |
| R | CcUGT1 + CcFLS + CcF3H-2 + CcCYP2 |
| S | CcMYB4 + CcFLS + CcCYP2 + CcUGT1 + CcUGT2 |
| T | CcMYB4 + CcFLS + CcCYP2 + CcUGT1 + CcUGT2 + CcAT1 |

Figure 12A:
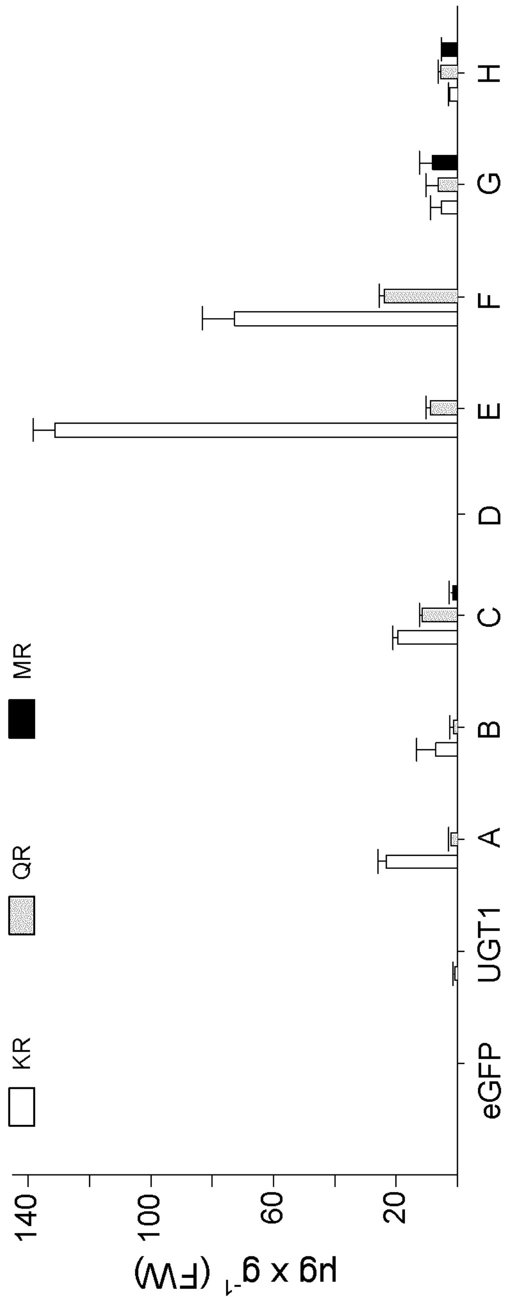
FIGS. 12A and 12B graphically illustrate flavonol rhamnoside accumulation in *N. benthamiana* transiently expressing different combinations of montbretia myricetin biosynthetic pathways genes, CcMYB genes, and CcUGT1. Tobacco leaves were infiltrated with different combinations (TABLE 2) of *A. tumefaciens* transformed with plasmids carrying the promoter-gene constructs $35S_{pro}$:CcUGT1, $35S_{pro}$:CcCHI, $35S_{pro}$:CcCHS, $35S_{pro}$:CcF3H2, $35S_{pro}$:CcFLS, $35S_{pro}$:CcCYP2, $35S_{pro}$:CcMYB1; $35S_{pro}$:CcMYB2; $35S_{pro}$:CcMYB3; $35S_{pro}$:CcMYB4 or the gene for the enhanced green fluorescent protein (eGFP). Leaves were collected at day five after infiltration. Metabolites were extracted with 50% MeOH, analyzed by LC-MS and identified based on their fragmentation patterns and an authentic standard for MR. Quantification was done using an external MbA standard curve. Means and standard errors of two or four biological replicates are shown. KR, kaempferol 3-O-rhamnoside (open bars); QR, quercetin 3-O-rhamnoside (grey bars); MR, myricetin 3-O-rhamnoside (solid). FW, fresh weight.
Figure 12B:
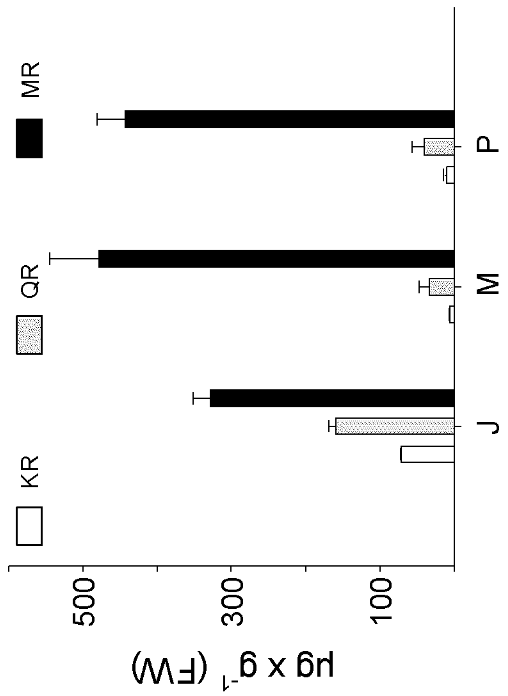

Small amounts of KR, but not QR or MR, were present when only CcUGT1 was expressed in *N. benthamiana* (FIGS. 12A and 12B), confirming earlier work (see EXAMPLE 1). Briefly, tobacco leaves were infiltrated with different combinations of *A. tumefaciens* transformed with plasmids carrying the promoter-gene constructs 35Spro:CcUGT1, 35Spro:CcCHI2, 35Spro:CcCHS2, 35Spro:CcF3H-2, 35Spro:CcFLS, 35Spro:CcCYP2 or the gene for the enhanced green fluorescent protein (eGFP). Combinations used for infiltration can be found in TABLE 2. Leaves were collected at day five after infiltration. Metabolites were extracted with 50% MeOH, analyzed by LC-MS and identified based on their fragmentation patterns and an authentic standard for MR Nine-fold higher levels of KR and small amounts of QR were produced when CcUGT1 was co-expressed with CcFLS, CcF3H-2, and CcCYP2 (Combination B) (FIGS. 12A and 12B, Supplemental Figure S4B). Co-expression of CcUGT1 with CcCHS2 and CcCHI2 (Combination A) resulted in 30-fold more KR compared to CcUGT1 expression alone and twice the level of QR compared to Combination B (FIGS. 12A and 12B). In Combination C, where CcUGT1 was co-expressed with CcCHS2, CcCHI2, CcFLS, CcF3H-2 and CcCYP2, levels of KR were 26-fold higher compared to CcUGT1 expression alone and levels of QR were 9-fold higher compared to Combination A (FIGS. 12A and 12B). Importantly, expression of gene Combination C also resulted in the formation of MR, albeit in small amounts of approximately 1 $\mu g\ g^{-1}$ FW (FIGS. 12A and 12B). Controls expressing eGFP or myricetin biosynthetic pathway genes without CcUGT1 (Combination D) did not yield detectable levels of flavonol rhamnoside production.

Montbretia CcMYB3 and CcMYB4 Enhance DHM Biosynthesis in *N. benthamiana*

The inventors used a BLASTP search with *Arabidopsis* MYB75 and differential expression analysis in yC and oC to screen the montbretia transcriptome for MYB transcription factors (MYB-TF) putatively involved in flavonoid biosynthesis. Four montbretia MYB-like TF, CcMYB1, CcMYB2, CcMYB3 and CcMYB4 had, respectively, 60-fold, 46-fold, 169-fold and 109-fold higher transcript abundance in yC compared to oC. Protein sequences were aligned using CLC and the ClustalW algorithm. Alignment with AtMYB75 showed that all four CcMYBs contained the conserved R2R3 domain. The most closely related *Arabidopsis* gene is AtMYB123, involved in proanthocyanidin biosynthesis (https://bioinformatics.psb.ugent.be/plaza/). To test if the montbretia MYB-TF could be used to enhance flavonol biosynthesis in *N. benthamiana*, the inventors transformed *A. tumefaciens* with plasmids carrying the promoter-gene constructs $35S_{pro}$:CcMYB1, $35S_{pro}$:CcMYB2, $35S_{pro}$:CcMYB3 or $35S_{pro}$:CcMYB4, which were used for *N. benthamiana* leave infiltration assays. Co-expression assays with CcUGT1 (combinations E-H, TABLE 2) allowed for flavonol rhamnoside screening without interference from endogenous *N. benthamiana* metabolites. The co-expression of CcUGT1 with CcMYB1 (Combination E) or CcMYB2 (Combination F) resulted in, respectively, 7-fold and 4-fold higher levels of KR and 0.8-fold and 2-fold higher levels QR compared to expression of the gene Combination C, (FIGS. 12A and 12B). Expression of CcUGT1 with CcMYB1 (E) or CcMYP2 (F) did not result in detectable levels of MR. However, low levels of MR were observed when CcUGT1 was co-expressed with CcMYB3 (Combination G) or CcMYB4 (Combination H), while levels of KR were over 14-fold reduced compared to the results obtained with CcMYB1 (Combination E) and CcMYB2 (Combinations F).

The inventors also tested if *N. benthamiana* plants that transiently expressed CcMYB-TFs in Combinations E-H had enhanced levels of flavonol precursors that accumulated as glucosides. As indicated above, tobacco leaves were infiltrated with *A. tumefaciens* transformed with plasmids carrying the promoter-gene constructs 35Spro:CcUGT1, 35Spro:CcMYB1, 35Spro:CcMYB2, 35Spro:CcMYB3 or 35Spro:CcMYB4. Combinations used for infiltration can be found in TABLE 2. Leaves were collected at day five after infiltration. Metabolites were extracted with 50% MeOH, analyzed by LC-MS and identified based on their fragmentation patterns. Those precursors would not be accessible for CcUGT1 and would therefore have been missed in the screen for flavonol rhamnosides. The inventors found pronounced m/z 481 peaks in extracts of plants expressing CcMYB3 or CcMYB4, and to a lesser extent in plants expressing CcMYB2 but not in plants expressing CcMYB1. The fragmentation pattern of m/z 481 peaks into m/z 319 (DHM minus glucose) led to the tentative identification of m/z 481 as DHM-glucosides possessing a glucose moiety at different positions of the DHM flavonoid core. DHM is a direct precursor for the formation of myricetin (FIG. 10), which makes the TFs CcMYB3 and CcMYB4 relevant for engineering of myricetin biosynthesis in combination with flavonol biosynthetic genes.

Extracts of plants expressing any of the four CcMYBs also revealed several m/z 449 peaks. The observed fragmentation patterns of m/z 449 suggested glucosides of DHK (m/z 287) and/or eriodictyol (m/z 287), which are respective precursors for kaempferol and quercetin. Plants expressing CcMYB2, CcMYB3 or CcMYB4 produced additional m/z 465 peaks tentatively identified as glucosides of DHQ (m/z 303) and/or PHF (m/z 303), precursor of quercetin and myricetin, respectively.

Transient Co-Expression of CcMYB4 with CcFLS, CcCYP2 and CcUGT1 Boosts the Formation of Myricetin 3-O-Rhamnosides in *N. benthamiana*

The inventors tested expression of CcMYB4 in combination with different myricetin biosynthesis genes (TABLE 2) and CcUGT1 for enhanced MR formation in *N. benthamiana*. As described above, extracts of plants expressing Combination H showed small amounts of m/z 463, m/z 431 and m/z 447, identified as MR and tentatively identified as KR and QR, respectively (FIGS. 12A and 12B). Small amounts of KR, QR and MR were also detected for Combination L, while Combination K only showed MR. Compared to the expression of CcMYB4+CcUGT1 (Combination H), flavonol rhamnoside levels were increased over 40-fold by the additional expression of CcFLS (Combination J) (FIGS. 12A and 12B). In addition to KR, QR and MR, quercetin 3-O-glucoside (QG) was detected with Combination J. Finally, the further addition of CcCYP2 in Combination M led to the dominant formation of the target metabolite MR, and major reduction in the formation of QR, KR and QG (FIGS. 12A and 12B). MR levels in extracts of plants expressing Combination M were about 100-fold higher compared to those expressing Combination H. Additional co-expression of CcF3H-2 (Combination P) did not seem to further affect flavonol rhamnoside levels compared to Combination M (FIGS. 12A and 12B). Samples showing increased MR formation also showed a depletion in DHM-glucosides (m/z 481).

Engineered *N. benthamiana* Leaves Produce Intermediates in MbA Biosynthesis

*N. benthamiana* plants expressing the four montbretia cDNAs CcMYB4, CcFLS, CcCYP2 and CcUGT1 (Combination M) had MR levels of 0.48±0.07 $mg \times g^{-1}$ fresh weight (FW) (FIGS. 12A and 12B). MR is the first pathway-specific intermediate in MbA biosynthesis. In addition to MR, the UV spectrum at 350-370 nm of extracts of Combination M plants showed peaks that were not present in control plants, expressing CcUGT1 alone or together with CcMYB4. To investigate the origin of those peaks, a fragmentation pattern analysis of their main masses was performed. All peaks showed the loss of one or multiple 162 (presumably glucose) and/or 146 (presumably rhamnose) units and fragmented into m/z 316/317 (myricetin), which tentatively identified them as myricetin glycosides, and suggested off-target conversion of myricetin or MR by endogenous *N. benthamiana* glycosyltransferase activities.

The inventors continued to build upon the Combination M metabolic engineering of *N. benthamiana* with the additional expression of the second CcUGT gene of MbA biosynthesis in Combination S (CcMYB4+CcFLS+CcCYP2+CcUGT1+CcUGT2). Combination S resulted in the formation of 1.89±0.23 $mg \times g^{-1}$ FW of myricetin 3-O-glucosyl 1,2-rhamnoside (MRG). The 4-fold increase in product yield of MRG compared to MR production in Combination M indicated that CcUGT2 enhances overall pathway flux into MbA biosynthesis. The UV 350-370 nm spectrum of extracts of Combination S leaves showed MRG as a major peak and additional peaks likely presenting myricetin glycosides as indicated by their fragmentation patterns.

Next the inventors added the third MbA pathway-specific gene, CcAT1, in Combination T (CcMYB4+CcFLS+CcCYP2+CcUGT77B2+CcUGT709G2+CcAT1). Briefly, tobacco leaves were infiltrated with *A. tumefaciens* transformed with plasmids carrying the promoter-gene constructs 35Spro:CcUGT1, 35Spro:CcUGT2, 35Spro:CcAT1, 35Spro:CcMYB4, 35Spro:CcFLS or 35Spro:CcCYP2. Combinations used for infiltration can be found in TABLE 2. Leaves were collected at day five after infiltration. Metabolites were extracted with 50% MeOH, analyzed by LC-MS and identified based on their fragmentation patterns or the authentic standard for mini-MbA The inventors showed previously that CcAT1 uses caffeoyl-CoA to catalyze the formation of mini-MbA in montbretia, but when expressed in *N. benthamiana*, CcAT1 catalyzed the addition of a coumaroyl moiety most likely due to substrate availability (Irmisch et al., 2018). Expression of Combination T in *N. benthamiana* led to the formation of 0.62±0.17 $mg \times g^{-1}$ FW of a product with m/z 771, tentatively identified as myricetin 3-O-(6'-O-coumaroyl)-glucosyl 1,2-rhamnoside (MRG-Cou or mini-MbB). In addition to MRG-Cou, the UV spectrum at 350-370 nm showed a few other myricetin based peak. Compounds with m/z 949 and m/z 933 were tentatively identified as myricetin 3-O-(6'-O-coumaroyl)-glucosyl glucoside O-glucoside (MGG-Cou+Glc) and myricetin 3-O-(6'-O-coumaroyl)-glucosyl rhamnoside O-glucoside (MRG-Cou+Glc), respectively. Screening for m/z 787, which is diagnostic of mini-MbA (MRG-Caff), identified a product in plants expressing Combination T that matched the retention time and fragmentation pattern of mini-MbA. Mini-MbA co-eluted with another m/z 787 compound tentatively identified as myricetin 3-O-(6'-O-coumaroyl)-glucosyl glucoside (MGG-Cou). Mini-MbA (MRG-Caff) was about 15-fold less abundant compared to Mini-MbB (MRG-Cou).

Discussion

Genes and Enzyme for Myricetin Biosynthesis in Montbretia

Flavonols are thought to be the most ancient group of flavonoids (Pollastri and Tattini, 2011). The biosynthesis of kaempferol and quercetin, which occurs in many plant species including *A. thaliana* (Lillo et al., 2008), is well characterized. Quercetin appears to be nearly ubiquitous in vascular plants, and genes for its biosynthesis are highly conserved (Pollastri and Tattini, 2011). In contrast, myricetin is less common and its biosynthesis is not well studied. For the purpose of engineering the myricetin derived biosynthesis of MbA in *N. benthamiana*, the inventors explored the montbretia corm transcriptome for a complete set of genes for myricetin biosynthesis (FIG. 10). The CcCHS and CcCHI genes represent the entry steps, and CcF3H-1, CcF3H-2, CcFLS, CcCYP1 and CcCYP2 cover the core metabolic grid of montbretia flavonoid biosynthesis. CcF3H-1, CcF3H-2 and CcFLS belong to the 2 OGD gene family; CcCYP1 and CcCYP2 are members of the P450 gene family. Based on their differential spatial and temporal transcript profiles in developing yC relative to oC, the montbretia flavonol pathway genes CcF3H-1, CcF3H-2, CcFLS, CcCYP1 and CcCYP2 are likely to be involved in the formation of myricetin leading to MbA in yC. Functions of these five genes are supported by the results from assays with recombinant enzymes and transient expression in *N. benthamiana* (FIG. 10). Their expression in *N. benthamiana* led to the enhanced availability of myricetin for MbA biosynthesis.

The hydroxylation of the 3'-hydroxy group on the B-ring of flavonoids is typically catalyzed by P450s (F'3H) of the CYP75B subfamily, while members of the CYP75A subfamily catalyze 3'5'-hydroxylations (F3'5'H) (Seitz et al., 2006). In contrast to the 3'4'-hydroxylated flavonoids, 3'4'5'-hydroxylated flavonoids are not ubiquitous in plants, suggesting that genes encoding F3'5'H may have been lost in several major lineages in plant evolution (Seitz et al., 2006). For example, *A. thaliana* has one gene for F3'H (CYP75B1) but no obvious F3'5'H (Saito et al., 2013). CcCYP1 and CcCYP2 both fall into the CYP75B clade, and the inventors would have priori expected both of these P450s to be F3'Hs. Functional characterization confirmed CcCYP1 as F3'H. Unexpectedly, CcCYP2 had F3'5'H activity, which affords the 3'4'5'-hydroxylation pattern of myricetin. Most of the currently known F3'5'H appear to have evolved by gene duplication of an ancestral F3'H, prior to the separation of gymnosperms and angiosperms, which led to the two functionally distinct F3'5'H/CYP75A and F3'H/CYP75B clades. However, in some members of the Asteraceae (e.g., *Callistephus chinensis* and *Pericallis cruenta*), which lack CYP75A genes, F3'5'H appear to have evolved later within the CYP75B subfamily. Apparently, such secondary evolution of F3'5'H functionality within the CYP75B also occurred independently in montbretia, which belongs to the Iridaceae, which is distant from the Asteraceae. CcCYP2 was active with naringenin, eriodictyol, DHK, DHQ and quercetin, similar to the broad substrate spectrum shown for F3'5'H from *Gentiana triflora* and *Petunia hybrida*, which is characteristic of flavonoid biosynthesis as a metabolic grid, or biosynthetic system, rather than a linear pathway.

In the flavonoid biosynthetic system, the dihydroflavonols are at the interface of flavonols and anthocyanidins. Flavonols are formed by FLS, while formation of anthocyanidins requires dihydroflavonol reductase (DFR). Substrate specificity of FLS and DFR determine the specific profiles of flavonols and anthocyanidins, respectively, of a given plant species. For example, in tomato and *petunia* (*Petunia hybrida*) DFR is specific for DHM leading to delphinidin-derived anthocyanins. Previously characterized FLS use DHK or DHQ as preferred substrates. FLS in onion prefers DHQ over DHK leading to quercetin glycosides as dominant flavonol glycosides. In grapevine (*Vitis vinifera*), FLS specificity for DHQ explains quercetin as the major flavonol. Transient expression of CcFLS in *N. benthamiana* led to the enhanced formation of kaempferol, quercetin and myricetin, suggesting that CcFLS is active with DHK, DHQ and DHM. The inventors are aware of only one other study that tested FLS acting upon DHM, and which reported that FLS from rose (*Rosa hybrida*) converted DHM into myricetin. However, rose FLS was ten-fold less efficient with DHM compared to DHQ, and since rose does not have F3'5'H activity, formation of DHM and myricetin may not occur in planta. To the best of our knowledge, the present study in montbretia is the first to describe a system of myricetin biosynthesis. In montbretia myricetin serves as the core flavonol building block for the complex MbA biosynthesis.

On the transcript level, the montbretia myricetin biosynthesis pathway genes CcF3H-1, CcF3H-2, CcFLS, CcCYP1 and CcCYP2 showed higher transcript abundance in developing yC compared to oC, matching the profile of MbA biosynthesis and accumulation (EXAMPLE 1). Of the myricetin and known MbA biosynthesis genes (EXAMPLE 1) CcFLS showed the most extreme differential transcript expression between yC and oC early in the growing season.

Engineering Myricetin Biosynthesis and Effects of CcMYPs in *N. benthamiana*

As described above in EXAMPLE 1, the inventors have shown that myricetin is limiting for the use of *N. bentmamiana* as a synthetic biology host for MbA production. Expression of the first two MbA pathway specific genes, CcUGT1 and CcUGT2, in *N. benthamiana* resulted in the formation of small amounts of KRG, but not MRG (EXAMPLE 1). In this example, the inventors showed that co-expression of three montbretia genes, CcMYB4, CcFLS, and CcCYP2, facilitated availability of myricetin in *N. benthamiana* as a substrate for CcUGT1.

MYB-TF are known to effect flavonoid biosynthesis in several plant species. Expression of different montbretia MYB-TF in *N. benthamiana* resulted in the formation of different flavonols or flavonol precursors. CcMYB1 mainly enhanced 4'-hydroxy flavonoid biosynthesis, and CcMYB2 enhanced 3'- and 4'-hydroxy flavonoid biosynthesis. In contrast, CcMYB3 and CcMYB4 led to higher levels of 3'4'5'-hydroxy flavonoid. The accumulation of the 3'4'5'-hydroxylated dihydroflavonol DHM in *N. benthamiana* expressing CcMYB3 or CcMYB4 made these two MYB-TF particularly interesting for improving myricetin formation. Endogenous *N. benthamiana* FLS appeared to be inefficient at converting DHM to myricetin, as is also known for other plant species. Additional co-expression of CcFLS enabled the efficient conversion of DHM into myricetin, and co-expression of CcCYP2 also helped to increase flux into the 3'4'5'-hydroxylated myricetin.

The four montbretia MYB-TF enhanced 3'OH-flavonoid biosynthesis, but only CcMYB3 and CcMYB4 appeared to enhance the F3'5'H step in *N. benthamiana*. In *G. triflora*, GtMYB3 interacts with GtbHLH1 to activate expression of F3'5'H. In general, many R2R3-MYB-TF rely on interaction with a bHLH protein to regulate flavonoid biosynthesis. For example, co-expression of the corn (*Zea mays*) TF C1 and the bHLH protein LC in tomato increased kaempferol levels while plants expressing either P1 or C1 did not. *Arabidopsis* MYB11, MYB12, MYB111 and maize P1 do not require a bHLH protein. CcMYBs have conserved amino acids for bHLH interaction, thus it is possible that they interact with an endogenous *N. benthamiana* factor.

Engineering of MR, MRG and mini-MbA biosynthesis in *N. benthamiana*

Transient expression in *N. benthamiana* has been developed as a useful system for testing gene functions and reconstructing the biosynthesis of complex metabolic pathways. For example, Lau W. and Sattely E. S. (2015). Science 349: 1224-1228, incorporated herein by reference in its entirety, achieved the biosynthesis of an etoposide aglycone, the precursor for the chemotherapeutic etoposide, by transient expression of ten genes from mayapple (*Podophyllum hexandrum*) in *N. benthamiana* (Id). In case of MbA, harvesting leaves of engineered *N. benthamiana* will have practical and economic advantages over harvesting of montbretia corms, which are the below-ground storage organs and required for vegetative reproduction. *N. benthamiana* leaves are easily accessible; they produce larger volume of faster growing biomass per plant than montbretia corms, and MbA biosynthesis will not be limited to a short developmental period as is the case with the annual corm growth cycle in montbretia.

Co-expression of CcMYB4, CcFLS and CcCYP2 with CcUGT1 or with both CcUGT1 and CcUGT2 led to the formation of the MbA pathway-specific intermediates MR and MRG, respectively. Levels of MRG produced in *N. benthamiana* are comparable to the level of MbA found in montbretia corms. Additional expression of CcAT1 resulted in the formation of small amounts of mini-MbA in *N. benthamiana*. Mini-MbA is the first intermediate in the MbA pathway that can be used as a potent (Ki=90 nM) HPA inhibitor. Although three additional UGT steps are required to complete MbA biosynthesis, which remain to be discovered, the present results are promising for our goal to develop *N. benthamiana* as a production system for the anti-diabetic compound MbA. However, in addition to MR and MRG, the inventors also observed other myricetin derived glycosides, likely formed by endogenous *N. benthamiana* UGTs. Such off-target metabolites may affect MbA yields and purification. The inventors noticed that co-expression CcMYB4, CcFLS and CcCYP2 with both CcUGT1 and CcUGT2 increased target product yield four-fold, compared to co-expression of CcMYB4, CcFLS and CcCYP2 with only CcUGT1. This result suggests that additional MbA pathway genes may drive biosynthesis further towards target—as opposed to off-target compounds. For reference, in the production of the anti-cancer glucoraphanin in *N. benthamiana* using 13 genes from *Arabidopsis*, the expression of two additional *Arabidopsis* genes resulted in decreased levels of off-target products and an increase in product yield.

Beyond engineering of myricetin biosynthesis as the core for MbA in *N. benthamiana* as described here, additional work is required to enhance the availability of caffeoyl-CoA as the substrate for the CcAT reaction to increase yield towards mini-MbA instead of mini-MbB. CcAT uses caffeoyl-CoA to produce mini-MbA, while it produces mini-MbB with coumaroyl-CoA. Internal π-stacking between myricetin and the caffeoyl moiety of MbA is essential for HPA inhibition. In a crystal structure of the MbA-HPA complex HPA catalytic side chains interact directly with the caffeoyl hydroxyl groups. The caffeoyl meta-hydroxyl group of MbA accounts for thousand-fold more effective HPA inhibition compared to MbB and MbC, analogs of MbA in which the meta-hydroxyl is replaced by a hydrogen or a methoxyl, respectively.

Conclusion

By exploring montbretia myricetin biosynthesis genes and MYB-TFs, the inventors generated an essential combination of genes to engineer myricetin biosynthesis in *N. benthamiana* plants. Relevant amounts of the MbA precursor MRG were produced in *N. benthamiana* when montbretia myricetin biosynthesis genes were transiently co-expressed with CcUGT1 and CcUGT2. Additional co-expression of CcAT1 led to the formation of mini-MbA, an antidiabetic compound and precursor of MbA. This work confirms that plants such as *N. benthamiana* can be engineered for heterologous production of synthetic biology of the anti-diabetic compound MbA.

Materials and Methods

Plant Material, Sampling, RNA Extraction and cDNA Synthesis

Montbretia (*Crocosmia* x *crocosmiiflora*; variety Emily McKenzie) plants were obtained and maintained as previously described (EXAMPLE 1 and Irmisch S, et al, (2018). Plant Cell 30: 1864-1886, incorporated herein by reference in its entirety). Old corms and newly developing corms (young corms) were harvested at six different time points in 2017 as previously described (EXAMPLE 1). RNA isolation and cDNA biosynthesis were performed as previously described (Kolosova N, et al. (2004). BioTechniques 36: 821-824; Irmisch S, et al, (2018). Plant Cell 30: 1864-1886, each of which is incorporated herein by reference in its entirety).

Identification and Isolation of Target Genes

The previously published montbretia corm transcriptome assembly (Irmisch et al., 2018) was used to identify candidate genes for myricetin biosynthesis, including CHS, CHI, F3H, FLS, F3'H and F3'5'H. A BLASTP search against the montbretia translated protein database was conducted. Results were filtered using a reciprocal BLASTP search against the non-redundant protein database of NCBI. Selected montbretia sequences were used for a reciprocal BLASTP analysis to obtain a full set of target proteins. Phylogenetic analysis was used to support sequence annotations. Closely related sequences were clustered at a cut-off of 98% amino acid identity, using CD-HIT (version 4.6.1) to collapse possible allelic variants (Fu L, et al. (2012). Bioinformatics 28: 3150-3152, incorporated herein by reference in its entirety). In addition, short sequences (≤200 amino acids) were removed and sequences were manually reviewed to remove likely chimeric or misassembled genes. For MYB-TFs, *Arabidopsis* MYB75 was used in a BLASTP search against the montbretia translated protein database. Candidates were selected with ≥60% aa identity to AtMYB75, at least 8-fold higher transcript abundance in young compared to old corms, and a minimal length of 220 aa. CcMYB-TFs, CcF3H, CcFLS, CcCYP1 and CcCYP2 were amplified from cDNA attained from young corm material (Jun. 10, 2017) and cloned into the pJET1.2/blunt vector (ThermoFisher Scientific) for sequencing (TABLE 3). A cytochrome P450 reductase (CcCPR1) with 70% identity to AtCPR2 (X66017) was amplified.

TABLE 3

Oligonucleotides used herein.

| Primer name | Sequence | SEQ ID NO: |
|---|---|---|
| qRT-F3H-1-fwd | GGTTGATGCCGGGGTGATTGCT | 65 |
| qRT-F3H-1-rev | TCCCTGAAGGTGACTGGAGACG | 66 |
| qRT-F3H-2-fwd | TGTCGATGCCGGGCTGATTTCC | 67 |
| qRT-F3H-2-rev | GCCCTGGAGGTGGCTGGAGACA | 68 |
| qRT-CYP-1-fwd | GTTCGACAAGGTGAAGTAGCATG | 69 |
| qRT-CYP-1-rev | CGCTAGTTGTGCATCTTCGTCG | 70 |
| qRT-CYP-2-fwd | ATCGCAGAATGCCGGTCGTC | 71 |
| qRT-CYP-2-rev | CTCGACGATGTGTCGGTACC | 72 |
| qRT-FLS-fwd | GGAGTCCAGGATTAACTACAACT | 73 |

TABLE 3-continued

| Oligonucleotides used herein. | | |
|---|---|---|
| Primer name | Sequence | SEQ ID NO: |
| qRT-FLS-rev | CTTGAGCAGCAGTTCGATTGC | 74 |
| MEP1-fwd | GTCGTCGGCTTCTTCGAGATG | 75 |
| MEP1-rev | CACATAGCAAACTAGGGACACAAC | 76 |
| ZF1-fwd | GTCCGTCTCGAATCTGGTGAG | 77 |
| ZF1-rev | GAGCAACACAATTCTTAGGCGTG | 78 |
| F3H-1-fwd | ATGGCGCCGGGTGCAACTGCGA | 79 |
| F3H-1-rev | TTAAGCCAAGATTTCACTGAGGCCT | 80 |
| F3H-2-fwd | ATGGCGCCGGTTGCGACTGCA | 81 |
| F3H-2-rev | TCAAGCAAGGATTTCACTCAGACCT | 82 |
| FLS-fwd | ATGGAGGTGGAGAGAGTTCAAGC | 83 |
| FLS-rev | TCACTGGGGAAGCTTGTTAAGTTTG | 84 |
| CYP1-fwd | ATGCTTACCTTCTTCTTCCTCTGG | 85 |
| CYP1-rev | TTAATAAGCCTTATGCGATAGCCG | 86 |
| CYP2-fwd | ATGACAATGACTTCCCTTGATATTATCC | 87 |
| CYP2-rev | TCATTTCATCTTGGGCGAATAAGCC | 88 |
| CPR-fwd | ATGCAATCGAGCACGATGAAGCTC | 89 |
| CPR-rev | TTACCACACATCACGGAGATATC | 90 |

Sequence Analysis and Phylogenetic Tree Reconstruction

An amino acid alignment of CcCYP1 and CcCYP2 and other published CYP75As and CYP75Bs was constructed using the MUSCLE algorithm (gap open, −2.9; gap extend, 0; hydrophobicity multiplier, 1.5; clustering method, upgmb) implemented in MEGA6 (Tamura K, et al. (2011). Mol Biol Evol 28: 2731-2739, incorporated herein by reference in its entirety). Based on this alignment a phylogenetic tree was estimated using the neighbor-joining algorithm (Poisson model) in MEGA6. A bootstrap resampling analysis with 1000 replicates was performed to evaluate the tree topology. Following the same procedure, a phylogenetic tree of CcFLS, CcF3H-1, CcF3H-2 and other published FLS and F3H enzymes was constructed. An alignment of CcMYB1-4 with published MYB-TF was constructed using CLC and the ClustalW algorithm.

Generation of Transcript Abundance Heatmap

Transcript expression data in counts per million (CPM) for manually curated genes were extracted from the transcriptome assembly (EXAMPLE 1 and Irmisch S, et al, (2018). Plant Cell 30: 1864-1886, incorporated herein by reference in its entirety). The heatmap was generated with the R package heatmaply.

Heterologous Expression of F3H Enzymes in *E. coli*

The complete open reading frames of CcF3H-1 and CcF3H-2 were cloned as BsaI fragments into the pASK-IBA37 vector (IBA-GmbH, Gottingen, Germany). The *E. coli* TOP10 strain (Invitrogen) was used for heterologous protein expression. Cultures were grown at 21° C., induced at an OD600=0.5 with 200 μg $L^{-1}$ anhydrotetracycline (Sigma-Aldrich, Germany) and subsequently placed at 18° C. and grown for another 20 h. Cells were collected by centrifugation and disrupted by five freeze and thaw cycles in chilled extraction buffer (50 mM Tris-HCl, pH 7.5, with 10 mM $MgCl_2$, 5 mM dithiothreitol, 2% (v/v) glycerol, 150 mM $NaCl_2$, 20 mM imidazole, 1× Pierce™ protease inhibitor (EDTA-free, ThermoFisher Scientific), 25U Benzonase Nuclease (Merck, Germany), and 0.2 mg/mL lysozyme). Cell fragments were removed by centrifugation at 14,000×g and the lysate was directly loaded onto a Ni-NTA agarose column (Qiagen, Hilden, Germany). Protein was eluted with elution buffer (10 mM Tris-HCl, pH=7.5, 500 mM Imidazol, 1 mM dithiothreitol, 10% (v/v) glycerol) and desalted into assay buffer (10 mM Tris-HCl, pH=7.5, with 1 mM dithiothreitol, 10% (v/v) glycerol) through an Illustra NAP-5 Column (GE Healthcare). Enzyme concentrations were determined using UV absorption at 280 nm.

Heterologous Expression of P450 Enzymes in *S. cerevisiae*

The complete open reading frames of the putative montbretia P450 enzymes CcCYP1 and CcCYP2 were cloned into the pESC-Leu2d vector and the open reading frame of montbretia CPR1 was cloned into the pESC-His vector following the User Cloning method (Ro D K, et al. (2008). BMC Biotechnol 8: 83, incorporated herein by reference in its entirety). For expression, the resulting P450 constructs were each co-transferred with the CPR1 into the *S. cerevisiae* strain BY4741 (GE Life Sciences, http://www.gelifesciences.com/). For gene expression, a single yeast colony was used to inoculate a starting culture in 30 mL selective dropout media, which was grown overnight at 28° C. and 180 rpm. One OD of this culture (approx. $2\times10^7$ cells $mL^{-1}$) was used to inoculate 100 mL YPDE medium (1% yeast extract (w/v), 2% bacto-peptone (w/V), 5% ethanol (v/v), 2% dextrose (w/v)) which was grown for 32-35 h, induced by transferring the cells into YPG medium (1% yeast extract (w/v), 2% bacto-peptone (w/v), and 2% Gal (w/v)) and cultures were grown for another 15-18 h at 28° C. Cells were harvested and yeast microsomes were isolated according to the procedures described by Pompon D, et al. (1996) Method Enzymol 272: 51-64 and Urban P, et al. (1994) Eur J Biochem 222: 843-850, each of which is incorporated herein by reference in its entirety, with minor modifications. Briefly, the cultures were centrifuged (7500×g, 10 min, 4° C.), the supernatant was decanted, the pellet was resuspended in 30 mL TEK buffer (50 mM Tris-HCl pH 7.5, 1 mM EDTA, 100 mM KCl) and then centrifuged again. The cell pellet was resuspended in 2 mL of TES buffer (50 mM Tris-HCl pH 7.5, 1 mM EDTA, 600 mM sorbitol, 10 g $L^{-1}$ bovine serum fraction V protein and 1.5 mM β-mercaptoethanol) and transferred to a 50 mL conical tube. Glass beads (acid-washed glass beads 425-600 μm, Sigma) were added to fill the complete volume of the cell suspension. Yeast cell walls were disrupted by 5 cycles of 1 min shaking by hand and subsequent chilling on ice for 1 min. The crude extract was recovered by washing the glass beads 4 times with 5 mL TES. The combined washing fractions were centrifuged (7500×g, 10 min, 4° C.), and the supernatant was transferred and centrifuged again (100,000×g, 60 min, 4° C.). The resulting microsomal protein fraction was homogenized in 2 mL TEG buffer (50 mM Tris-HCl, 1 mM EDTA, 30% w/v glycerol) using a glass homogenizer (Potter-Elvehjem, Fisher Scientific, Schwerte, Germany). Aliquots were stored at −20° C. and were used for protein assays.

Enzyme Assays

To test cloned montbretia P450 enzymes CcCYP1 and CcCYP2 for F3'H and F3'5'H activity, yeast microsomes harboring recombinant P450 protein and CcCPR1 were incubated in separate assays with the potential substrates naringenin, eriodyctiol, DHK, DHQ, or kaempferol for 20 min at 25° C. and 300 rpm. Assays were conducted in glass vials containing 200 μL of the reaction mixture (75 mM sodium phosphate buffer (pH 7.4), 10 μM substrate, 1 mM NADPH and 2 μL of the prepared microsomes. Higher substrate concentrations and longer incubation times as well as higher volumes of microsomes did not affect substrate preference. To test activity with quercetin as the substrate, reactions were incubated for 60 min and 500 μM of quercetin. All assays were stopped by placing on ice after the addition of an equal volume MeOH. Reaction mixtures containing microsomes prepared from BY4741 transformed with the empty vector (pESC-Leu2d) and CcCPR1 served as negative controls. To test CcFLS, CcF3H-1 and CcF3H-2 for 20D-dioxygenase activity, enzyme assays in 200 μL assay buffer containing 5 μg protein, 100 μM substrate, 0.5 mM ascorbate, 0.25 mM $FeCl_3$ and 1 mM oxoglutarate were performed in a Teflon-sealed, screw-capped 1 ml GC glass vial. Naringenin, eriodyctiol, DHK, DHQ or DHM served as substrates. Assays were incubated for 60 min at 25° C., slightly shaking and stopped by placing assay vials on ice after the addition of an equal volume MeOH. Reaction products of all assays where analyzed using LC-MS/MS as described below.

Reverse Transcription and qRT-PCR cDNA syntheses were done with 650 ng total RNA using the dsDNase and Maxima First Strand cDNA Synthesis Kit (ThermoFisher Scientific) according to the manufacturer's instructions. For qRT-PCR the cDNA was diluted 1:5 with water. For the amplification of target gene fragments with a length of about 150 bp, primer pairs were designed having a Tm≥60° C., GC content of 45-60%, and primer length of 20-25 nt (TABLE 3). Primer specificity was confirmed by agarose gel electrophoresis, melting curve analysis, standard curve analysis and by sequence verification of cloned PCR amplicons. Samples were run in duplicate using SsoFast™ EvaGreen® Supermix (BioRad). The following PCR conditions were applied for all reactions: Initial incubation at 95° C. for 30 sec followed by 40 cycles of amplification (95° C. for 5 sec, 60° C. for 10 sec). Melting curve data were recorded at the end of cycling from 55° C. to 95° C. All assays were performed with the same PCR machine (Bio-Rad CFX96™, Bio-Rad Laboratory, Hercules, CA, USA) in optical 96-well plates. qRT-PCR analyses were performed with three biological replicates for each of the 6 different time points for yC and oC samples (June $10^{th}$, June $27^{th}$, July $22^{nd}$, August $16^{th}$, September $12^{th}$, October $6^{th}$). The serinincooperator (MEP) and the zinc-finger protein (ZF) were used as reference genes as described previously (EXAMPLE 1 and Irmisch S, et al, (2018). Plant Cell 30: 1864-1886, incorporated herein by reference in its entirety) (TABLE 3).

Transient Expression of Montbretia Genes in *N. benthamiana*

For expression in *N. benthamiana*, the coding regions of CcCHS2, CcCHI2, CcF3H-2, CcFLS, CcCYP2, CcMYB1, CcMYB2, CcMYB3, CcMYB4, CcUGT1 (MG938542), CcUGT2 (MG938543), and CcAT1 (MH365462) were cloned individually into pCAMBiA2300U vector. After sequence verification, pCAMBiA vectors carrying the individual montbretia cDNAs, enhanced green fluorescence protein (eGFP), or the pBIN:p19 were separately transferred into *Agrobacterium tumefaciens* strain C58pMP90. One mL of overnight cultures (220 rpm, 28° C.) were used to inoculate 10 mL LB-media containing 50 μg×$mL^{-1}$ kanamycin, 25 μg×$mL^{-1}$ rifampicin and 25 μg×$mL^{-1}$ gentamicin for overnight growth. The following day the cultures were centrifuged (4000×g, 5 min) and cells were re-suspended in infiltration buffer (10 mM MES, pH 5.6, 10 mM $MgCl_2$, 100 μM acetosyringone) to a final OD600 of 0.5. After shaking for 3 h at RT different combinations of equal volumes of individual transformed *A. tumefaciens* ($35S_{pro}$:gene) as shown in TABLE 2 were prepared for leaf infiltration. All combinations included *A. tumefaciens* pBIN:p19 for enhancement of gene expression. Leaves of four-week old *N. benthamiana* plants were infiltrated with *A. tumefaciens* solution using a 1-mL needle-free syringe to gently push the solution into the abaxial surface. Infiltrated leaves were labeled with tape and harvested five days after infiltration. Four biological replicates were used and analyzed for the final Combinations M, P, S, T, and two biological replicates were used for screening of all other Combinations. Leaf material was directly frozen in liquid nitrogen and stored at −80° C. until further analysis. Plant material was ground in liquid nitrogen into a fine powder, and 100 mg were extracted with 1 mL 50% (v/v) MeOH for 2 h at RT. The extract was analyzed using LC-MS/MS.

LC-MS Analysis

LC was performed on an Agilent 1100 HPLC (Agilent Technologies GmbH, Waldbronn, Germany) with Agilent ZORBAX SB-C18 column (50×4.6 mm, 1.8 μm particle size) (Merck, Darmstadt, 370 Germany) using aqueous formic acid (0.2% v/v) (mobile phase A) and acetonitrile plus formic acid (0.2% v/v) (mobile phases B). The elution profile for in vitro enzyme activity assays was: 0-0.5 min, 95% A; 0.5-5 min, 5-40% B in A; 5-7 min 90% B in A and 7.1-10 min 95% A. The elution profile for *N. benthamiana* leave extracts was: 0-0.5 min, 95% A; 0.5-5 min, 5-20% B in A; 5-7 min 90% B in A and 7.1-10 min 95% A. The flow rate was 0.8 mL×$min^{-1}$ at a column temperature of 50° C. LC was coupled to an Agilent MSD Trap XCT-Plus mass spectrometer equipped with an electro-spray operated in negative ionization mode (capillary voltage, 4000 eV; temp, 350° C.; nebulizing gas, 60 psi; dry gas 12 L/min) and an Agilent 1100 Diode Array Detector (DAD, detection 200-700 nm, J&M Analytik AG, Aalen, Germany). MS/MS was used to monitor daughter ion formation. The LC/MSD Trap Software 5.2 (Bruker Daltonik, GmbH) was used for data acquisition and processing. Metabolites were quantified using an MbA standard curve. Compounds were identified using their retention times, molecular masses and specific fragmentation patterns and by use of authentic standards if they were available. Authentic standards for eriodyctiol, naringenin, DHK, DHM, myricetin and MR were from Sigma-Aldrich. Other authentic standards used were DHQ (Sequoia Research Products), quercetin and kaempferol (TRC), myricetin 3-O-glucoside (Extrasynthese, France), MbA and mini-MbA (Williams L K, et al (2015) Nat Chem Biol 11: 691-696, incorporated herein by reference in its entirety).

Statistical Analysis

To test for significant differences in gene expression patterns in young and old corms at different time points (June 2016-October 2016) a two-way analysis of variance (ANOVA) was performed followed by a Tukey-Test using SigmaPlot 11.0 for Windows (Systat Software Inc. 2008). Data for CcF3H-1, CcF3H-2, CcFLS, CcCYP1 and CcCYP2 gene expression was transformed (log, log, ^0.25, ^0.25, ^0.3; respectively) in order to meet statistical requirements. A student's t-test was used to test for significant fold change differences between old and young corms of June $10^{th}$.

Accession Numbers

Nucleotide sequences were deposited in GenBank for the following: CcF3H-1 (accession no. MK562522), CcF3H-2 (accession no. MK562523), CcFLS1 (accession no.

MK562524), CcCYP2 (accession no. MK562521), CcCYP1 (accession no. MK562520), CcCPR1 (accession no. MK562529), CcMYB1 (accession no. MK562525), CcMYB2 (accession no. MK562526), CcMYB3 (accession no. MK562527), and CcMYB4 (accession no. MK562528), each incorporated herein by reference in its entirety.

Example 3

Type 2 diabetes (T2B) affects over 320 million people worldwide. Healthy lifestyles, improved drugs and effective nutraceuticals are different components of a response against the growing T2B epidemic. The specialized metabolite montbretin A (MbA) is being developed for treatment of T2B and obesity due to its unique pharmacological activity as a highly effective and selective inhibitor of the human pancreatic α-amylase. MbA is an acylated flavonol glycoside found in small amounts in montbretia (*Crocosmia* x *crocosmiiflora*) corms. MbA cannot be obtained in sufficient quantities for drug development from its natural source or by chemical synthesis. To overcome these limitations through metabolic engineering, the inventors are investigating the genes and enzymes of MbA biosynthesis. The inventors described in EXAMPLE 1 and Irmisch S, et al, (2018) Plant Cell 30: 1864-1886, incorporated herein by reference in its entirety, the first three steps of MbA biosynthesis from myricetin to myricetin 3-O-(6'-O-caffeoyl)-glucosyl rhamnoside (mini-MbA). This example described the inventors' work to characterize the sequence of reactions from mini-MbA to MbA, and discovery and characterization of the gene and enzyme responsible for the glucosylation of mini-MbA. The UDP-glucose dependent glucosyltransferase CcUGT3 (UGT703E1) catalyzes the 1,2-glucosylation of mini-MbA to produce myricetin 3-O-(glucosyl-6'-O-caffeoyl)-glucosyl rhamnoside. Co-expression of CcUGT3 with genes for myricetin and mini-MbA biosynthesis in *Nicotiana benthamiana* validated its biological function and expanded the set of genes available for the metabolic engineering of MbA.

Results

Identification of the Sequence of Glycosylations from Mini-MbA to MbA

To identify the sequence of glycosylation from mini-MbA to MbA the inventors tested protein extracts prepared from young corms (yC) or old corms (oC) that were collected on Jun. 10, 2016 for UDP-dependent glycosyltransferase (UGT) activity. This time point has been shown to have high activity of MbA biosynthesis in yC and low activity in oC, enabling a screen for differentially expressed enzyme activities involved in MbA formation (EXAMPLE 1 and Irmisch S, et al, (2018) Plant Cell 30: 1864-1886, incorporated herein by reference in its entirety; and EXAMPLE 2 and Irmisch, S. et al. (April 2019) Plant Physiology, DOI: 10.1104/pp. 19.00254, incorporated herein by reference in its entirety). Protein extracts of yC converted mini-MbA (m/z 787) and UDP-Glc into a compound with m/z 949. Briefly, protein extracts from young corms (yC) catalyze the conversion of mini-MbA and UDP-Glc into MbA-$XR^2$ (peak 1, m/z 949). Formation of peak 1 was over 35-fold lower in assays with protein extracts from the same amount of old corms (oC), which was identified by liquid chromatography-tandem mass spectrometry (LC-MS/MS) as myricetin 3-O-(glucosyl-6'-O-caffeoyl)-1,2-β-D-glucosyl 1,2-α-L-rhamnoside (MbA-$XR^2$, abbreviated as MbA minus xylose and second rhamnose) based on comparison of retention time and fragmentation pattern to an authentic standard (protein extracts of yC catalyzed the formation of m/z 919 (peak 1) and m/z 1051 (peak 2) from mini-MbA and UDP-Xyl; samples were analyzed using LC-MS). The MS/MS spectra of m/z 949 showed the loss of the caffeoyl moiety (minus 162 with its weaker ester bond), and MS/MS ($MS^3$) analysis on the resulting m/z 787 showed the loss of the trisaccharide chain yielding myricetin (m/z 316). Assays with protein extracts from yC produced over 35-fold more MbA-$XR^2$ than assays with protein extracts from the same amount of oC. These results supported a biosynthetic pathway in which UDP-Glc dependent formation of MbA-$XR^2$ from mini-MbA represents the fourth step in MbA biosynthesis (FIG. 1B).

As MbA possesses a xylose at the myricetin 4'-hydroxy group (FIG. 1), the inventors also tested for the alternative scenario of a UDP-Xyl dependent conversion of mini-MbA. Protein extracts of yC converted mini-MbA and UDP-Xyl into a compound with m/z 919. The fragmentation pattern of m/z 919 was indicative of the position of Xyl at the end of a trisaccharide chain, suggesting the incorporation of Xyl instead of Glc in MbA-$XR^2$. In addition to m/z 919 these assays produced a compound with m/z 1051. The MS/MS fragmentation pattern of m/z 1051 showed the initial loss of 132 indicative of a second Xyl attached to the myricetin ring. However, these two compounds (m/z 919 and m/z 1051) with a Xyl at the end of the trisaccharide chain would not be relevant as precursors to MbA, which contains a Glc, but not Xyl, in this position.

Incubation of yC protein extracts with MbA-$XR^2$ and UDP-Xyl resulted in the formation of a compound of m/z 1081 (peak 3), which was identified as myricetin 3-O-(glucosyl-6'-O-caffeoyl)-1,2-β-D-glucosyl 1,2-α-L-rhamnoside 4'-O-β-D-xyloside (MbA-$R^2$, abbreviated as MbA minus second rhamnose) based on comparison of the retention time and fragmentation pattern with an authentic standard (described above). The prominent daughter ion in the MS/MS spectra, m/z 949 agreed with the loss of the Xyl on the 4'-hydroxy group of myricetin. Assays with protein extracts of yC produced over 20-times more MbA-$R^2$ compared to protein extracts derived from the same amount of oC. These results confirmed MbA-$R^2$, produced by UDP-Xyl dependent transformation of MbA-$XR^2$ in step 5, as the penultimate intermediate in the MbA biosynthesis (FIG. 1B).

To test if yC protein extracts catalyze the complete conversion of mini-MbA into MbA, the inventors incubated protein extracts with mini-MbA, UDP-Glc and UDP-Xyl with or without UDP-Rha. These assays resulted in the formation of MbA-$XR^2$ (m/z 949), MbA-$R^2$ (m/z 1081) and MbA (m/z 1227) (samples were analyzed using LC-MS and extracted ion chromatograms (EIC) were generated; compound identification was done using authentic standards). MbA is present in yC protein extracts and could not be entirely removed in the extraction process. An increase (2.5-fold) in the formation of MbA was observed when UDP-Rha was included as a substrate, corresponding with a decrease in MbA-$XR^2$ (m/z 949) and MbA-$R^2$ (m/z 1081) indicating the efficient conversion of those intermediates into MbA. These results support a UDP-Rha dependent reaction as the final step 6 of MbA biosynthesis (FIG. 1B).

The MbA Pathway Intermediates Mini-MbA, MbA-$XR^2$ and MbA-$R^2$ are Present in Young Corms The inventors have shown that the first two intermediates in MbA biosynthesis, MR and MRG accumulate in higher amounts in yC compared to oC (EXAMPLE 1 and Irmisch S, et al, (2018) Plant Cell 30: 1864-1886, incorporated herein by reference in its entirety). Following the enzyme assays with yC and oC that established the sequence of steps in the MbA biosynthesis, the inventors screened corm extracts for the proposed intermediates downstream of MRG that were previously not detected, specifically mini-MbA, MbA-XR$^2$ and MbA-R$^2$ (FIG. 1B). The inventors performed targeted metabolite analysis by LC-MS/MS of corm extracts of the Jun. 16, 2017 time-point. The inventors used a long-run LC method to achieve separation of the more complex intermediates and performed both full scan and MS/MS (on masses m/z 787 corresponding to mini-MbA, m/z 949 corresponding to MbA-XR$^2$, or m/z 1081 corresponding to MbA-R$^2$. These analyses revealed the presence of proposed MbA pathway intermediates mini-MbA (peak 2), MbA-XR$^2$ (peak 5) and MbA-R$^2$ (peak 8) in extracts of yC but not in oC. Additional compounds with m/z 787 (peak 1,3), m/z 949 (peak 4,6) or m/z 1081 (peak 7) were present in yC or oC extracts. Their fragmentation patterns suggest that they represent various myricetin glycosides, based on the loss of one or multiple m/z 162 or m/z 146 (putatively Glc or Rha, respectively) and the occurrence of the daughter ion m/z 316 or 317.

Identification of UGT Candidates for the Glycosylation of Mini-MbA to MbA-XR$^2$ by Transcriptome Co-Expression Analysis The inventors previously established co-expression analysis as a successful strategy for discovery of genes in the formation of mini-MbA (EXAMPLE 1 and Irmisch S, et al, (2018) Plant Cell 30: 1864-1886, incorporated herein by reference in its entirety). In this example, the inventors used Haystack co-expression analysis across montbretia flowers, stems, leaves, stolons, yC and oC with CcUGT1, CcUGT2, CcAT1 and CcAT2 as baits to screen for candidate UGTs for the fourth step in the MbA biosynthesis, specifically the glucosylation of mini-MbA to MbA-XR$^2$ (FIG. 1B). In this analysis, the UGT transcript DN67918_c7_g7_i4 showed a strong correlation ($R \geq 0.98$) with CcUGT1, CcUGT2, CcAT1 and CcAT2, as well as over 16-fold higher transcript abundance in yC compared to oC (>log FC4). The open reading frame (ORF) of DN67918_c7_g7_i4 translated into a protein of 361 amino acids (aa). Compared to known UGTs, the translated ORF lacked the C-terminal region. A partly matching transcript TR29056_c3_g1_i1 covering the ORF for the C-terminal was detected by screening a separate montbretia corm transcriptome made of corms harvested July, 2013 (corm 2013) with the DN67918_c7_g7_i4 sequence. PCR with primers spanning the complete ORF of both transcripts and cDNA template from yC of the Jun. 10, 2016 time point generated two different full-length UGT cDNAs, UGT703E1 and UGT703E2. These two sequences shared 88% nucleotide (nt) identity and 79% predicted aa identity. They shared 88% and 95% nt identify and 80% and 91% aa identity with DN67918_c7_g7_i4, respectively. In a phylogenetic analysis both UGT703E1 and UGT703E2 fall into clade D of family 1 UGTs (amino acid sequences of CcUGT1, CcUGT2, UGT703E1 (also referred to as CcUGT3) and UGT703E2 were aligned with selected UGTs from other plant species using ClustalW and a neighbor joining tree was constructed using MEGA6; alignments and phylogeny were used to cluster montbretia UGTs with known UGT clades) while the previously characterized CcUGT1 and CcUGT2 belong to clade F and clade P, respectively (EXAMPLE 1 and Irmisch S, et al, (2018) Plant Cell 30: 1864-1886, incorporated herein by reference in its entirety). The closest characterized UGT in other species is UGT703B1 from crocus (*Crocus sativus*), which glucosylates the 7-hydroxy group of kaempferol.

CcUGT3 (UGT703E1) Converts Mini-MbA into MbA-XR$^2$

To test CcUGT3 (UGT703E1) and UGT703E2 for glucosyltransferase activity, the cDNAs were expressed in *E. coli* and the recombinant proteins were Ni-purified and assayed using mini-MbA and UDP-Glc followed by LC-MS/MS analysis of products. Assays with UGT703E1 resulted in the formation of a single product peak with m/z 949 identified as MbA-XR$^2$ based on matching retention time and fragmentation pattern with an authentic standard. No activity was observed with UGT703E2 or the empty vector control.

The inventors tested UGT703E1 for substrate specificity with UDP-Glc as the sugar donor against different flavonoids and phenolics as potential sugar acceptors, specifically myricetin, MR, MRG, MbA-G (MbA minus the terminal Glc), epicatechin, salicin and caffeic acid. UGT703E1 showed no activity with any of those acceptor substrates. Noteworthy, MRG which is missing the caffeoyl moiety compared to mini-MbA did not serve as a substrate for UGT703E1. In addition to UDP-Glc, UGT703E1 also accepted UDP-Xyl and UDP-Rha as sugar donors with mini-MbA as the acceptor substrate (briefly, UGT703E1 (CcUGT3) was heterologously expressed in *E. coli*, extracted, purified and tested for enzyme activity in separate assays with mini-MbA and one of the sugar donors UDP-Glc, UDP-Xyl or UDP-Rha or with the three sugar donors combined). The fragmentation pattern of the respective products with m/z 919 and m/z 933 showed the initial loss of m/z 162 (caffeoyl moiety) indicating the formation of a trisaccharide side chain with Xyl or Rha, respectively, instead of the terminal Glc in MbA-XR$^2$. The turnover rate for mini-MbA and UDP-Glc was 1.2-fold higher compared to the turnover rate of mini-MbA with UDP-Xyl and 19-fold higher compared to mini-MbA and UDP-Rha. Similar patterns of different preference for UDP-Glc over UDP-Xyl and UDP-Rha were observed when UGT703E1 was assayed simultaneously with UDP-Glc, UDP-Xyl and UDP-Rha and mini-MbA. These results establish UGT703E1 as CcUGT3 catalyzing the conversion of mini-MbA to MbA-XR$^2$ as step 4 in the MbA biosynthetic pathway (FIG. 1B).

Figure 13:
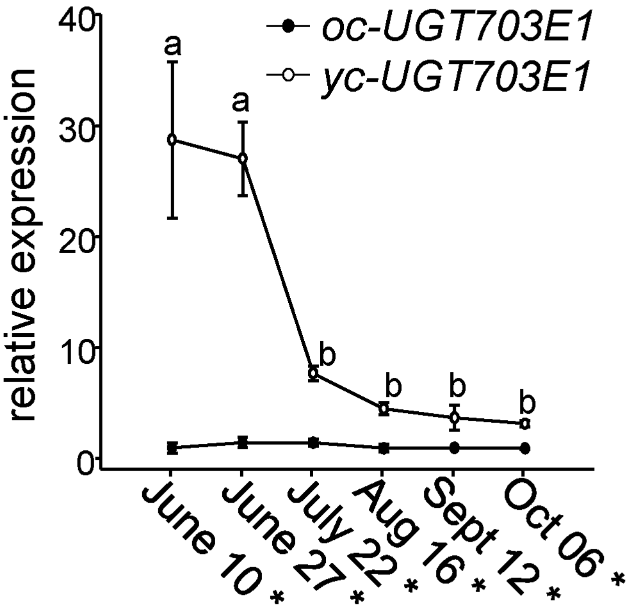
FIG. 13 graphically illustrates enzyme expression of recombinant CcUGT3 (UGT703E1) in young and old corms. RNA was isolated from yC and oC harvested at different time points of corm development. Transcript abundance was determined by qRT-PCR. Means and standard errors are shown (n=3). Different letters above the data points indicate significant differences between harvest points. Asterisks (*) indicate the statistical significance between yC and oC for all time points.

Transcript Expression Profiles of UGT703E1 (CcUGT3) in yC and oC Support a Role in MbA Biosynthesis The inventors measured profiles of transcript abundance of UGT703E1 (CcUGT3) during corm development in yC and oC from Jun. 10 to Oct. 6, 2016 using quantitative real time PCR (qRT-PCR) (FIG. 13). As with the previously described genes in mini-MbA biosynthesis (EXAMPLE 1 and Irmisch S, et al, (2018) Plant Cell 30: 1864-1886, incorporated herein by reference in its entirety), transcript levels of UGT703E1 (CcUGT3) were low and did not significantly change across all time points in oC and were significantly higher in yC at all time points. Transcript abundance was highest in young corms harvested in June, with over 28-fold higher transcript levels compared to oC of the same time point and significantly dropped in samples harvested after June (FIG. 13) matching the reported profiles of MbA accumulation and earlier pathways genes (EXAMPLE 1 and Irmisch S, et al, (2018) Plant Cell 30: 1864-1886, incorporated herein by reference in its entirety).

*N. benthamiana* Leaves Co-Expressing UGT703E1 (CcUGT3) Produce MbA-XR$^2$ and MbB-XR$^2$ In EXAMPLE 2, the inventors demonstrated that mini-MbA (also abbreviated as MRG-Caff) and mini-MbB (MRG-Cou), which contains a coumaroyl moiety instead of the caffeoyl moiety, could be produced in *N. benthamiana* by combined transient co-expression of the three montbretia myricetin biosynthesis genes CcMYB4, CcFLS and CcCYP2 and the three montbretia mini-MbA biosynthesis genes CcUGT1, CcUGT2 and CcAT1 (see also Irmisch, S. et al. (April 2019) Plant Physiology, DOI:10.1104/pp. 19.00254, incorporated herein by reference in its entirety). In this example, the inventors expand this expression system to validate the function of UGT703E1 (CcUGT3) in planta. *Nicotiana benthamiana* leaves were infiltrated with *Agrobacterium tumefaciens* containing the construct $35S_{pro}$: UGT703E1 (UGT703E1) and *A. tumefaciens* harboring individual $35S_{pro}$-gene constructs for the above mentioned six genes for myricetin and mini-MbA biosynthesis. Plants expressing the six myricetin and mini-MbA biosynthesis genes without the $35S_{pro}$:UGT703E1 (UGT703E1) construct served as controls. Leaves were collected five days after infiltration, and MeOH/$H_2O$ extracts analyzed by LC-MS/MS and LC-MS-TOF. Control leaves expressing myricetin and mini-MbA biosynthesis genes produced mini-MbA (MRG-Caff, m/z 787, peak 2), mini-MbB (MRG-Cou, m/z 771, peak 3) and myricetin 3-O-(6'-O-coumaroyl)-glucosyl glucoside (MGG-Cou m/z 787, peak 1) consistent with previous work (EXAMPLE 2 and Irmisch, S. et al. (April 2019) Plant Physiology, DOI:10.1104/pp. 19.00254, incorporated herein by reference in its entirety). A decrease in the peak areas corresponding to these products was observed when UGT703E1 (CcUGT3) was co-expressed with genes for myricetin and mini-MbA biosynthesis, indicative of UGT703E1 (CcUGT3) dependent conversion of mini-MbA, mini-MbB and MGG-Co. To detect potential products of these reactions, the inventors screened leave extracts for CcUGT3-dependent occurrence of compounds with m/z 949 or m/z 933 corresponding to glucosylation (+Glc m/z 162) of mini-MbA and MGG-Cou or mini-MbB, respectively. Leaves co-expressing UGT703E1 (CcUGT3) produced a single unique m/z 933 compound (peak 6) tentatively identified as MbB-$XR^2$. The fragmentation of the mother ion m/z 933 into m/z 787 (MRGG) and m/z 316 (M) indicates the initial loss of the coumaroyl moiety followed by the loss of the trisaccharide chain. Three m/z 949 compounds (peaks 3, 4 and 5) were specific to the co-expression of UGT703E1 (CcUGT3). Peak 5 was identified as MbA-$XR^2$, the fourth intermediate in MbA biosynthesis, based on comparison of fragmentation pattern and retention time to an authentic standard. The fragmentation of m/z 949 (peak 3) into m/z 803 (MGGG) and m/z 316 (M) as well as the decrease of MGG-Co (m/z 787 peak 1) suggests the identity of peak 3 as myricetin 3-O-(glucosyl-6'-O-coumaroyl)-glucosyl glucoside (MRGG-Co). Peak identities were additionally supported by accurate masses. The identity of m/z 949 peak 4 could not be resolved. As UGT703E1 (CcUGT3) accepts UDP-Xyl in vitro the inventors also screened for m/z 903 reflecting the addition of a xylose to mini-MbB. Trace amounts of an m/z 903 peak, possessing less than 1% of the peak area of MbB-$XR^2$ (m/z 933) could be detected. None of the above mentioned peaks could be detected in control samples.

Discussion

Building upon on work on the biosynthesis of mini-MbA (EXAMPLE 1 and Irmisch S, et al, (2018) Plant Cell 30: 1864-1886, incorporated herein by reference in its entirety), the inventors now established the complete sequence of steps in the MbA biosynthetic pathway (FIG. 1B) supported by results from enzyme assays with corm extracts and detection of the previously missing intermediates mini-MbA, MbA-$XR^2$ and MbA-$R^2$ in the metabolite profiles of yC. Based on this knowledge of the sequence of steps in the biosynthesis, the inventors focused the search for the next UGT in the biosynthetic pathway, CcUGT3, by targeting candidates that met the criteria of (i) differential and higher expression in yC relative to oC; (ii) matching the temporal expression profiles of CcUGT1, CcUGT2, CcAT1 and CcAT2 with an early summer peak in yC; and (iii) enzyme activity with mini-MbA and UDP-Glc as substrates. The discovery and characterization of UGT703E1 met these criteria, which defines CcUGT3 as a glycoside glucosyltransferase (GGT) that catalyzes the formation of MbA-$XR^2$ as the fourth intermediate in MbA biosynthesis. The function of CcUGT3 was validated with the pathway reconstruction to MbA-$XR^2$ and MbB-$XR^2$ in *N. benthamiana*, extending the metabolic engineering of MbA to four out of six required steps starting from myricetin.

MbA Biosynthesis Proceeds Via Step Wise Assembly of Individual Building Blocks

Enzymes that catalyze glycosylations in the biosynthesis of complex specialized metabolites in plants may be promiscuous with different intermediates of the biosynthetic system, which establishes a metabolic grit, or they may be specific for individual intermediates in a linear pathway. As examples for the former, in steviol glycoside biosynthesis in stevia (*Stevia rebaudiana*), the initial glycosylation occurs at the C-13 hydroxyl group, but subsequent glycosylations apparently do not follow a strict sequence. Similarly, in flavonoid biosynthesis in *Arabidopsis thaliana*, the sequence of xylosylation and glucosylation at C-2" or C-6", respectively, of cyanidin 3-O-glucoside, can vary. In contrast, acylated anthocyanins in lobelia (*Lobelia erinus*) known as lobelinins appear to be synthesized through decorations of the anthocyanin core that follow a specific sequence starting with the formation of a coumaroyl rutinoside at the 3-OH group of the anthocyanin core, followed by the glucosylation and malonylation on the 5-OH before the anthocyanin B-ring is modified.

The results presented here, together with work presented in EXAMPLE 1 (and Irmisch S, et al, (2018) Plant Cell 30: 1864-1886, incorporated herein by reference in its entirety), suggest that biosynthesis of MbA proceeds through a linear pathway defined by a sequence of six steps involving five different glycosylations and a acylation (FIG. 1B). The work described in EXAMPLE 1 demonstrates that CcUGT1, CcUGT2 and CcAT1 or CcAT2 functions in this sequence to produce mini-MbA from myricetin (see also Irmisch S, et al, (2018) Plant Cell 30: 1864-1886). Here, the inventors showed that CcUGT3 extends the disaccharide moiety attached to the myricetin 3-OH group yielding the final trisaccharide functionality. Completion of the trisaccharide moiety does not precede the acylation that produces mini-MbA. Formation of the trisaccharide moiety at the myricetin C-ring (FIG. 1A) is followed by the decoration of the myricetin B-ring, which are the later steps similar to other flavonoid biosynthetic pathways. The montbretia UGTs responsible for the remaining formation of the rhamnosyl xyloside disaccharide moiety at the 4'-hydroxy of the B-ring of MbA remain to be identified. Given that that the complete set of glycosylations of MbA was achieved in corm protein extracts with UDP-sugars as sugar donors, the inventors propose that the final formation of the 4'-disaccharide in MbA biosynthesis is catalyzed by two remaining UGTs, in contrast to the alternative scenarios of acyl-glucose-dependent glycosyltransferase or possible transglycosylation reactions.

CcUGT3 is a Clade D Family 1 GT Glycoside Glucosyltransferase (GGT)

CcUGT3 catalyzes the fourth step in MbA biosynthesis, the conversion of mini-MbA into MbA-$XR^2$, which involves formation of a 1,2-linked trisaccharide chain using an acylated flavonol disaccharide substrate. A variety of GGTs mediating the formation of acceptor-disaccharides, mainly flavonoid disaccharides have been described. Less is known about GGTs catalyzing the formation of more complex glycosyl chains. For example in soybean (*Glycine max*) GmF3G2"Gt is involved in the formation of the branched chain flavonoid trisaccharide kaempferol 3-O-glucosyl-(1, 2-rhamnosyl-1,6-glucoside). In steviol glycoside biosynthesis, UGT76G1 forms the branch chain trisaccharide of rebaudioside A from stevioside or steviolbioside. Certain glycosylated triterpene saponins in soybean contain a trisaccharide side chain, produced by GGTs UGT73P2 (GmSGT2) and UGT91H4 (GmSGT3). In Madagascar periwinkle (*Catharanthus roseus*), CaUGT3 exhibits a unique glucosyl chain elongation activity forming di-, tri- and tetra saccharides with 1,6-linkages in a sequential manner.

Montbretia UGT703E1 does not accept the flavonol disaccharide MRG as substrate, but uses the acetylated mini-MbA to catalyze formation of the trisaccharide chain suggesting a substrate binding mechanism involving the recognition of the acyl group. In contrast the common daisy (*Bellis perennis*) GGT BpUGAT involved in anthocyanin formation glucosylates both cyanidin 3-O-glucoside and the acylated cyanidin 3-O-(6"-O-malonyl) glucoside.

Subfamily A of family 1 GTs has been described to contain GGTs catalyzing glycosylations of sugars attached to flavonoids, and this clade contains the large majority of known GGTs that act on a variety of substrates including flavonoid glycosides as well as terpenoid and lignan glycosides. In addition a few GGTs have been reported belonging to clade H (stevia UGT76G1), clade E (crocus UGT707B1) and clade D (soybean GmSGT2, GmUGT73F4, GmUGT73F2). The two characterized UGTs in MbA biosynthesis, CcUGT2 (EXAMPLE 1 and Irmisch S, et al, (2018) Plant Cell 30: 1864-1886) and Cc UGT3 (this example) fall into in Clade P and D, respectively, highlighting that prediction of GGT function by clade association is not possible. Clade D is one of the largest groups of plant UGTs covering a wide array of different functions, and clade D UGTs of the same species may also cover diverse functions. Overall, the majority of montbretia UGTs are members of clade D comprising about 35% of corm-expressed UGTs (56 members) (EXAMPLE 1 and Irmisch S, et al, (2018) Plant Cell 30: 1864-1886). In Soybean clade D is also the dominant with 43 UGT members.

Utility UGT703E1 (CcUGT3) for MbA Metabolic Engineering

Similar to enzymes in MbA biosynthesis characterized in EXAMPLE 1 (see also Irmisch S, et al, (2018) Plant Cell 30: 1864-1886), CcUGT3 is highly stereo- and regio-specific for product formation. However, also similar to the enzymes in MbA biosynthesis characterized in EXAMPLE 1 (see also Irmisch S, et al, (2018) Plant Cell 30: 1864-1886), UGT703E1 (CcUGT3) can act in the formation of both MbA-$XR^2$ and MbB-$XR^2$ when expressed in *N. benthamiana*. In the *N. benthamiana* system availability of caffeoyl-CoA as opposed to coumaroyl-CoA appears to be limiting favoring a biosynthesis towards MbB instead of MbA (EXAMPLE 1 and Irmisch S, et al, (2018) Plant Cell 30: 1864-1886; EXAMPLE 2 and Irmisch, S. et al. (April 2019) Plant Physiology, DOI:10.1104/pp. 19.00254). These results confirm that enhancing access to caffeoyl-CoA remains a critical issue for metabolic engineering of MbA biosynthesis in *N. benthamiana*. Both MbA and mini-MbA are potent and selective inhibitors of HPA, while MbB is not an effective inhibitor. MbA inhibits HPA with a Ki of 8 nM; the Ki of mini-MbA was first reported as 93 nM. The CcUGT3 product MbA-$XR^2$ has a Ki of 42 nM making it a substantially more efficient inhibitor relative to mini-MbA due to the addition of a glucose unit. Building upon work that showing that mini-MbA and mini-MbB production can be engineered in *N. benthamiana* (Irmisch, S. et al. (April 2019) Plant Physiology, DOI:10.1104/pp. 19.00254), the inventors have now accomplished the CcUGT3-dependent production of MbA-$XR^2$ and MbB-$XR^2$. The next steps are to further extend this system to the heterologous production of the complete MbA molecule, which requires two additional metabolic steps.

Material and Methods

Plant Material

Montbretia (*Crocosmia* x *crocosmiiflora*) plants of the variety Emily McKenzie were obtained, propagated and harvested (2016 plant material) as described above in EXAMPLE 1 (see also Irmisch S, et al, (2018) Plant Cell 30: 1864-1886). Additional, plants harvested on Jun. 16, 2017 originated from young corms which had been separated from the old corm in November, 2016. *Nicotiana benthamiana* plants were grown from seed in potting soil in a controlled environment chamber (day, 26° C.; night, 22° C.; 16 h/8 h light/dark cycle).

Metabolite Extraction for Detection of MbA Pathway Intermediates

Young corms (newly developing during the 2017 growing season) and old corms (one year old) were harvested Jun. 16, 2017, flash frozen and ground in liquid nitrogen to a fine powder, of which 100 mg per sample was extracted with 400 μL 50% MeOH/$H_2O$ (v/v) (2 h shaking at 21° C.). The undiluted supernatant was used for metabolite analyses. Extracts were analyzed using the long-run LC-MS method (described below).

UGT Assays with Corm Protein Extracts

UGT assays with corm protein extracts were done as described above in EXAMPLE 1 (see also Irmisch S, et al, (2018) Plant Cell 30: 1864-1886). In brief, 500 mg of powdered corm was extracted with 2.5 mL of buffer (100 mM NaPi, pH 7.4, 5 mM ascorbic acid, 5 mM sodium bisulfite, 5 mM dithiothreitol, 1 mM EDTA, 10% (v/v) glycerol, 1% (w/v) PVP, 4% (w/v) PVPP, 4% (w/v) Amberlite XAD-4, 0.1% (v/v) Tween) for 1 h at 4° C. Following centrifugation at 4,300×g for 30 min (4° C.), the supernatant was collected and desalted three times into assay buffer (10 mM Tris-HCl, pH 7.5, 1 mM dithiothreitol, 10% (v/v) glycerol) using NAP-5 columns (GE-Healthcare). Desalted protein extract (75 μL) was used in 150 μL total assay volume with 50 μM mini-MbA or 50 μM MbA-$XR^2$ as acceptor and one or more of the following UDP sugars, 1 mM UDP-Glu (Sigma-Aldrich), 1 mM UDP-Xyl (CarboSource Services) and 50 μL UDP-$Rha^P$. UDP-$Rha^P$ was prepared as described above in EXAMPLE 1 (see also Irmisch S, et al, (2018) Plant Cell 30: 1864-1886). Assays were incubated at 21° C. for 6 h in a Teflon-sealed, screw-capped 1-mL GC glass vial and stopped by placing vials on ice after the addition of 150 μL MeOH. After centrifugation at 4300×g for 20 min (4° C.) supernatant was transferred into a fresh vial and analyzed for product formation by LC-MS.

LC-MS Analysis

LC was performed on an Agilent 1100 HPLC (Agilent Technologies GmbH, Waldbronn, Germany) with Agilent ZORBAX SB-C18 column (50×4.6 mm, 1.8 μm particle size) (Merck, Darmstadt, 370 Germany) using aqueous formic acid (0.2% v/v) (mobile phase A) and acetonitrile plus formic acid (0.2% v/v) (mobile phases B). The short-run elution profile was: 0-0.5 min, 95% A; 0.5-5 min, 5-20% B in A; 5-7 min 90% B in A and 7.1-10 min 95% A. The flow rate was 1 mL×min$^{-1}$ at a column temperature of 45° C. To improve separation of MbA pathway intermediates a long-run elution profile was used: 0-7 min, 95% A; 7-9 min, 5-15% B in A; 9-20 min 15-18% B in A; 20-25 min 18-90% B in A; 25-27 min 90% B in A and 27.1-30 min 95% A). Flow rate was 1 mL×min at a column temperature of 40° C. LC was coupled to an Agilent MSD Trap XCT-Plus mass spectrometer equipped with an electro-spray operated in negative ionization mode (capillary voltage, 4000 eV; temp, 350° C.; nebulizing gas, 60 psi; dry gas 12 L/min) and an Agilent 1100 Diode Array Detector (DAD, detection 200-700 nm, J&M Analytik AG, Aalen, Germany). MS$^n$ was conducted to obtain fragmentation patterns for compound identification. The LC/MSD Trap Software 5.2 (Bruker Daltonik, GmbH) was used for data acquisition and processing. Enzyme assay products were quantified using an external MbA standard curve. Compounds were tentatively identified using their molecular masses and specific fragmentation patterns. Authentic standards were available for mini-MbA, MbA-XR$^2$, MbA-R and MbA (Williams L K, et al. (2015) Nat Chem Biol 11: 691-696, incorporated herein by reference in its entirety). An enzyme assay using CcAT1, MRG and coumaroyl-CoA was used to generate Mini-MbB (EXAMPLE 1 and Irmisch S, et al, (2018) Plant Cell 30: 1864-1886, incorporated herein by reference in its entirety).

Accurate mass measurement was performed on an Agilent 1290 Infinity UHPLC (Agilent Technologies GmbH, Waldbronn, Germany) utilizing the same column, mobile phase and long-run as described above. The LC was coupled to an Agilent 6530 Accurate Mass Q-ToF mass spectrometer equipped with an electrospray ion source operated in negative ionization mode (capillary voltage, 4000 eV; temp, 350° C.; nebulizing gas, 60 psi; dry gas 12 L×min$^{-1}$) and an Agilent 1290 Diode Array Detector (DAD, detection 190-400 nm, J&M Analytik AG, Aalen, Germany). Accurate mass MS/MS experiment was conducted to analyse fragmentation patterns for compound identification. Hexakis (1H, 1H, 3H tetrafluoropropoxy)phosphazine/Purine/Ammonium Trifluoroacetate mixture was used as API-ToF Reference Mass solution. The Mass Hunter Workstation Software, version B.07.00, 2015 (Agilent Technologies) was used for data acquisition and processing.

Identification of Candidate UGTs

To identify candidate UGTs the published transcriptome and differential expression (DE) data of yC and oC as well as DE data for other organs were utilized as described above in EXAMPLE 1 (see also Irmisch S, et al, (2018) Plant Cell 30: 1864-1886). Haystack (http://haystack.mocklerlab.org/) was used to filter UGTs whose expression patterns correlated with CcUGT1, CcUGT2 and at least one of the CcATs, CcAT1 or CcAT2. A correlation cut off, of R≥0.8 was used and results were filtered to meet criteria of at least 16-fold (log FC(fold change)=4) greater expression in yC compared to oC. A transcriptome assembly using sequencing data from corms harvested July, 2013 (corm 2013) was processed as described previously for yC/oC data as described above in EXAMPLE 1 (see also Irmisch S, et al, (2018) Plant Cell 30: 1864-1886). This data set was used to obtain the complete open reading frame of the target UGT sequence.

UGT cDNA Cloning and Heterologous Expression in *E. coli*

Candidate UGTs were amplified from cDNA prepared from yC of the Jun. 10, 2016 time point and cloned into the pJET1.2/blunt vector (ThermoFisher Scientific) for sequencing (TABLE 4). Complete open reading frames of candidate UGTs were cloned as BsaI or BbsI fragments into the pASK-IBA37 vector (IBA-GmbH, Gottingen, Germany). The *E. coli* TOP10 strain (Invitrogen) was used for heterologous UGT expression. Cultures were grown at 21° C., induced at an OD600=0.5 with 200 μg/L anhydrotetracycline (Sigma-Aldrich, Germany) and then placed at 18° C. and grown for another 20 h. Cells were collected by centrifugation and disrupted by five freeze and thaw cycles in chilled extraction buffer (50 mM Tris-HCl, pH 7.5, 10 mM $MgCl_2$, 5 mM dithiothreitol, 2% (v/v) glycerol, 150 mM $NaCl_2$, 20 mM imidazole, 1× Pierce™ protease inhibitor (EDTA-free, ThermoFisher Scientific), 25 U Benzonase Nuclease (Merck, Germany), and 0.2 mg×mL$^{-1}$ lysozyme). Cell fragments were removed by centrifugation at 14,000×g for 20 min at 4° C. and the supernatant was loaded onto a Ni-NTA agarose column (Qiagen, Hilden, Germany). Protein was eluted with elution buffer (10 mM Tris-HCl, pH 7.5, 500 mM imidazole, 1 mM dithiothreitol, 10% (v/v) glycerol) and desalted into assay buffer (10 mM Tris-HCl, pH=7.5, 1 mM dithiothreitol, 10% (v/v) glycerol) using Illustra NAP-5 Columns (GE Healthcare). Protein concentrations were determined using UV absorption at 280 nm.

TABLE 4

Oligonucleotides used herein.

| primer name | sequence | SEQ ID NO: |
|---|---|---|
| UGT703-f | ATGAGCTCCAAAGAAGGCCAG | 91 |
| UGT703-r | TCAAATTGCTTGTGTACGTGAGTTG | 92 |
| UGT703E1-QRTf | CCTTCGCCAGACTTGCTCATG | 93 |
| UGT703E1-QRTr | CTGCGACGCATGTGGAGAAC | 94 |

UGT Assays with Recombinant Proteins

UGT assays with recombinant were performed with 1 μg of purified recombinant protein, 50 μM mini-MbA and 1 mM UDP-Glu in a Teflon-sealed, screw-capped 1-mL GC glass vial. Unless stated otherwise, assays were performed in assay buffer in a final volume of 50 μL and incubated at 25° C. Assays were incubated for 2 h, and stopped by placing on ice after the addition of an equal volume of MeOH. CcUGT3 was tested for substrate specificity using 0.5 μg of protein, 1 mM UDP-Glc and 50 μM of the different substrates ( ), and incubated for 2 h. For relative turnover rates for mini-MbA and different UDP-sugars, 0.5 μg purified CcUGT3 was assayed with 50 μM mini-MbA and 1 mM UDP-Glc or UDP-Xyl or HPLC-purified UDP-Rha for 60 min. Product quantification was done based on an MbA standard curve.

Reverse Transcription and Quantitative Real-Time PCR (qRT-PCR)

RNA was extracted and cDNA synthesis done as described above in EXAMPLE 1 (see also Irmisch S, et al, (2018) Plant Cell 30: 1864-1886). For qRT-PCR the cDNA was diluted 1:5 with water. For the amplification of a UGT3 fragment of approximately 200 bp length, a primer pair was designed with a Tm≥60° C., a GC content of 45-60%, and a primer length of 20-25 nt (TABLE 4). Primer specificity was confirmed by agarose gel electrophoresis, melting curve analysis, standard curve analysis and by sequence verification of cloned PCR products. qRT-PCR reactions were performed in duplicate on a Bio-Rad CFX96™ instrument (Bio-Rad Laboratory, Hercules, CA, USA) in optical 96-well plates using SsoFast™ EvaGreen® Supermix (Bio-Rad) with the following PCR conditions: Initial incubation at 95° C. for 30 sec followed by 40 cycles of amplification (95° C. for 5 sec, 60° C. for 10 sec). qRT-PCR analyses were performed with three biological replicates for each of the six different time points of yC and oC collections (Jun. 10, Jun. 27, Jul. 22, Aug. 16, Sep. 12, Oct. 6, 2016) as described above in EXAMPLE 1 (see also Irmisch S, et al, (2018) Plant Cell 30: 1864-1886). Serin-incorporator (MEP) and zinc-finger protein (ZF) were used as reference genes as described above in EXAMPLE 1 (see also Irmisch S, et al, (2018) Plant Cell 30: 1864-1886).

Transient Expression in *N. benthamiana*

For expression in *N. benthamiana*, the coding region of UGT3 was cloned into the pCAMBiA2300U vector. After sequence verification, the pCAMBiA vector carrying UGT3 as well as pCAMBiA vectors carrying the genes for myricetin biosynthesis: CcFLS, CcCYP2 and CcMYB4 as described in EXAMPLE 1 (see also Irmisch S, et al, (2018) Plant Cell 30: 1864-1886) and the genes for mini-MbA biosynthesis CcUGT1, CcUGT2 and CcAT1 as described above in EXAMPLE 2 (see also Irmisch, S. et al. (April 2019) Plant Physiology, DOI:10.1104/pp. 19.00254) and the pBIN:p19 were separately transferred into *Agrobacterium tumefaciens* strain C58pMP90. One mL of overnight cultures (220 rpm, 28° C.) were used to inoculate 10 mL LB-media containing 50 $\mu g \times mL^{-1}$ kanamycin, 25 $\mu g \times mL^{-1}$ rifampicin and 25 $\mu g \times mL^{-1}$ gentamicin for overnight growth. The following day the cultures were centrifuged (4,000×g, 5 min) and cells were re-suspended in infiltration buffer (10 mM MES, pH 5.6, 10 mM $MgCl_2$, 100 μM acetosyringone) to a final OD600 of 0.5. After shaking for 3 h at RT, the following combinations of transformed *A. tumefaciens* were prepared for leaf infiltration using: (i) *A. tumefaciens* $35S_{pro}$:(CcMYB4+CcFLS+CcCYP2+CcUGT1+CcUGT2+CcAT1)+*A. tumefaciens* pBIN:p19; (ii) *A. tumefaciens* $35S_{pro}$:(CcMYB4+CcFLS+CcCYP2+CcUGT1+CcUGT2+CcAT1+CcUGT3)+*A. tumefaciens* pBIN:p19. Equal volumes of each line of transformed *A. tumefaciens* were used to prepare the mixtures. The leaves of four-week old *N. benthamiana* plants were infiltrated with *A. tumefaciens* solution using a 1-mL needle-free syringe to gently push the bacterial mixture into the abaxial surface. Infiltrated leaves were labeled with tape and harvested five days after infiltration and directly frozen in liquid nitrogen and stored at −80° C. until further analysis. Plant material was ground in liquid nitrogen into a fine powder, and 100 mg were extracted with 1 mL 50% (v/v) MeOH for 2 h at RT. The extracts were analyzed using LC-MS. Product quantification was done based on an external MbA standard curve.

Alignment and Phylogenetic Tree Construction

An amino acid alignment of CcUGT3, UGT703E2 and other plants UGTs was constructed using ClustalW algorithm implemented in MEGA6 (Tamura K, et al. (2011) Mol Biol Evol 28: 2731-2739, incorporated herein by reference in its entirety). Based on this alignment, a phylogenetic tree was reconstructed with MEGA6 using a neighbor-joining algorithm (Poisson model). A bootstrap resampling analysis with 1000 replicates was performed to evaluate the tree topology.

Statistical Analysis

To test for significant differences in CcUGT3 transcript abundance in yC and oC at different time points, data were log transformed to meet statistical requirements and a two-way analysis of variance (ANOVA) was performed followed by a Tukey-Test using SigmaPlot 11.0 for Windows (Systat Software Inc. 2008).

Accession Numbers

Previously published oC, yC and corm_2013 transcriptome libraries are available in the NCBI/GenBank Sequence Read Archive (SRA) (SRP108844). UGT DE data are described above in EXAMPLE 1 (see also Irmisch S, et al, (2018) Plant Cell 30: 1864-1886, incorporated herein by reference in its entirety).

Example 4

As described above, the specialized metabolite montbretin A (MbA), an acylated flavonol glycoside found in small amounts in montbretia (*Crocosmia* x *crocosmiiflora*) corms, is being developed for treatment of T2B and obesity due to its unique pharmacological activity as a highly effective and selective inhibitor of the human pancreatic α-amylase. MbA cannot be obtained in sufficient quantities for drug development from its natural source or by chemical synthesis. The inventors have investigated the genes and enzymes of MbA biosynthesis to develop an engineered metabolic pathway for MbA synthesis. The first three steps of MbA biosynthesis from myricetin to myricetin 3-O-(6'-O-caffeoyl)-glucosyl rhamnoside (mini-MbA) are described in EXAMPLE 1. Additional genes to promoting enhanced production of a myricetin are described in EXAMPLE 2. Additionally, the sequence of reactions from mini-MbA to MbA, and discovery and characterization of the gene and enzyme responsible for the glucosylation of mini-MbA is described in EXAMPLE 3. This example describes the inventors' work to characterize the last two enzymes that that catalyze the last two steps catalyzing glycosylation of MbA-$XR^2$ to produce MbA-$R^2$ and catalyzing glycosylation of MbA-$R^2$ to MbA.

Results

Identification of Candidate UGTs by Time Course Co-Expression Analysis

Genes identified in EXAMPLES 1 and 3 for MbA biosynthesis share a distinct temporal pattern during the development of young corms (yC) with highest level of expression during early summer, and low expression in old corms (oC) of the previous growing season (see also Irmisch S, et al, (2018) Plant Cell 30: 1864-1886). To identify the remaining two UGTs required for the completion of MbA biosynthesis, the inventors utilized a RNA-Seq library prepared from yC harvested Jun. 10, 2016, as described above in EXAMPLE 1 (see also Irmisch S, et al, (2018) Plant Cell 30: 1864-1886) and a newly generated set of five RNA-Seq transcriptomes developed from yC harvested at five different time points (Jun. 27, Jul. 22, Aug. 16, Sep. 12, and Oct. 6, 2016). Transcriptomes for each of these six time points of yC development were constructed using RNA-Bloom, predicted peptides were combined and redundancies reduced yielding 40,565 non-redundant (NR) transcript contigs with an average length covering translated sequences of 331 aa. Using reciprocal BLASTP searches (see EXAMPLE 1 and Irmisch S, et al, (2018) Plant Cell 30: 1864-1886) 190 UGTs (≥250 aa) were identified in the montbretia yC-time course transcriptome. These UGT sequences were filtered based on high counts per millions (cpm) at the June 10th time point and at least 5-fold higher transcript abundance at June 10th compared to October 6th, which resulted in the identification of 19 candidate UGTs. These 19 UGTs included the three UGTs involved in MbA biosynthesis, CcUGT1, CcUGT2 and CcUGT3 as characterized in EXAMPLE 1 and Irmisch S, et al, (2018) Plant Cell 30: 1864-1886. To identify UGT expression patterns similar to those of known MbA biosynthesis genes, the inventors produced a heatmap of expression data comprising the 19 UGTs and the two characterized CcATs, CcAT1 and CcAT2 (EXAMPLE 1 and Irmisch S, et al, (2018) Plant Cell 30: 1864-1886). Based on clustering with known MbA biosynthesis genes, the inventors selected six full-length candidate UGT transcripts, UGT703G1 (contig E2.L.3032), UGT703F1 (contig E2.L.4789), UGT709R1 (contig E0.U.334646), UGT703H1 (contig E1.L.26519), UGT703E4 (contig E2.L.7030) and UGT729A2 (contig E0.L.130572) for further characterization. The inventors also validated these six UGT transcripts for presence and differential expression (DE) in the contrasting yC/oC transcriptome (EXAMPLE 1 and Irmisch S, et al, (2018) Plant Cell 30: 1864-1886). UGT703G1, UGT703F1 and UGT709R1 were present as full-length sequences with 36.8-fold, 9.9-fold and 10.2-fold higher transcript abundance, respectively, in yC compared to old corms. UGT729A2 and UGT703E4 showed 90.7-fold and 2.8-fold higher transcript levels in yC compared to oC, respectively, but UGT729A2 was missing a sequence for 84 aa at the predicted UGT C-terminus and UGT703E4 was only detected as a short fragment encoding for 250 aa. Surprisingly, UGT703H1 was initially not found in the yC/oC transcriptome. Upon closer inspection of the yC/oC transcriptome, the inventors identified a contig of 3,692 nt length (DN68292_c0_g1_i1) which covered two separate non-overlapping ORF encoding UGTs. The presence of two ORFs may be due to in-silico fusion of two contigs. The shorter of the two ORFs matched UGT703H1. The inventors had initially missed this contig during data analysis, which was trained to only select for the longest ORF on any given contig.

CcUGT4 (UGT703H1) and CcUGT5 (UGT729A2) Convert MbA-$XR^2$ into MbA

The cDNAs covering the full-length ORFs of UGT703G1, UGT703F1, UGT709R1, UGT703H1, UGT703E4 and UGT729A2 were amplified by PCR from yC cDNA template. In a phylogenetic analysis of family 1 UGTs (EXAMPLE 1 and Irmisch S, et al, (2018) Plant Cell 30: 1864-1886), proteins encoded by UGT703G1, UGT703F1, UGT703E4, UGT703H1 and UGT729A2 clustered with UGT clade D, and UGT709R1 clustered with clade P. All six proteins possess a glutamine in the c-terminal position of the PSPG-motif. The amino acid in this position is thought to be important for sugar donor specificity.

To assess candidate UGTs for glycosyltransferase activity, the inventors expressed the six cDNAs individually in *E. coli*, verified protein expression by Western blot analysis, and performed enzyme assays with the recombinant proteins using MbA-$XR^2$ and UDP-Xyl (step 5 in MbA biosynthesis) or MbA-$R^2$ and UDP-Rha (step 6 in MbA biosynthesis) as substrates (see FIGS. 2A and 14). Product analysis was done by LC-UV/MS analysis. The initial activity screen was performed with protein extracts of the *E. coli* expression strains without purification of recombinant UGTs. This screen revealed UGT activity for UGT703H1 and UGT729A2.

When incubated with MbA-$XR^2$ and UDP-Xyl, protein extracts containing UGT703H1 showed the formation of a single product peak with m/z 1081.5 identified as MbA-$R^2$ based on matching retention time and fragmentation pattern with an authentic standard (UGTs were heterologously expressed in *E. coli* and Ni-purified protein was assayed for activity with MbA-$XR^2$ and UDP-Xyl for CcUGT4). The fragmentation pattern of MbA-R2 shows the initial loss of Xyl (loss of 132, m/z 949), indicative for the attachment of Xyl to the 4'-position of the flavonol B-ring. Protein extract containing UGT729A2 converted MbA-R2 and UDP-Rha into a single product with m/z 1227.5 identified as MbA based on comparison with an authentic standard (UGTs were heterologously expressed in *E. coli* and Ni-purified protein was assayed for activity with with MbA-R2 and UDP-Rha for CcUGT5). The fragmentation pattern of MbA shows the predominant initial loss of the rhamnosyl xyloside (minus 278, m/z 949) or the initial loss of the caffeoyl moiety (minus 162, m/z 1065), followed by the loss of the respective other to form m/z 787 (MRGG). The inventors also detected a small m/z 1081.5 product peak in assays of protein extracts containing UGT703G1 with MbA-$XR^2$ and UDP-Xyl, but its retention time did not match that of MbA-R2. No activity was detected in any of the assays with protein extracts containing UGT703F1, UGT709R1, or UGT703E4 or in control assays with protein extract of *E. coli* containing the empty vector. Taken together, these activity screens identified UGT703H1 (CcUGT4) and UGT729A2 (CcUGT5) as the enzymes that catalyze the final two glycosylation steps in the MbA biosynthesis.

For further characterization CcUGT4 (UGT703H1) and CcUGT5 (UGT729A2) proteins were Ni-purified. The inventors tested CcUGT4 for substrate specificity with UDP-Xyl as the sugar donor and different sugar acceptors, specifically myricetin, MR, MRG, mini-MbA, MbA-$XR^2$, quercetin, kaempferol and caffeic acid. Among intermediates in MbA biosynthesis, in addition to MbA-$XR^2$, CcUGT4 was also active with MRG and mini-MbA but not with myricetin or MR. However, product formation with MRG and mini-MbA was only 0.6% and 5.2%, respectively, relative to product formation with MbA-$XR^2$ as substrate (briefly, CcUGT4 was heterologously expressed in *E. coli*, extracted, Ni-purified and tested for enzyme activity in separate assays with DP-Xyl and myricetin, MR, MRG, mini-MbA or MbA-$XR^2$; products were analyzed using LC-MS). No activity was detected with any of the other acceptor substrates tested. CcUGT4 was specific for UDP-Xyl as the sugar donor and did not accept UDP-Rha or UDP-Glc when MbA-$XR^2$ was used as the acceptor. The inventors tested CcUGT5 for substrate specificity with UDP-Rha as the sugar donor and different acceptors, myricetin, MR, MRG, mini-MbA, MbA-$XR^2$, MbA-$R^2$, MbA-$CR^2$, quercetin 4'-O-glucoside (spiraeoside), quercetin, kaempferol or caffeic acid. In addition to MbA-$R^2$, CcUGT5 was active with MbA-$CR^2$ (which is MbA-R2 missing the caffeoyl moiety) as a substrate forming a single product peak m/z 1065 identified as MbA-C (MbA missing the caffeoyl moiety) (briefly, CcUGT5 was heterologously expressed in *E. coli*, extracted, Ni-purified and tested for enzyme activity in separate assays with UDP-Rha and the sugar acceptor MbA-R2 (m/z 1081.5) or MbA-CR2 (m/z 919) and products were analyzed using LC-MS). Quercetin 4'-O-glucoside (spiraeoside) did not serve as a substrate for CcUGT5. In addition to UDP-Rha, CcUGT5 also accepted UDP-Xyl but not UDP-Glc as a sugar donor with MbA-$R^2$ as acceptor (briefly, CcUGT5 was heterologously expressed in *E. coli*, extracted, Ni-purified and tested for enzyme activity in separate assays with MbA-R2 and one of the sugar donors UDP-Xyl, UDP-Glc or UDP-Rha and products were analyzed using LC-MS). However, product formation using UDP-Xyl and MbA-$R^2$ was only 0.7% relative to product formation with UDP-Rha, suggesting that UDP-Rha was the preferred sugar donor substrate for CcUGT5.

Figure 15B:
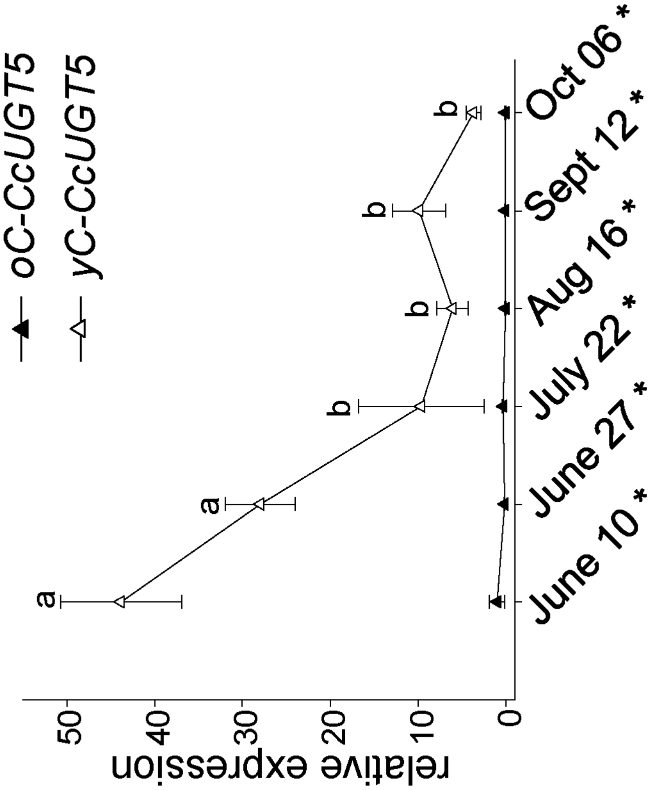
FIGS. 15A and 15B graphically illustrate transcript abundance of CcUGT4 and CcUGT5 in yC and oC over a time course of corm development. RNA was isolated from yC (open circles) and oC (closed circles) harvested at different time points of corm development. Transcript abundance was determined by qRT-PCR for CcUGT4 (FIG. 4A) and CcUGT5 (FIG. 4B). Means and standard errors are shown (n=3). Different letters above the data points indicate significant differences between harvest points. Asterisks (*) indicate the statistical significance between yC and oC for time points.
Figure 15A:
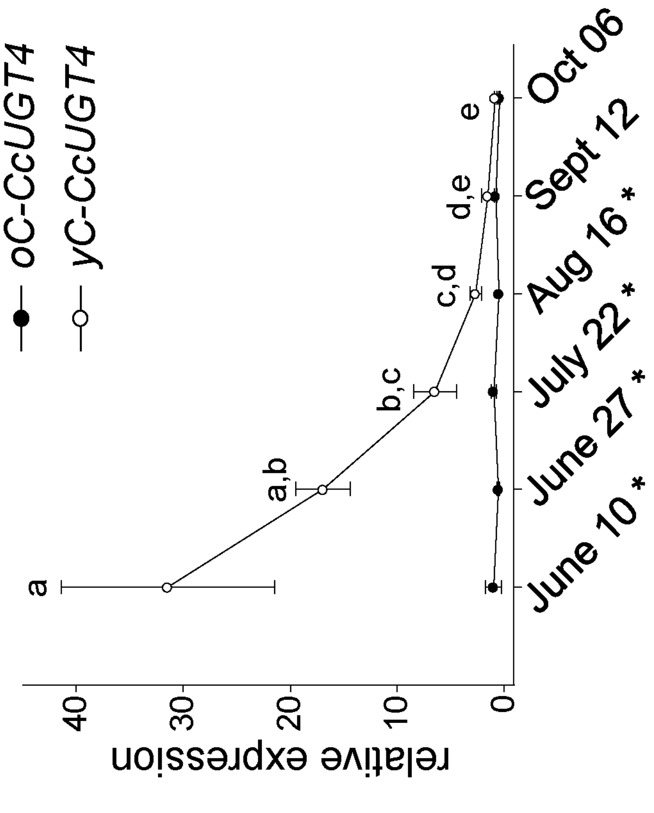

Transcript Expression Profiles of CcUGT4 and CcUGT5 Support their Role in MbA Biosynthesis To validate gene expression patterns in yC and compare gene expression patterns in oC over a time course of corm development, the inventors measured transcript abundance of CcUGT4 and CcUGT5 using quantitative real time PCR (qRT-PCR) in RNA samples isolated from corms of the Jun. 10 to Oct. 6, 2016 time course (FIGS. 15A and 15B). Matching the expression of other genes involved in MbA biosynthesis and matching the profiles of MbA accumulation (see Examples 1-3, Irmisch S, et al, (2018) Plant Cell 30: 1864-1886, and Irmisch, S. et al. (April 2019) Plant Physiology, DOI:10.1104/pp. 19.00254), CcUGT4 and CcUGT5 transcript abundance was low and did not significantly change across all time points in oC, and was significantly higher in almost all of the yC samples compared to oC. Transcript abundance of CcUGT4 and CcUGT5 was highest in yC harvested in early June, with over 30-fold and 40-fold higher transcript levels, respectively, compared to oC of the same time point. Expression levels of both UGTs continuously dropped from June to October. CcUGT4 and CcUGT5 showed 38-fold and 11-fold higher transcript abundance in yC harvested in early June compared to October.

Reconstitution of MbA Biosynthesis *N. benthamiana* Leaves

The inventors previously showed that MbA-$XR^2$ and MbB-$XR^2$ (coumaroyl moiety instead of caffeoyl moiety) can be produced in *N. benthamiana* by transient co-expression of the montbretia myricetin biosynthesis genes, CcMYB4, CcFLS and CcCYP2, together with genes for the first four steps of the MbA pathway (from myricetin to MbA-$XR^2$), CcUGT1, CcUGT2, CcAT1 and CcUGT3 (EXAMPLE 3). Here, the inventors further extended the pathway reconstruction for the complete MbA biosynthesis in *N. benthamiana* by additional co-expressing CcUGT4 and CcUGT5. *Nicotiana benthamiana* leaves were infiltrated with different combinations of *Agrobacterium tumefaciens* strains containing the above-mentioned genes as $35S_{pro}$-gene constructs (EXAMPLES 2 and 3, and Irmisch, S. et al. (April 2019) Plant Physiology, DOI:10.1104/pp. 19.00254). Plants expressing combinations of myricetin and MbA-$XR^2$ biosynthesis genes (EXAMPLES 2 and 3, and Irmisch, S. et al. (April 2019) Plant Physiology, DOI:10.1104/pp. 19.00254) served as controls. Leaves were collected five days after infiltration, and MeOH/$H_2O$ extracts analyzed by LC-MS and LC-MS-TOF using authentic standards for MbA and intermediates in MbA biosynthesis for metabolite identification. In addition, the inventors produced reference compounds for MbB and intermediates in MbB biosynthesis using MbA biosynthesis enzymes which was possible as CcAT1 is active with both caffeoyl-CoA and coumaroyl-CoA (EXAMPLE 1 and Irmisch S, et al, (2018) Plant Cell 30: 1864-1886).

In agreement the results described in EXAMPLES 1-3, leaves expressing myricetin and MbA-$XR^2$ biosynthesis genes produced MbA-$XR^2$ (m/z 949, peak 4) and MbB-$XR^2$ (m/z 933, peak 2) (EXAMPLE 3). Peak areas corresponding to these products decreased when CcUGT4 alone or CcUGT4 in combination with CcUGT5 were co-expressed with genes for myricetin and MbA-$XR^2$ biosynthesis, indicating substrate conversion. Xylosylation of MbA-$XR^2$ or MbB-$XR^2$ through CcUGT4 would result in m/z 1081.5 or m/z 1065.5, respectively. A small peak m/z 1081.5 (peak 10) matching the retention time and fragmentation pattern of MbA-R2 was detected in samples co-expressing CcUGT4. Additionally, two m/z 1065.5 peaks were detected and peak 9 could be identified as MbB-$R^2$. Additional co-expression of CcUGT5 resulted in depletion of MbA-$R^2$ and MbB-$R^2$ and small amounts of m/z 1227.5 (peak 16) identified as MbA and m/z 1211.5 (peak 14) identified as MbB were detected. Interestingly, these samples also showed a m/z 1065.5 peak (peak 11) identified as MbA-C (MbA and MbB without the caffeoyl or coumaroyl moiety) a possible degradation product of MbA/MbB. In all experiments, formation of peaks corresponding to MbA and MbB and intermediates in their biosynthesis was specific to the co-expression of the respective montbretia MbA biosynthesis enzymes. Other peaks of unknown identity were likely due to the modification of pathway intermediates through endogenous *N. benthamiana* enzymes and/or montbretia enzymes acting on *N. benthamiana* flavonoids.

Material and Methods

Plant Material

Montbretia (*Crocosmia* x *crocosmiiflora*) plants of the variety Emily McKenzie were obtained, propagated and harvested as described above in EXAMPLE 1 (see also Irmisch S, et al, (2018) Plant Cell 30: 1864-1886). *Nicotiana benthamiana* plants were grown from seed in potting soil in a controlled environment chamber (day, 26° C.; night, 22° C.; 16 h/8 h light/dark cycle).

Transcriptome Sequencing, De Novo Assembly

RNA samples (RNA Integrity Number ≥9) prepared separately from yC of the Jun. 27, Jul. 22, Aug. 16, Sep. 12 and Oct. 6, 2016 time point, each with two biological replicates were sequenced at the McGill University & Génome Québec Innovation Centre (http://gqinnovationcenter.com). RNA-Seq was performed on the Illumina HiSeq 4000 platform using 100-bp PE strand-specific libraries multiplexed on a two lane, generating approximately 670 million PE reads. Data for yC of the Jun. 10, 2016 time point was acquired and utilized as described above in EXAMPLE 1 (see also Irmisch S, et al, (2018) Plant Cell 30: 1864-1886). Sequence quality was assessed with FastQC (http://www.bioinformatics.babraham.ac.uk/projects/fastqc/). Adapter sequences were trimmed with BBDuk of the BBTools software suite (v 38.32, sourceforge.net/projects/bbmap/). Sequences were then assembled by RNA-Bloom (ver 0.9.8) for each individual time point. TransDecoder (version 5.4.0, https://transdecoder.github.io/) was used to predicted peptides for each assembly. In the end, predicted peptides for each timepoint were then amalgamated and clustered at 96% identity using CD-Hit (version 4.6.8) resulting in 40,565 contigs with average length of 331 aa.

Generation of Transcript Abundance and Heatmap

Transcript expression data in counts per million (CPM) were extracted from the transcriptome assembly using the voom/limma package in R with quantification results from Salmon (v 0.11.3) with numBootStrap=100 (Law et al., 2014; Patro et al., 2017). Contigs with less than 100 counts per million (CPM) were discarded. The heat map was generated with the R package heatmaply.

Identification of Target UGTs

Putative montbretia UGT sequences were identified in the yC-time course (yC-TC) transcriptome assembly by BLASTP and reciprocal BLASTP search of the montbretia yC-TC translated protein database as described above in EXAMPLE 1 (see also Irmisch S, et al, (2018) Plant Cell 30: 1864-1886). 298 putative UGT sequences could be identified with 190 UGTs larger than 250 amino aids. UGTs were filtered based on their cpm values. Parameters for filtering of candidate UGTs were based on the recovery of known genes in MbA-$XR^2$ biosynthesis (>30 cpm for the June 10th time point and >5-fold higher expression June 10th compared to October). A heat map was constructed utilizing the remaining 19 UGTs (containing UGT77B2, UGT709G2 and UGT703E1) and CcAT1 and CcAT2. A list of target UGTs was compiled based on clustering of candidates with characterized genes in MbA biosynthesis.

UGT cDNA Cloning and Heterologous Expression in *E. coli*

Target UGTs were amplified from cDNA prepared from yC of the Jun. 10, 2016 time point and cloned into the pJET1.2/blunt vector (ThermoFisher Scientific) for sequencing. Complete open reading frames of the target UGTs were cloned as BsaI fragments into the pASK-IBA37 vector (IBA-GmbH, Gottingen, Germany). The *E. coli* TOP10 strain (Invitrogen) was used for heterologous UGT expression. Cultures were grown at 21° C., induced at an OD600=0.5 with 200 μg/L anhydrotetracycline (Sigma-Aldrich, Germany) and then placed at 18° C. and grown for another 20 h. Cells were collected by centrifugation and disrupted by five freeze and thaw cycles in chilled extraction buffer [50 mM Tris-HCl, pH 7.5, 10 mM MgCl2, 5 mM dithiothreitol, 10% (v/v) glycerol, 1× Pierce™ protease inhibitor (EDTA-free, ThermoFisher Scientific), 25 U Benzonase Nuclease (Merck, Germany), 0.2 mg×mL-1 lysozyme]. Cell fragments were removed by centrifugation at 14,000×g and the supernatant was desalted into assay buffer (10 mM Tris-HCl, pH=7.5, 1 mM dithiothreitol, 10% (v/v) glycerol) using Econopac 10DG columns (BioRad, Hercules, CA, USA). For protein purification using Ni-NTA, a modified extraction buffer was used [50 mM Tris-HCl, pH 7.5, 10 mM MgCl2, 5 mM dithiothreitol, 2% (v/v) glycerol, 150 mM NaCl2, 20 mM imidazole, 1× Pierce™ protease inhibitor (EDTA-free, ThermoFisher Scientific), 25 U Benzonase Nuclease (Merck, Germany), and 0.2 mg×mL-1 lysozyme] and the lysate was directly loaded onto a Ni-NTA agarose column (Qiagen, Hilden, Germany). Protein was eluted with elution buffer (10 mM Tris-HCl, pH=7.5, 500 mM imidazole, 1 mM dithiothreitol, 10% (v/v) glycerol) and desalted into assay buffer using Illustra NAP-5 Columns (GE Healthcare). Enzyme concentrations were determined using UV absorption at 280 nm. For all experiments the His•Tag® Antibody HRP Conjugate Kit (Novagene) was used to ensure successful heterologous enzyme expression.

Enzyme Assays with Recombinant UGTs

To test for UGT activity, initial enzyme assays were performed with 100 μL of the bacterial extract, 50 μM MbA-$XR^2$ and 1 mM UDP-Xyl or 50 μM MbA-$R^2$ and UDP-Rha in a Teflon-sealed, screw-capped 1 ml GC glass vial. Unless stated otherwise, assays were performed in assay buffer in a final volume of 100 μL and incubated at 25° C. Assays were incubated for 2 h, and stopped by placing on ice after the addition of an equal volume of MeOH. To characterize UGTs and determine enzyme parameters UGT4 and UGT5 were Ni-purified and incubated with different sugar donors and sugar acceptors. For sugar donor specificity 1.7 μg of UGT4 or 4 μg of UGT5 were incubated with 50 μM MbA-$XR^2$ or 50 μM MbA-R2, respectively and 1 mM of either UDP-Glc, UDP-Rha or UDP-Xyl in a final volume of 50 μL for 40 min. Sugar acceptor specificity was tested using 1.7 μg of UGT4 or 4 μg of UGT5, 1 mM UDP-Xyl or UDP-Rha, respectively and 50 μM of the different substrates and incubated for 1.5 h.

LC-MS Analysis

LC was performed on an Agilent 1100 HPLC (Agilent Technologies GmbH, Waldbronn, Germany) with Agilent ZORBAX SB-C18 column (50×4.6 mm, 1.8 μm particle size) (Merck, Darmstadt, 370 Germany) using aqueous formic acid (0.2% v/v) (mobile phase A) and acetonitrile plus formic acid (0.2% v/v) (mobile phases B). Different methods were established to yield peak separation. Method A: elution profile was: 0-0.2 min, 95% A; 0.2-1 min, 5-17% B in A; 1-8 min, 17-20% B in A; 8-9 min 20-90% B in A; 9-10 min 90% B in A and 10.1-11 min 95% A. The flow rate was 1 mL×min-1 at a column temperature of 45° C. Method B: elution profile was: 0-0.2 min, 90% A; 0.2-1 min, 10-17% B in A; 1-8 min, 17-20% B in A; 8-9 min 20-90% B in A; 9-10 min 90% B in A and 10.1-11 min 95% A. The flow rate was 1 mL×min-1 at a column temperature of 30° C. Method C: elution profile: 0-7 min, 95% A; 7-9 min, 5-15% B in A; 9-20 min, 15-18% B in A; 20-25 min 18-90% B in A; 25-27 min 90% B in A and 27.1-30 min 95% A. The flow rate was 1 mL×min-1 at a column temperature of 40° C. LC was coupled to an Agilent MSD Trap XCT-Plus mass spectrometer equipped with an electro-spray operated in negative ionization mode (capillary voltage, 4000 eV; temp, 350° C.; nebulizing gas, 60 psi; dry gas 12 L/min) and an Agilent 1100 Diode Array Detector (DAD, detection 200-700 nm, J&M Analytik AG, Aalen, Germany). MSn was conducted to analyse fragmentation patterns for compound identification. The LC/MSD Trap Software 5.2 (Bruker Daltonik, GmbH) was used for data acquisition and processing. Enzyme products were quantified using an external MbA standard curve. Compounds were tentatively identified using their molecular masses and specific fragmentation patterns. Authentic standards were available for mini-MbA, MbA-$XR^2$, MbA-R and MbA (Williams, L. K., et al. (2015). Nat. Chem. Biol. 11, 691-696, incorporated herein by reference in its entirety).

Accurate mass measurement was performed on an Agilent 1290 Infinity UHPLC (Agilent Technologies GmbH, Waldbronn, Germany) utilizing the same column, mobile phase and method C as described. The LC was coupled to an Agilent 6530 Accurate Mass Q-ToF mass spectrometer equipped with an electrospray ion source operated in negative ionization mode (capillary voltage, 4000 eV; temp, 350° C.; nebulizing gas, 60 psi; dry gas 12 L/min) and an Agilent 1290 Diode Array Detector (DAD, detection 190-400 nm, J&M Analytik AG, Aalen, Germany). Accurate mass MS/MS experiment was conducted to analyse fragmentation patterns for compound identification. Hexakis(1H, 1H, 3H tetrafluoropropoxy)phosphazine/Purine/Ammonium Trifluoroacetate mixture was used as API-ToF Reference Mass solution. The Mass Hunter Workstation Software, version B.07.00, 2015 (Agilent Technologies) was used for data acquisition and processing.

Reverse Transcription and qRT-PCR

RNA was extracted and cDNA synthesis done as described above in EXAMPLE 1 (see also Irmisch S, et al, (2018) Plant Cell 30: 1864-1886). For qRT-PCR the cDNA was diluted 1:5 with water. For the amplification of CcUGT4 (UGT703H1) and CcUGT5 (UGT729A2) gene fragments, primer pairs were designed generally accordingly to parameters as described above. Primer specificity was confirmed by agarose gel electrophoresis, melting curve analysis, standard curve analysis and by sequence verification of cloned PCR products. qRT-PCR reactions were performed in duplicate on a Bio-Rad CFX96™ instrument (Bio-Rad Laboratory, Hercules, CA, USA) in optical 96-well plates using SsoFast™ EvaGreen® Supermix (BioRad) with the following PCR conditions: Initial incubation at 95° C. for 30 sec followed by 40 cycles of amplification (95° C. for 5 sec, 60° C. for 10 sec). qRT-PCR analyses were performed with three biological replicates for each of the 6 different time points of yC and oC collections in 2016 (June 10th, June 27th, July 22nd, August 16th, September 12th, October 6th see EXAMPLE 1 and Irmisch S, et al, (2018) Plant Cell 30: 1864-1886). Serin-incorperator (MEP) and zinc-finger protein (ZF) were used as reference genes as described above in EXAMPLE 1 (see also Irmisch S, et al, (2018) Plant Cell 30: 1864-1886).

While illustrative embodiments of the present invention have been shown and described herein, it will be appreciated by those skilled in the art that such embodiments are provided by way of example only. Various changes and substitutions can be made therein without departing from the spirit and scope of the invention. It should be understood that various alternatives to the embodiments of the invention described herein may be employed in practicing the invention.

The invention claimed is:

1. A transgenic organism comprising at least one heterologous nucleic acid operatively linked to a promoter, wherein the heterologous nucleic acid encodes at least one enzyme in a montbretin A (MbA) metabolic pathway;

wherein the transgenic organism produces montbretin A (MbA) and/or at least one precursor thereof, wherein the MbA precursor is selected from naringenin, dihydrokaempferol (DHK), kaempferol, eriodictyol, dihydroquercetin (DHQ), quercetin, pentahydroxyflavanon (PHF), dihydromyricetin (DHM), myricetin, myricetin 3-O-rhamnoside (MR), myricetin 3-O-glycosyl rhamnoside (MRG), myricetin 3-O-(6' O-caffeoyl)-glucosyl rhamnoside (mini MbA), myricetin 3-O-(glucosyl-6'-O-caffeoyl)-glucosyl rhamnoside (MbA-$XR^2$), and myricetin 3-O-(glucosyl-6'-O-caffeoyl)-glucosyl rhamnoside 4'-O-xyloside (MbA-$R^2$);

wherein the at least one enzyme in the MbA metabolic pathway is selected from a flavanone hydroxylase (F3H), flavonol synthase (FLS), a flavonoid 3'-hydroxylase (F3'H), a flavonoid 3'5'-hydroxylase (F3'5'H), a UDP sugar dependent glycosyltransferase (UGT), and a BAHD-acyltransferase (BAHD-AT); or wherein the transgenic organism comprises a plurality of heterologous nucleic acids operatively linked to one or more promoters, wherein each of the plurality of heterologous nucleic acids encodes at least one enzyme in a MbA metabolic pathway independently selected from a F3'H, FLS, F3'H, a F3'5'H, a UGT, and a BAHD-AT in any combination; and wherein the at least one enzyme comprises one of the following:

a F3H, wherein the F3H has an amino acid sequence with at least 85% identity to the amino acid sequence set forth in SEQ ID NO:2 or SEQ ID NO:4;

a FLS, wherein the FLS has an amino acid sequence with at least 85% identity to the amino acid sequence set forth in SEQ ID NO:6;

a F3'H, wherein the F3'H has an amino acid sequence with at least 85% identity to the amino acid sequence set forth in SEQ ID NO:8;

a F3'5'H, wherein the F3'5'H has an amino acid sequence with at least 85% identity to the amino acid sequence set forth in SEQ ID NO:10;

a BAHD-AT, wherein the BAHD-AT has an amino acid sequence with at least 85% identity to the amino acid sequence set forth in SEQ ID NO: 16 or SEQ ID NO: 18;

a UGT, wherein the UGT has an amino acid sequence with at least 85% identity to the amino acid sequence set forth in SEQ ID NO:12 or SEQ ID NO:14 or SEQ ID NO:20 or SEQ ID NO: 22 or SEQ ID NO:24.

2. The transgenic organism of claim 1, wherein the transgenic organism is a plant, plant part, plant cell or a microorganism.

3. The transgenic organism of claim 1, wherein the transgenic organism is a plant, plant part, or plant cell that produces an elevated amount of MbA and/or at least one precursor thereof compared to a plant, plant part, or plant cell of the same species under equivalent conditions but that does not comprise the heterologous nucleic acid.

4. The transgenic organism of claim 1, wherein the heterologous nucleic acid encoding the at least one enzyme is from a montbretia (*Crocosmia*) plant.

5. The transgenic organism of claim 1, wherein the at least one enzyme comprises one of the following:

a F3H, wherein the F3H is selected from CcF3H1 from a montbretia (*Crocosmia* x *crocosmiiflora*) plant, CcF3H2 from a montbretia (*Crocosmia* x *crocosmiiflora*) plant, or a homolog thereof;

a FLS, wherein the FLS is CcFLS from a montbretia (*Crocosmia* x *crocosmiiflora*) plant, or a homolog thereof;

a F3'H, wherein the F3'H is CcYP1 from a montbretia (*Crocosmia* x *crocosmiiflora*) plant, or a homolog thereof;

a F3'5'H, wherein the F3'5'H is CcYP2 from a montbretia (*Crocosmia* x *crocosmiiflora*) plant, or a homolog thereof;

a UGT, wherein the UGT is CcUGT1 from a montbretia (*Crocosmia* x *crocosmiiflora*) plant, or a homolog thereof;

a UGT, wherein the UGT is CcUGT2 from a montbretia (*Crocosmia* x *crocosmiiflora*) plant, or a homolog thereof;

a BAHD-AT, wherein the BAHD-AT is selected from CcAT1 from a montbretia (*Crocosmia* x *crocosmiiflora*) plant, CcAT2 derived from a montbretia (*Crocosmia* x *crocosmiiflora*) plant, or a homolog thereof;

a UGT, wherein the UGT is CcUGT3 from a montbretia (*Crocosmia* x *crocosmiiflora*) plant, or a homolog thereof;

a UGT, wherein the UGT is CcUGT4 from a montbretia (*Crocosmia* x *crocosmiiflora*) plant, or a homolog thereof;

and a UGT, wherein the UGT is CcUGT5 from a montbretia (*Crocosmia* x *crocosmiiflora*) plant, or a homolog thereof.

6. The transgenic organism of claim 2, wherein the plant, plant part, or plant cell is in the genus *Nicotiana*.

7. The transgenic organism of claim 2, wherein the plant, plant part, or plant cell is *Nicotiana benthamiana* or wherein the microorganism is a yeast.

8. A method for producing at least one montbretin A (MbA) precursor, comprising permitting the expression of the at least one heterologous nucleic acid in the transgenic organism of claim 1.

9. The method of claim 8, further comprising providing the transgenic organism with a sufficient source of myricetin.

10. The method of claim 8, further extracting the at least one MbA precursor from the transgenic organism.

11. The method of claim 8, wherein the transgenic organism produces MbA from the at least one precursor.

12. The method of claim 11, wherein the transgenic organism comprises a plurality of heterologous nucleic acids operatively linked to one or more promoters, wherein each of the plurality of heterologous nucleic acids encodes a different enzyme in the montbretin A (MbA) metabolic pathway, wherein the different enzymes are selected from a flavanone hydroxylase (F3H), flavonol synthase (FLS), a flavonoid 3'-hydroxylase (F3'H), a flavonoid 3'5'-hydroxylase (F3'5'H), and a UDP-sugar dependent glycosyltransferase (UGT), and a BAHD-acyltransferase (BAHD-AT) in any combination.

13. The method of claim 11, further extracting the MbA from the transgenic organism.

* * * * *

SEQUENCE LISTING

```
<160> NUMBER OF SEQ ID NOS: 94

<210> SEQ ID NO 1
<211> LENGTH: 1119
<212> TYPE: DNA
<213> ORGANISM: Crocosmia x crocosmiiflora

<400> SEQUENCE: 1

atggcgccgg gtgcaactgc gactccattc cttcccaccg tctcgaacga gacgactctg     60

agagagtctt tcgttcgcga cgaggacgag aggccgaagg tggcctacaa cgtcttcagc    120

agcgagatac ccgtgatctc actcgagggc atcgatgaga tcgagggccg gagggtggag    180

atatgcaaga agatcgttgc ggcgtgcgag gactggggcg tcttccaggt tgtcgatcat    240

ggggttgatg ccggggtgat tgctgacatg acgaggcttg ccagggagtt cttctcgctg    300

ccgccggagg acaagctgag gttcgacatg tccgggggaa agaagggagg gttcatcgtc    360

tccagtcacc ttcagggaga agcagtgcaa gactggaggg agattgtgac atacttctca    420

tatccaatta gggccagaga ctactcgagg tggcccgaca agccggagga ctggaggtcc    480

gtcaccgaga agtatagtga aacgctgatg gagttagcct gcaagctctt gggggtcctc    540

tccgaagcga tgggtcttga tactgaggct ataaccaagg cctgcatcga catggaccag    600

aaggtggtgg tcaacttcta ccccaaatgc ccccaacctg acctcaccct cggcctcaag    660

cgccacactg accccggcac catcaccctt ctgcttcaag accaggttgg tggcctccag    720

gccaccaagg atggtggcaa gacttggatc accgttcaac ccgtcgaagg cgcattcgtt    780

gtcaacctcg gagatcatgg tcatttcttg agcaatggcc ggtttaagaa tgctgaccat    840

caggcggtcg tgaactcgaa cactagtcgt ctatcgatcg cgactttcca aaacccagca    900

ccagatgcaa tcgtgtaccc tctggcgatc agggagggcg agaagccagt gttggatgag    960

cccatcacat tcgctgagat gtaccgaagg aagatgagtc gtgatcttga gctggccaag   1020

atcaagaaac tggcaaaggt ggagaaccaa gaagtgctgg agaagaccaa ggtggaagct   1080

gtagcccaac ccaaaggcct cggtgaaatt ttggcttaa                          1119

<210> SEQ ID NO 2
<211> LENGTH: 372
<212> TYPE: PRT
<213> ORGANISM: Crocosmia x crocosmiiflora

<400> SEQUENCE: 2

Met Ala Pro Gly Ala Thr Ala Thr Pro Phe Leu Pro Thr Val Ser Asn
1               5                   10                  15

Glu Thr Thr Leu Arg Glu Ser Phe Val Arg Asp Glu Asp Glu Arg Pro
            20                  25                  30
```

-continued

```
Lys Val Ala Tyr Asn Val Phe Ser Ser Glu Ile Pro Val Ile Ser Leu
        35                  40                  45

Glu Gly Ile Asp Glu Ile Glu Gly Arg Arg Val Glu Ile Cys Lys Lys
    50                  55                  60

Ile Val Ala Ala Cys Glu Asp Trp Gly Val Phe Gln Val Val Asp His
65                  70                  75                  80

Gly Val Asp Ala Gly Val Ile Ala Asp Met Thr Arg Leu Ala Arg Glu
                85                  90                  95

Phe Phe Ser Leu Pro Pro Glu Asp Lys Leu Arg Phe Asp Met Ser Gly
            100                 105                 110

Gly Lys Lys Gly Gly Phe Ile Val Ser Ser His Leu Gln Gly Glu Ala
        115                 120                 125

Val Gln Asp Trp Arg Glu Ile Val Thr Tyr Phe Ser Tyr Pro Ile Arg
    130                 135                 140

Ala Arg Asp Tyr Ser Arg Trp Pro Asp Lys Pro Glu Asp Trp Arg Ser
145                 150                 155                 160

Val Thr Glu Lys Tyr Ser Glu Thr Leu Met Glu Leu Ala Cys Lys Leu
                165                 170                 175

Leu Gly Val Leu Ser Glu Ala Met Gly Leu Asp Thr Glu Ala Ile Thr
            180                 185                 190

Lys Ala Cys Ile Asp Met Asp Gln Lys Val Val Val Asn Phe Tyr Pro
        195                 200                 205

Lys Cys Pro Gln Pro Asp Leu Thr Leu Gly Leu Lys Arg His Thr Asp
    210                 215                 220

Pro Gly Thr Ile Thr Leu Leu Leu Gln Asp Gln Val Gly Gly Leu Gln
225                 230                 235                 240

Ala Thr Lys Asp Gly Gly Lys Thr Trp Ile Thr Val Gln Pro Val Glu
                245                 250                 255

Gly Ala Phe Val Val Asn Leu Gly Asp His Gly His Phe Leu Ser Asn
            260                 265                 270

Gly Arg Phe Lys Asn Ala Asp His Gln Ala Val Val Asn Ser Asn Thr
        275                 280                 285

Ser Arg Leu Ser Ile Ala Thr Phe Gln Asn Pro Ala Pro Asp Ala Ile
    290                 295                 300

Val Tyr Pro Leu Ala Ile Arg Glu Gly Glu Lys Pro Val Leu Asp Glu
305                 310                 315                 320

Pro Ile Thr Phe Ala Glu Met Tyr Arg Arg Lys Met Ser Arg Asp Leu
                325                 330                 335

Glu Leu Ala Lys Ile Lys Lys Leu Ala Lys Val Glu Asn Gln Glu Val
            340                 345                 350

Leu Glu Lys Thr Lys Val Glu Ala Val Ala Gln Pro Lys Gly Leu Gly
        355                 360                 365

Glu Ile Leu Ala
    370
```

<210> SEQ ID NO 3
<211> LENGTH: 1119
<212> TYPE: DNA
<213> ORGANISM: Crocosmia x crocosmiiflora

<400> SEQUENCE: 3

```
atggcgccgg ttgcgactgc aacgccgttc cttcccacca tctccaacga gacgacgctt      60

aggcagacat tcgtccgcga cgaggacgag aggccgaagg tggcctacaa cgtcttcagc     120

agcgagatac ccgtgatttc gttggagggc atcgatgagg tcgatggacg gagagcggag     180
```

```
atatgcaaga agatcgttgc agcttgcgag gactggggcg tgttccaggt tgtcgatcat    240

ggtgtcgatg ccgggctgat ttccgacatg acgaggctgg ccagggagtt cttcgccctg    300

ccgccggagg acaagttgag gttcgacatg accgggggga agaagggagg gttcattgtc    360

tccagccacc tccagggcga agcagtgcaa gactggaggg agatcgtgac atacttctca    420

tacccaatta gggccagaga ctactcgagg tggcctgaca agcctgagga ctggaggtcc    480

gtaacgaaga catacagcga aaagctgatg gagttggcct gcaagctatt ggggatcctc    540

tccgaagcga tgggccttga tacggaggct ctaaccaagg cctgcgtcga catggatcag    600

aaggtggtgg tcaacttcta ccccaaatgt ccccaacctg acctcaccct cggactcaag    660

cgtcacaccg accccggcac cattaccctt ctgctccaag atcaggttgg tggcctccag    720

gccaccaagg atggtggcaa gacttggatc actgttcaac cagtcgaagg cgcattcgtc    780

gttaacctcg gagaccatgg ccatttcttg agcaatggcc gcttcaagaa tgctgaccat    840

caggcggtcg tgaactcaaa cactagtcgc ctatcgattg cgactttcca gaacccagcc    900

ccagatgcga tcgtgtaccc gttggcgatc agggaggggg agaagccagt gttggatgag    960

cccatcacgt ttgctgagat gtaccggagg aaaatgagtc gtgatcttga gctggccaat   1020

ctcaagaagc tagccaagac ggagaaccaa caagtggcag agaaggccga ggtggaggct   1080

gtagtccaac ccaaaggcct gagtgaaatc cttgcttga                          1119
```

<210> SEQ ID NO 4
<211> LENGTH: 372
<212> TYPE: PRT
<213> ORGANISM: Crocosmia x crocosmiiflora

<400> SEQUENCE: 4

```
Met Ala Pro Val Ala Thr Ala Thr Pro Phe Leu Pro Thr Ile Ser Asn
1               5                   10                  15

Glu Thr Thr Leu Arg Gln Thr Phe Val Arg Asp Glu Asp Glu Arg Pro
            20                  25                  30

Lys Val Ala Tyr Asn Val Phe Ser Ser Glu Ile Pro Val Ile Ser Leu
        35                  40                  45

Glu Gly Ile Asp Glu Val Asp Gly Arg Arg Ala Glu Ile Cys Lys Lys
    50                  55                  60

Ile Val Ala Ala Cys Glu Asp Trp Gly Val Phe Gln Val Val Asp His
65                  70                  75                  80

Gly Val Asp Ala Gly Leu Ile Ser Asp Met Thr Arg Leu Ala Arg Glu
                85                  90                  95

Phe Phe Ala Leu Pro Pro Glu Asp Lys Leu Arg Phe Asp Met Thr Gly
            100                 105                 110

Gly Lys Lys Gly Gly Phe Ile Val Ser Ser His Leu Gln Gly Glu Ala
        115                 120                 125

Val Gln Asp Trp Arg Glu Ile Val Thr Tyr Phe Ser Tyr Pro Ile Arg
    130                 135                 140

Ala Arg Asp Tyr Ser Arg Trp Pro Asp Lys Pro Glu Asp Trp Arg Ser
145                 150                 155                 160

Val Thr Lys Thr Tyr Ser Glu Lys Leu Met Glu Leu Ala Cys Lys Leu
                165                 170                 175

Leu Gly Ile Leu Ser Glu Ala Met Gly Leu Asp Thr Glu Ala Leu Thr
            180                 185                 190

Lys Ala Cys Val Asp Met Asp Gln Lys Val Val Val Asn Phe Tyr Pro
        195                 200                 205
```

```
Lys Cys Pro Gln Pro Asp Leu Thr Leu Gly Leu Lys Arg His Thr Asp
    210                 215                 220

Pro Gly Thr Ile Thr Leu Leu Leu Gln Asp Gln Val Gly Gly Leu Gln
225                 230                 235                 240

Ala Thr Lys Asp Gly Gly Lys Thr Trp Ile Thr Val Gln Pro Val Glu
                245                 250                 255

Gly Ala Phe Val Val Asn Leu Gly Asp His Gly His Phe Leu Ser Asn
            260                 265                 270

Gly Arg Phe Lys Asn Ala Asp His Gln Ala Val Val Asn Ser Asn Thr
        275                 280                 285

Ser Arg Leu Ser Ile Ala Thr Phe Gln Asn Pro Ala Pro Asp Ala Ile
    290                 295                 300

Val Tyr Pro Leu Ala Ile Arg Glu Gly Glu Lys Pro Val Leu Asp Glu
305                 310                 315                 320

Pro Ile Thr Phe Ala Glu Met Tyr Arg Arg Lys Met Ser Arg Asp Leu
                325                 330                 335

Glu Leu Ala Asn Leu Lys Lys Leu Ala Lys Thr Glu Asn Gln Gln Val
            340                 345                 350

Ala Glu Lys Ala Glu Val Glu Ala Val Val Gln Pro Lys Gly Leu Ser
        355                 360                 365

Glu Ile Leu Ala
    370
```

<210> SEQ ID NO 5
<211> LENGTH: 996
<212> TYPE: DNA
<213> ORGANISM: Crocosmia x crocosmiiflora

<400> SEQUENCE: 5

```
atggaggtgg agagagttca agcaattgca tccctaggcc agaaactcga caccataccc     60

tccgaattca tccgttccga gcacgagcag cccgggaaga cgacgttcga tgggcccatc    120

ccggagattc ccgtgatcga tctcggcgac aaggatggca ttgtcggggc ggtagcggag    180

gcagcgaggg agtggggtct gttccagata atcaaccacg gcatccccgt ggaggttata    240

aaggaactgc agagagttgg gaaggagttc ttcgagctgc cacaggagga gaaggaggtc    300

tatgctatgg acatggtgac catggagggg tatggcacta agctgcagaa ggagacagaa    360

gggaaaaagg cctgggtcga ccatctcttc cataacatat ggccggagtc caggattaac    420

tacaacttct ggcctcaaaa tcctcctgac tataggaagg ccaacaagga atatgctaag    480

catctgttgg aagtgatggg tgaaatactt acaagcttgt cgctggggct aggactggag    540

ggtcatgtct tcaaggaagc actcggtggc gacgcaatcg aactgctgct caagatcaac    600

tactacccaa cttgcccacg accggatcta gcgttgggtg tcccggccca caccgacatg    660

tccgccataa cccttctcgt accaaatgaa gtccctggct tgcaggtctt caaggacgat    720

cactggttcg atgcgaagta catccccaac gccatcatcg tccacattgg tgatcagatt    780

gagatattga gcaatggcaa gtacaagagc gtgctgcaca ggacaaccgt caacaaggag    840

aaggtgcgga tgtcgtggcc ggttttctgc tcgccgcccg gggagtggat ggttggtaca    900

ttgccgcaac ttgttagtga agacacccct gccaagtaca agactaagaa gtacaaggac    960

taccagtatt gcaaacttaa caagcttccc cagtga                              996
```

<210> SEQ ID NO 6
<211> LENGTH: 331

<212> TYPE: PRT
<213> ORGANISM: Crocosmia x crocosmiiflora

<400> SEQUENCE: 6

```
Met Glu Val Glu Arg Val Gln Ala Ile Ala Ser Leu Gly Gln Lys Leu
1               5                   10                  15

Asp Thr Ile Pro Ser Glu Phe Ile Arg Ser Glu His Glu Gln Pro Gly
            20                  25                  30

Lys Thr Thr Phe Asp Gly Pro Ile Pro Glu Ile Pro Val Ile Asp Leu
        35                  40                  45

Gly Asp Lys Asp Gly Ile Val Gly Ala Val Ala Glu Ala Ala Arg Glu
    50                  55                  60

Trp Gly Leu Phe Gln Ile Ile Asn His Gly Ile Pro Val Glu Val Ile
65                  70                  75                  80

Lys Glu Leu Gln Arg Val Gly Lys Glu Phe Phe Glu Leu Pro Gln Glu
                85                  90                  95

Glu Lys Glu Val Tyr Ala Met Asp Met Val Thr Met Glu Gly Tyr Gly
            100                 105                 110

Thr Lys Leu Gln Lys Glu Thr Glu Gly Lys Lys Ala Trp Val Asp His
        115                 120                 125

Leu Phe His Asn Ile Trp Pro Glu Ser Arg Ile Asn Tyr Asn Phe Trp
    130                 135                 140

Pro Gln Asn Pro Pro Asp Tyr Arg Lys Ala Asn Lys Glu Tyr Ala Lys
145                 150                 155                 160

His Leu Leu Glu Val Met Gly Glu Ile Leu Thr Ser Leu Ser Leu Gly
                165                 170                 175

Leu Gly Leu Glu Gly His Val Phe Lys Glu Ala Leu Gly Gly Asp Ala
            180                 185                 190

Ile Glu Leu Leu Leu Lys Ile Asn Tyr Tyr Pro Thr Cys Pro Arg Pro
        195                 200                 205

Asp Leu Ala Leu Gly Val Pro Ala His Thr Asp Met Ser Ala Ile Thr
    210                 215                 220

Leu Leu Val Pro Asn Glu Val Pro Gly Leu Gln Val Phe Lys Asp Asp
225                 230                 235                 240

His Trp Phe Asp Ala Lys Tyr Ile Pro Asn Ala Ile Ile Val His Ile
                245                 250                 255

Gly Asp Gln Ile Glu Ile Leu Ser Asn Gly Lys Tyr Lys Ser Val Leu
            260                 265                 270

His Arg Thr Thr Val Asn Lys Glu Lys Val Arg Met Ser Trp Pro Val
        275                 280                 285

Phe Cys Ser Pro Pro Gly Glu Trp Met Val Gly Thr Leu Pro Gln Leu
    290                 295                 300

Val Ser Glu Asp Thr Pro Ala Lys Tyr Lys Thr Lys Lys Tyr Lys Asp
305                 310                 315                 320

Tyr Gln Tyr Cys Lys Leu Asn Lys Leu Pro Gln
                325                 330
```

<210> SEQ ID NO 7
<211> LENGTH: 1527
<212> TYPE: DNA
<213> ORGANISM: Crocosmia x crocosmiiflora

<400> SEQUENCE: 7

```
atgcttacct tcttcttcct ctggatttct actcttctgc tctcctcttt catcgtctac      60

cttctgtata ggaggcgcag tgctcaatgc cctccgcttc cgccagggcc gaacggctgg     120
```

-continued

```
ccgatcctcg gcaacctgcc gcagctaggc gcgaagcctc accagactct ggatgccttg    180

tctaagcaat acggcccgct cttccgcctc cggctcggtt ccgtcaacgt cgtcgtcgcc    240

tcatcttctg cggtcgccgc acagtttctt cgcacccacg acgtaaactt cagcaaccgg    300

cccccaaact ccggagcgga gcatgtagcc tacaactacc aggacttggt gttcgccccc    360

tacggtccca ggtggcggat gctgaggaag ctttgctcag tccacctctt ctccctcaag    420

gccctagacg acctccgacc ggttcgacaa ggtgaagtag catgccttgt gaggaacctc    480

cgtcggcatg ccgacactgg tgttctcgtc aatttgggca aggccctgaa tgtctgcgct    540

acgaacgcac tggcaagagc aatgcttggg cggagagtgt ttgccgacga agatgcacaa    600

ctagcggagg cagacgagtt caaggagatg gtcgtggagc tgatgaggct ggccggggtg    660

ttcaacgtgg gtgacttcgt gcctgggcta gggtggctgg atttgcaagg tgtggtgggg    720

aagatgaaga ggctgcatag aaggtatgac gcgttcctcg atagggttat cgaggagaac    780

caggcgaatg cgaagagcgg cgatttgctg agcgtgttga tcagattgaa ggaggctgat    840

gcagagggag aaatcaaact caacaacact gatattaagg cattgctcct gaacttgttc    900

actgcaggga ctgacacctc ttcaagcaca gtagagtggg tcttagcaga gctgattcgc    960

caccctgaca ttctacaaaa gacccaacat gaacttgact cggtcatcgg ccgagaccgt   1020

ctcgtcgccg aatcagacct cccgaacctc ccctacctcc aagccgttgt caaggagacc   1080

ttccgcctcc acccgtcgac gccactctcg ctcccccgaa tggcctcaga ggaatgcatc   1140

gtcaacgggt acaaaatacc gaagcacgcg acgttactgg tgaacgtgtg gtccattggg   1200

cgtgatgcag cagtgtggaa cgacccgctt gagttccgac cgtcacggtt cctccccgga   1260

ggggagcgag agcatgtgga cgtcaagggc aatgattttg aagtcatacc gtttggggcg   1320

ggaaggagga tttgcgcggg attgagcttg ggccttagga tggtccagtt catgactgcg   1380

acgatagtgc atgcatatga ttggtcacta cccaaaggcc aagaatgtca aaaactggac   1440

atggaagagg catatggatt gacattgcaa agggcagttc ctctgatggt tcaaccaatc   1500

cctcggctat cgcataaggc ttattaa                                       1527


<210> SEQ ID NO 8
<211> LENGTH: 508
<212> TYPE: PRT
<213> ORGANISM: Crocosmia x crocosmiiflora

<400> SEQUENCE: 8

Met Leu Thr Phe Phe Phe Leu Trp Ile Ser Thr Leu Leu Leu Ser Ser
1               5                   10                  15

Phe Ile Val Tyr Leu Leu Tyr Arg Arg Arg Ser Ala Gln Cys Pro Pro
            20                  25                  30

Leu Pro Pro Gly Pro Asn Gly Trp Pro Ile Leu Gly Asn Leu Pro Gln
        35                  40                  45

Leu Gly Ala Lys Pro His Gln Thr Leu Asp Ala Leu Ser Lys Gln Tyr
    50                  55                  60

Gly Pro Leu Phe Arg Leu Arg Leu Gly Ser Val Asn Val Val Val Ala
65                  70                  75                  80

Ser Ser Ser Ala Val Ala Ala Gln Phe Leu Arg Thr His Asp Val Asn
                85                  90                  95

Phe Ser Asn Arg Pro Pro Asn Ser Gly Ala Glu His Val Ala Tyr Asn
            100                 105                 110

Tyr Gln Asp Leu Val Phe Ala Pro Tyr Gly Pro Arg Trp Arg Met Leu
```

```
        115                 120                 125

Arg Lys Leu Cys Ser Val His Leu Phe Ser Leu Lys Ala Leu Asp Asp
    130                 135                 140

Leu Arg Pro Val Arg Gln Gly Glu Val Ala Cys Leu Val Arg Asn Leu
145                 150                 155                 160

Arg Arg His Ala Asp Thr Gly Val Leu Val Asn Leu Gly Lys Ala Leu
                165                 170                 175

Asn Val Cys Ala Thr Asn Ala Leu Ala Arg Ala Met Leu Gly Arg Arg
            180                 185                 190

Val Phe Ala Asp Glu Asp Ala Gln Leu Ala Glu Ala Asp Glu Phe Lys
        195                 200                 205

Glu Met Val Val Glu Leu Met Arg Leu Ala Gly Val Phe Asn Val Gly
    210                 215                 220

Asp Phe Val Pro Gly Leu Gly Trp Leu Asp Leu Gln Gly Val Val Gly
225                 230                 235                 240

Lys Met Lys Arg Leu His Arg Arg Tyr Asp Ala Phe Leu Asp Arg Val
                245                 250                 255

Ile Glu Glu Asn Gln Ala Asn Ala Lys Ser Gly Asp Leu Leu Ser Val
            260                 265                 270

Leu Ile Arg Leu Lys Glu Ala Asp Ala Glu Gly Glu Ile Lys Leu Asn
        275                 280                 285

Asn Thr Asp Ile Lys Ala Leu Leu Leu Asn Leu Phe Thr Ala Gly Thr
    290                 295                 300

Asp Thr Ser Ser Ser Thr Val Glu Trp Val Leu Ala Glu Leu Ile Arg
305                 310                 315                 320

His Pro Asp Ile Leu Gln Lys Thr Gln His Glu Leu Asp Ser Val Ile
                325                 330                 335

Gly Arg Asp Arg Leu Val Ala Glu Ser Asp Leu Pro Asn Leu Pro Tyr
            340                 345                 350

Leu Gln Ala Val Val Lys Glu Thr Phe Arg Leu His Pro Ser Thr Pro
        355                 360                 365

Leu Ser Leu Pro Arg Met Ala Ser Glu Glu Cys Ile Val Asn Gly Tyr
    370                 375                 380

Lys Ile Pro Lys His Ala Thr Leu Leu Val Asn Val Trp Ser Ile Gly
385                 390                 395                 400

Arg Asp Ala Ala Val Trp Asn Asp Pro Leu Glu Phe Arg Pro Ser Arg
                405                 410                 415

Phe Leu Pro Gly Gly Glu Arg Glu His Val Asp Val Lys Gly Asn Asp
            420                 425                 430

Phe Glu Val Ile Pro Phe Gly Ala Gly Arg Arg Ile Cys Ala Gly Leu
        435                 440                 445

Ser Leu Gly Leu Arg Met Val Gln Phe Met Thr Ala Thr Ile Val His
    450                 455                 460

Ala Tyr Asp Trp Ser Leu Pro Lys Gly Gln Glu Cys Gln Lys Leu Asp
465                 470                 475                 480

Met Glu Glu Ala Tyr Gly Leu Thr Leu Gln Arg Ala Val Pro Leu Met
                485                 490                 495

Val Gln Pro Ile Pro Arg Leu Ser His Lys Ala Tyr
            500                 505
```

```
<210> SEQ ID NO 9
<211> LENGTH: 1584
<212> TYPE: DNA
<213> ORGANISM: Crocosmia x crocosmiiflora
```

<400> SEQUENCE: 9
atgacaatga cttcccttga tattatcctc ttcatctctg ccattgtctt cctctctatc 60
tactactaca atctcttctc caatgcaaag agaagtaatg gcctaaaact tcctccgggg 120
ccgaagggat atcctgtcct aggcaatctc cctcagctcg gcgctaagcc gcaccaagct 180
ctgcaggcat tctccagagt ctacgggcct ctcatgcgtc tccgtcttgg ctctgtcgac 240
ctcgttgtcg cttcctcccc ttccgttgcc gcccaattcc tcaagaacga ctccaacttc 300
tgcgctcgtc ccccgaactc cggcgcggag cacatggctt ttaactatca tgatctcgtg 360
tttgccccct acggcccccg ctggcgactc ctccgtaagc tctctgccgt ccacctcctc 420
ggccccaagg ccctcgacga caaccagaac gtacgcgaag aggagcttgc ggtgcttgcg 480
cgaatgctgt acgagcgatc ccggggcggg gagccggtga atgtcgggaa ggagatgcac 540
gtgtgctcga cgaatgcgct ttcgagggcg atgatgggga ggagagtgtt tgagaagctg 600
gcagtggggg gagggggggt agaagaggag gaggagatga agaaggcgga ggagttcaag 660
gacatggtgg tggaggtgat gactctcgcc ggggttttca atatcgggga cttcgtgccg 720
tggctgaagc cgttcgacat tcaaggagtg gtgaggaaga tgaagagggt gcacagaagg 780
tacaatgtgt ttcttgataa gtttatcgca gaatgccggt cgtcggcgaa gccgggagcg 840
aacgacctgc tgagtgtgct cattgggcag agggggaagt cagatggcag tggaggcgag 900
atcactgata cggccatcaa ggcccttgtg ctgaacctgc tcacagccgg taccgacaca 960
tcgtcgagca cgatcgaatg ggccttgacc gaactcatcc gccacccgga catcctgaag 1020
aaggcccagc aggagatcga ctcggccgtt ggccgcgacc gcctcgtcac agagtctgac 1080
gtccccaagc tcccctacct acaagccata gtcaaggaga acttccgcat gcacccggca 1140
acacccctct ccctaccccg catgtcgata gaggagtgcg atatcggcgg ctaccacatc 1200
cccaagaaca gtaccctctt cgtcaacata tgggccatgg gacgtgaccc gtcgatctgg 1260
ccagacccga tggagttccg cccttcccgg ttcctcccgg gagggcaggg ggagcacctg 1320
gaggtcagag gcaaccactt tgaactaatg ccgttcggcg ccgggaggag gatctgcgct 1380
ggcactagca tgggcatacg ggtggtgcac tcgacggtgg cgacattgat ccatgcattc 1440
gactggaagt tgcctgaggg cctgacggcc gagaagatcg acatggagga ggccttcggc 1500
atatcccttc agaaggcaat tccgctgatg gctcacccaa tcccaaggtt ggctccaaag 1560
gcttattcgc ccaagatgaa atga 1584

<210> SEQ ID NO 10
<211> LENGTH: 527
<212> TYPE: PRT
<213> ORGANISM: Crocosmia x crocosmiiflora

<400> SEQUENCE: 10

Met Thr Met Thr Ser Leu Asp Ile Ile Leu Phe Ile Ser Ala Ile Val
1 5 10 15

Phe Leu Ser Ile Tyr Tyr Tyr Asn Leu Phe Ser Asn Ala Lys Arg Ser
20 25 30

Asn Gly Leu Lys Leu Pro Pro Gly Pro Lys Gly Tyr Pro Val Leu Gly
35 40 45

Asn Leu Pro Gln Leu Gly Ala Lys Pro His Gln Ala Leu Gln Ala Phe
50 55 60

Ser Arg Val Tyr Gly Pro Leu Met Arg Leu Arg Leu Gly Ser Val Asp
65 70 75 80

```
Leu Val Val Ala Ser Ser Pro Ser Val Ala Ala Gln Phe Leu Lys Asn
                85                  90                  95

Asp Ser Asn Phe Cys Ala Arg Pro Pro Asn Ser Gly Ala Glu His Met
            100                 105                 110

Ala Phe Asn Tyr His Asp Leu Val Phe Ala Pro Tyr Gly Pro Arg Trp
        115                 120                 125

Arg Leu Leu Arg Lys Leu Ser Ala Val His Leu Leu Gly Pro Lys Ala
    130                 135                 140

Leu Asp Asp Asn Gln Asn Val Arg Glu Glu Glu Leu Ala Val Leu Ala
145                 150                 155                 160

Arg Met Leu Tyr Glu Arg Ser Arg Gly Gly Glu Pro Val Asn Val Gly
                165                 170                 175

Lys Glu Met His Val Cys Ser Thr Asn Ala Leu Ser Arg Ala Met Met
            180                 185                 190

Gly Arg Arg Val Phe Glu Lys Leu Ala Val Gly Gly Gly Gly Val Glu
        195                 200                 205

Glu Glu Glu Glu Met Lys Lys Ala Glu Glu Phe Lys Asp Met Val Val
    210                 215                 220

Glu Val Met Thr Leu Ala Gly Val Phe Asn Ile Gly Asp Phe Val Pro
225                 230                 235                 240

Trp Leu Lys Pro Phe Asp Ile Gln Gly Val Val Arg Lys Met Lys Arg
                245                 250                 255

Val His Arg Arg Tyr Asn Val Phe Leu Asp Lys Phe Ile Ala Glu Cys
            260                 265                 270

Arg Ser Ser Ala Lys Pro Gly Ala Asn Asp Leu Leu Ser Val Leu Ile
        275                 280                 285

Gly Gln Arg Gly Lys Ser Asp Gly Ser Gly Gly Glu Ile Thr Asp Thr
    290                 295                 300

Ala Ile Lys Ala Leu Val Leu Asn Leu Leu Thr Ala Gly Thr Asp Thr
305                 310                 315                 320

Ser Ser Ser Thr Ile Glu Trp Ala Leu Thr Glu Leu Ile Arg His Pro
                325                 330                 335

Asp Ile Leu Lys Lys Ala Gln Gln Glu Ile Asp Ser Ala Val Gly Arg
            340                 345                 350

Asp Arg Leu Val Thr Glu Ser Asp Val Pro Lys Leu Pro Tyr Leu Gln
        355                 360                 365

Ala Ile Val Lys Glu Asn Phe Arg Met His Pro Ala Thr Pro Leu Ser
    370                 375                 380

Leu Pro Arg Met Ser Ile Glu Glu Cys Asp Ile Gly Gly Tyr His Ile
385                 390                 395                 400

Pro Lys Asn Ser Thr Leu Phe Val Asn Ile Trp Ala Met Gly Arg Asp
                405                 410                 415

Pro Ser Ile Trp Pro Asp Pro Met Glu Phe Arg Pro Ser Arg Phe Leu
            420                 425                 430

Pro Gly Gly Gln Gly Glu His Leu Glu Val Arg Gly Asn His Phe Glu
        435                 440                 445

Leu Met Pro Phe Gly Ala Gly Arg Arg Ile Cys Ala Gly Thr Ser Met
    450                 455                 460

Gly Ile Arg Val Val His Ser Thr Val Ala Thr Leu Ile His Ala Phe
465                 470                 475                 480

Asp Trp Lys Leu Pro Glu Gly Leu Thr Ala Glu Lys Ile Asp Met Glu
                485                 490                 495
```

-continued

```
Glu Ala Phe Gly Ile Ser Leu Gln Lys Ala Ile Pro Leu Met Ala His
            500                 505                 510

Pro Ile Pro Arg Leu Ala Pro Lys Ala Tyr Ser Pro Lys Met Lys
        515                 520                 525


<210> SEQ ID NO 11
<211> LENGTH: 1371
<212> TYPE: DNA
<213> ORGANISM: Crocosmia x crocosmiiflora

<400> SEQUENCE: 11

atggattcag ccagcaggca gcatgtcgcc ctcatcgcct tccccttcgc atcgcacccc      60

ggcaacctat tcgccttcgc acgcgccctt gccgctgccg ctcccgacat cacattctct     120

ttcctcacca ccaccttcgc agctgccacc ctccccccgg ccccgccggc ggcaaacctc     180

cgtctctgcc acgtggctga cggtgtgccg gagggggac tgccgccagg cacgacaatc     240

cacgggcgta tcgggatgtt cctcagggcg acgcccggga acttccggga tggggtgcgg     300

gcagcggagg aggaggtggg ggtgaaggtc agctgtgtgg tcagcgatgc gttcctctgg     360

atgacggctg atgttgcgga ggagatcggt gcgcagtggc tgccgctgtg gacgtgtgca     420

cctgccgcgc tgctggctca tgtgtcgacg gaccagctgc gggagaggtt cggagttgag     480

aagcaagcaa cggccggctg ggcagacgag ctcgtcgact tcatccccgg cctttcatgc     540

ctccgcattc gcgacattcc cgatgagatc gtaaccaact ggcactccga cctctccatc     600

ctcctccatc gcatggggaa ccagctcacg agtgcgaccg ccgtagccct caacaccttc     660

gacggcctcg acaccaccat cgatgctgcc ctcgcctccc tgttcaagaa gaccctcccc     720

atcggccccc tcaacctcct ctcctctccg ccgccacttc agcccgggga tgagaaatgc     780

ctgtcctggc tggacggtca ggaggacgcc acggtggcct acgtcagctt cggcacgatg     840

gtcctaatgc cgacgcagtc cgacgtgtcc gagattgccc agggcctcga gtcgagcggg     900

gtgcggttcc tgtggtccct aagggaggag gcgagggctg ggctgctccc tcccgggttc     960

ttggagagga cggcagggag gggactagtg gtgccgtggg ccccacaggt gagggtgcta    1020

gggcaccggg ctgtcggggc attcgtgacg cactgcgggt ggaatgcggt gatggagagc    1080

gtgacgagcg gggtgccgat ggcgtgcctg ccttcgttcg cagaccagaa gacgaatgcg    1140

aggatggtgt cggcggcgtg ggggatcggg gaggcgctcc gtggggagaa ggtgacgaag    1200

gaggaggtgg tgaggagcat ggagattgtt atgatggggg aggaagggag gaggatgagg    1260

gagaggatag gcaatcttag ggagaaggcg gcggaggcag tcgggccggg cgggagctcg    1320

tcggagaatt tcaagagtgt cttggagatg gtacgtggga ctgctaatta a             1371


<210> SEQ ID NO 12
<211> LENGTH: 456
<212> TYPE: PRT
<213> ORGANISM: Crocosmia x crocosmiiflora

<400> SEQUENCE: 12

Met Asp Ser Ala Ser Arg Gln His Val Ala Leu Ile Ala Phe Pro Phe
1               5                   10                  15

Ala Ser His Pro Gly Asn Leu Phe Ala Phe Ala Arg Ala Leu Ala Ala
            20                  25                  30

Ala Ala Pro Asp Ile Thr Phe Ser Phe Leu Thr Thr Thr Phe Ala Ala
        35                  40                  45

Ala Thr Leu Pro Pro Ala Pro Pro Ala Ala Asn Leu Arg Leu Cys His
    50                  55                  60
```

```
Val Ala Asp Gly Val Pro Glu Gly Gly Leu Pro Pro Gly Thr Thr Ile
65                  70                  75                  80

His Gly Arg Ile Gly Met Phe Leu Arg Ala Thr Pro Gly Asn Phe Arg
                85                  90                  95

Asp Gly Val Arg Ala Ala Glu Glu Glu Val Gly Val Lys Val Ser Cys
            100                 105                 110

Val Val Ser Asp Ala Phe Leu Trp Met Thr Ala Asp Val Ala Glu Glu
        115                 120                 125

Ile Gly Ala Gln Trp Leu Pro Leu Trp Thr Cys Ala Pro Ala Ala Leu
    130                 135                 140

Leu Ala His Val Ser Thr Asp Gln Leu Arg Glu Arg Phe Gly Val Glu
145                 150                 155                 160

Lys Gln Ala Thr Ala Gly Trp Ala Asp Glu Leu Val Asp Phe Ile Pro
                165                 170                 175

Gly Leu Ser Cys Leu Arg Ile Arg Asp Ile Pro Asp Glu Ile Val Thr
            180                 185                 190

Asn Trp His Ser Asp Leu Ser Ile Leu Leu His Arg Met Gly Asn Gln
        195                 200                 205

Leu Thr Ser Ala Thr Ala Val Ala Leu Asn Thr Phe Asp Gly Leu Asp
    210                 215                 220

Thr Thr Ile Asp Ala Ala Leu Ala Ser Leu Phe Lys Lys Thr Leu Pro
225                 230                 235                 240

Ile Gly Pro Leu Asn Leu Leu Ser Ser Pro Pro Pro Leu Gln Pro Gly
                245                 250                 255

Asp Glu Lys Cys Leu Ser Trp Leu Asp Gly Gln Glu Asp Ala Thr Val
            260                 265                 270

Ala Tyr Val Ser Phe Gly Thr Met Val Leu Met Pro Thr Gln Ser Asp
        275                 280                 285

Val Ser Glu Ile Ala Gln Gly Leu Glu Ser Ser Gly Val Arg Phe Leu
    290                 295                 300

Trp Ser Leu Arg Glu Glu Ala Arg Ala Gly Leu Leu Pro Pro Gly Phe
305                 310                 315                 320

Leu Glu Arg Thr Ala Gly Arg Gly Leu Val Val Pro Trp Ala Pro Gln
                325                 330                 335

Val Arg Val Leu Gly His Arg Ala Val Gly Ala Phe Val Thr His Cys
            340                 345                 350

Gly Trp Asn Ala Val Met Glu Ser Val Thr Ser Gly Val Pro Met Ala
        355                 360                 365

Cys Leu Pro Ser Phe Ala Asp Gln Lys Thr Asn Ala Arg Met Val Ser
    370                 375                 380

Ala Ala Trp Gly Ile Gly Glu Ala Leu Arg Gly Glu Lys Val Thr Lys
385                 390                 395                 400

Glu Glu Val Val Arg Ser Met Glu Ile Val Met Met Gly Glu Glu Gly
                405                 410                 415

Arg Arg Met Arg Glu Arg Ile Gly Asn Leu Arg Glu Lys Ala Ala Glu
            420                 425                 430

Ala Val Gly Pro Gly Gly Ser Ser Ser Glu Asn Phe Lys Ser Val Leu
        435                 440                 445

Glu Met Val Arg Gly Thr Ala Asn
    450                 455
```

<210> SEQ ID NO 13
<211> LENGTH: 1413

<212> TYPE: DNA
<213> ORGANISM: Crocosmia x crocosmiiflora

<400> SEQUENCE: 13

```
atggcagaga aagaagcaaa acatcatgtg gtcctcttcc ccttgccagg ccaaggtcac      60
attggctcaa tgctgaaact ggcacagctc ctttcgaccg ccggtttcta catcaccttc     120
gtccacaccg aacgcaacta ccgtcgcttc ctactcacct ccacatcctt caacgtgccc     180
aagttccggt tccgcaccat ccctgacggc tttcccgaca acgatccccg ctcgcccctc     240
ccgtttatag agctccaaga atcgttggat acaaagtgta aggggtatta tcgggaagtg     300
ttggtcgctg tcgacgaaga gtggcctccc gtcacttgtg tcgtggcgga tacagctctt     360
ccacttgcac ttgaagtgcc tgaggagttg ggattcctg taatgatact cgcaccgcac     420
agtgcaggca gtatattaac aggttattca atcccgcagc ttatacaagg aggagagttt     480
cctttccctg aggatgccga tatggatgaa ctattacaag gcgtgttagg gctggaaggt     540
atcgtaaggc gtagggatat gtctgtcaga ggattcaagt ccatcgacag cccatttgtt     600
cgattcgaag tgaaaatgaa ccaaaatctg agcagaggaa gagctctcat cctaaacacg     660
acggaatcca tggactctct tgctctgcga cacattcggt ccatatgtcc tactacctac     720
actcttggac cctttcatgt tcttctcaga aacataaaag accaatctca ctctgcaagt     780
ctttccgaag aggacaggtc ttgcatcgcc tggctcgaca cgaagccgaa caagtctgtg     840
gtctatgtca gtttcggtag ccttgcggcc atgtcaagag aagcgtttct tgaatttcag     900
cagggattgc tcgacagcgg ctatcatttc ttgtgggtga ttcgacccga tatggtggaa     960
gggggactag aagagtgtga gctgaccgct agcgaacgac gatatttcgt aaaatgggcg    1020
ccacaggagg aggttcttgc gcacccggcg gtagggtgtt tcttgaccca cagtgggtgg    1080
aactcgacgt tagagagtat ctatgcggga gtgccgatga tatgttggcc attcttcgca    1140
gaccagctga tcaacagcag gttcgtgagc gaggtgtgga aaattgcatt ggatatgaag    1200
gatttatgcg gaaggagcta tgtggagagg atggtgaagg aagttatgag tggagagaaa    1260
ggtaaagagc taagaaaatc tatctgtgag atggcagata tggtaaagaa aagtgcagaa    1320
gaaggtggat cttcctatac caacttcaaa gagttgattg ggcatatcaa atctttgagt    1380
ttaccggcct gttcaagtac ttcgggtttt tag                                 1413
```

<210> SEQ ID NO 14
<211> LENGTH: 470
<212> TYPE: PRT
<213> ORGANISM: Crocosmia x crocosmiiflora

<400> SEQUENCE: 14

```
Met Ala Glu Lys Glu Ala Lys His His Val Val Leu Phe Pro Leu Pro
1               5                   10                  15

Gly Gln Gly His Ile Gly Ser Met Leu Lys Leu Ala Gln Leu Leu Ser
            20                  25                  30

Thr Ala Gly Phe Tyr Ile Thr Phe Val His Thr Glu Arg Asn Tyr Arg
        35                  40                  45

Arg Phe Leu Leu Thr Ser Thr Ser Phe Asn Val Pro Lys Phe Arg Phe
    50                  55                  60

Arg Thr Ile Pro Asp Gly Phe Pro Asp Asn Asp Pro Arg Ser Pro Leu
65                  70                  75                  80

Pro Phe Ile Glu Leu Gln Glu Ser Leu Asp Thr Lys Cys Lys Gly Tyr
                85                  90                  95
```

-continued

```
Tyr Arg Glu Val Leu Val Ala Val Asp Glu Glu Trp Pro Pro Val Thr
            100                 105                 110

Cys Val Val Ala Asp Thr Ala Leu Pro Leu Ala Leu Glu Val Pro Glu
        115                 120                 125

Glu Leu Gly Ile Pro Val Met Ile Leu Ala Pro His Ser Ala Gly Ser
    130                 135                 140

Ile Leu Thr Gly Tyr Ser Ile Pro Gln Leu Ile Gln Gly Gly Glu Phe
145                 150                 155                 160

Pro Phe Pro Glu Asp Ala Asp Met Asp Glu Leu Leu Gln Gly Val Leu
                165                 170                 175

Gly Leu Glu Gly Ile Val Arg Arg Arg Asp Met Ser Val Arg Gly Phe
            180                 185                 190

Lys Ser Ile Asp Ser Pro Phe Val Arg Phe Glu Val Lys Met Asn Gln
        195                 200                 205

Asn Leu Ser Arg Gly Arg Ala Leu Ile Leu Asn Thr Thr Glu Ser Met
    210                 215                 220

Asp Ser Leu Ala Leu Arg His Ile Arg Ser Ile Cys Pro Thr Thr Tyr
225                 230                 235                 240

Thr Leu Gly Pro Phe His Val Leu Leu Arg Asn Ile Lys Asp Gln Ser
                245                 250                 255

His Ser Ala Ser Leu Ser Glu Glu Asp Arg Ser Cys Ile Ala Trp Leu
            260                 265                 270

Asp Thr Lys Pro Asn Lys Ser Val Val Tyr Val Ser Phe Gly Ser Leu
        275                 280                 285

Ala Ala Met Ser Arg Glu Ala Phe Leu Glu Phe Gln Gln Gly Leu Leu
    290                 295                 300

Asp Ser Gly Tyr His Phe Leu Trp Val Ile Arg Pro Asp Met Val Glu
305                 310                 315                 320

Gly Gly Leu Glu Glu Cys Glu Leu Thr Ala Ser Glu Arg Arg Tyr Phe
                325                 330                 335

Val Lys Trp Ala Pro Gln Glu Glu Val Leu Ala His Pro Ala Val Gly
            340                 345                 350

Cys Phe Leu Thr His Ser Gly Trp Asn Ser Thr Leu Glu Ser Ile Tyr
        355                 360                 365

Ala Gly Val Pro Met Ile Cys Trp Pro Phe Phe Ala Asp Gln Leu Ile
    370                 375                 380

Asn Ser Arg Phe Val Ser Glu Val Trp Lys Ile Ala Leu Asp Met Lys
385                 390                 395                 400

Asp Leu Cys Gly Arg Ser Tyr Val Glu Arg Met Val Lys Glu Val Met
                405                 410                 415

Ser Gly Glu Lys Gly Lys Glu Leu Arg Lys Ser Ile Cys Glu Met Ala
            420                 425                 430

Asp Met Val Lys Lys Ser Ala Glu Glu Gly Gly Ser Ser Tyr Thr Asn
        435                 440                 445

Phe Lys Glu Leu Ile Gly His Ile Lys Ser Leu Ser Leu Pro Ala Cys
    450                 455                 460

Ser Ser Thr Ser Gly Phe
465                 470
```

<210> SEQ ID NO 15
<211> LENGTH: 1302
<212> TYPE: DNA
<213> ORGANISM: Crocosmia x crocosmiiflora

<400> SEQUENCE: 15

-continued

```
atgagcttca cagtgaccaa gactgctccg gcactgatca ccccctccga gccgacaccc     60
tccggccaca ttctccccct ctcgttcttc gaccgcttgc cgttccttcg ggttttccta    120
gtggacatga ttatggtgta tggtcgcggt gaccaaccgg cgaaagtcat taaagaagcg    180
gtggccaagg cattggtcca ttactacccg ctagccggca ggcttactac cgatacggac    240
gacggtgagt tgtcggttgc ctgcaccgga gaaggcgtgt ggtttgtcga ggcgacggcg    300
gattgtagga tggaagatgt caactatctg caagtggaac ctctgatgat ccctaaagaa    360
cagatgctcc cttctcatcc agaaggggtt gatccttaca ctctgcctct catgatacag    420
gttacacaat tcagatgtgg tggattcgca tttgctacca gggctaatca tgcagttttt    480
gacggcatag gagcaggtca gatcaaggta gcaattggcg agatggcaag aggacttaag    540
caccctacag taaagccagt atggtgtagg gatgtcatcc gcaagcctat ccctagccaa    600
atctctgcta cggaaccaca cgatacggat ctgtcaccag tgtctgatat aaagtttaca    660
aataatcaga ctaacatcga gtgttgttcc tttgatctct ccctagacca catcaaccat    720
ctgaaggacc gcttcgcaaa agaagtaggc aaaatttgct cagtatttga tgttatcaca    780
gcgaagctat ggcaatcccg tactcgagca atcggcctgc agccgcaaac cgaagtttcc    840
ctcacctttc ttctgaacat tcgccaagta gtattgcaca atgagcttcc tcctgatggt    900
ggttactacg ggaactgtct cgttcctctc gtaaacaaag ctccaagtgg acagattgcc    960
aatgcaccac ttttcgagat tgtgcggcta atcaaagaag caaaagatga cttgttacgt   1020
aaagactcgg cgtctctgat aggaggaatg ccaccgtaca aaaagcccag ctatgctgat   1080
ctctccatcg tggattggcg gcgattagga ctgtacgaag cagactttgg atggggagga   1140
ccgatgtttc tcgtcccgtt gaacgaacat actgtcactt cttgctcgac ttaccttttc   1200
aagtcaccgg ttgcttcgaa gaaggatgtt tgtctggtga catactgcat tgtgaaggaa   1260
caccttgaag ccttccgcgc cgagatgaat gattttacct ag                      1302
```

<210> SEQ ID NO 16
<211> LENGTH: 433
<212> TYPE: PRT
<213> ORGANISM: Crocosmia x crocosmiiflora

<400> SEQUENCE: 16

```
Met Ser Phe Thr Val Thr Lys Thr Ala Pro Ala Leu Ile Thr Pro Ser
1               5                   10                  15

Glu Pro Thr Pro Ser Gly His Ile Leu Pro Leu Ser Phe Phe Asp Arg
            20                  25                  30

Leu Pro Phe Leu Arg Val Phe Leu Val Asp Met Ile Met Val Tyr Gly
        35                  40                  45

Arg Gly Asp Gln Pro Ala Lys Val Ile Lys Glu Ala Val Ala Lys Ala
    50                  55                  60

Leu Val His Tyr Tyr Pro Leu Ala Gly Arg Leu Thr Thr Asp Thr Asp
65                  70                  75                  80

Asp Gly Glu Leu Ser Val Ala Cys Thr Gly Glu Gly Val Trp Phe Val
                85                  90                  95

Glu Ala Thr Ala Asp Cys Arg Met Glu Asp Val Asn Tyr Leu Gln Val
            100                 105                 110

Glu Pro Leu Met Ile Pro Lys Glu Gln Met Leu Pro Ser His Pro Glu
        115                 120                 125

Gly Val Asp Pro Tyr Thr Leu Pro Leu Met Ile Gln Val Thr Gln Phe
    130                 135                 140
```

```
Arg Cys Gly Gly Phe Ala Phe Ala Thr Arg Ala Asn His Ala Val Phe
145                 150                 155                 160

Asp Gly Ile Gly Ala Gly Gln Ile Lys Val Ala Ile Gly Glu Met Ala
                165                 170                 175

Arg Gly Leu Lys His Pro Thr Val Lys Pro Val Trp Cys Arg Asp Val
            180                 185                 190

Ile Arg Lys Pro Ile Pro Ser Gln Ile Ser Ala Thr Glu Pro His Asp
        195                 200                 205

Thr Asp Leu Ser Pro Val Ser Asp Ile Lys Phe Thr Asn Asn Gln Thr
    210                 215                 220

Asn Ile Glu Cys Cys Ser Phe Asp Leu Ser Leu Asp His Ile Asn His
225                 230                 235                 240

Leu Lys Asp Arg Phe Ala Lys Glu Val Gly Lys Ile Cys Ser Val Phe
                245                 250                 255

Asp Val Ile Thr Ala Lys Leu Trp Gln Ser Arg Thr Arg Ala Ile Gly
            260                 265                 270

Leu Gln Pro Gln Thr Glu Val Ser Leu Thr Phe Leu Leu Asn Ile Arg
        275                 280                 285

Gln Val Val Leu His Asn Glu Leu Pro Pro Asp Gly Gly Tyr Tyr Gly
    290                 295                 300

Asn Cys Leu Val Pro Leu Val Asn Lys Ala Pro Ser Gly Gln Ile Ala
305                 310                 315                 320

Asn Ala Pro Leu Phe Glu Ile Val Arg Leu Ile Lys Glu Ala Lys Asp
                325                 330                 335

Asp Leu Leu Arg Lys Asp Ser Ala Ser Leu Ile Gly Gly Met Pro Pro
            340                 345                 350

Tyr Lys Lys Pro Ser Tyr Ala Asp Leu Ser Ile Val Asp Trp Arg Arg
        355                 360                 365

Leu Gly Leu Tyr Glu Ala Asp Phe Gly Trp Gly Gly Pro Met Phe Leu
    370                 375                 380

Val Pro Leu Asn Glu His Thr Val Thr Ser Cys Ser Thr Tyr Leu Phe
385                 390                 395                 400

Lys Ser Pro Val Ala Ser Lys Lys Asp Val Cys Leu Val Thr Tyr Cys
                405                 410                 415

Ile Val Lys Glu His Leu Glu Ala Phe Arg Ala Glu Met Asn Asp Phe
            420                 425                 430

Thr
```

```
<210> SEQ ID NO 17
<211> LENGTH: 1302
<212> TYPE: DNA
<213> ORGANISM: Crocosmia x crocosmiiflora

<400> SEQUENCE: 17

atgagcttca cagtgaccaa gactgctccg gcagtgatca ccccctccga gccgacaccc      60

tccggccaca ttctccccct ctcgttcttc gaccgcttgc cgttccttcg ggttttccta     120

gtggacatga ttatggtgta tggtcacggt gaccaaccgg cgaaggtcat taaagaagca     180

gtggccaagg cattggtcca ttactacccg ctagccggca ggcttactac cgatacggac     240

gacggtgagt tgtcggttgc atgcaccgga gaaggtgtgt ggtttgtcga ggcgacggcg     300

gattgtagga tggaagatgt caactatctg caagtggaac ctctgatgat ccctaaagaa     360

cagatactcc cttctcatcc agaaggggtt gatccttaca ctctgccttt catgatacag     420
```

```
gttacacaat tcagatgcgg tggattcacg tttgctacca gggctaatca tgcagttttt    480

gacggcatag gagcaggtca gatcaaggta gcaattggcg agatggcaag aggacttaag    540

caccctacag ttaagccagt atggtgtagg gatgtcatcc gcaagcctat ccctagccaa    600

atctctgcta cggaaccaca cgatacggat ctgtcatcaa ttcctgattt aaagtttaca    660

aataatcaga ctaacatcga gtgttgttcc tttgatctct ctctagacca catcaaccat    720

ctaaaggacc acttcgcaaa agaagtaggc aaaatttgct cagtatttga tgttatcgca    780

gccaagctat ggcaatctcg tactcgagca atcggccttc agccgcaaac cgaagtttcc    840

cttacctttc ttctgaatat tcgccaagta gtattgcaca atgagcttcc tcctgatggt    900

ggttactacg ggaactgtct cgttcctctc ataaacaaag ctccaagcgg acagattgcc    960

aatgcaccac ttttcgagat tgtgcggcta atcaaggaag caaaagatga cttgttaagt   1020

aaagactcgg cgtctctgat aggagaaatg ccaccgtaca aaaagcccag ctatgctgat   1080

ctctccatcg tcgattggcg gcgattagga ctgtacgaag cggactttgg atggggagga   1140

ccgatgtttc tcgtcccgtt gaatgaacat actgtcactt cttgctcgac ttaccttttc   1200

aagtcaccgg ttgcttcgaa gaaggatgtt cgtctggtga catactgcat tgtgaaggaa   1260

caccttgaag ccttccgcga cgagatgaat gatttcacct ag                      1302
```

<210> SEQ ID NO 18
<211> LENGTH: 433
<212> TYPE: PRT
<213> ORGANISM: Crocosmia x crocosmiiflora

<400> SEQUENCE: 18

```
Met Ser Phe Thr Val Thr Lys Thr Ala Pro Ala Val Ile Thr Pro Ser
1               5                   10                  15

Glu Pro Thr Pro Ser Gly His Ile Leu Pro Leu Ser Phe Phe Asp Arg
            20                  25                  30

Leu Pro Phe Leu Arg Val Phe Leu Val Asp Met Ile Met Val Tyr Gly
        35                  40                  45

His Gly Asp Gln Pro Ala Lys Val Ile Lys Glu Ala Val Ala Lys Ala
    50                  55                  60

Leu Val His Tyr Tyr Pro Leu Ala Gly Arg Leu Thr Thr Asp Thr Asp
65                  70                  75                  80

Asp Gly Glu Leu Ser Val Ala Cys Thr Gly Glu Gly Val Trp Phe Val
                85                  90                  95

Glu Ala Thr Ala Asp Cys Arg Met Glu Asp Val Asn Tyr Leu Gln Val
            100                 105                 110

Glu Pro Leu Met Ile Pro Lys Glu Gln Ile Leu Pro Ser His Pro Glu
        115                 120                 125

Gly Val Asp Pro Tyr Thr Leu Pro Phe Met Ile Gln Val Thr Gln Phe
    130                 135                 140

Arg Cys Gly Gly Phe Thr Phe Ala Thr Arg Ala Asn His Ala Val Phe
145                 150                 155                 160

Asp Gly Ile Gly Ala Gly Gln Ile Lys Val Ala Ile Gly Glu Met Ala
                165                 170                 175

Arg Gly Leu Lys His Pro Thr Val Lys Pro Val Trp Cys Arg Asp Val
            180                 185                 190

Ile Arg Lys Pro Ile Pro Ser Gln Ile Ser Ala Thr Glu Pro His Asp
        195                 200                 205

Thr Asp Leu Ser Ser Ile Pro Asp Leu Lys Phe Thr Asn Asn Gln Thr
    210                 215                 220
```

-continued

```
Asn Ile Glu Cys Cys Ser Phe Asp Leu Ser Leu Asp His Ile Asn His
225                 230                 235                 240

Leu Lys Asp His Phe Ala Lys Glu Val Gly Lys Ile Cys Ser Val Phe
                245                 250                 255

Asp Val Ile Ala Ala Lys Leu Trp Gln Ser Arg Thr Arg Ala Ile Gly
            260                 265                 270

Leu Gln Pro Gln Thr Glu Val Ser Leu Thr Phe Leu Leu Asn Ile Arg
        275                 280                 285

Gln Val Val Leu His Asn Glu Leu Pro Pro Asp Gly Gly Tyr Tyr Gly
    290                 295                 300

Asn Cys Leu Val Pro Leu Ile Asn Lys Ala Pro Ser Gly Gln Ile Ala
305                 310                 315                 320

Asn Ala Pro Leu Phe Glu Ile Val Arg Leu Ile Lys Glu Ala Lys Asp
                325                 330                 335

Asp Leu Leu Ser Lys Asp Ser Ala Ser Leu Ile Gly Glu Met Pro Pro
            340                 345                 350

Tyr Lys Lys Pro Ser Tyr Ala Asp Leu Ser Ile Val Asp Trp Arg Arg
        355                 360                 365

Leu Gly Leu Tyr Glu Ala Asp Phe Gly Trp Gly Gly Pro Met Phe Leu
    370                 375                 380

Val Pro Leu Asn Glu His Thr Val Thr Ser Cys Ser Thr Tyr Leu Phe
385                 390                 395                 400

Lys Ser Pro Val Ala Ser Lys Lys Asp Val Arg Leu Val Thr Tyr Cys
                405                 410                 415

Ile Val Lys Glu His Leu Glu Ala Phe Arg Asp Glu Met Asn Asp Phe
            420                 425                 430

Thr


<210> SEQ ID NO 19
<211> LENGTH: 1395
<212> TYPE: DNA
<213> ORGANISM: Crocosmia x crocosmiiflora

<400> SEQUENCE: 19

atgagctcca aagaaggcca gcccttccac atgctcttct tccctttcat ggctccgggc      60

cacttccaac cagtgctcta catggccgag cgcttcgccg cccacggcgt tagggtttcc     120

atcctcacca cccctgccaa cgtccccctc gtccgaccat ccctagatcg agccaacatc     180

gaactccaca ccgtaccgtt cccctcggca gaagccggtc tacccaaagg gtgtgagaac     240

tacatgcacg tgccttcgcc agacttgctc atgaatttct acactgccat gccaatgctc     300

cgagacccat tcgccaaggt cttcagagac ctcctccccg actgtgtcgt aacggacggg     360

tttttctact ggagctacgc catcgcggcc gagctaaaca taccaaggct tgtgttcaat     420

ggtacatgcc tgttctccac atgcgtcgca gaaagcctag accgccacaa gacgctcgat     480

agccttccgc cggctgcaga gactgtggtc atcccaggcc tcccccacag gatcgaaatg     540

ctcagatcgc aattaccccc ttcagggggg gaaaaaccag gaatatttaa actagtgatg     600

gaggccgacg ccaagagcta tggcattgtg gtgaacacct tctccgagct cgaatccgac     660

tacttaaagt gctttggaag aaaagcttgg ccattgggcc cccttgttcc acgctacagg     720

gacaatgcta atgacaaggc acacgattgc gtgaaatggc tcgatcgcaa gagtcccggc     780

tcgactgtat acgtctgttt cgggagcacg ggctccttta ccagggctca gatgcgagaa     840

ttggcactgg ggctcgagag ttccgaccaa cagtttgtct gggtggtggc caaggatgtc     900
```

-continued

```
tatgagttga ttccccaagg gtttgaggag agggtcggcg gaaagggtct gatcataaga    960

ggatgggctc cgcaggtgct gatcctcaac catccttcgg tcgggggatt cctgacacat   1020

tgcgggtgga actcatgcct cgagggggta tctgcgggcc tcccattagc cacatggcct   1080

atgcatgtcg agcaattctt caacgagagg ctgatcgtcg acgtgttgag gattggagta   1140

tctgttgggg tgaagaagct tgcgtttaag ccagaagata acgagttgat ggaagcagaa   1200

atggtaaaga aggccgtgga tgaactgatg ggcagtgggg aggcagcaga tctgaggagg   1260

caaagggcga gggagctcgg agaaaaggcg aggaaagccg tggaggaggg agggtcgtct   1320

tatgtgaaca tggccaatct gattcaggag ttgattgaaa tgaagaattg caactcacgt   1380

acacaagcaa tttga                                                    1395
```

<210> SEQ ID NO 20
<211> LENGTH: 464
<212> TYPE: PRT
<213> ORGANISM: Crocosmia x crocosmiiflora

<400> SEQUENCE: 20

```
Met Ser Ser Lys Glu Gly Gln Pro Phe His Met Leu Phe Phe Pro Phe
1               5                   10                  15

Met Ala Pro Gly His Phe Gln Pro Val Leu Tyr Met Ala Glu Arg Phe
            20                  25                  30

Ala Ala His Gly Val Arg Val Ser Ile Leu Thr Thr Pro Ala Asn Val
        35                  40                  45

Pro Leu Val Arg Pro Ser Leu Asp Arg Ala Asn Ile Glu Leu His Thr
    50                  55                  60

Val Pro Phe Pro Ser Ala Glu Ala Gly Leu Pro Lys Gly Cys Glu Asn
65                  70                  75                  80

Tyr Met His Val Pro Ser Pro Asp Leu Leu Met Asn Phe Tyr Thr Ala
                85                  90                  95

Met Pro Met Leu Arg Asp Pro Phe Ala Lys Val Phe Arg Asp Leu Leu
            100                 105                 110

Pro Asp Cys Val Val Thr Asp Gly Phe Phe Tyr Trp Ser Tyr Ala Ile
        115                 120                 125

Ala Ala Glu Leu Asn Ile Pro Arg Leu Val Phe Asn Gly Thr Cys Leu
    130                 135                 140

Phe Ser Thr Cys Val Ala Glu Ser Leu Asp Arg His Lys Thr Leu Asp
145                 150                 155                 160

Ser Leu Pro Pro Ala Ala Glu Thr Val Val Ile Pro Gly Leu Pro His
                165                 170                 175

Arg Ile Glu Met Leu Arg Ser Gln Leu Pro Pro Ser Gly Gly Glu Lys
            180                 185                 190

Pro Gly Ile Phe Lys Leu Val Met Glu Ala Asp Ala Lys Ser Tyr Gly
        195                 200                 205

Ile Val Val Asn Thr Phe Ser Glu Leu Glu Ser Asp Tyr Leu Lys Cys
    210                 215                 220

Phe Gly Arg Lys Ala Trp Pro Leu Gly Pro Leu Val Pro Arg Tyr Arg
225                 230                 235                 240

Asp Asn Ala Asn Asp Lys Ala His Asp Cys Val Lys Trp Leu Asp Arg
                245                 250                 255

Lys Ser Pro Gly Ser Thr Val Tyr Val Cys Phe Gly Ser Thr Gly Ser
            260                 265                 270

Phe Thr Arg Ala Gln Met Arg Glu Leu Ala Leu Gly Leu Glu Ser Ser
```

-continued

```
        275                 280                 285

Asp Gln Gln Phe Val Trp Val Val Ala Lys Asp Val Tyr Glu Leu Ile
    290                 295                 300

Pro Gln Gly Phe Glu Glu Arg Val Gly Gly Lys Gly Leu Ile Ile Arg
305                 310                 315                 320

Gly Trp Ala Pro Gln Val Leu Ile Leu Asn His Pro Ser Val Gly Gly
                325                 330                 335

Phe Leu Thr His Cys Gly Trp Asn Ser Cys Leu Glu Gly Val Ser Ala
            340                 345                 350

Gly Leu Pro Leu Ala Thr Trp Pro Met His Val Glu Gln Phe Phe Asn
        355                 360                 365

Glu Arg Leu Ile Val Asp Val Leu Arg Ile Gly Val Ser Val Gly Val
    370                 375                 380

Lys Lys Leu Ala Phe Lys Pro Glu Asp Asn Glu Leu Met Glu Ala Glu
385                 390                 395                 400

Met Val Lys Lys Ala Val Asp Glu Leu Met Gly Ser Gly Glu Ala Ala
                405                 410                 415

Asp Leu Arg Arg Gln Arg Ala Arg Glu Leu Gly Glu Lys Ala Arg Lys
            420                 425                 430

Ala Val Glu Glu Gly Gly Ser Ser Tyr Val Asn Met Ala Asn Leu Ile
        435                 440                 445

Gln Glu Leu Ile Glu Met Lys Asn Cys Asn Ser Arg Thr Gln Ala Ile
    450                 455                 460


<210> SEQ ID NO 21
<211> LENGTH: 1395
<212> TYPE: DNA
<213> ORGANISM: Crocosmia x crocosmiiflora

<400> SEQUENCE: 21

atggcgtcag aaactagtcc aactctccac attctcttct tccccctcat ggcccccagc     60

cacatgctcc ccgtgcacga catggccaag ctctttgcag cccgcagcgg cgtgaattgc    120

accttcctca ccacccatgg caatgctcac ctcgttaagc ctcacccggc tatcaaattg    180

caactcatcc cattccctcc cgattctgga ctaccggccg ggtgcgaaaa ccaatccact    240

gtcccttgcc aagatttaga gccaaacttt tttgcggcac tttcgaaact ccgccaacct    300

ttcgacgtag tcctcagaga gctgcacccc gactgcgtca tcacagatgc gttcttccca    360

tggacgtatg acatcgcagc tgagctcgac ataccgaggc tcgtgttcca tgtcagcaac    420

aacttttcac ggtgcgcgtt cgacgcctta gaccgtcaca aggtcttcca agaccttcct    480

tccgaagaag agtcgttcgt tatcccgggc ctccctcacc gcatcgagat gctgaaaact    540

tacatgcctg atccacgcga aatgcatccg gtcttctttg aactcatccc acagatgatg    600

gaggctgaac ccaagagcta tggtgtggtg acaaacagcg tctacgagtt ggagcccgac    660

tatgtggact actctaggaa tgtgatcggc cggaaaactt ggtgcttcgg gcccgtgtcg    720

ctgtgcaata gtaggggaga tgtcggtgtg gctaccaatc caacatgtct caattggctc    780

gatagcatga gtccccgctc ggtcgtgtac gttagcttcg gtagcttgag ccacttttcg    840

aagtctcagc ttactgagat agctttaggc ctcgaagcat ccgaccaacc atttctttgg    900

gtgctcagag aggccgacga ggagtggatg atcgatggat atgagcagag gactaaaggt    960

aaaggtctaa tcataagagg ttgggctccg caggttcaaa ttttgaacca caaagcgatc   1020

ggtggtttcg tgacacattg cgggtggaac tcgagtttgg aggggatttg tgctggtttg   1080
```

-continued

```
ccacttgtta catggcctct atttgctgag caattcttca atgagaggtt tattttggat   1140

gtactgaaga ttggtgtcgc ggtagggata aaggaacaca ccataaagca tgtcgagagg   1200

ccggtgatcg aggctggtaa agtggagaag gcggtgaggc tgctaatggg cgacggagag   1260

gagacagtgg agaggtgggg gagagtaagg gagcttggag agatggccaa gaaagcggta   1320

gagatcgatg gttcgtctta taatgacatg gagagtctta taaaggagct gaaggagagc   1380

cagaaaacta aatga                                                    1395


<210> SEQ ID NO 22
<211> LENGTH: 464
<212> TYPE: PRT
<213> ORGANISM: Crocosmia x crocosmiiflora

<400> SEQUENCE: 22

Met Ala Ser Glu Thr Ser Pro Thr Leu His Ile Leu Phe Phe Pro Leu
1               5                   10                  15

Met Ala Pro Ser His Met Leu Pro Val His Asp Met Ala Lys Leu Phe
            20                  25                  30

Ala Ala Arg Ser Gly Val Asn Cys Thr Phe Leu Thr Thr His Gly Asn
        35                  40                  45

Ala His Leu Val Lys Pro His Pro Ala Ile Lys Leu Gln Leu Ile Pro
    50                  55                  60

Phe Pro Pro Asp Ser Gly Leu Pro Ala Gly Cys Glu Asn Gln Ser Thr
65                  70                  75                  80

Val Pro Cys Gln Asp Leu Glu Pro Asn Phe Phe Ala Ala Leu Ser Lys
                85                  90                  95

Leu Arg Gln Pro Phe Asp Val Val Leu Arg Glu Leu His Pro Asp Cys
            100                 105                 110

Val Ile Thr Asp Ala Phe Phe Pro Trp Thr Tyr Asp Ile Ala Ala Glu
        115                 120                 125

Leu Asp Ile Pro Arg Leu Val Phe His Val Ser Asn Asn Phe Ser Arg
    130                 135                 140

Cys Ala Phe Asp Ala Leu Asp Arg His Lys Val Phe Gln Asp Leu Pro
145                 150                 155                 160

Ser Glu Glu Glu Ser Phe Val Ile Pro Gly Leu Pro His Arg Ile Glu
                165                 170                 175

Met Leu Lys Thr Tyr Met Pro Asp Pro Arg Glu Met His Pro Val Phe
            180                 185                 190

Phe Glu Leu Ile Pro Gln Met Met Glu Ala Glu Pro Lys Ser Tyr Gly
        195                 200                 205

Val Val Thr Asn Ser Val Tyr Glu Leu Glu Pro Asp Tyr Val Asp Tyr
    210                 215                 220

Ser Arg Asn Val Ile Gly Arg Lys Thr Trp Cys Phe Gly Pro Val Ser
225                 230                 235                 240

Leu Cys Asn Ser Arg Gly Asp Val Gly Val Ala Thr Asn Pro Thr Cys
                245                 250                 255

Leu Asn Trp Leu Asp Ser Met Ser Pro Arg Ser Val Val Tyr Val Ser
            260                 265                 270

Phe Gly Ser Leu Ser His Phe Ser Lys Ser Gln Leu Thr Glu Ile Ala
        275                 280                 285

Leu Gly Leu Glu Ala Ser Asp Gln Pro Phe Leu Trp Val Leu Arg Glu
    290                 295                 300

Ala Asp Glu Glu Trp Met Ile Asp Gly Tyr Glu Gln Arg Thr Lys Gly
305                 310                 315                 320
```

```
Lys Gly Leu Ile Ile Arg Gly Trp Ala Pro Gln Val Gln Ile Leu Asn
                325                 330                 335

His Lys Ala Ile Gly Gly Phe Val Thr His Cys Gly Trp Asn Ser Ser
            340                 345                 350

Leu Glu Gly Ile Cys Ala Gly Leu Pro Leu Val Thr Trp Pro Leu Phe
        355                 360                 365

Ala Glu Gln Phe Phe Asn Glu Arg Phe Ile Leu Asp Val Leu Lys Ile
    370                 375                 380

Gly Val Ala Val Gly Ile Lys Glu His Thr Ile Lys His Val Glu Arg
385                 390                 395                 400

Pro Val Ile Glu Ala Gly Lys Val Glu Lys Ala Val Arg Leu Leu Met
                405                 410                 415

Gly Asp Gly Glu Glu Thr Val Glu Arg Trp Gly Arg Val Arg Glu Leu
            420                 425                 430

Gly Glu Met Ala Lys Lys Ala Val Glu Ile Asp Gly Ser Ser Tyr Asn
        435                 440                 445

Asp Met Glu Ser Leu Ile Lys Glu Leu Lys Glu Ser Gln Lys Thr Lys
    450                 455                 460


<210> SEQ ID NO 23
<211> LENGTH: 1473
<212> TYPE: DNA
<213> ORGANISM: Crocosmia x crocosmiiflora

<400> SEQUENCE: 23

atggattccg aacccaggaa gaagaagaag cagcagcagc tccacatctt cttcgtcccc     60

cattttgcta acggccacat gaccgctatc ctccacactg ccaagctact cgctgccgag    120

cacggcgccc gatccacctt ggtgaccacc cccggcaacg cctacatctt caacgacacc    180

atcaacgatg caacccgtag tggtctctcc atgcagctcc tcctcctccc cttcccagac    240

gtcggcctcc caccgggctg cgagagcact gcctccatcc ctcaaaccgc cgaaaaccgc    300

ttcctgctcc acaaagccgg ctacctcctc cgagagccat tcgagggact cctccatgag    360

catctacccg actgcatcgt cggcgatgca atgagcctct ggtgtgcaga cgtagcggaa    420

tctttccaca ttccctacgt acaattcaac gtcagttcgc ctttcgcatt ctgcgttctg    480

gagacggtct actcgcaagc cgcccaccac aacgcagatg cgtcgaccga cacgatcggc    540

cctctgaccg gccttccgca tcctctcgtg ctgcagcgca ccgagctaac gttgccggcc    600

gagtatgtgg acatgtacat gggcgatttg gtgagaatcc tgaggaggag tatcggtgtt    660

atccacaaca gcttctgcga gctcgcaccg gagtatctcg acgcgatcgt aaagagtggg    720

aggataaaga gattatggtg cgtcgggccg ctccagctct ctagtactac aattagtact    780

aatgctccca agaattggga gtggatcaaa aagtggctcg acacgaaaga gaaagagtcg    840

gtggtctgtg tcagcttcgg caccgagtgg caattcagcc acgaacagct gcgacagctc    900

gctatcggac tggattcttc gggccattcg ttcgtctgga tattgaaggg agaggacgac    960

acgatggccg agtggatgcc cgaagggttc tatgagaggg tggaagggag gggactggtg   1020

attacggaat gggcaccgca gttcatgata ctcaaccacc cggcattggg agcgagtatc   1080

tgccactgcg gatggaactc ggggatcgag tcggtgtgcg ccggcctgcc ggttatcgcg   1140

tggccgttgc actcggagca gttcttgaac gagaggtttt ttgttgaggc gctgaagatt   1200

ggggtgagga ttattgaggg ggatatgagg gagccgaagc tgaagagtga gaaggtggtg   1260

agcgcggaga aggtgagaga ggcagtgatg aacattctcg gaagtggaga ggaagtgaag   1320
```

gagatgagga ggaaggcgaa ggagtatagt aagttggcaa agatggctat ggagaaaggg 1380
ggttcttcta aacttgagtt gagctctttg tttgaggagc tcaccctcat tgctcaagac 1440
aaaagaaacg ctgctgctgc tgctacttct tga 1473

<210> SEQ ID NO 24
<211> LENGTH: 490
<212> TYPE: PRT
<213> ORGANISM: Crocosmia x crocosmiiflora

<400> SEQUENCE: 24

```
Met Asp Ser Glu Pro Arg Lys Lys Lys Lys Gln Gln Gln Leu His Ile
1               5                   10                  15

Phe Phe Val Pro His Phe Ala Asn Gly His Met Thr Ala Ile Leu His
            20                  25                  30

Thr Ala Lys Leu Leu Ala Ala Glu His Gly Ala Arg Ser Thr Leu Val
        35                  40                  45

Thr Thr Pro Gly Asn Ala Tyr Ile Phe Asn Asp Thr Ile Asn Asp Ala
    50                  55                  60

Thr Arg Ser Gly Leu Ser Met Gln Leu Leu Leu Leu Pro Phe Pro Asp
65                  70                  75                  80

Val Gly Leu Pro Pro Gly Cys Glu Ser Thr Ala Ser Ile Pro Gln Thr
                85                  90                  95

Ala Glu Asn Arg Phe Leu Leu His Lys Ala Gly Tyr Leu Leu Arg Glu
            100                 105                 110

Pro Phe Glu Gly Leu Leu His Glu His Leu Pro Asp Cys Ile Val Gly
        115                 120                 125

Asp Ala Met Ser Leu Trp Cys Ala Asp Val Ala Glu Ser Phe His Ile
    130                 135                 140

Pro Tyr Val Gln Phe Asn Val Ser Ser Pro Phe Ala Phe Cys Val Leu
145                 150                 155                 160

Glu Thr Val Tyr Ser Gln Ala Ala His His Asn Ala Asp Ala Ser Thr
                165                 170                 175

Asp Thr Ile Gly Pro Leu Thr Gly Leu Pro His Pro Leu Val Leu Gln
            180                 185                 190

Arg Thr Glu Leu Thr Leu Pro Ala Glu Tyr Val Asp Met Tyr Met Gly
        195                 200                 205

Asp Leu Val Arg Ile Leu Arg Arg Ser Ile Gly Val Ile His Asn Ser
    210                 215                 220

Phe Cys Glu Leu Ala Pro Glu Tyr Leu Asp Ala Ile Val Lys Ser Gly
225                 230                 235                 240

Arg Ile Lys Arg Leu Trp Cys Val Gly Pro Leu Gln Leu Ser Ser Thr
                245                 250                 255

Thr Ile Ser Thr Asn Ala Pro Lys Asn Trp Glu Trp Ile Lys Lys Trp
            260                 265                 270

Leu Asp Thr Lys Glu Lys Glu Ser Val Val Cys Val Ser Phe Gly Thr
        275                 280                 285

Glu Trp Gln Phe Ser His Glu Gln Leu Arg Gln Leu Ala Ile Gly Leu
    290                 295                 300

Asp Ser Ser Gly His Ser Phe Val Trp Ile Leu Lys Gly Glu Asp Asp
305                 310                 315                 320

Thr Met Ala Glu Trp Met Pro Glu Gly Phe Tyr Glu Arg Val Glu Gly
                325                 330                 335

Arg Gly Leu Val Ile Thr Glu Trp Ala Pro Gln Phe Met Ile Leu Asn
```

-continued

```
            340                 345                 350

His Pro Ala Leu Gly Ala Ser Ile Cys His Cys Gly Trp Asn Ser Gly
        355                 360                 365

Ile Glu Ser Val Cys Ala Gly Leu Pro Val Ile Ala Trp Pro Leu His
    370                 375                 380

Ser Glu Gln Phe Leu Asn Glu Arg Phe Phe Val Glu Ala Leu Lys Ile
385                 390                 395                 400

Gly Val Arg Ile Ile Glu Gly Asp Met Arg Glu Pro Lys Leu Lys Ser
                405                 410                 415

Glu Lys Val Val Ser Ala Glu Lys Val Arg Glu Ala Val Met Asn Ile
            420                 425                 430

Leu Gly Ser Gly Glu Glu Val Lys Glu Met Arg Arg Lys Ala Lys Glu
        435                 440                 445

Tyr Ser Lys Leu Ala Lys Met Ala Met Glu Lys Gly Gly Ser Ser Lys
    450                 455                 460

Leu Glu Leu Ser Ser Leu Phe Glu Glu Leu Thr Leu Ile Ala Gln Asp
465                 470                 475                 480

Lys Arg Asn Ala Ala Ala Ala Ala Thr Ser
                485                 490
```

<210> SEQ ID NO 25
<211> LENGTH: 747
<212> TYPE: DNA
<213> ORGANISM: Crocosmia x crocosmiiflora

<400> SEQUENCE: 25

```
atgggaagaa agccatgttg ttcgaaggag ggatgaaca gaggggcatg ggcttcaatg      60

gaagacaaga tcttggtcac ttacatcaaa acacacggag aaggcaaatg gaggagtcta    120

ccaaagagag ctgggctgaa gcgatgcgga aagagctgcc gactccgttg gctgaactat    180

ctccggccgg gcatcaagag agggaacatt tctgaggatg aggaggacct catcatcaga    240

ctccataact tgctcggcaa tagatggtcc ctgattgcag gtagattgcc cgggcgaaca    300

gacaatgaaa tcaagaacta ctggaacaca aacttgggta ggagggtgca tgaccaatca    360

catcagcact gcagaccaaa tcccacaatt accagcacaa aaccggccga tgcgcctcct    420

gcgaacgcta acaccgtagc aacaatgccc gtgagaacta aggcggcaag gtgcactagg    480

gctttcttct ccgacgacct gtctgatcag aaggaggttg cggccaataa cgacggtctc    540

gataataaaa aggaggaatt tgatgcagta ggcagcatag ggcctctatt gcaagaaaat    600

gttggcaatg cagttggaga agatacgaac attgacatgg cagtgtcttt ggatagtctg    660

ctcttgttcg atagctttca agtcgacgat gggatcaatc ttcagtcgat ggctgctttg    720

ctagattcgg aggaccaatg gttttaa                                         747
```

<210> SEQ ID NO 26
<211> LENGTH: 248
<212> TYPE: PRT
<213> ORGANISM: Crocosmia x crocosmiiflora

<400> SEQUENCE: 26

```
Met Gly Arg Lys Pro Cys Cys Ser Lys Glu Gly Met Asn Arg Gly Ala
1               5                   10                  15

Trp Ala Ser Met Glu Asp Lys Ile Leu Val Thr Tyr Ile Lys Thr His
            20                  25                  30

Gly Glu Gly Lys Trp Arg Ser Leu Pro Lys Arg Ala Gly Leu Lys Arg
        35                  40                  45
```

```
Cys Gly Lys Ser Cys Arg Leu Arg Trp Leu Asn Tyr Leu Arg Pro Gly
    50                  55                  60

Ile Lys Arg Gly Asn Ile Ser Glu Asp Glu Glu Asp Leu Ile Ile Arg
65                  70                  75                  80

Leu His Asn Leu Leu Gly Asn Arg Trp Ser Leu Ile Ala Gly Arg Leu
                85                  90                  95

Pro Gly Arg Thr Asp Asn Glu Ile Lys Asn Tyr Trp Asn Thr Asn Leu
            100                 105                 110

Gly Arg Arg Val His Asp Gln Ser His Gln His Cys Arg Pro Asn Pro
        115                 120                 125

Thr Ile Thr Ser Thr Lys Pro Ala Asp Ala Pro Pro Ala Asn Ala Asn
    130                 135                 140

Thr Val Ala Thr Met Pro Val Arg Thr Lys Ala Ala Arg Cys Thr Arg
145                 150                 155                 160

Ala Phe Phe Ser Asp Asp Leu Ser Asp Gln Lys Glu Val Ala Ala Asn
                165                 170                 175

Asn Asp Gly Leu Asp Asn Lys Lys Glu Glu Phe Asp Ala Val Gly Ser
            180                 185                 190

Ile Gly Pro Leu Leu Gln Glu Asn Val Gly Asn Ala Val Gly Glu Asp
        195                 200                 205

Thr Asn Ile Asp Met Ala Val Ser Leu Asp Ser Leu Leu Leu Phe Asp
    210                 215                 220

Ser Phe Gln Val Asp Asp Gly Ile Asn Leu Gln Ser Met Ala Ala Leu
225                 230                 235                 240

Leu Asp Ser Glu Asp Gln Trp Phe
                245

<210> SEQ ID NO 27
<211> LENGTH: 849
<212> TYPE: DNA
<213> ORGANISM: Crocosmia x crocosmiiflora

<400> SEQUENCE: 27

atgggtagga ggccttgttg ctccaaagaa ggactgaacc gaggagcgtg gtcggctcga     60

gaagacaaag ttctcaaaga ttacatcaac actcacggcg aaggaaaatg gagagatctc    120

cccaggagag caggactaaa gcgttgcggt aagagttgtc gactacggtg gctaaattac    180

ttgaggccag acatcaagag aggcaacatt tcctacgacg aggaggagct cataatcaga    240

ctccacaagc ttcttggtaa cagatggtcg ctcattgccg gaagattgcc cggtcgaact    300

gacaatgaaa tcaagaacta ctggaacacg tatcttagca agaaggtgaa ctctcaaact    360

catcagcatg aaattgatgg tgatcaagtg cctctcaaga aaaccaagga ggaagaggta    420

agtgaaaagc ctcaagtgat cagaaccaag gcagtgaggt gcaccaaggc atacatgctc    480

actacccatc tggatgataa ttctttgatc accaataaat gcccggagcc gattagtact    540

gagcggtcgt actcgccttc agccactttc ctcgacattc cgatggattt cgacatggac    600

gagttcttgg ctggtttcga atgtgataga aatttcgatc aagtttgtga cggcgaaaat    660

ccgttacgac ttgacgataa aatggaagaa gaatggagag agagttatga gtgccttcaa    720

ctcaatgtgg actccgacat tagagccttg tcgtcggcat tgctagactc cgaagatgac    780

tggaagcaga atggaggaaa agatgagctt atgggaggag gtaatggagg gccttcatct    840

gtctcataa                                                            849
```

<210> SEQ ID NO 28
<211> LENGTH: 282
<212> TYPE: PRT
<213> ORGANISM: Crocosmia x crocosmiiflora

<400> SEQUENCE: 28

```
Met Gly Arg Arg Pro Cys Cys Ser Lys Glu Gly Leu Asn Arg Gly Ala
1               5                   10                  15

Trp Ser Ala Arg Glu Asp Lys Val Leu Lys Asp Tyr Ile Asn Thr His
            20                  25                  30

Gly Glu Gly Lys Trp Arg Asp Leu Pro Arg Arg Ala Gly Leu Lys Arg
        35                  40                  45

Cys Gly Lys Ser Cys Arg Leu Arg Trp Leu Asn Tyr Leu Arg Pro Asp
    50                  55                  60

Ile Lys Arg Gly Asn Ile Ser Tyr Asp Glu Glu Glu Leu Ile Ile Arg
65                  70                  75                  80

Leu His Lys Leu Leu Gly Asn Arg Trp Ser Leu Ile Ala Gly Arg Leu
                85                  90                  95

Pro Gly Arg Thr Asp Asn Glu Ile Lys Asn Tyr Trp Asn Thr Tyr Leu
            100                 105                 110

Ser Lys Lys Val Asn Ser Gln Thr His Gln His Glu Ile Asp Gly Asp
        115                 120                 125

Gln Val Pro Leu Lys Lys Thr Lys Glu Glu Glu Val Ser Glu Lys Pro
    130                 135                 140

Gln Val Ile Arg Thr Lys Ala Val Arg Cys Thr Lys Ala Tyr Met Leu
145                 150                 155                 160

Thr Thr His Leu Asp Asp Asn Ser Leu Ile Thr Asn Lys Cys Pro Glu
                165                 170                 175

Pro Ile Ser Thr Glu Arg Ser Tyr Ser Pro Ser Ala Thr Phe Leu Asp
            180                 185                 190

Ile Pro Met Asp Phe Asp Met Asp Glu Phe Leu Ala Gly Phe Glu Cys
        195                 200                 205

Asp Arg Asn Phe Asp Gln Val Cys Asp Gly Glu Asn Pro Leu Arg Leu
    210                 215                 220

Asp Asp Lys Met Glu Glu Glu Trp Arg Glu Ser Tyr Glu Cys Leu Gln
225                 230                 235                 240

Leu Asn Val Asp Ser Asp Ile Arg Ala Leu Ser Ser Ala Leu Leu Asp
                245                 250                 255

Ser Glu Asp Asp Trp Lys Gln Asn Gly Gly Lys Asp Glu Leu Met Gly
            260                 265                 270

Gly Gly Asn Gly Gly Pro Ser Ser Val Ser
        275                 280
```

<210> SEQ ID NO 29
<211> LENGTH: 780
<212> TYPE: DNA
<213> ORGANISM: Crocosmia x crocosmiiflora

<400> SEQUENCE: 29

```
atggtgaaga gaagccaaag agtggggaag aaggcagtgg aggtgaacag agggacatgg      60

actgctgagg aagatgagaa gctgatgaac tatgtatcag ctcatggtga caagaagtgg     120

agaatgcttc cagccaaagc tggtctaaag aggtgcggaa agagttgtag actgagatgg     180

ctgaactatc taaggccagg catcaagaga ggaaatatct ctgaagatga agaggacctc     240

atcattcgtc ttcacaatct actaggcaat cgatggtcaa ttattgcagg aagaattcca     300
```

-continued

```
ggccgaacag acaacgaaat caagaaccac tggaatactc acttgagcaa gaggtcatta    360

actatagatg acctcaacaa caagcagaat cctggtcttg acaaccgtga catgctctct    420

cctacaaaga taactcaacg ctcgactccg acacacacga acaagaatac caatgatgag    480

ctaatcgatt catggactga tctccctgct ccagattttg atcttgagca gttcctgagc    540

ttgcttccga tgtcggatct gtgtcccgga agcaatggca atgacttaga attgaatgat    600

tttgggattc cgataaatga tatcaatcag gattcatttc gatctgatga ttacaacgtc    660

aattaccaag aatttctgga ttctcaagta tggagtcgcg ctttcgaatt tgatgacata    720

gaccaattct tggattgcca agcctacggt agtctctgct caccgattgc tggacaataa    780
```

<210> SEQ ID NO 30
<211> LENGTH: 259
<212> TYPE: PRT
<213> ORGANISM: Crocosmia x crocosmiiflora

<400> SEQUENCE: 30

```
Met Val Lys Arg Ser Gln Arg Val Gly Lys Lys Ala Val Glu Val Asn
1               5                   10                  15

Arg Gly Thr Trp Thr Ala Glu Glu Asp Glu Lys Leu Met Asn Tyr Val
            20                  25                  30

Ser Ala His Gly Asp Lys Lys Trp Arg Met Leu Pro Ala Lys Ala Gly
        35                  40                  45

Leu Lys Arg Cys Gly Lys Ser Cys Arg Leu Arg Trp Leu Asn Tyr Leu
    50                  55                  60

Arg Pro Gly Ile Lys Arg Gly Asn Ile Ser Glu Asp Glu Glu Asp Leu
65                  70                  75                  80

Ile Ile Arg Leu His Asn Leu Leu Gly Asn Arg Trp Ser Ile Ile Ala
                85                  90                  95

Gly Arg Ile Pro Gly Arg Thr Asp Asn Glu Ile Lys Asn His Trp Asn
            100                 105                 110

Thr His Leu Ser Lys Arg Ser Leu Thr Ile Asp Asp Leu Asn Asn Lys
        115                 120                 125

Gln Asn Pro Gly Leu Asp Asn Arg Asp Met Leu Ser Pro Thr Lys Ile
    130                 135                 140

Thr Gln Arg Ser Thr Pro Thr His Thr Asn Lys Asn Thr Asn Asp Glu
145                 150                 155                 160

Leu Ile Asp Ser Trp Thr Asp Leu Pro Ala Pro Asp Phe Asp Leu Glu
                165                 170                 175

Gln Phe Leu Ser Leu Leu Pro Met Ser Asp Leu Cys Pro Gly Ser Asn
            180                 185                 190

Gly Asn Asp Leu Glu Leu Asn Asp Phe Gly Ile Pro Ile Asn Asp Ile
        195                 200                 205

Asn Gln Asp Ser Phe Arg Ser Asp Asp Tyr Asn Val Asn Tyr Gln Glu
    210                 215                 220

Phe Leu Asp Ser Gln Val Trp Ser Arg Ala Phe Glu Phe Asp Asp Ile
225                 230                 235                 240

Asp Gln Phe Leu Asp Cys Gln Ala Tyr Gly Ser Leu Cys Ser Pro Ile
                245                 250                 255

Ala Gly Gln
```

<210> SEQ ID NO 31
<211> LENGTH: 783
<212> TYPE: DNA
<213> ORGANISM: Crocosmia x crocosmiiflora

<400> SEQUENCE: 31

```
atggtgaaga gaagccaaag agtggagaag aaggcagtgg aggtaaacag agggacatgg     60
actgctgagg aagatgagaa gctgatgaac tatgtatcag ctcatggtga caagaagtgg    120
agaatgcttc cagccaaagc tggtctaaag aggtgcggaa agagttgtag actgagatgg    180
ttgaactatc tgaggccagg gatcaagaga ggaaatatct ctgaagatga agaggacctc    240
atcattcgtc ttcacaatct actaggcaat cgatggtcaa ttatcgcggg aagaattccg    300
ggccgaacag acaatgaaat caagaatcac tggaatactc acttgagcaa gaggtcatta    360
acaatagaag atctcaacaa gaagcacaat cctggtattg acaacattga catactccct    420
cctacaaaga taactctcac ctcgagctca gatacctttc cggtgactcc ggtatgccaa    480
accgatcaag cctcagacac gaacaagaat gatgtgttag tagattcatg gacagatctg    540
tctggtccag attttgatct cgaacagttt ctaagcttgc ttccaatgtc ggatctctgt    600
cctggaagca atggcaatga gttagaattc gatgattttg ggatcccaag acatgatagc    660
aaacaggatt catttagatc taatgactac aacatcaatt accaagaatg tctggattct    720
caagtatgga gttgcgcttt cgaatatgat gacctagacc aattcttgga ttgccaatcc    780
taa                                                                  783
```

<210> SEQ ID NO 32
<211> LENGTH: 260
<212> TYPE: PRT
<213> ORGANISM: Crocosmia x crocosmiiflora

<400> SEQUENCE: 32

```
Met Val Lys Arg Ser Gln Arg Val Glu Lys Lys Ala Val Glu Val Asn
1               5                   10                  15

Arg Gly Thr Trp Thr Ala Glu Glu Asp Glu Lys Leu Met Asn Tyr Val
            20                  25                  30

Ser Ala His Gly Asp Lys Lys Trp Arg Met Leu Pro Ala Lys Ala Gly
        35                  40                  45

Leu Lys Arg Cys Gly Lys Ser Cys Arg Leu Arg Trp Leu Asn Tyr Leu
    50                  55                  60

Arg Pro Gly Ile Lys Arg Gly Asn Ile Ser Glu Asp Glu Glu Asp Leu
65                  70                  75                  80

Ile Ile Arg Leu His Asn Leu Leu Gly Asn Arg Trp Ser Ile Ile Ala
                85                  90                  95

Gly Arg Ile Pro Gly Arg Thr Asp Asn Glu Ile Lys Asn His Trp Asn
            100                 105                 110

Thr His Leu Ser Lys Arg Ser Leu Thr Ile Glu Asp Leu Asn Lys Lys
        115                 120                 125

His Asn Pro Gly Ile Asp Asn Ile Asp Ile Leu Pro Pro Thr Lys Ile
    130                 135                 140

Thr Leu Thr Ser Ser Ser Asp Thr Phe Pro Val Thr Pro Val Cys Gln
145                 150                 155                 160

Thr Asp Gln Ala Ser Asp Thr Asn Lys Asn Asp Val Leu Val Asp Ser
                165                 170                 175

Trp Thr Asp Leu Ser Gly Pro Asp Phe Asp Leu Glu Gln Phe Leu Ser
            180                 185                 190

Leu Leu Pro Met Ser Asp Leu Cys Pro Gly Ser Asn Gly Asn Glu Leu
        195                 200                 205

Glu Phe Asp Asp Phe Gly Ile Pro Arg His Asp Ser Lys Gln Asp Ser
```

```
    210                 215                 220

Phe Arg Ser Asn Asp Tyr Asn Ile Asn Tyr Gln Glu Cys Leu Asp Ser
225                 230                 235                 240

Gln Val Trp Ser Cys Ala Phe Glu Tyr Asp Asp Leu Asp Gln Phe Leu
                245                 250                 255

Asp Cys Gln Ser
            260
```

<210> SEQ ID NO 33
<211> LENGTH: 22
<212> TYPE: DNA
<213> ORGANISM: Artificial sequence
<220> FEATURE:
<223> OTHER INFORMATION: Synthetic

<400> SEQUENCE: 33
atggattcag ccagcaggca gc 22

<210> SEQ ID NO 34
<211> LENGTH: 25
<212> TYPE: DNA
<213> ORGANISM: Artificial sequence
<220> FEATURE:
<223> OTHER INFORMATION: Synthetic

<400> SEQUENCE: 34
ttaattagca gtcccacgta ccatc 25

<210> SEQ ID NO 35
<211> LENGTH: 25
<212> TYPE: DNA
<213> ORGANISM: Artificial sequence
<220> FEATURE:
<223> OTHER INFORMATION: Synthetic

<400> SEQUENCE: 35
atggcagaga aagaagcaaa acatc 25

<210> SEQ ID NO 36
<211> LENGTH: 26
<212> TYPE: DNA
<213> ORGANISM: Artificial sequence
<220> FEATURE:
<223> OTHER INFORMATION: Synthetic

<400> SEQUENCE: 36
ctaaaaaccc gaagtacttg aacagg 26

<210> SEQ ID NO 37
<211> LENGTH: 22
<212> TYPE: DNA
<213> ORGANISM: Artificial sequence
<220> FEATURE:
<223> OTHER INFORMATION: Synthetic

<400> SEQUENCE: 37
atggaagctc atggagatag cc 22

<210> SEQ ID NO 38
<211> LENGTH: 23
<212> TYPE: DNA
<213> ORGANISM: Artificial sequence
<220> FEATURE:
<223> OTHER INFORMATION: Synthetic

<400> SEQUENCE: 38
tcagccatgt gaggttctgt gag 23

<210> SEQ ID NO 39
<211> LENGTH: 21
<212> TYPE: DNA
<213> ORGANISM: Artificial sequence
<220> FEATURE:
<223> OTHER INFORMATION: Synthetic

<400> SEQUENCE: 39
atgagcttca cagtgaccaa g 21

<210> SEQ ID NO 40
<211> LENGTH: 23
<212> TYPE: DNA
<213> ORGANISM: Artificial sequence
<220> FEATURE:
<223> OTHER INFORMATION: Synthetic

<400> SEQUENCE: 40
ctaggtaaaa tcattcatct cgg 23

<210> SEQ ID NO 41
<211> LENGTH: 21
<212> TYPE: DNA
<213> ORGANISM: Artificial sequence
<220> FEATURE:
<223> OTHER INFORMATION: Synthetic

<400> SEQUENCE: 41
atgagcttca cagtgaccaa g 21

<210> SEQ ID NO 42
<211> LENGTH: 23
<212> TYPE: DNA
<213> ORGANISM: Artificial sequence
<220> FEATURE:
<223> OTHER INFORMATION: Synthetic

<400> SEQUENCE: 42
ctaggtaaaa tcattcatct cgg 23

<210> SEQ ID NO 43
<211> LENGTH: 21
<212> TYPE: DNA
<213> ORGANISM: Artificial sequence
<220> FEATURE:
<223> OTHER INFORMATION: Synthetic

<400> SEQUENCE: 43
atggtgaagg gagaagtgac a 21

<210> SEQ ID NO 44
<211> LENGTH: 24
<212> TYPE: DNA
<213> ORGANISM: Artificial sequence
<220> FEATURE:
<223> OTHER INFORMATION: Synthetic

<400> SEQUENCE: 44
tcaattagca actgcttcca tgaa 24

<210> SEQ ID NO 45
<211> LENGTH: 20

<212> TYPE: DNA
<213> ORGANISM: Artificial sequence
<220> FEATURE:
<223> OTHER INFORMATION: Synthetic

<400> SEQUENCE: 45
atggcagtag aggtagaggc 20

<210> SEQ ID NO 46
<211> LENGTH: 22
<212> TYPE: DNA
<213> ORGANISM: Artificial sequence
<220> FEATURE:
<223> OTHER INFORMATION: Synthetic

<400> SEQUENCE: 46
tcaagcaccc acattgagaa ac 22

<210> SEQ ID NO 47
<211> LENGTH: 21
<212> TYPE: DNA
<213> ORGANISM: Artificial sequence
<220> FEATURE:
<223> OTHER INFORMATION: Synthetic

<400> SEQUENCE: 47
atgacacctt ccctatcctt c 21

<210> SEQ ID NO 48
<211> LENGTH: 25
<212> TYPE: DNA
<213> ORGANISM: Artificial sequence
<220> FEATURE:
<223> OTHER INFORMATION: Synthetic

<400> SEQUENCE: 48
tcaaagtgta gaaagagtaa atggg 25

<210> SEQ ID NO 49
<211> LENGTH: 21
<212> TYPE: DNA
<213> ORGANISM: Artificial sequence
<220> FEATURE:
<223> OTHER INFORMATION: Synthetic

<400> SEQUENCE: 49
atgagcttca cagtgaccaa g 21

<210> SEQ ID NO 50
<211> LENGTH: 22
<212> TYPE: DNA
<213> ORGANISM: Artificial sequence
<220> FEATURE:
<223> OTHER INFORMATION: Synthetic

<400> SEQUENCE: 50
ttaagctaca gcctcgtaga ac 22

<210> SEQ ID NO 51
<211> LENGTH: 24
<212> TYPE: DNA
<213> ORGANISM: Artificial sequence
<220> FEATURE:
<223> OTHER INFORMATION: Synthetic

<400> SEQUENCE: 51
atgggtaagg gagaagtcat aatt 24

<210> SEQ ID NO 52
<211> LENGTH: 22
<212> TYPE: DNA
<213> ORGANISM: Artificial sequence
<220> FEATURE:
<223> OTHER INFORMATION: Synthetic

<400> SEQUENCE: 52
ttaaccaact gcctccatga ac 22

<210> SEQ ID NO 53
<211> LENGTH: 23
<212> TYPE: DNA
<213> ORGANISM: Artificial sequence
<220> FEATURE:
<223> OTHER INFORMATION: Synthetic

<400> SEQUENCE: 53
gtgaaggtca gctgtgtggt cag 23

<210> SEQ ID NO 54
<211> LENGTH: 23
<212> TYPE: DNA
<213> ORGANISM: Artificial sequence
<220> FEATURE:
<223> OTHER INFORMATION: Synthetic

<400> SEQUENCE: 54
gcttctcaac tccgaacctc tcc 23

<210> SEQ ID NO 55
<211> LENGTH: 23
<212> TYPE: DNA
<213> ORGANISM: Artificial sequence
<220> FEATURE:
<223> OTHER INFORMATION: Synthetic

<400> SEQUENCE: 55
gtggtctatg tcagtttcgg tag 23

<210> SEQ ID NO 56
<211> LENGTH: 22
<212> TYPE: DNA
<213> ORGANISM: Artificial sequence
<220> FEATURE:
<223> OTHER INFORMATION: Synthetic

<400> SEQUENCE: 56
cggtcagctc acactcttct ag 22

<210> SEQ ID NO 57
<211> LENGTH: 25
<212> TYPE: DNA
<213> ORGANISM: Artificial sequence
<220> FEATURE:
<223> OTHER INFORMATION: Synthetic

<400> SEQUENCE: 57
cggatctgtc accagtgtct gatat 25

<210> SEQ ID NO 58
<211> LENGTH: 21
<212> TYPE: DNA
<213> ORGANISM: Artificial sequence
<220> FEATURE:
<223> OTHER INFORMATION: Synthetic

<400> SEQUENCE: 58
ggattgccat agcttcgctg t 21

<210> SEQ ID NO 59
<211> LENGTH: 24
<212> TYPE: DNA
<213> ORGANISM: Artificial sequence
<220> FEATURE:
<223> OTHER INFORMATION: Synthetic

<400> SEQUENCE: 59
cggatctgtc atcaattcct gatt 24

<210> SEQ ID NO 60
<211> LENGTH: 21
<212> TYPE: DNA
<213> ORGANISM: Artificial sequence
<220> FEATURE:
<223> OTHER INFORMATION: Synthetic

<400> SEQUENCE: 60
agattgccat agcttggctg c 21

<210> SEQ ID NO 61
<211> LENGTH: 21
<212> TYPE: DNA
<213> ORGANISM: Artificial sequence
<220> FEATURE:
<223> OTHER INFORMATION: Synthetic

<400> SEQUENCE: 61
gtcgtcggct tcttcgagat g 21

<210> SEQ ID NO 62
<211> LENGTH: 24
<212> TYPE: DNA
<213> ORGANISM: Artificial sequence
<220> FEATURE:
<223> OTHER INFORMATION: Synthetic

<400> SEQUENCE: 62
cacatagcaa actagggaca caac 24

<210> SEQ ID NO 63
<211> LENGTH: 21
<212> TYPE: DNA
<213> ORGANISM: Artificial sequence
<220> FEATURE:
<223> OTHER INFORMATION: Synthetic

<400> SEQUENCE: 63
gtccgtctcg aatctggtga g 21

<210> SEQ ID NO 64
<211> LENGTH: 23
<212> TYPE: DNA
<213> ORGANISM: Artificial sequence
<220> FEATURE:
<223> OTHER INFORMATION: Synthetic

<400> SEQUENCE: 64
gagcaacaca attcttaggc gtg 23

<210> SEQ ID NO 65
<211> LENGTH: 22
<212> TYPE: DNA
<213> ORGANISM: Artificial sequence
<220> FEATURE:
<223> OTHER INFORMATION: Synthetic

<400> SEQUENCE: 65
ggttgatgcc ggggtgattg ct 22

<210> SEQ ID NO 66
<211> LENGTH: 22
<212> TYPE: DNA
<213> ORGANISM: Artificial sequence
<220> FEATURE:
<223> OTHER INFORMATION: Synthetic

<400> SEQUENCE: 66
tccctgaagg tgactggaga cg 22

<210> SEQ ID NO 67
<211> LENGTH: 22
<212> TYPE: DNA
<213> ORGANISM: Artificial sequence
<220> FEATURE:
<223> OTHER INFORMATION: Synthetic

<400> SEQUENCE: 67
tgtcgatgcc gggctgattt cc 22

<210> SEQ ID NO 68
<211> LENGTH: 22
<212> TYPE: DNA
<213> ORGANISM: Artificial sequence
<220> FEATURE:
<223> OTHER INFORMATION: Synthetic

<400> SEQUENCE: 68
gccctggagg tggctggaga ca 22

<210> SEQ ID NO 69
<211> LENGTH: 23
<212> TYPE: DNA
<213> ORGANISM: Artificial sequence
<220> FEATURE:
<223> OTHER INFORMATION: Synthetic

<400> SEQUENCE: 69
gttcgacaag gtgaagtagc atg 23

<210> SEQ ID NO 70
<211> LENGTH: 22
<212> TYPE: DNA
<213> ORGANISM: Artificial sequence
<220> FEATURE:
<223> OTHER INFORMATION: Synthetic

<400> SEQUENCE: 70
cgctagttgt gcatcttcgt cg 22

<210> SEQ ID NO 71
<211> LENGTH: 20
<212> TYPE: DNA
<213> ORGANISM: Artificial sequence
<220> FEATURE:
<223> OTHER INFORMATION: Synthetic

<400> SEQUENCE: 71
atcgcagaat gccggtcgtc 20

<210> SEQ ID NO 72
<211> LENGTH: 20
<212> TYPE: DNA
<213> ORGANISM: Artificial sequence
<220> FEATURE:
<223> OTHER INFORMATION: Synthetic

<400> SEQUENCE: 72
ctcgacgatg tgtcggtacc 20

<210> SEQ ID NO 73
<211> LENGTH: 23
<212> TYPE: DNA
<213> ORGANISM: Artificial sequence
<220> FEATURE:
<223> OTHER INFORMATION: Synthetic

<400> SEQUENCE: 73
ggagtccagg attaactaca act 23

<210> SEQ ID NO 74
<211> LENGTH: 21
<212> TYPE: DNA
<213> ORGANISM: Artificial sequence
<220> FEATURE:
<223> OTHER INFORMATION: Synthetic

<400> SEQUENCE: 74
cttgagcagc agttcgattg c 21

<210> SEQ ID NO 75
<211> LENGTH: 21
<212> TYPE: DNA
<213> ORGANISM: Artificial sequence
<220> FEATURE:
<223> OTHER INFORMATION: Synthetic

<400> SEQUENCE: 75
gtcgtcggct tcttcgagat g 21

<210> SEQ ID NO 76
<211> LENGTH: 24
<212> TYPE: DNA
<213> ORGANISM: Artificial sequence
<220> FEATURE:
<223> OTHER INFORMATION: Synthetic

<400> SEQUENCE: 76
cacatagcaa actagggaca caac 24

<210> SEQ ID NO 77
<211> LENGTH: 21
<212> TYPE: DNA
<213> ORGANISM: Artificial sequence
<220> FEATURE:
<223> OTHER INFORMATION: Synthetic

<400> SEQUENCE: 77
gtccgtctcg aatctggtga g 21

<210> SEQ ID NO 78

<211> LENGTH: 23
<212> TYPE: DNA
<213> ORGANISM: Artificial sequence
<220> FEATURE:
<223> OTHER INFORMATION: Synthetic

<400> SEQUENCE: 78
gagcaacaca attcttaggc gtg 23

<210> SEQ ID NO 79
<211> LENGTH: 22
<212> TYPE: DNA
<213> ORGANISM: Artificial sequence
<220> FEATURE:
<223> OTHER INFORMATION: Synthetic

<400> SEQUENCE: 79
atggcgccgg gtgcaactgc ga 22

<210> SEQ ID NO 80
<211> LENGTH: 25
<212> TYPE: DNA
<213> ORGANISM: Artificial sequence
<220> FEATURE:
<223> OTHER INFORMATION: Synthetic

<400> SEQUENCE: 80
ttaagccaag atttcactga ggcct 25

<210> SEQ ID NO 81
<211> LENGTH: 21
<212> TYPE: DNA
<213> ORGANISM: Artificial sequence
<220> FEATURE:
<223> OTHER INFORMATION: Synthetic

<400> SEQUENCE: 81
atggcgccgg ttgcgactgc a 21

<210> SEQ ID NO 82
<211> LENGTH: 25
<212> TYPE: DNA
<213> ORGANISM: Artificial sequence
<220> FEATURE:
<223> OTHER INFORMATION: Synthetic

<400> SEQUENCE: 82
tcaagcaagg atttcactca gacct 25

<210> SEQ ID NO 83
<211> LENGTH: 23
<212> TYPE: DNA
<213> ORGANISM: Artificial sequence
<220> FEATURE:
<223> OTHER INFORMATION: Synthetic

<400> SEQUENCE: 83
atggaggtgg agagagttca agc 23

<210> SEQ ID NO 84
<211> LENGTH: 25
<212> TYPE: DNA
<213> ORGANISM: Artificial sequence
<220> FEATURE:
<223> OTHER INFORMATION: Synthetic

<400> SEQUENCE: 84
tcactgggga agcttgttaa gtttg 25

<210> SEQ ID NO 85
<211> LENGTH: 24
<212> TYPE: DNA
<213> ORGANISM: Artificial sequence
<220> FEATURE:
<223> OTHER INFORMATION: Synthetic

<400> SEQUENCE: 85
atgcttacct tcttcttcct ctgg 24

<210> SEQ ID NO 86
<211> LENGTH: 24
<212> TYPE: DNA
<213> ORGANISM: Artificial sequence
<220> FEATURE:
<223> OTHER INFORMATION: Synthetic

<400> SEQUENCE: 86
ttaataagcc ttatgcgata gccg 24

<210> SEQ ID NO 87
<211> LENGTH: 28
<212> TYPE: DNA
<213> ORGANISM: Artificial sequence
<220> FEATURE:
<223> OTHER INFORMATION: Synthetic

<400> SEQUENCE: 87
atgacaatga cttcccttga tattatcc 28

<210> SEQ ID NO 88
<211> LENGTH: 25
<212> TYPE: DNA
<213> ORGANISM: Artificial sequence
<220> FEATURE:
<223> OTHER INFORMATION: Synthetic

<400> SEQUENCE: 88
tcatttcatc ttgggcgaat aagcc 25

<210> SEQ ID NO 89
<211> LENGTH: 24
<212> TYPE: DNA
<213> ORGANISM: Artificial sequence
<220> FEATURE:
<223> OTHER INFORMATION: Synthetic

<400> SEQUENCE: 89
atgcaatcga gcacgatgaa gctc 24

<210> SEQ ID NO 90
<211> LENGTH: 23
<212> TYPE: DNA
<213> ORGANISM: Artificial sequence
<220> FEATURE:
<223> OTHER INFORMATION: Synthetic

<400> SEQUENCE: 90
ttaccacaca tcacggagat atc 23

<210> SEQ ID NO 91
<211> LENGTH: 21
<212> TYPE: DNA

-continued

```
<213> ORGANISM: Artificial sequence
<220> FEATURE:
<223> OTHER INFORMATION: Synthetic

<400> SEQUENCE: 91

atgagctcca aagaaggcca g                                          21


<210> SEQ ID NO 92
<211> LENGTH: 25
<212> TYPE: DNA
<213> ORGANISM: Artificial sequence
<220> FEATURE:
<223> OTHER INFORMATION: Synthetic

<400> SEQUENCE: 92

tcaaattgct tgtgtacgtg agttg                                      25


<210> SEQ ID NO 93
<211> LENGTH: 21
<212> TYPE: DNA
<213> ORGANISM: Artificial sequence
<220> FEATURE:
<223> OTHER INFORMATION: Synthetic

<400> SEQUENCE: 93

ccttcgccag acttgctcat g                                          21


<210> SEQ ID NO 94
<211> LENGTH: 20
<212> TYPE: DNA
<213> ORGANISM: Artificial sequence
<220> FEATURE:
<223> OTHER INFORMATION: Synthetic

<400> SEQUENCE: 94

ctgcgacgca tgtggagaac                                            20
```